US012152756B2

(12) United States Patent
Wilcox et al.

(10) Patent No.: US 12,152,756 B2
(45) **Date of Patent: *Nov. 26, 2024**

(54) LIGHTING DEVICES HAVING OPTICAL WAVEGUIDES FOR CONTROLLED LIGHT DISTRIBUTION

(71) Applicant: CREE LIGHTING USA LLC, Racine, WI (US)

(72) Inventors: Kurt Wilcox, Libertyville, IL (US); Jin Hong Lim, Morrisville, NC (US); Curt Progl, Raleigh, NC (US); Steve Wilcenski, Cary, NC (US); Zongjie Yuan, Libertyville, IL (US)

(73) Assignee: CREE LIGHTING USA LLC, Racine, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,586

(22) Filed: Apr. 17, 2023

(65) Prior Publication Data

US 2023/0417382 A1 Dec. 28, 2023

Related U.S. Application Data

(60) Continuation of application No. 17/672,510, filed on Feb. 15, 2022, now Pat. No. 11,655,950, which is a (Continued)

(51) Int. Cl.

*F21S 8/08* (2006.01)
*F21V 5/00* (2018.01)

(Continued)

(52) U.S. Cl.

CPC ............... *F21S 8/088* (2013.01); *F21S 8/086* (2013.01); *F21V 5/00* (2013.01); *F21V 21/116* (2013.01);

(Continued)

(58) Field of Classification Search

CPC ......... F21S 8/088; F21S 8/086; F21V 21/116; G02B 6/0016; G02B 6/0021; G02B 6/0031

See application file for complete search history.

(56) References Cited

U.S. PATENT DOCUMENTS

2011/0199774 A1* 8/2011 Shinohara ............ G02B 6/0018 359/599
2011/0310633 A1* 12/2011 Morgan ............. G02B 19/0019 362/558

(Continued)

*Primary Examiner* — Christopher E Dunay

(74) *Attorney, Agent, or Firm* — J. Clinton Wimbish; Maynard Nexsen PC

(57) ABSTRACT

Lighting devices having optical waveguides for controlled light distribution are provided. A lighting device includes a housing, a light emitter disposed in the housing, and a waveguide at least partially disposed in an opening of the housing. The waveguide includes a light input surface defining coupling features, wherein the light emitter is disposed adjacent the light input surface and emits light into the coupling features. The waveguide further includes a light transmission portion disposed between the light input surface and a light extraction portion, wherein light from the light emitter received at the light input surface propagates through the light transmission portion toward the light extraction portion. The waveguide further includes the light extraction portion, which comprises at least one light redirection feature and at least one light extraction feature that cooperate to generate a controlled light pattern exiting the lighting device.

20 Claims, 157 Drawing Sheets

Related U.S. Application Data continuation-in-part of application No. 16/392,978, filed on Apr. 24, 2019, now Pat. No. 11,408,572, which is a division of application No. 15/192,979, filed on Jun. 24, 2016, now Pat. No. 10,317,608.

(51) Int. Cl.

| | |
|---|---|
| ***F21V 8/00*** | (2006.01) |
| ***F21V 21/116*** | (2006.01) |
| ***G02B 6/24*** | (2006.01) |
| ***G02B 6/26*** | (2006.01) |
| ***G02B 6/30*** | (2006.01) |
| ***G02B 6/32*** | (2006.01) |
| ***G02B 6/34*** | (2006.01) |
| *F21V 29/51* | (2015.01) |
| *F21W 131/103* | (2006.01) |
| *F21Y 113/13* | (2016.01) |
| *F21Y 115/10* | (2016.01) |

(52) U.S. Cl.

CPC ......... *G02B 6/0006* (2013.01); *G02B 6/0016* (2013.01); *G02B 6/0021* (2013.01); *G02B 6/0031* (2013.01); *G02B 6/0035* (2013.01); *G02B 6/0036* (2013.01); *G02B 6/0045* (2013.01); *G02B 6/0055* (2013.01); *G02B 6/24* (2013.01); *G02B 6/262* (2013.01); *G02B 6/305* (2013.01); *G02B 6/32* (2013.01); *G02B 6/34* (2013.01); *F21V 29/51* (2015.01); *F21W 2131/103* (2013.01); *F21Y 2113/13* (2016.08); *F21Y 2115/10* (2016.08)

(56) References Cited

U.S. PATENT DOCUMENTS

2012/0113676 A1* 5/2012 Van Dijk ............. G02B 6/0078 362/606

2013/0039090 A1* 2/2013 Dau ...................... F21V 7/0025 362/217.05

2014/0091332 A1* 4/2014 Medendorp, Jr. .... G02B 6/0076 257/88

2014/0211496 A1* 7/2014 Durkee ..................... F21S 8/04 362/555

* cited by examiner

No end reflecting optic

Translucent50/50 on LGP ends

WO on LGP ends

Front

@ 65°

Max/Min = 3.2

Max/Min = 4.5

48C

| CCX | CCY |
|---|---|
| 0.29 | 0.32 |
| 0.35 | 0.38 |
| 0.40 | 0.42 |
| 0.48 | 0.44 |
| 0.48 | 0.39 |
| 0.40 | 0.36 |
| 0.32 | 0.30 |
| 0.29 | 0.32 |

LIGHTING DEVICES HAVING OPTICAL WAVEGUIDES FOR CONTROLLED LIGHT DISTRIBUTION

RELATED APPLICATIONS

This application is a continuation of U.S. patent application Ser. No. 17/672,510, filed on Feb. 15, 2022, which is a continuation-in-part of U.S. patent application Ser. No. 16/392,978, now U.S. Pat. No. 11,408,572, filed Apr. 24, 2019, which is a division of U.S. patent application Ser. No. 15/192,979, now U.S. Pat. No. 10,317,608, filed Jun. 24, 2016. U.S. patent application Ser. No. 15/192,979 is a continuation-in-part of International Patent Application No. PCT/US2014/30017, filed Mar. 15, 2014. U.S. patent application Ser. No. 15/192,979 is further a continuation-in-part of U.S. patent application Ser. No. 14/485,609, filed Sep. 12, 2014, now U.S. Pat. No. 9,952,372, which claims the benefit of U.S. Provisional Patent Application Ser. No. 62/005,965, filed May 30, 2014, U.S. Provisional Patent Application Ser. No. 62/025,436, filed Jul. 16, 2014, and U.S. Provisional Patent Application Ser. No. 62/025,905, filed Jul. 17, 2014. U.S. patent application Ser. No. 15/192,979 is further a continuation-in-part of U.S. patent application Ser. No. 14/657,988, now U.S. Pat. No. 9,709,725, filed Mar. 13, 2015, which claims the benefit of U.S. Provisional Patent Application Ser. No. 62/005,965, filed May 30, 2014, U.S. Provisional Patent Application Ser. No. 62/025,436, filed Jul. 16, 2014, and U.S. Provisional Patent Application Ser. No. 62/025,905, filed Jul. 17, 2014. U.S. patent application Ser. No. 15/192,979 is further a continuation-in-part of U.S. Design Patent Application Ser. No. 29/496,754, now U.S. Des. Pat. No. D764,091, filed Jul. 16, 2014. U.S. patent application Ser. No. 15/192,979 is further a continuation-in-part of U.S. patent application Ser. No. 15/060,354, now U.S. Pat. No. 9,835,317, filed Mar. 3, 2016. U.S. patent Application Ser. No. 15/192,979 is further a continuation-in-part of U.S. patent Application Ser. No. 15/060,306 now U.S. Pat. No. 9,841,154, filed Mar. 3, 2016. U.S. patent application Ser. No. 15/192,979 further claims the benefit of U.S. Provisional Patent Application Ser. No. 62/301,559, filed Feb. 29, 2016, and U.S. Provisional Patent Application Ser. No. 62/301,572, filed Feb. 29, 2016, the disclosures of which are incorporated by reference herein in their entireties.

This application is a continuation of U.S. patent application Ser. No. 17/672,510, filed on Feb. 15, 2022, which is a continuation-in-part of U.S. patent application Ser. No. 16/369,138, now U.S. Pat. No. 11,249,239, filed Mar. 29, 2019, the disclosure of which is hereby incorporated herein by reference in its entirety.

The present application is also a continuation of U.S. patent application Ser. No. 17/036,982; filed on Sep. 29, 2020, which is a continuation of U.S. patent application Ser. No. 16/429,491, now U.S. Pat. No. 10,808,891; filed Jun. 3, 2019; which is a continuation of U.S. patent application Ser. No. 15/812,729, filed Dec. 9, 2013 (now U.S. Pat. No. 9,869,432), which in turn claims the benefit of U.S. Provisional Patent Application No. 61/758,660, filed Jan. 30, 2013, and further comprises a continuation-in-part of U.S. patent application Ser. No. 13/842,521, filed Mar. 15, 2013 (now U.S. Pat. No. 9,519,095), and further comprises a continuation-in-part of U.S. patent application Ser. No. 13/839,949, filed Mar. 15, 2013 (now U.S. Pat. No. 9,581,751), and further comprises a continuation-in-part of U.S. patent application Ser. No. 13/841,074, filed Mar. 15, 2013 (now U.S. Pat. No. 9,625,638), and further comprises a continuation-in-part of U.S. patent application Ser. No. 13/840,563, filed Mar. 15, 2013, and further comprises a continuation-in-part of U.S. patent application Ser. No. 13/938,877, filed Jul. 10, 2013 (now U.S. Pat. No. 9,389,367), all owned by the assignee of the present application, and the disclosures of which are incorporated by reference herein.

This patent application also incorporates by reference U.S. patent application Ser. No. 14/101,086, filed Dec. 9, 2013 (now U.S. Pat. No. 9,690,029), U.S. patent application Ser. No. 14/101,099, filed Dec. 9, 2013 (now U.S. Pat. No. 9,411,086), U.S. patent application Ser. No. 14/101,132, filed Dec. 9, 2013 (now U.S. Pat. No. 9,442,243), U.S. patent application Ser. No. 14/101,129, filed Dec. 9, 2013 (now U.S. Pat. No. 10,234,616) and U.S. patent application Ser. No. 14/101,051, filed Dec. 9, 2013 (now U.S. Pat. No. 9,366,396).

The present application is also a continuation of U.S. patent application Ser. No. 17/346,700, filed Jun. 14, 2021, which is a continuation of U.S. patent application Ser. No. 16/539,163, now U.S. Pat. No. 11,099,317, filed Aug. 13, 2019, which is a divisional of U.S. patent application Ser. No. 14/726,152, filed May 29, 2015, now U.S. Pat. No. 10,422,944, which is a continuation-in-part of U.S. patent application Ser. No. 13/840,563, filed Mar. 15, 2013, now U.S. Pat. No. 10,436,969, and also a continuation-in-part of U.S. patent application Ser. No. 13/839,949, filed Mar. 15, 2013, now U.S. Pat. No. 9,581,751, both of which claim benefit of U.S. Provisional patent application Ser. No. 61/758,660, filed Jan. 30, 2013.

U.S. patent application Ser. No. 17/346,700 is also a continuation of U.S. patent application Ser. No. 16/937,026, filed Jul. 23, 2020, now U.S. Pat. No. 11,079,079; a continuation of U.S. patent application Ser. No. 16/937,096, filed Jul. 23, 2020, now U.S. Pat. No. 11,035,527, and a continuation of U.S. patent application Ser. No. 15/376,257, filed Dec. 12, 2016. U.S. patent application Ser. No. 15/376,257 is a divisional of U.S. patent application Ser. No. 13/842,521, filed Mar. 15, 2013, now U.S. Pat. No. 9,519,095, which claims the benefit of U.S. Provisional Patent Application Ser. No. 61/758,660, filed Jan. 30, 2013. U.S. patent application Ser. No. 16/937,026 is a continuation-in-part of U.S. patent application Ser. No. 16/692,130, filed Nov. 22, 2019, now U.S. Pat. No. 10,794,572, which is a continuation of U.S. patent application Ser. No. 15/710,913, filed Sep. 21, 2017, now U.S. Pat. No. 10,508,794.

The entire contents of each of the above-listed applications are incorporated herein by reference.

FIELD OF THE DISCLOSURE

The present disclosure relates to optical devices, and more particularly, to luminaries utilizing an optical waveguide.

The present inventive subject matter relates to optical waveguides, and more particularly to optical waveguides for general lighting.

The present disclosure relates to light fixtures, and more particularly to light fixtures incorporating an optical waveguide.

BACKGROUND

An optical waveguide mixes and directs light emitted by one or more light sources, such as one or more light emitting diodes (LEDs). A typical optical waveguide includes three main components: one or more coupling elements or optics, one or more distribution elements, and one or more extraction elements. The coupling element(s) or optic(s) direct light into the distribution element(s) and condition the light to interact with the subsequent components. The one or more distribution elements control how light flows through the waveguide and have characteristics dependent on the waveguide geometry and material. The extraction element(s) determine how light is removed by controlling where and in what direction the light exits the waveguide.

In some applications such as roadway, street, or parking lot lighting, it may be desirable to illuminate certain regions surrounding a light fixture while maintaining relatively low illumination of neighboring regions thereof. For example, along a roadway, it may be preferred to direct light in an x-dimension parallel with the roadway while minimizing illumination in a y-dimension toward roadside houses. Alternatively, symmetrical 360-degree illumination may be desirable. In the further alternative, asymmetrical 360 illumination may also be desirable.

An optical waveguide mixes and directs light emitted by one or more light sources, such as one or more light emitting diodes (LEDs). A typical optical waveguide includes three main components: one or more coupling elements, one or more distribution elements, and one or more extraction elements. The coupling component(s) direct light into the distribution element(s), and condition the light to interact with the subsequent components. The one or more distribution elements control how light flows through the waveguide and is dependent on the waveguide geometry and material. The extraction element(s) determine how light is removed by controlling where and in what direction the light exits the waveguide.

When designing a coupling optic, the primary considerations are: maximizing the efficiency of light transfer from the source into the waveguide; controlling the location of light injected into the waveguide; and controlling the angular distribution of the light in the coupling optic. One way of controlling the spatial and angular spread of injected light is by fitting each source with a dedicated lens. These lenses can be disposed with an air gap between the lens and the coupling optic, or may be manufactured from the same piece of material that defines the waveguide's distribution element(s). Discrete coupling optics allow numerous advantages such as higher efficiency coupling, controlled overlap of light flux from the sources, and angular control of how the injected light interacts with the remaining elements of the waveguide. Discrete coupling optics use refraction, total internal reflection, and surface or volume scattering to control the distribution of light injected into the waveguide.

After light has been coupled into the waveguide, it must be guided and conditioned to the locations of extraction. The simplest example is a fiber-optic cable, which is designed to transport light from one end of the cable to another with minimal loss in between. To achieve this, fiber optic cables are only gradually curved and sharp bends in the waveguide are avoided. In accordance with well-known principles of total internal reflectance light traveling through a waveguide is reflected back into the waveguide from an outer surface thereof, provided that the incident light does not exceed a critical angle with respect to the surface.

In order for an extraction element to remove light from the waveguide, the light must first contact the feature comprising the element. By appropriately shaping the waveguide surfaces, one can control the flow of light across the extraction feature(s). Specifically, selecting the spacing, shape, and other characteristic(s) of the extraction features affects the appearance of the waveguide, its resulting distribution, and efficiency.

Hulse U.S. Pat. No. 5,812,714 discloses a waveguide bend element configured to change a direction of travel of light from a first direction to a second direction. The waveguide bend element includes a collector element that collects light emitted from a light source and directs the light into an input face of the waveguide bend element. Light entering the bend element is reflected internally along an outer surface and exits the element at an output face. The outer surface comprises beveled angular surfaces or a curved surface oriented such that most of the light entering the bend element is internally reflected until the light reaches the output face.

Parker et al. U.S. Pat. No. 5,613,751 discloses a light emitting panel assembly that comprises a transparent light emitting panel having a light input surface, a light transition area, and one or more light sources. Light sources are preferably embedded or bonded in the light transition area to eliminate any air gaps, thus reducing light loss and maximizing the emitted light. The light transition area may include reflective and/or refractive surfaces around and behind each light source to reflect and/or refract and focus the light more efficiently through the light transition area into the light input surface of the light emitting panel. A pattern of light extracting deformities, or any change in the shape or geometry of the panel surface, and/or coating that causes a portion of the light to be emitted, may be provided on one or both sides of the panel members. A variable pattern of deformities may break up the light rays such that the internal angle of reflection of a portion of the light rays will be great enough to cause the light rays either to be emitted out of the panel or reflected back through the panel and emitted out of the other side.

Shipman, U.S. Pat. No. 3,532,871 discloses a combination running light reflector having two light sources, each of which, when illuminated, develops light that is directed onto a polished surface of a projection. The light is reflected onto a cone-shaped reflector. The light is transversely reflected into a main body and impinges on prisms that direct the light out of the main body.

Simon U.S. Pat. No. 5,897,201 discloses various embodiments of architectural lighting that is distributed from contained radially collimated light. A quasi-point source develops light that is collimated in a radially outward direction and exit means of distribution optics direct the collimated light out of the optics.

Kelly et al. U.S. Pat. No. 8,430,548 discloses light fixtures that use a variety of light sources, such as an incandescent bulb, a fluorescent tube and multiple LEDs. A volumetric diffuser controls the spatial luminance uniformity and angular spread of light from the light fixture. The volumetric diffuser includes one or more regions of volumetric light scattering particles. The volumetric diffuser may be used in conjunction with a waveguide to extract light.

Dau et al U.S. Pat. No. 8,506,112 discloses illumination devices having multiple light emitting elements, such as LEDs disposed in a row. A collimating optical element receives light developed by the LEDs and a light guide directs the collimated light from the optical element to an optical extractor, which extracts the light.

A.L.P. Lighting Components, Inc. of Niles, Illinois, manufactures a waveguide having a wedge shape with a thick end, a narrow end, and two main faces therebetween. Pyramid-shaped extraction features are formed on both main faces. The wedge waveguide is used as an exit sign such that the thick end of the sign is positioned adjacent a ceiling and the narrow end extends downwardly. Light enters the waveguide at the thick end and is directed down and away from the waveguide by the pyramid-shaped extraction features.

Low-profile LED-based luminaires have recently been developed (e.g., General Electric's ET series panel troffers) that utilize a string of LED elements directed into the edge of a waveguiding element (an "edge-lit" approach). However, such luminaires typically suffer from low efficiency due to losses inherent in coupling light emitted from a predominantly Lambertian emitting source such as a LED element into the narrow edge of a waveguide plane.

An optical waveguide mixes and directs light emitted by one or more light sources, such as one or more light emitting diodes (LEDs). A typical optical waveguide includes three main components: one or more coupling elements, one or more distribution elements, and one or more extraction elements. The coupling component(s) direct light into the distribution element(s), and condition the light to interact with the subsequent components. The one or more distribution elements control how light flows through the waveguide and is dependent on the waveguide geometry and material. The extraction element(s) determine how light is removed by controlling where and in what direction the light exits the waveguide.

When designing a coupling optic, the primary considerations are: maximizing the efficiency of light transfer from the source into the waveguide; controlling the location of light injected into the waveguide; and controlling the angular distribution of the light in the coupling optic. One way of controlling the spatial and angular spread of injected light is by fitting each source with a dedicated lens. These lenses can be disposed with an air gap between the lens and the coupling optic, or may be manufactured from the same piece of material that defines the waveguide's distribution element(s). Discrete coupling optics allow numerous advantages such as higher efficiency coupling, controlled overlap of light flux from the sources, and angular control of how the injected light interacts with the remaining elements of the waveguide. Discrete coupling optics use refraction, total internal reflection, and surface or volume scattering to control the distribution of light injected into the waveguide.

After light has been coupled into the waveguide, it must be guided and conditioned to the locations of extraction. The simplest example is a fiber-optic cable, which is designed to transport light from one end of the cable to another with minimal loss in between. To achieve this, fiber optic cables are only gradually curved and sharp bends in the waveguide are avoided. In accordance with well-known principles of total internal reflectance light traveling through a waveguide is reflected back into the waveguide from an outer surface thereof, provided that the incident light does not exceed a critical angle with respect to the surface.

In order for an extraction element to remove light from the waveguide, the light must first contact the feature comprising the element. By appropriately shaping the waveguide surfaces, one can control the flow of light across the extraction feature(s). Specifically, selecting the spacing, shape, and other characteristic(s) of the extraction features affects the appearance of the waveguide, its resulting distribution, and efficiency.

SUMMARY

Lighting devices having optical waveguides for controlled light distribution are provided. A lighting device includes a housing, a light emitter disposed in the housing, and a waveguide at least partially disposed in an opening of the housing. The waveguide includes a light input surface defining coupling features, wherein the light emitter is disposed adjacent the light input surface and emits light into the coupling features. The waveguide further includes a light transmission portion disposed between the light input surface and a light extraction portion, wherein light from the light emitter received at the light input surface propagates through the light transmission portion toward the light extraction portion. The waveguide further includes the light extraction portion, which comprises at least one light redirection feature and at least one light extraction feature that cooperate to generate a controlled light pattern exiting the lighting device.

According to one aspect, a lighting device comprises a body of optically transmissive material exhibiting a total internal reflection characteristic, the body further comprising a light input surface for receiving light, a light extraction portion spaced from the light input surface, a light transmission portion disposed between the light input surface and the light extraction portion, and at least one light deflection surface for deflecting light toward the light extraction portion. Further in accordance with this aspect the light extraction portion comprises a first extraction surface for extracting light deflected by the at least one light deflection surface out of the body and a second extraction surface for extracting light other than light deflected by the at least one light deflection surface out of the body.

According to another aspect, a lighting device comprises a body of optically transmissive material exhibiting a total internal reflection characteristic, the body further comprising a light input surface for receiving light in a first direction, a light extraction portion spaced from the light input surface, and a light transmission portion at least partially surrounding the light extraction portion and disposed between the light input surface and the light extraction portion. Further in accordance with this aspect, the light extraction portion comprises at least two spaced surfaces for directing light out of the body in a second direction comprising a directional component opposite the first direction.

According to still another aspect, a lighting device comprises a body of optically transmissive material exhibiting a total internal reflection characteristic, the body further comprising a light input surface for receiving light in a first direction, a light extraction portion spaced from the light input surface, and a light transmission portion disposed between the light input surface and the light extraction portion. Further regarding this aspect, the body comprises a width dimension, a length dimension, and a thickness dimension wherein the light extraction portion comprises first and second light reflecting surfaces disposed in a first thickness portion of the body and first and second light extraction surfaces disposed in a second thickness portion of the body for receiving light reflected off the first and second light reflecting surfaces and for directing light out of the body in a second direction comprising a directional component opposite the first direction.

According to yet another aspect, a lighting device comprises a body of optically transmissive material exhibiting a total internal reflection characteristic, the body further comprising a light input surface for receiving light in a first direction, a light extraction portion spaced from the light input surface, and a light transmission portion disposed between the light input surface and the light extraction portion. Further, in accordance with this aspect, the light extraction portion comprises a light extraction feature including a surface for directing light out of the body in a second direction comprising a directional component opposite the first direction and a portion for directing light out of the body in a direction comprising a directional component along the first direction.

According to another aspect, a luminaire comprises a body of optically transmissive material exhibiting a total internal reflection characteristic, the body further comprising a light input surface for receiving light in a first direction, a light extraction portion spaced from the light input surface, and a light transmission portion at least partially surrounding the light extraction portion. Further regarding this aspect, the body comprises a width dimension, a length dimension, and a thickness dimension wherein the light input surface is disposed on one side of the light extraction portion and the light extraction portion comprises a light extraction feature for extracting light through a light output surface in exit directions comprising directional components along the first direction and opposite the first direction. Further still in accordance with this aspect, a luminaire housing comprises a mounting apparatus that mounts the body in an orientation such that the length and width extend in substantially horizontal directions and the thickness dimension extends in a substantially vertical direction.

According to another aspect, a luminaire comprises a body of optically transmissive material exhibiting a total internal reflection characteristic, the body further comprising a light input surface for receiving light in a first direction, a light extraction portion spaced from the light input surface, and a light transmission portion disposed between the light input surface and the light extraction portion and at least partially surrounding the light extraction portion. Further according to this aspect, the body comprises a width dimension, a length dimension, and a thickness dimension wherein the light input surface is disposed on one side of the light extraction portion and the light extraction portion comprises a light extraction feature for extracting light through a light output surface in exit directions comprising directional components along the first direction and opposite the first direction. Still further regarding this aspect, a luminaire housing comprising a mounting apparatus that mounts the body in an orientation such that at least one of the length and width dimensions has a substantially vertical directional component and the thickness dimension extends in a substantially horizontal direction.

According to yet another aspect, a lighting device comprises a body of optically transmissive material exhibiting a total internal reflection characteristic, the body further comprising a light input surface for receiving light in a first direction from at least one LED, a light extraction feature comprising a light extraction surface and a light reflecting surface, and a light redirection feature configured to receive light from said input surface. Also, according to this aspect, the light reflection surface of the light extraction feature is configured to receive light from the light redirection feature and reflect the light from the light redirection feature to the light extracting surface for extraction from the body in a second direction comprising a directional component opposite the first direction. Still further according to this aspect, the light reflection surface of the light extraction feature is configured to extract light other than the light from the light redirection feature from the body in a direction comprising a directional component along the first direction.

Other aspects and advantages of the present invention will become apparent upon consideration of the following detailed description and the attached drawings wherein like numerals designate like structures throughout the specification.

In some embodiments, a waveguide comprises a light coupling portion having a first surface and a second surface. A plurality of LEDs emits light into the first surface of the light coupling portion. A light emitting portion has a third surface and a fourth surface. The light emitting portion is disposed adjacent the light coupling portion such that the third surface is disposed adjacent the second surface. A light transmission portion optically couples the light coupling portion to the light emitting portion.

A light extraction feature may be provided for extracting light through the fourth surface. The light extraction feature may be on the fourth surface. The light extraction feature may comprise at least one of indents, depressions, facets or holes extending into the fourth surface. The light extraction feature may comprise at least one of bumps, facets or steps rising above the fourth surface. The light coupling portion may have substantially the same area as the light emitting portion. The light coupling portion may have substantially the same footprint as the light emitting portion. The light coupling portion may be substantially coextensive with the light emitting portion. The first surface, the second surface, the third surface and the fourth surface may be substantially parallel to one another. The fourth surface may be a light emitting surface and the first surface may be disposed substantially parallel to the fourth surface where the plurality of LEDs may be spaced over the first surface. The light transmission portion may be substantially annular. Light may be directed radially inwardly from the light transmission portion into the light emitting portion. A second light transmission portion may optically couple the light coupling portion to the light emitting portion.

In some embodiments, a waveguide comprises a light coupling portion having a first interior surface and a first exterior surface where the first exterior surface comprises a plurality of light coupling features. A plurality of LEDs emits light into the light coupling features. A light emitting portion has a second interior surface and a second exterior surface where the second exterior surface defines a light emitting surface. The light emitting portion is disposed adjacent the light coupling portion such that the first interior surface is disposed adjacent the second interior surface. A light transmission portion optically couples the light coupling portion to the light emitting portion.

The light coupling portion and light emitting portion may be separate components connected at an interface. A light extraction feature may extract light through the second exterior surface. The light extraction feature may comprise at least one of indents, depressions, facets or holes extending into the fourth surface and bumps, facets or steps rising above the fourth surface. A footprint of the light coupling portion may be substantially the same or less than a footprint of the light emitting portion. The light coupling portion may be made of a first material and the light emitting region may be made of a second material where the first material is different than the second material. The light emitting portion may be made of glass and the light coupling portion may be made of at least one of acrylic and silicone. A second light transmission portion may optically couple the light coupling portion to the light emitting portion.

Those skilled in the art will appreciate the scope of the present disclosure and realize additional aspects thereof after reading the following detailed description of the preferred embodiments in association with the accompanying drawing figures.

According to one aspect, a waveguide comprises a waveguide body having a coupling cavity defined by a coupling feature disposed within the waveguide body. A plug member comprises a first portion disposed in the coupling cavity and an outer surface substantially conforming to the coupling feature and a second portion extending from the first portion into the coupling cavity. The second portion includes a reflective surface adapted to direct light in the coupling cavity into the waveguide body.

According to another aspect, a luminaire, comprises a waveguide body having a lateral extent defined by a first face and a second face opposite the first face. A coupling cavity extends in a depth dimension of the waveguide body transverse to the lateral extent and is defined by a plurality of light coupling features that extend between the first and second faces. At least one of the light coupling features has a first portion that extends laterally into the waveguide body to an extent greater than an extent to which a second portion of the at least one light coupling feature extends laterally into the waveguide body. A plurality of LED's is disposed in the coupling cavity.

According to yet another aspect, a luminaire comprises a waveguide body having an interior coupling cavity extending into a portion of the waveguide body remote from an edge thereof. An LED element extends into the interior coupling cavity and comprises first and second sets of LEDs wherein each LED of the first set comprises a first color LED and each LED of the second set comprises a second color LED. The second color LEDs are disposed between the first color LEDs and the first color LEDs have a first height and the second color LEDs have a second height less than the first height. The LED element further includes a lens disposed over the first and second sets of LEDs.

According to further aspect, a luminaire comprises a waveguide body having and interior coupling cavity, and an LED element extending into the interior coupling cavity. The interior coupling cavity extends into a portion of the waveguide body from an edge thereof and includes at least one scalloped surface.

Other aspects and advantages of the present invention will become apparent upon consideration of the following detailed description and the attached drawings wherein like numerals designate like structures throughout the specification.

Embodiments of the present disclosure generally relate to light fixtures and luminaires configured to emit light. According to one aspect, an optical waveguide includes a first waveguide portion and a second waveguide portion adjacent to and separate from the first waveguide portion. The waveguide portions include light coupling portions that are at least partially aligned and adapted to receive light developed by a light source. The first waveguide portion further has a first major surface with light direction features and a second major surface opposite the first major surface. The second waveguide portion further has a third major surface proximate the second major surface with an air gap disposed therebetween and a fourth major surface opposite the third major surface wherein the fourth major surface includes a cavity extending therein.

According to another aspect, an optical waveguide comprises first and second waveguide stages having first and second at least partially aligned interior light coupling cavities, respectively, first and second light transmission portions, respectively, separated from one another by an air gap, and first and second light extraction portions, respectively. The light transmission portion of each of the first and second waveguide stages is disposed between the interior light coupling cavity and the light extraction portion of such stage along a lateral dimension thereof. The light extraction portion of the first stage is disposed outside of the light extraction portion of the second stage along the lateral dimension of the second stage.

According to yet another aspect, a luminaire includes a housing and an optical waveguide disposed in the housing. The optical waveguide includes first and second stages each having a light coupling portion and a light extraction portion. A light source is also disposed in the housing and is adapted to develop light that is directly incident on both of the light coupling portions of the first and second stages. Light incident on the light coupling portions travels through the first and second stages and the light extraction portions direct light out of the stages.

According to still another aspect, an optical waveguide comprises a plurality of waveguide portions arranged in a stack with each waveguide portion having a coupling surface and a surface opposite the coupling surface. The coupling surface of a first waveguide portion is aligned with a light source and adapted to receive light developed by the light source and each next waveguide is aligned with each previous waveguide such that light escaping through the surface opposite the coupling surface of each previous waveguide is received by the coupling surface of the next waveguide.

Other aspects and advantages will become apparent upon consideration of the following detailed description and the attached drawings wherein like numerals designate like structures throughout the specification.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 74:
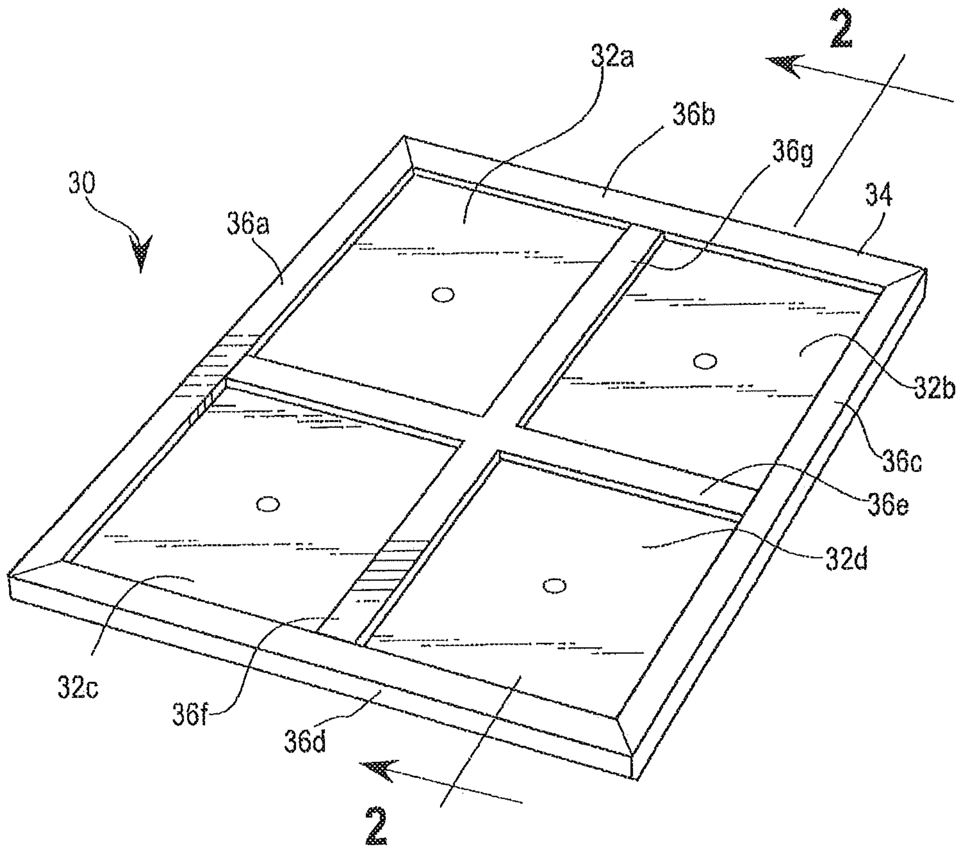
FIG. 74 is a perspective view of a luminaire incorporating waveguides.
Figure 76A:
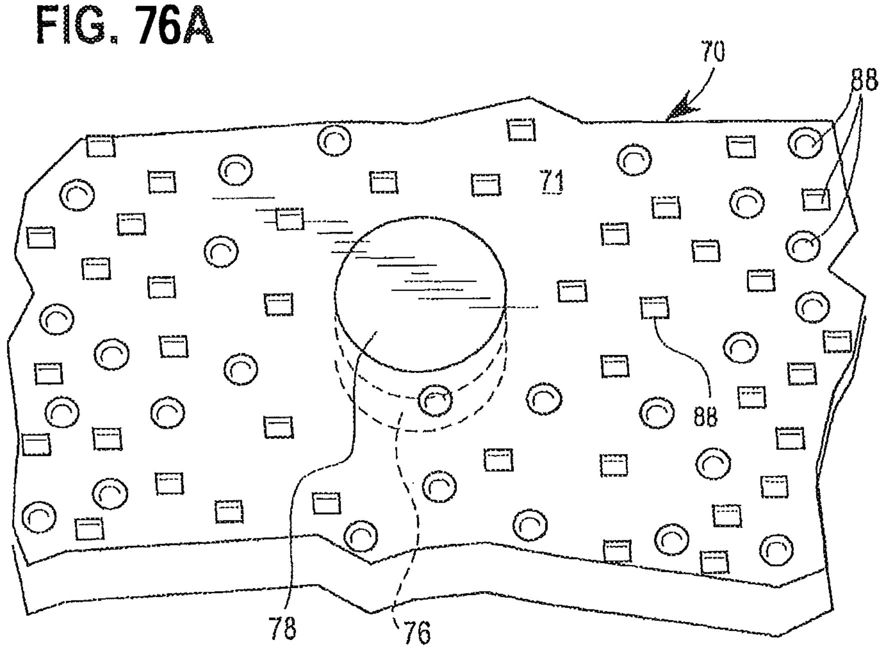
Figure 76B:
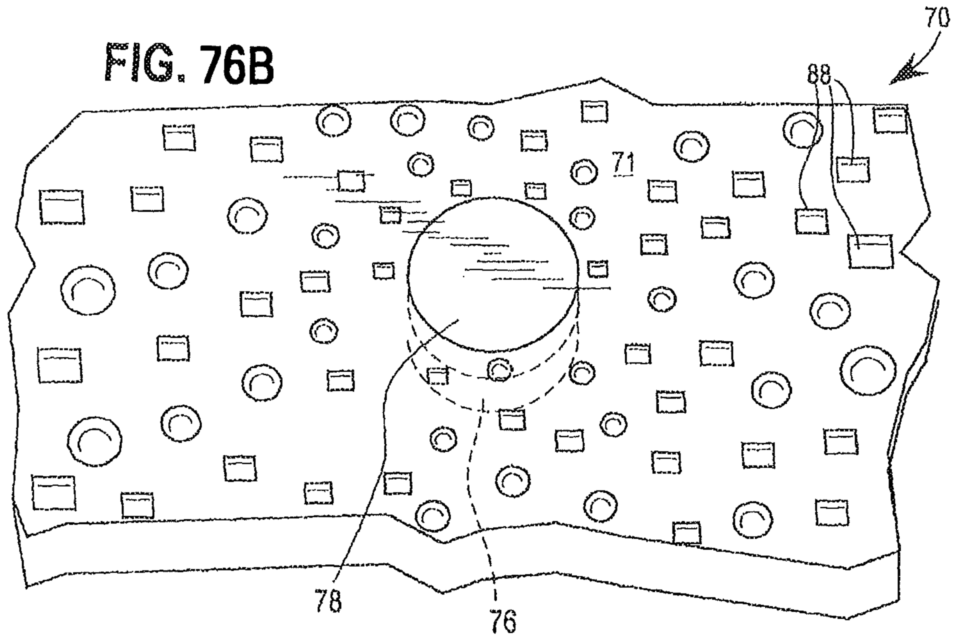
Figure 76C:
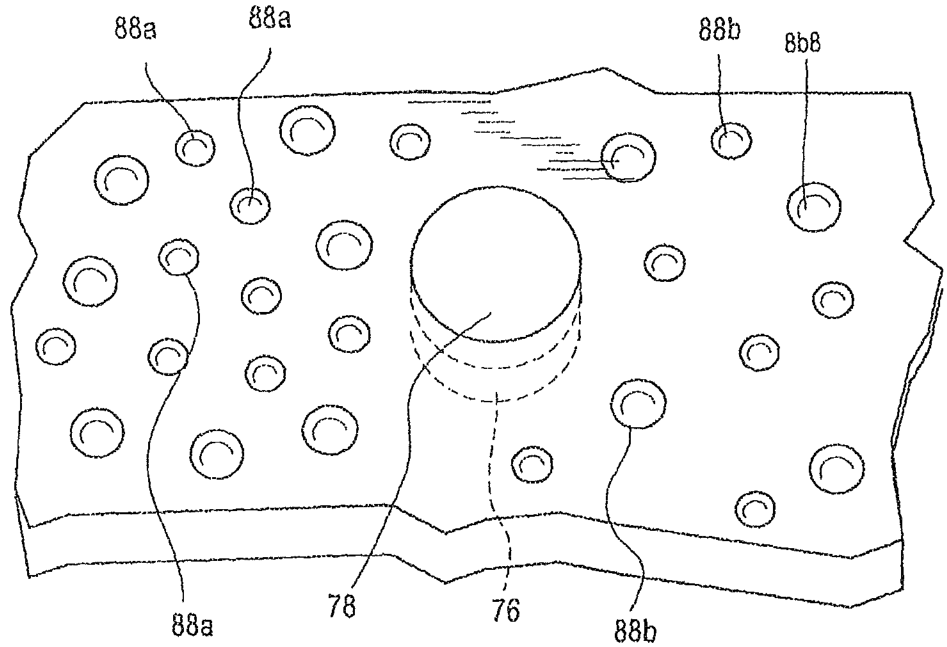
Figure 77:
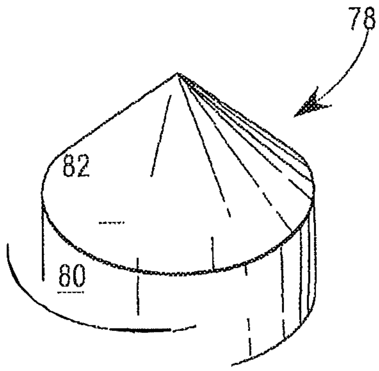
Figure 78:
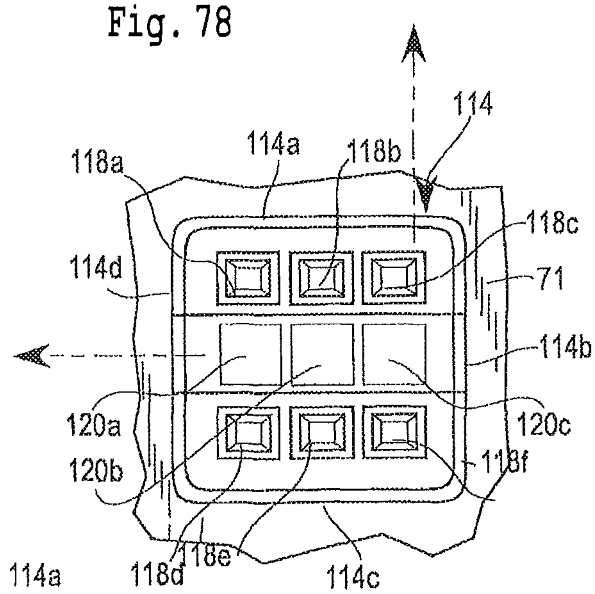
Figure 79:
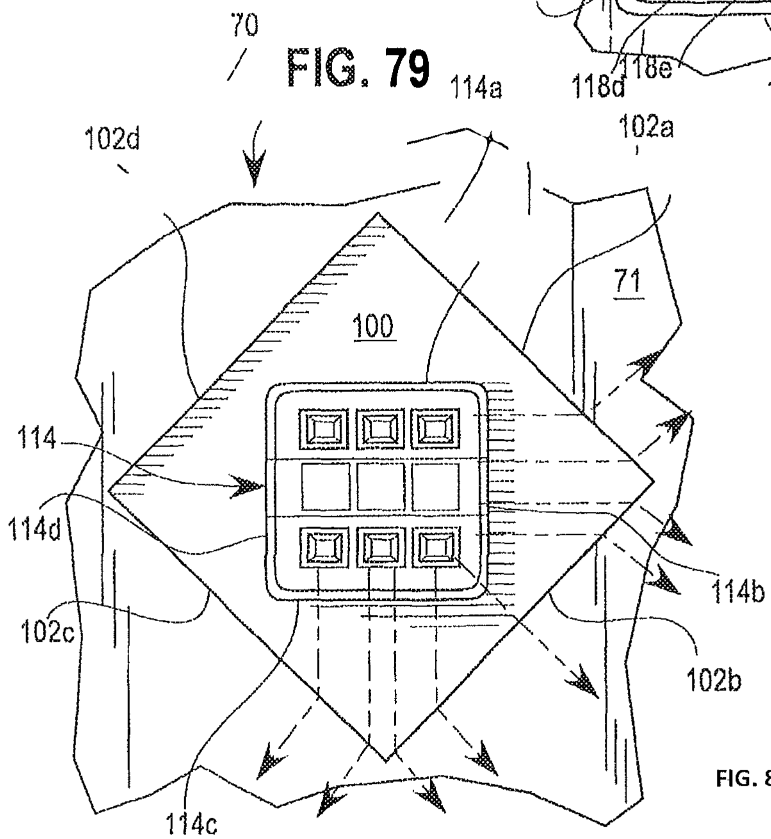
Figure 80:
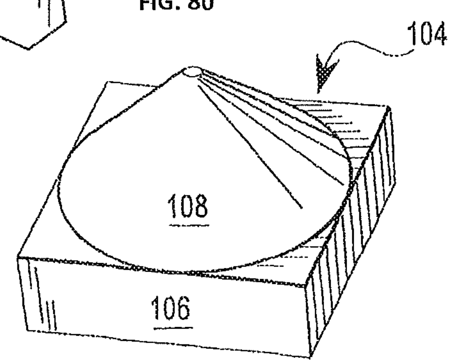
Figure 81:
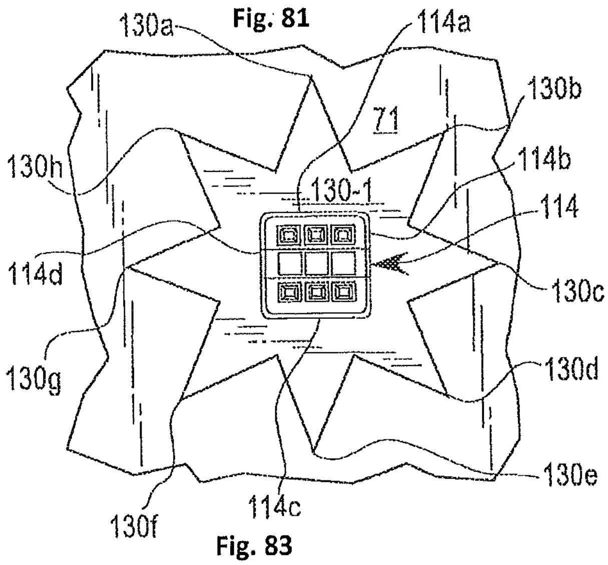
Figure 82:
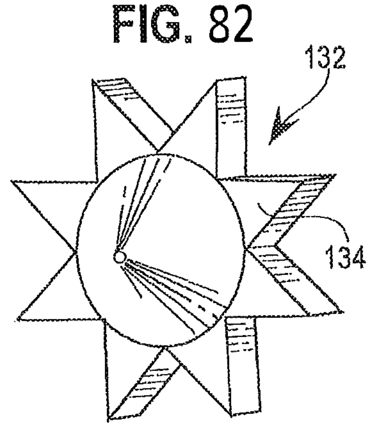
Figure 83:
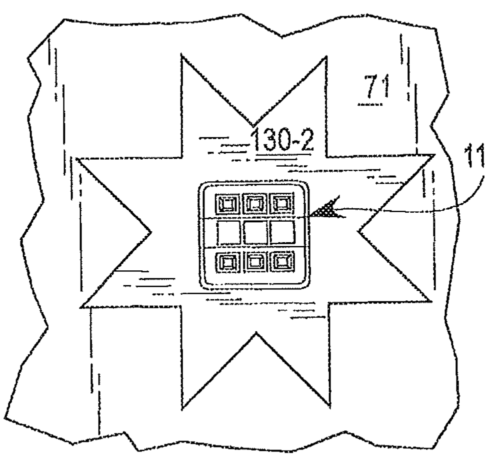
Figure 84:
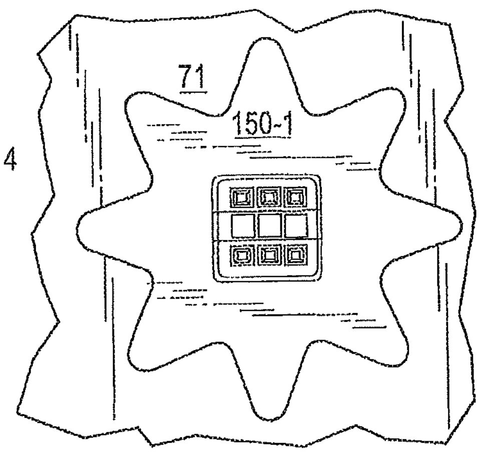
Figure 85:
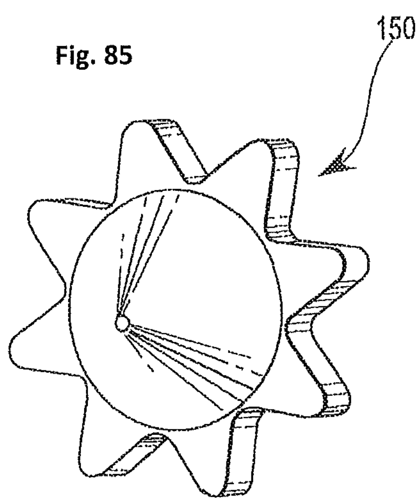
Figure 86:
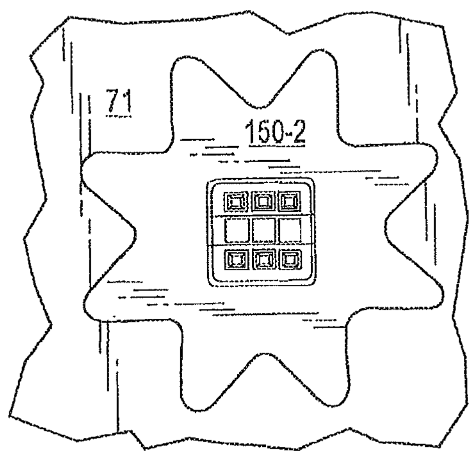
Figure 87:
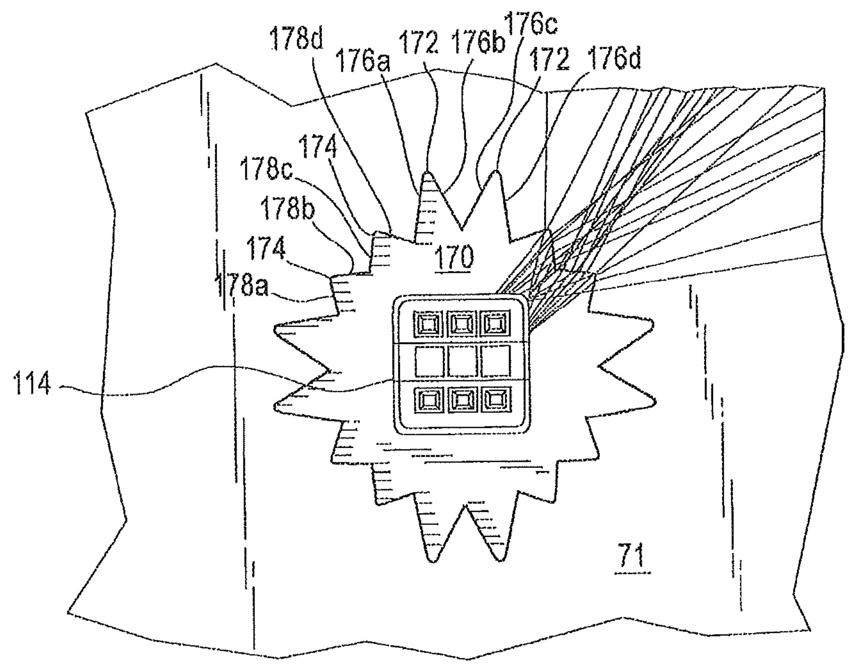
Figure 88:
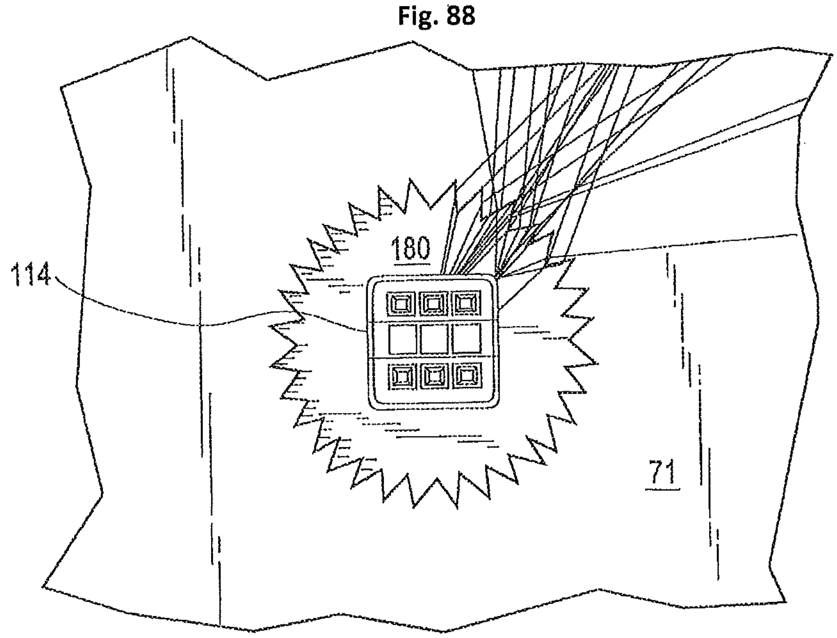
Figure 89:
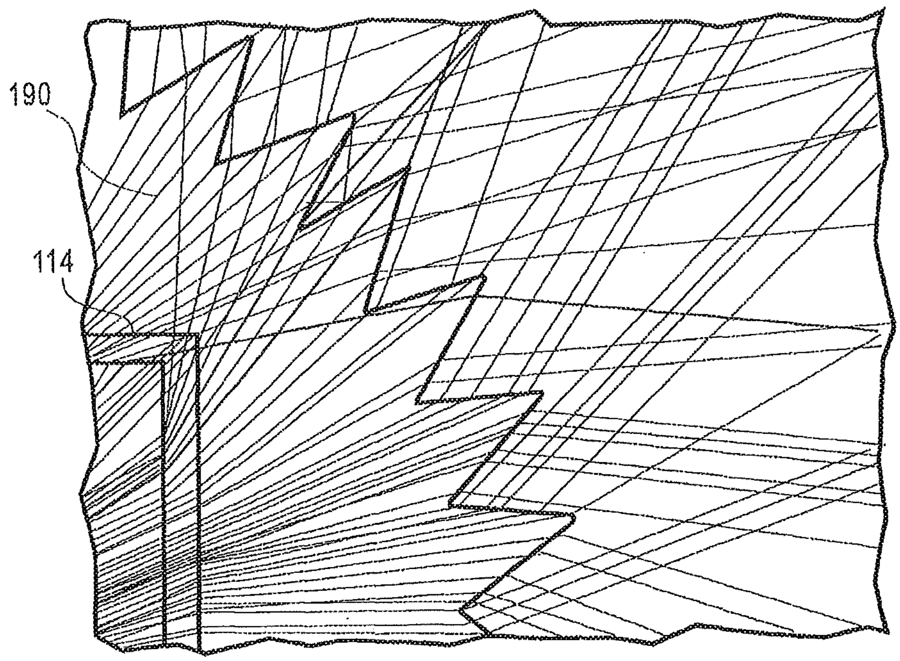
Figure 89A:
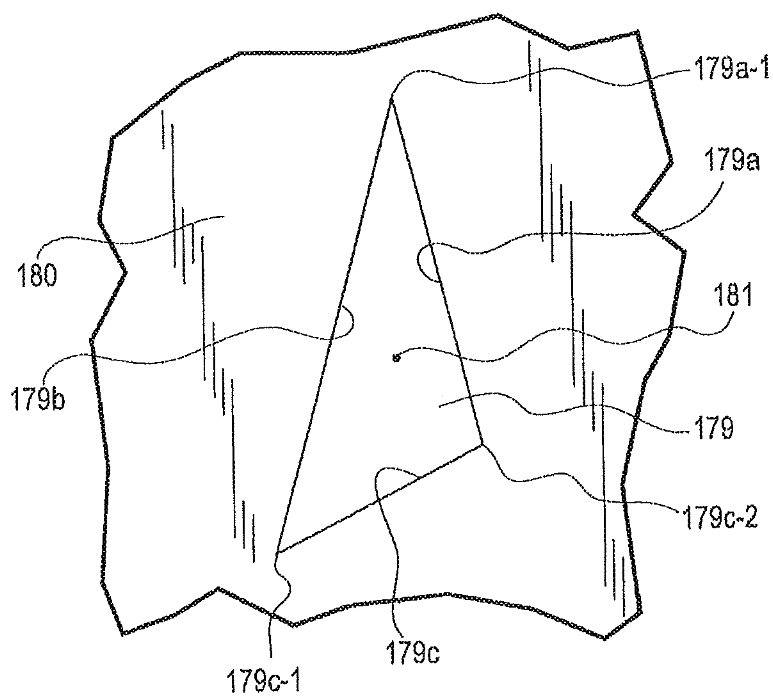
Figure 90:
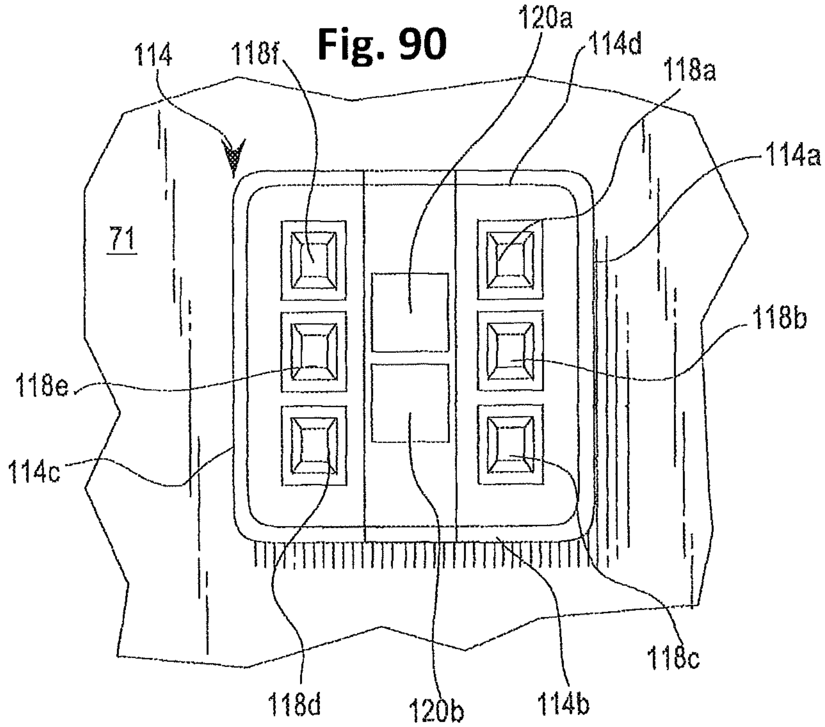
Figure 91:
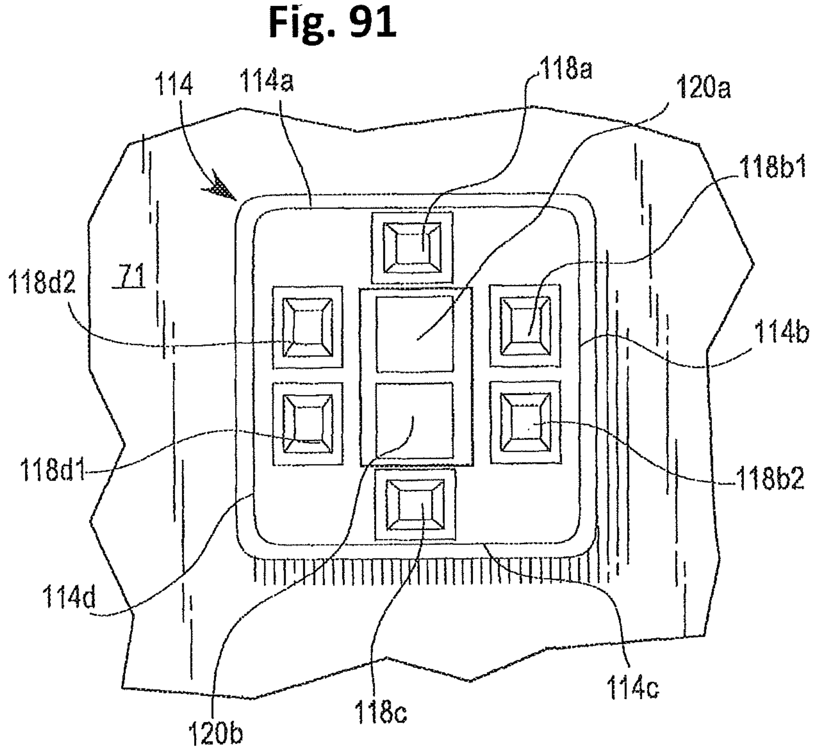
Figure 91A:
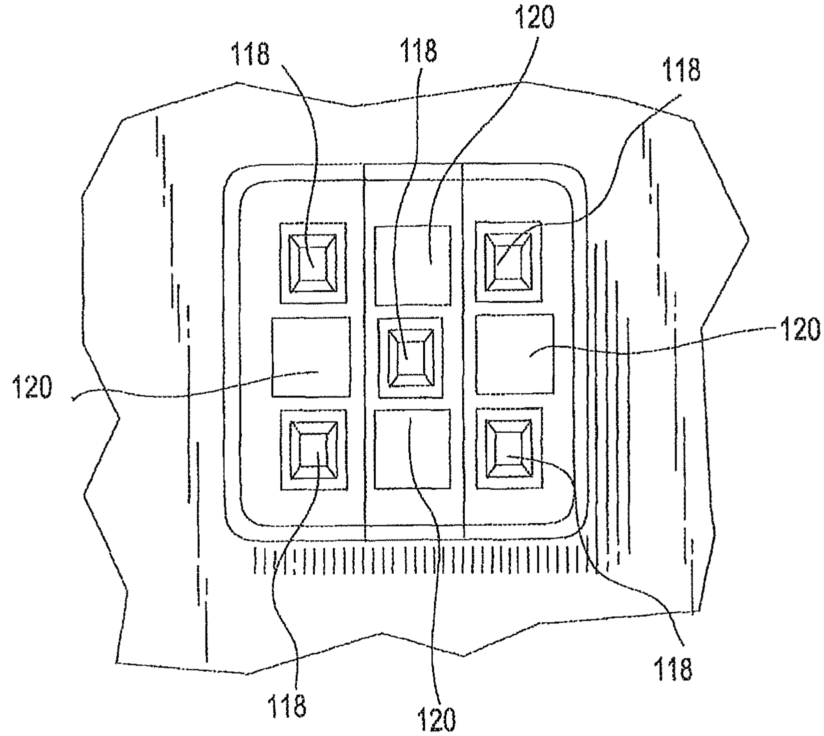
Figure 92:
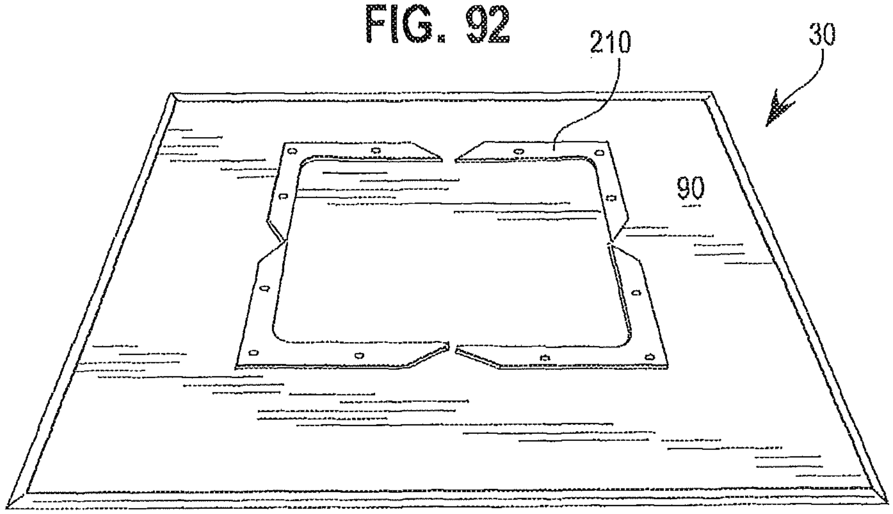
Figure 93:
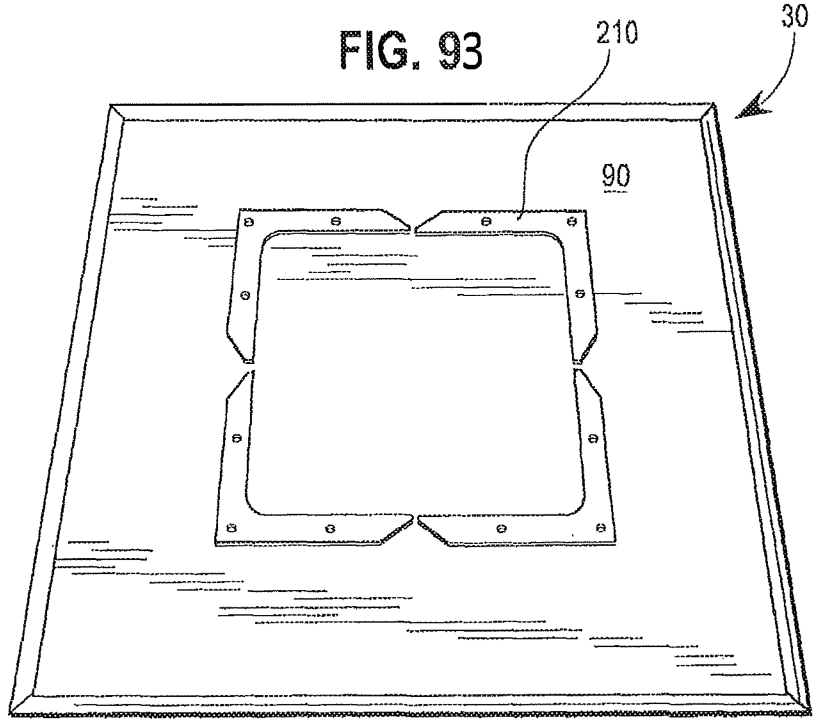
Figure 94:
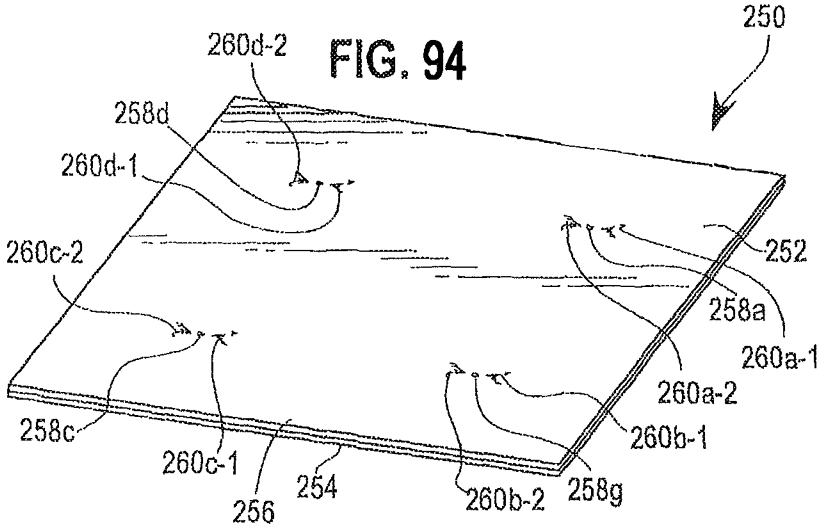
Figure 95:
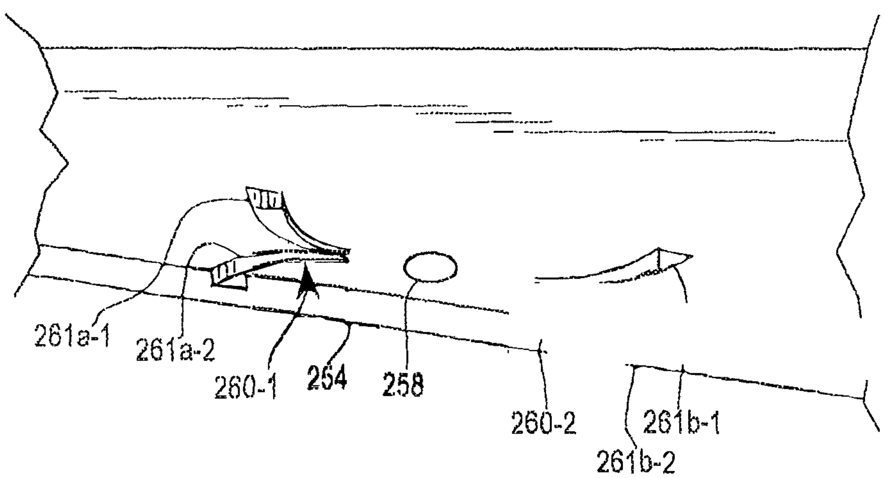
Figure 96:
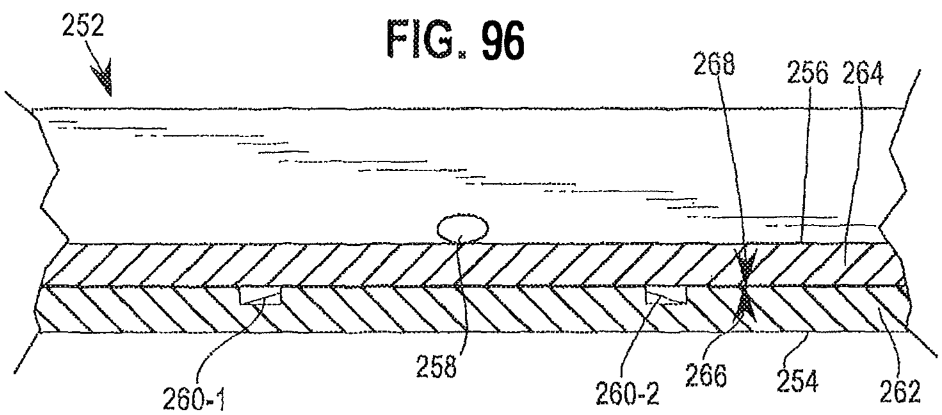
Figure 97:
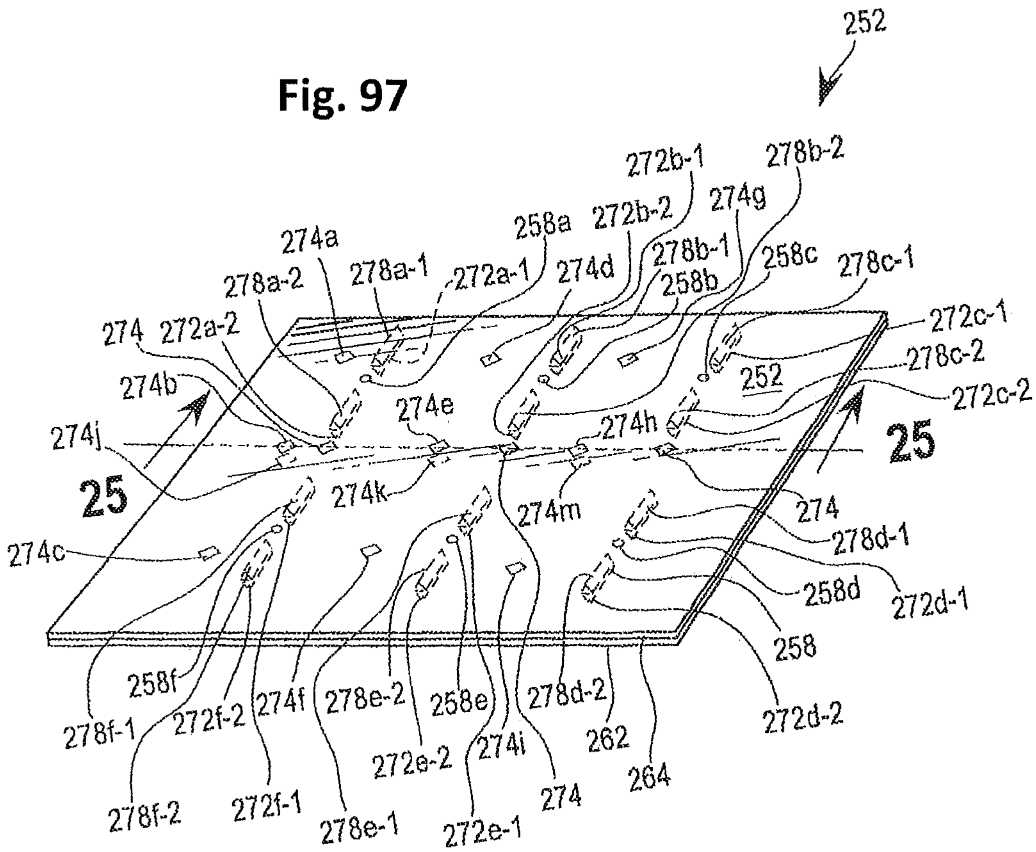
Figure 98:
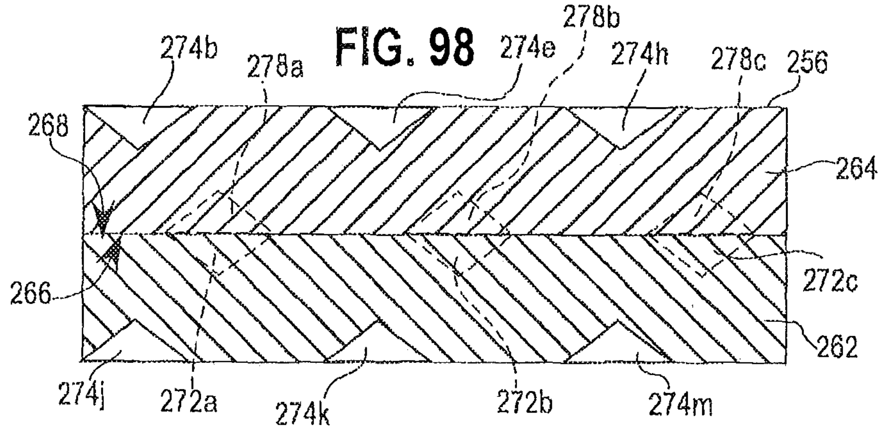
Figure 99:
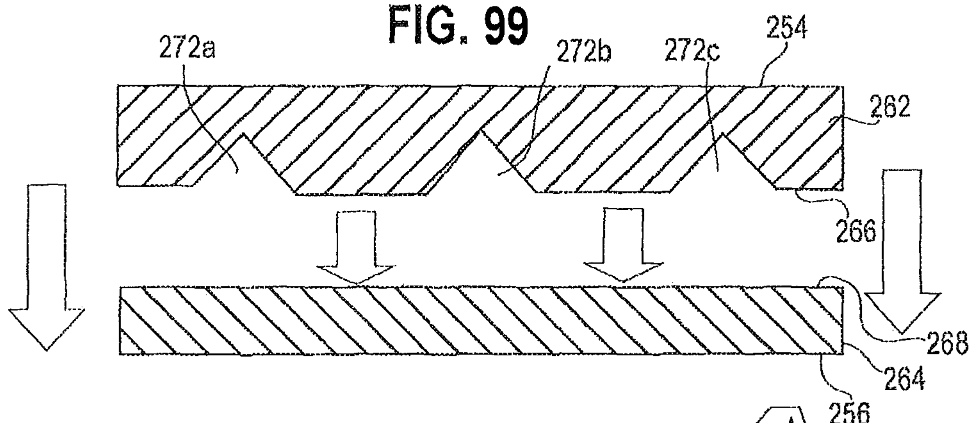
Figure 100:
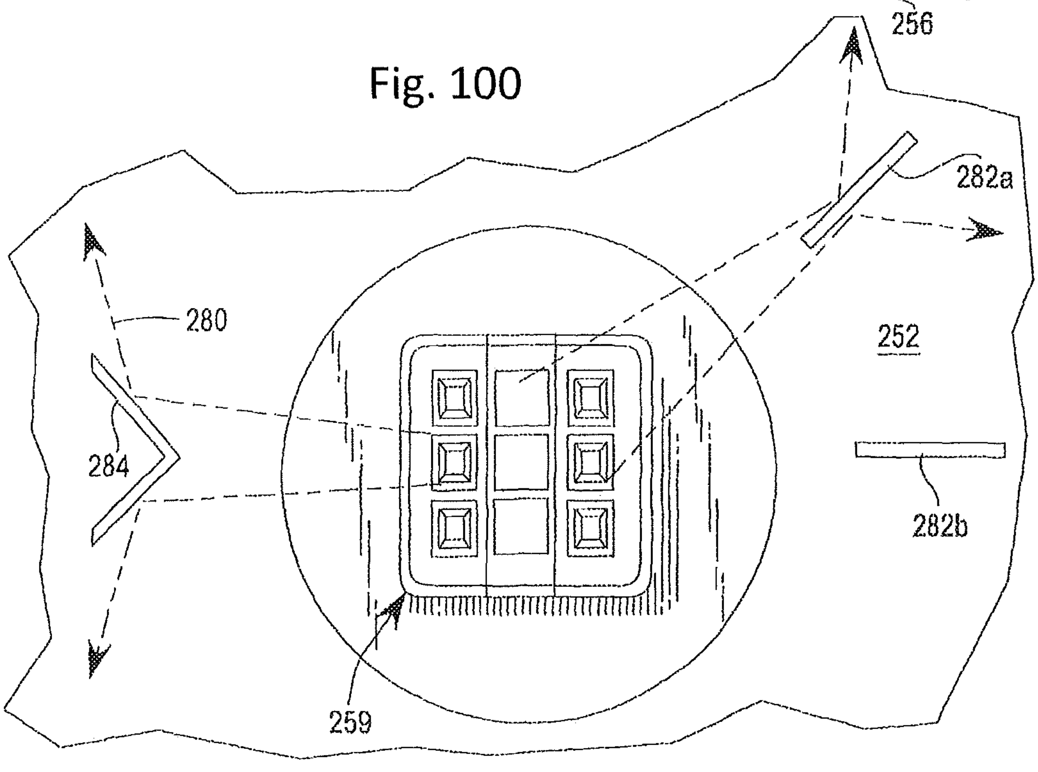
Figure 101:
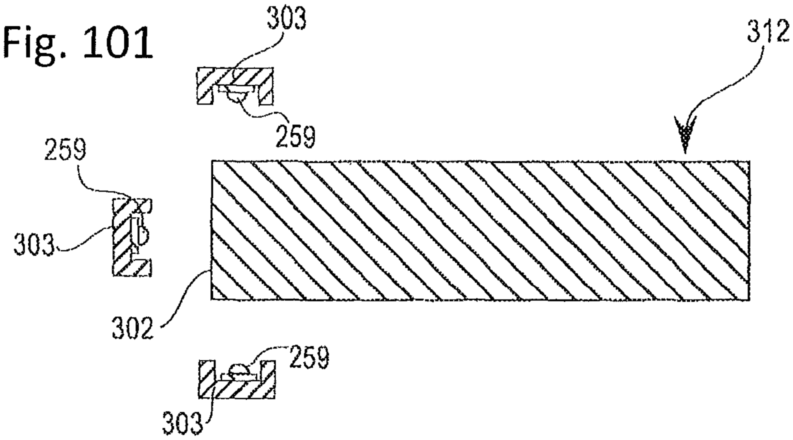
Figure 101A:
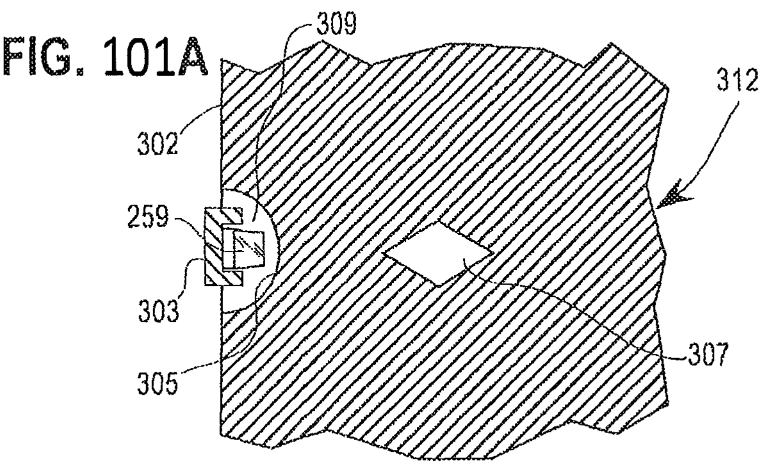
Figure 102:
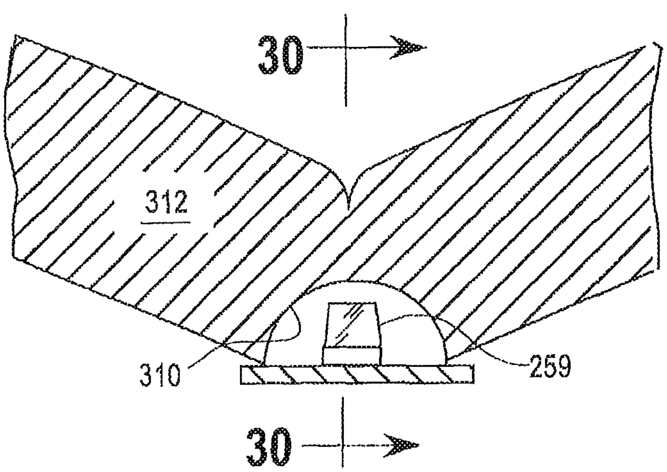
Figure 103:
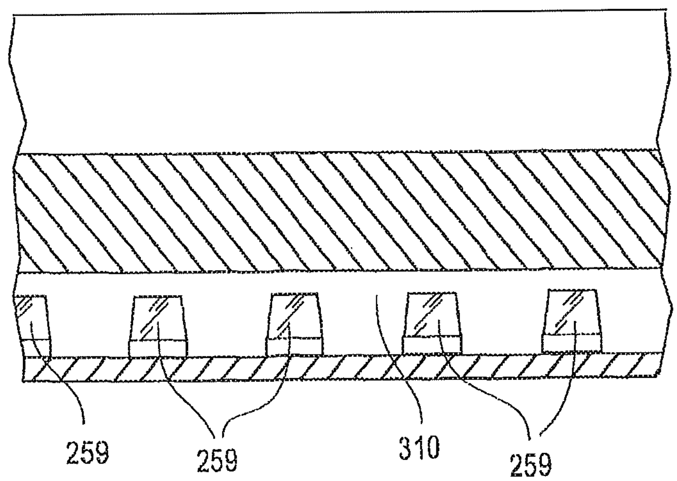
Figure 104:
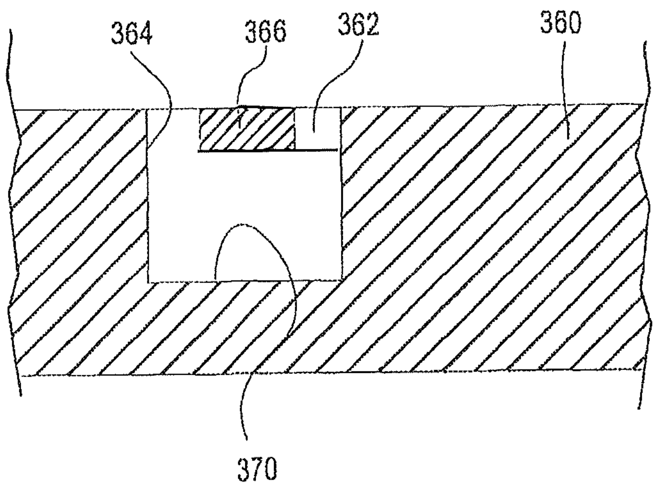
Figure 105:
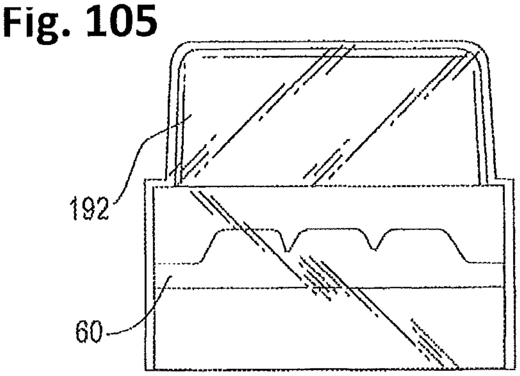
Figure 106:
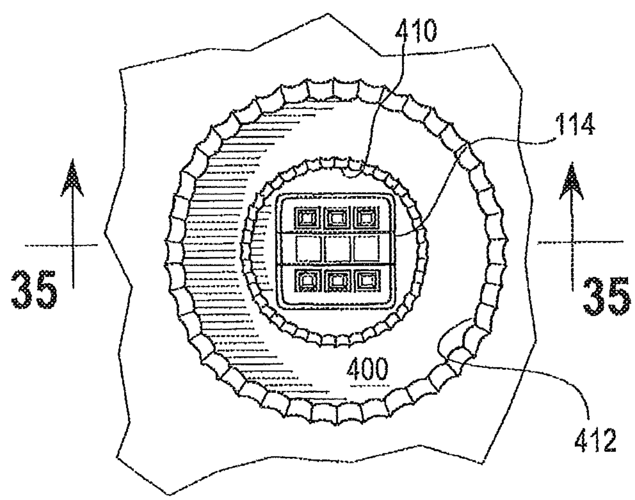
Figure 107:
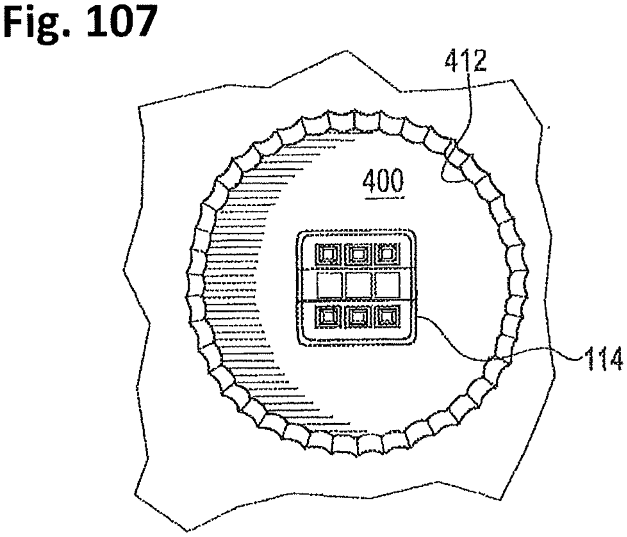

FIGS. 76A, 76B, and 76C are fragmentary, enlarged, isometric views of the first embodiment of FIG. 74 illustrating various extraction features;

FIG. 77 is an enlarged, isometric view of the plug member of FIG. 74;

FIG. 78 is an elevational view of the LED element used in the luminaire of FIG. 74;

FIG. 79 is an elevational view of the LED element disposed in a first alternative coupling cavity that may be incorporated in the luminaire of FIG. 74;

FIG. 80 is an enlarged, isometric view of a first alternative plug member that may be used in the coupling cavity of FIG. 79;

FIG. 81 is an elevational view of the LED element disposed in a second alternative coupling cavity that may be incorporated in the luminaire of FIG. 74;

FIG. 82 is an enlarged, isometric view of a second alternative plug member that may be used in the coupling cavity of FIG. 81;

FIG. 83 is an elevational view of the LED element disposed in a third alternative coupling cavity that may be incorporated in the luminaire of FIG. 74;

FIG. 84 is an elevational view of the LED element disposed in a fourth alternative coupling cavity that may be incorporated in the luminaire of FIG. 74;

FIG. 85 is an enlarged, isometric view of a third alternative plug member that may be used in the coupling cavities of FIGS. 84 and 86;

FIG. 86 is an elevational view of the LED element disposed in a fifth alternative coupling cavity that may be incorporated in the luminaire of FIG. 74;

FIG. 87 is an elevational view of the LED element disposed in a sixth alternative coupling cavity that may be incorporated in the luminaire of FIG. 74;

FIG. 88 is an elevational view of the LED element disposed in a seventh alternative coupling cavity that may be incorporated in the luminaire of FIG. 74;

FIG. 89 is a fragmentary, enlarged, elevational view of a portion of the LED element disposed in the seventh alternative coupling cavity of FIG. 88;

FIG. 89A is an elevational view of an eighth alternative coupling cavity that may be incorporated in the luminaire of FIG. 74;

FIGS. 90 and 91 are elevational views of first and second alternative LED elements that may be used in any of the luminaires disclosed herein;

FIG. 91A is an elevational view of yet another alternative LED element that may be used in any of the luminaires disclosed herein;

FIGS. 92 and 93 are isometric and elevational views, respectively, of the luminaire of FIG. 74 utilizing a masking element;

FIG. 94 is an isometric view of a waveguide having redirection features;

FIG. 95 is an enlarged, fragmentary, isometric view of the redirection features of the waveguide of FIG. 94;

FIG. 96 is an enlarged, isometric view of the waveguide of FIG. 94 with a portion broken away;

FIG. 97 is an isometric view of a waveguide having first alternative redirection features;

FIG. 98 is a sectional view of the waveguide having first alternative redirection features taken generally along the lines 25-25 of FIG. 97;

FIG. 99 is an elevational view of the waveguide having first alternative redirection features during fabrication;

FIG. 100 is an elevational view of a waveguide having second and third alternative redirection features;

FIG. 101 is a diagrammatic fragmentary side elevational view of a further embodiment;

FIG. 101A is a diagrammatic plan view of the embodiment of FIG. 101;

FIG. 102 is an isometric view of a waveguide according to yet another embodiment;

FIG. 103 is a sectional view taken generally along the lines 30-30 of FIG. 102;

FIG. 104 is a fragmentary sectional view according to still another embodiment;

FIG. 105 is a side elevational view of an LED element including a lens;

FIG. 106 is a plan view of a further alternative coupling cavity;

FIG. 107 is a plan view of yet another alternative coupling cavity; and

Figure 108:
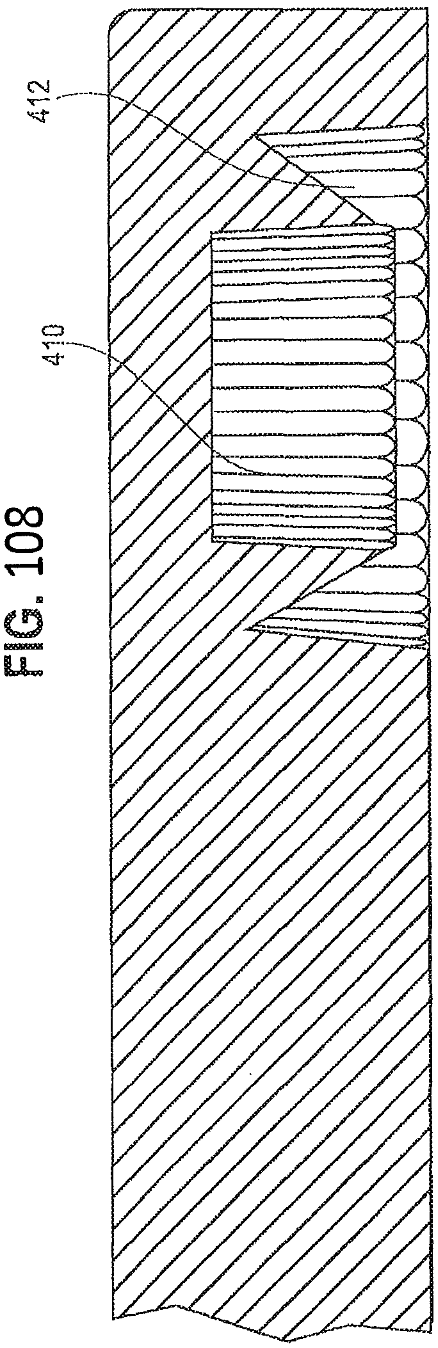

FIG. 108 is a sectional view taken generally along the lines 35-35 of FIG. 106.

Figure 109:
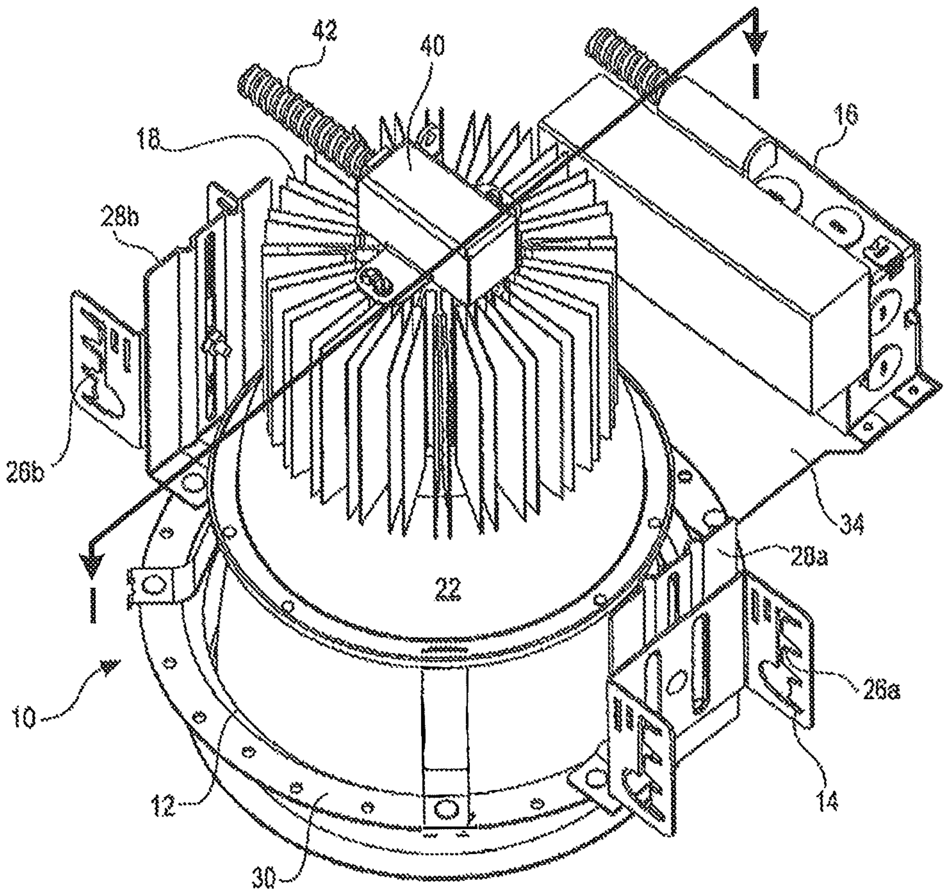

FIG. 109 is an isometric view of a luminaire incorporating an optical waveguide.

Figure 110:
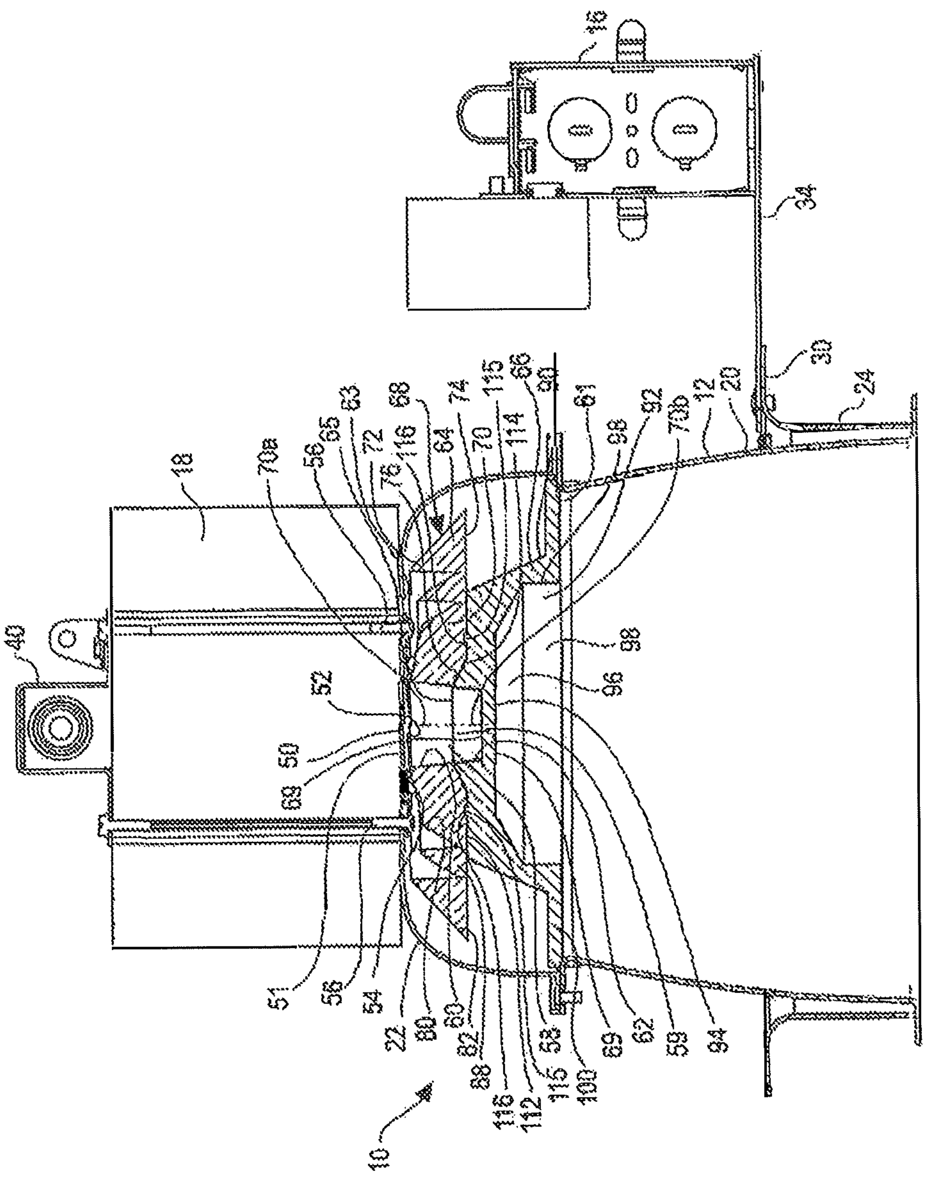

FIG. 110 is a sectional view taken generally along the lines I-I of FIG. 109.

Figure 111:
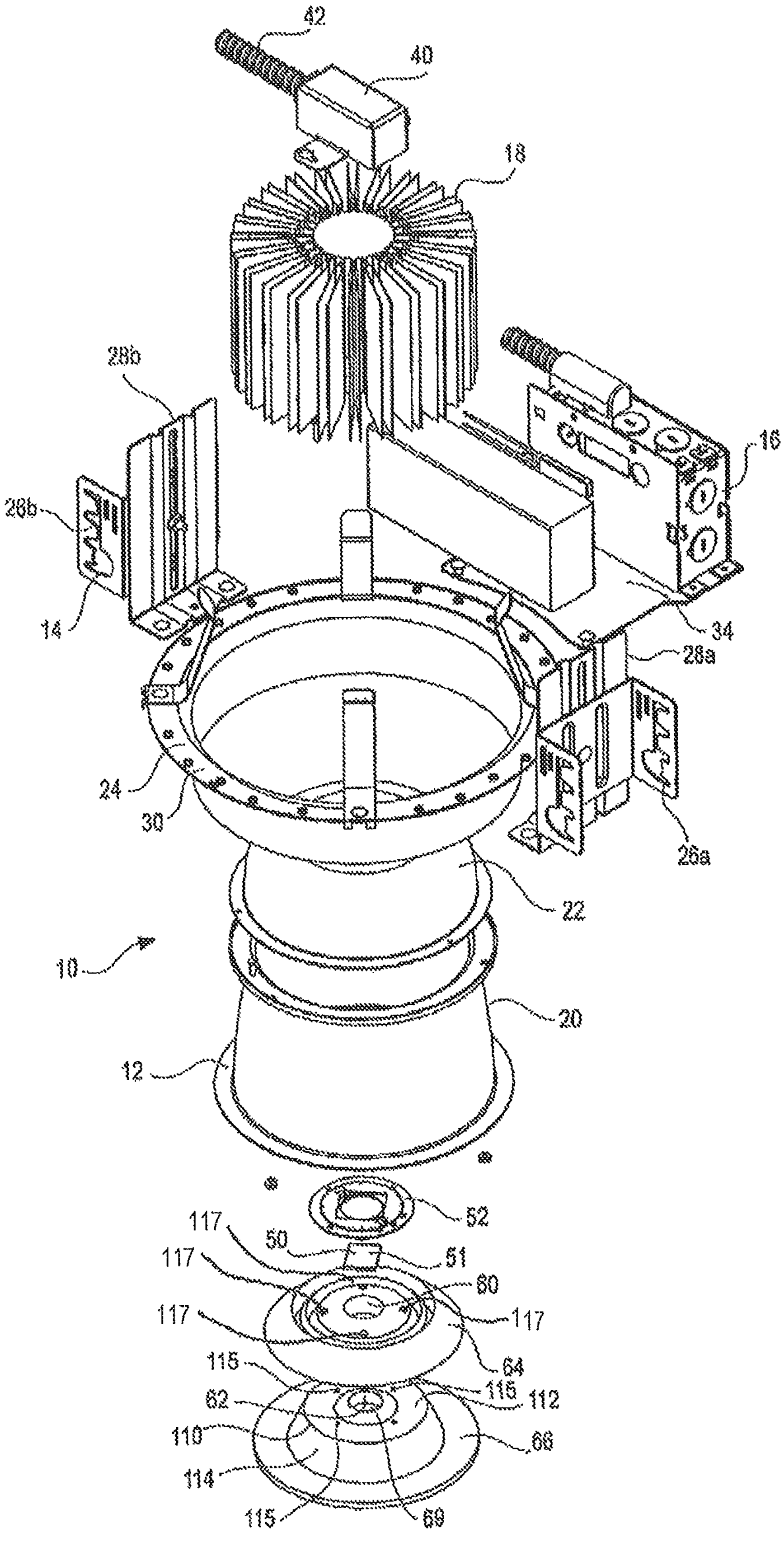

FIG. 111 is an exploded isometric view from above of the luminaire of FIGS. 109 and 110.

Figure 112A:
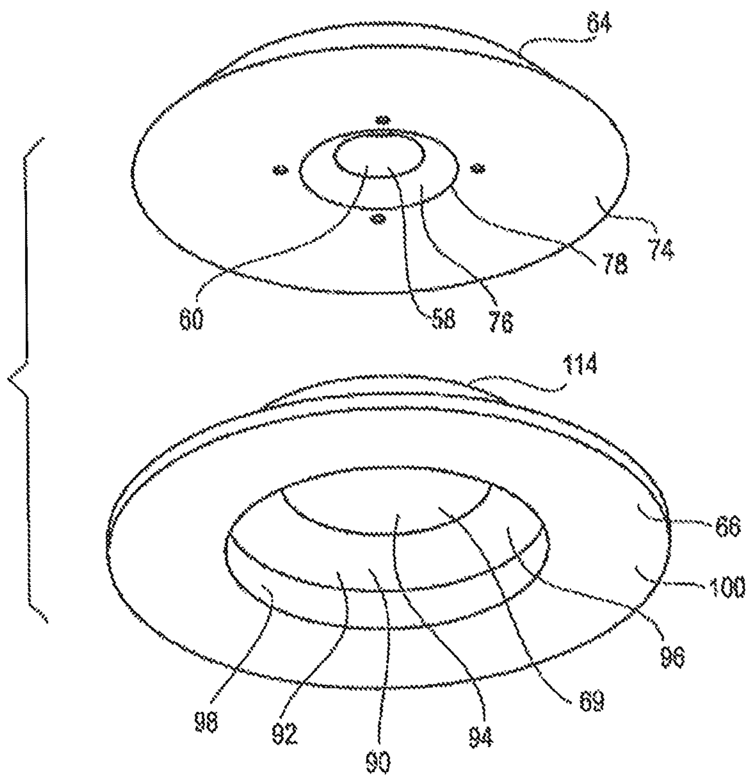

FIG. 112A is a fragmentary exploded isometric view from below of the waveguide stages of FIG. 111.

Figure 112B:
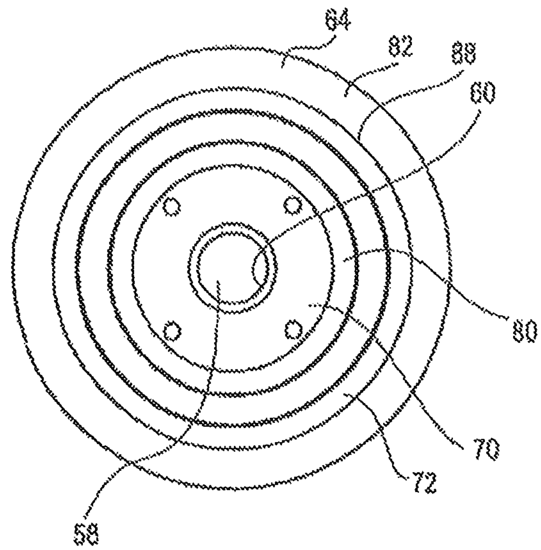

FIG. 112B is a plan view of the first waveguide stage of FIG. 112A.

Figure 112C:
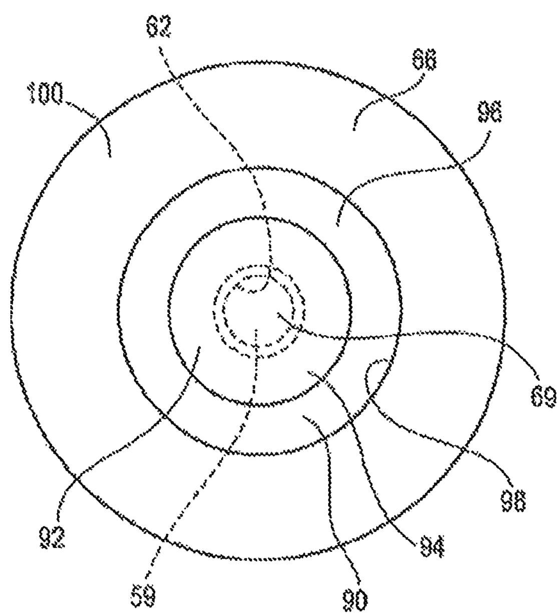

FIG. 112C is a bottom elevational view of the second waveguide stage of FIG. 112A.

Figure 112D:
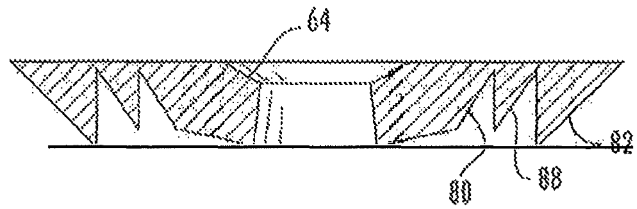
Figure 112E:
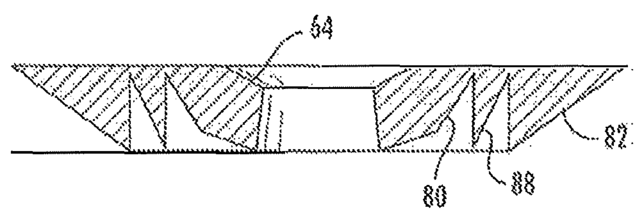

FIGS. 112D and 112E are cross-sectional views of alternative embodiments of the first waveguide stage of FIG. 112A.

Figure 112F:
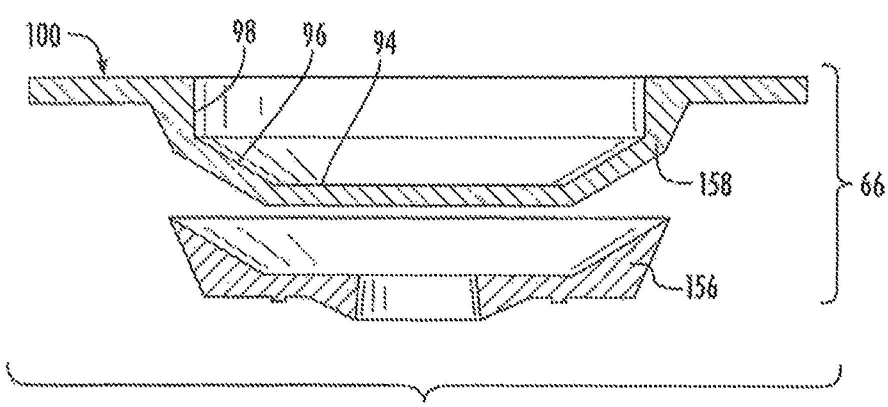

FIG. 112F is a cross-sectional view of an alternative embodiment of the second waveguide stage of FIG. 112A.

Figure 113:
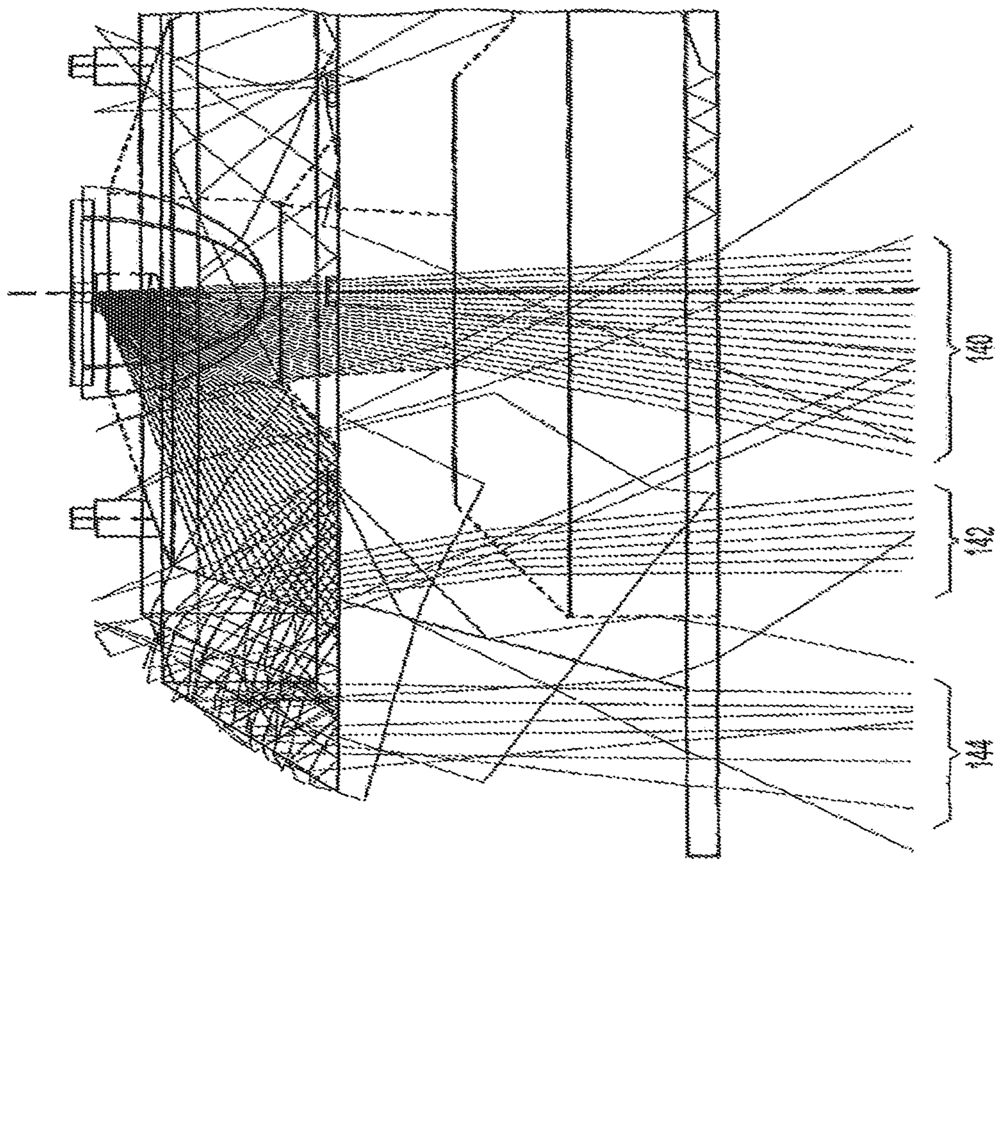
Figure 114:
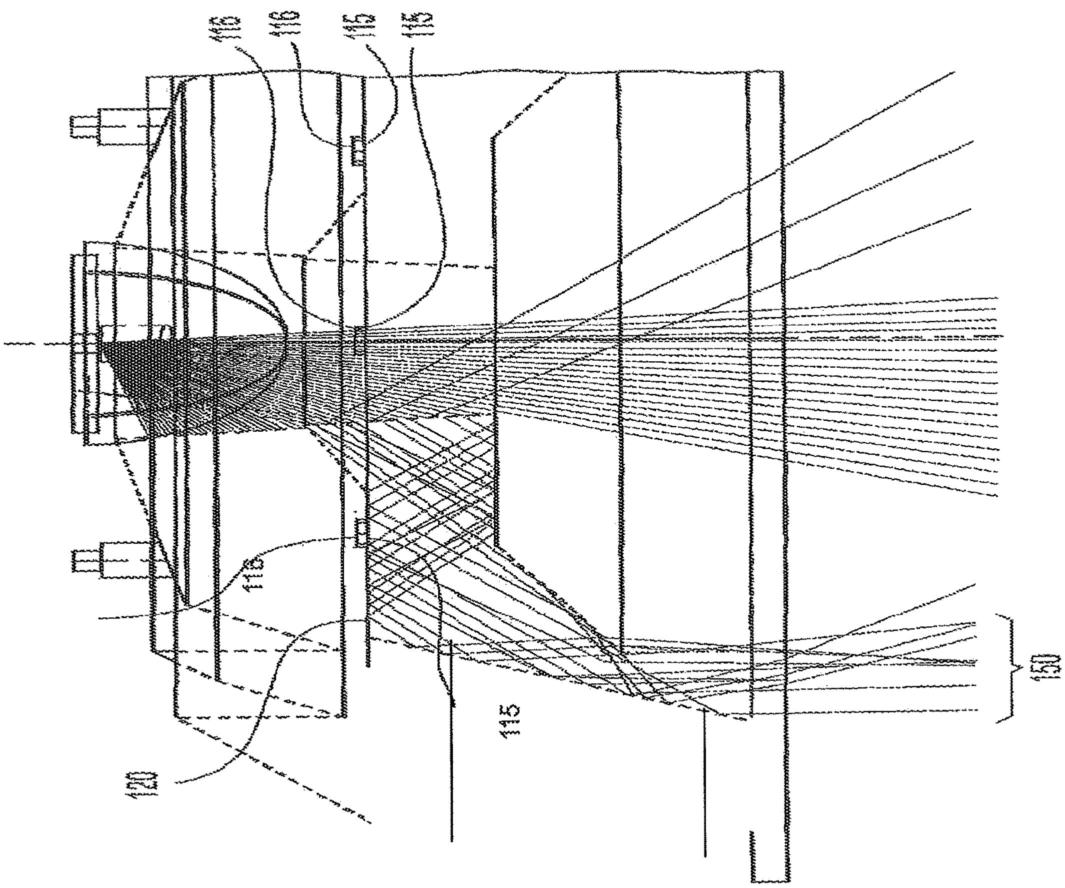

FIGS. 113 and 114 are ray trace diagrams simulating light passage through the waveguide stages of FIG. 110.

Figure 115A:
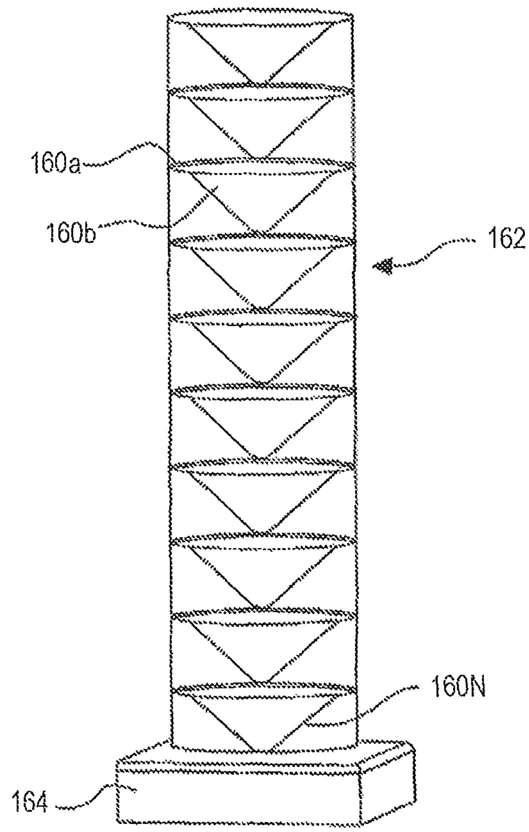

FIG. 115A is a side elevational view of another embodiment of a multi-stage waveguide.

Figure 115B:
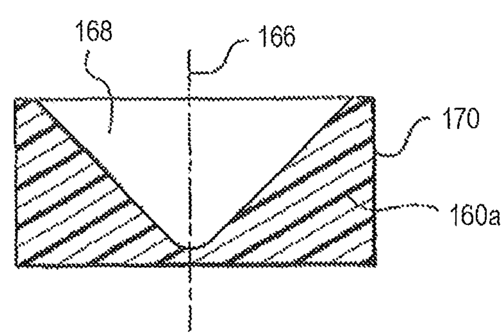

FIG. 115B is a sectional view of the stage of FIG. 115A.

Figure 116A:
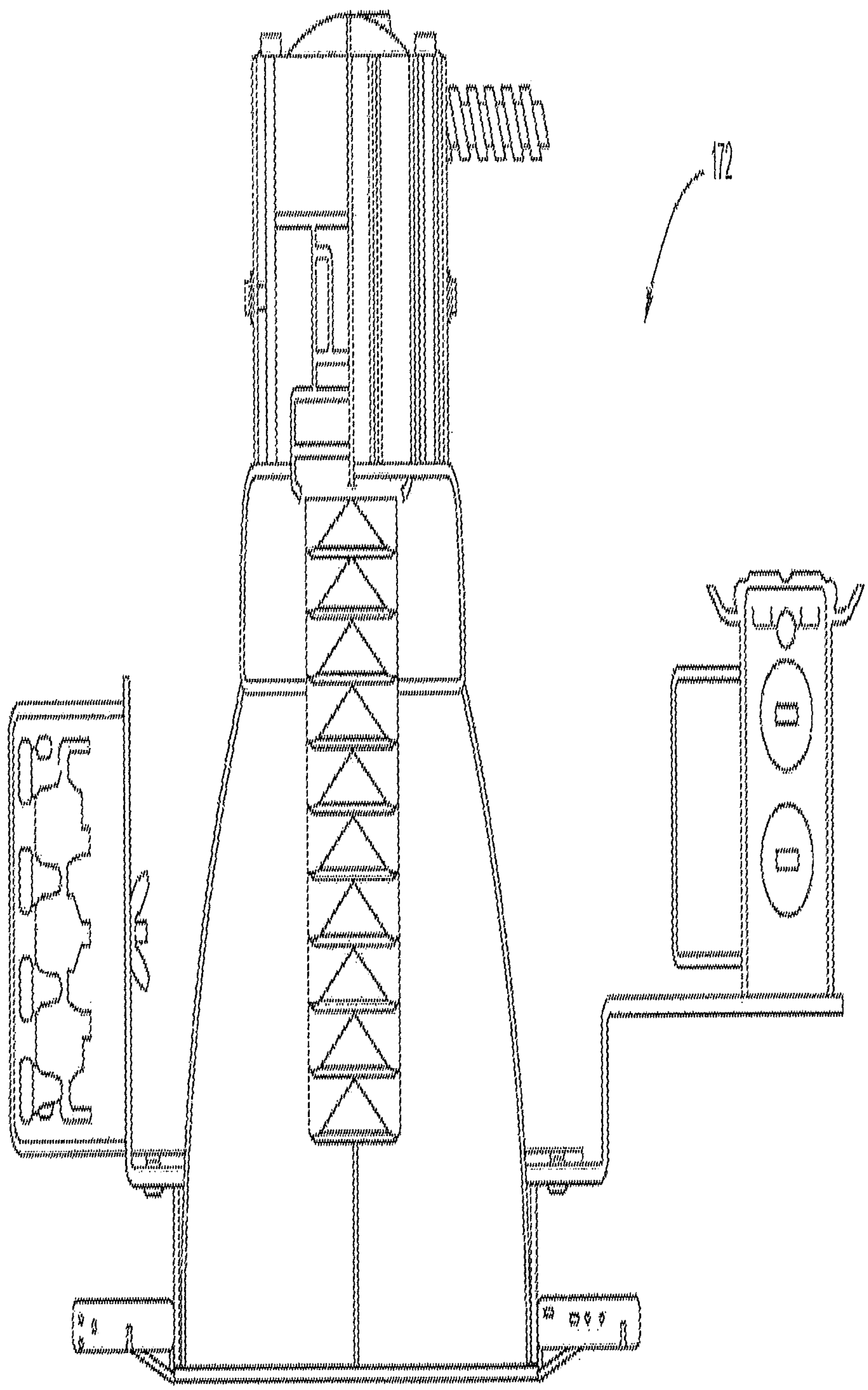
Figure 116B:
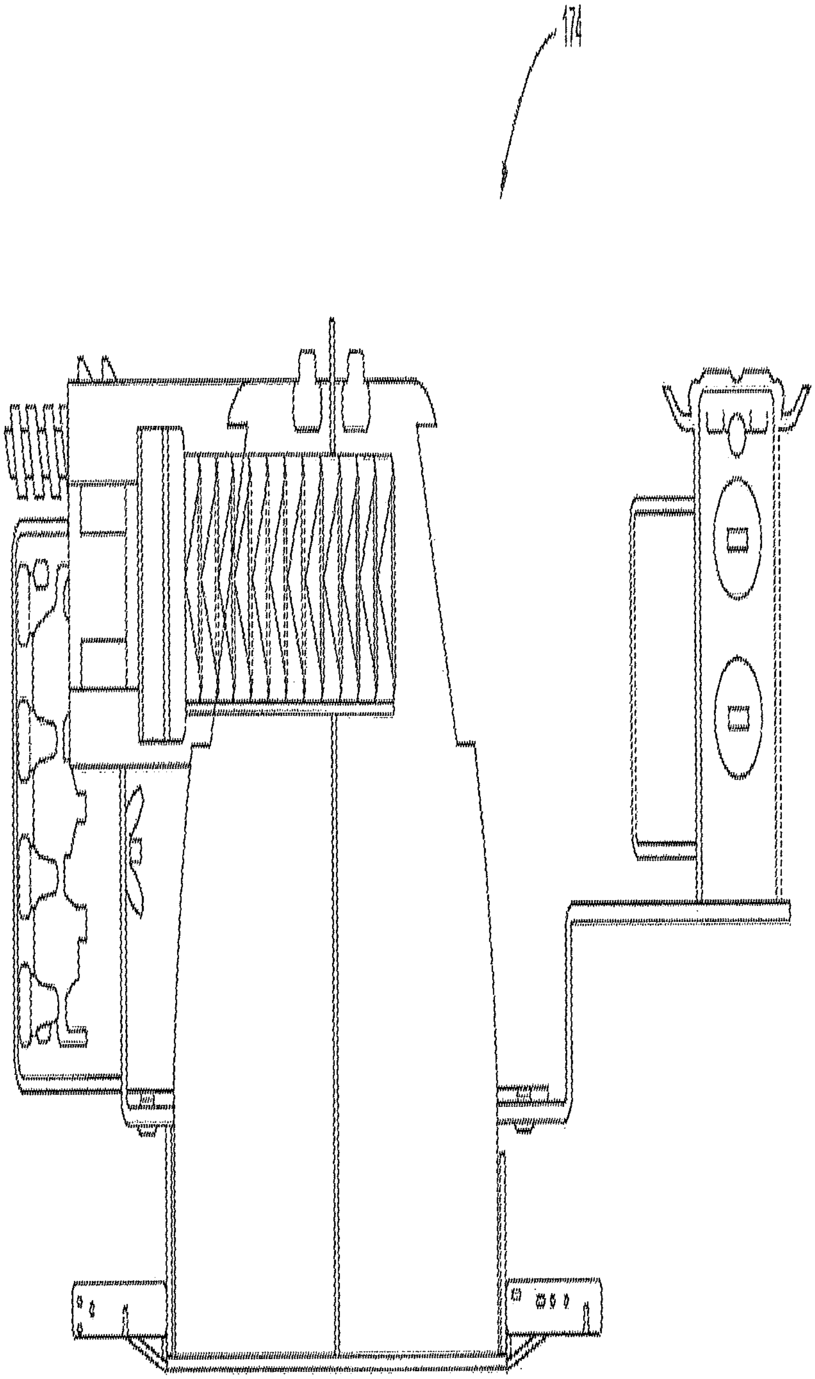

FIGS. 116A and 116B are sectional views of alternate embodiments of luminaires incorporating the multi-stage waveguide of FIG. 115A.

Figure 117:
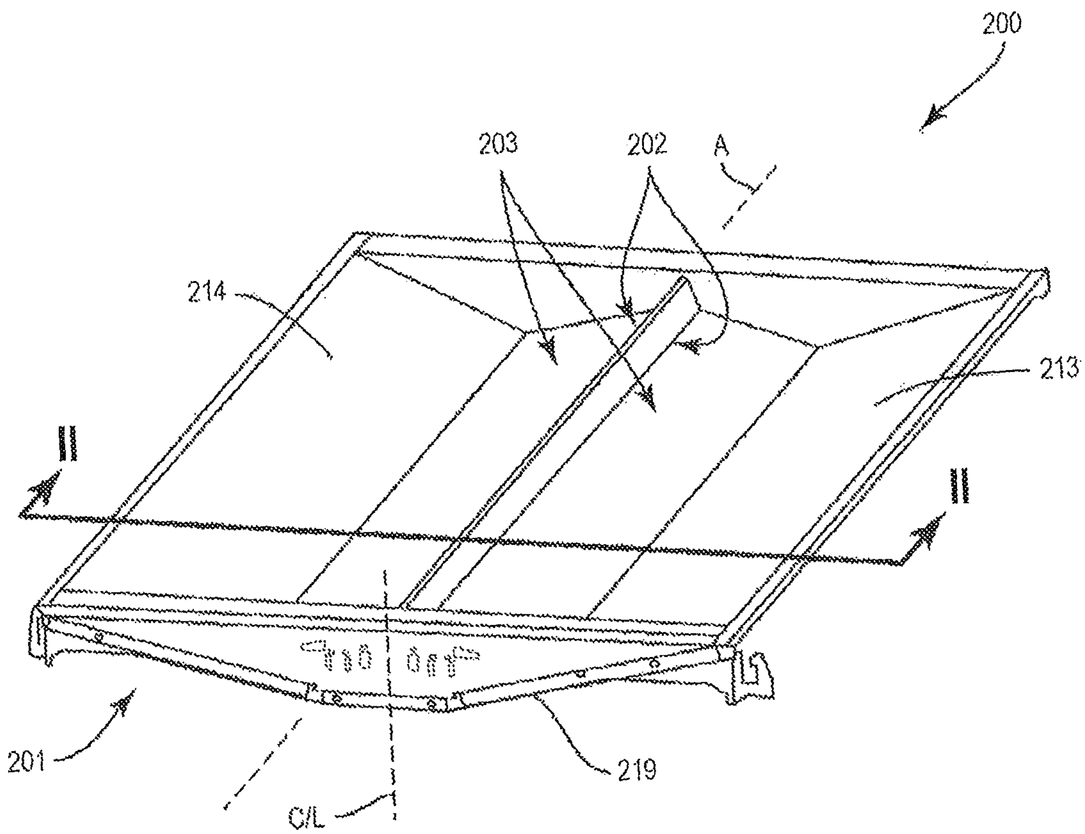

FIG. 117 is a perspective view of a light fixture.

Figure 118A:
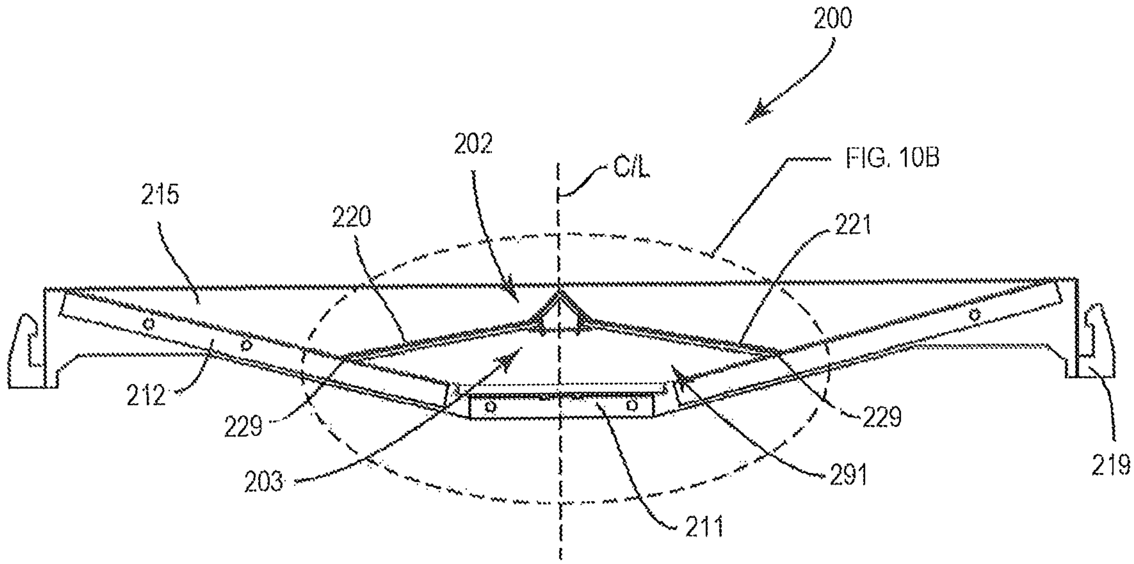

FIG. 118A is a side schematic view of a light fixture having a housing, LED assembly, and light guide assembly.

Figure 118B:
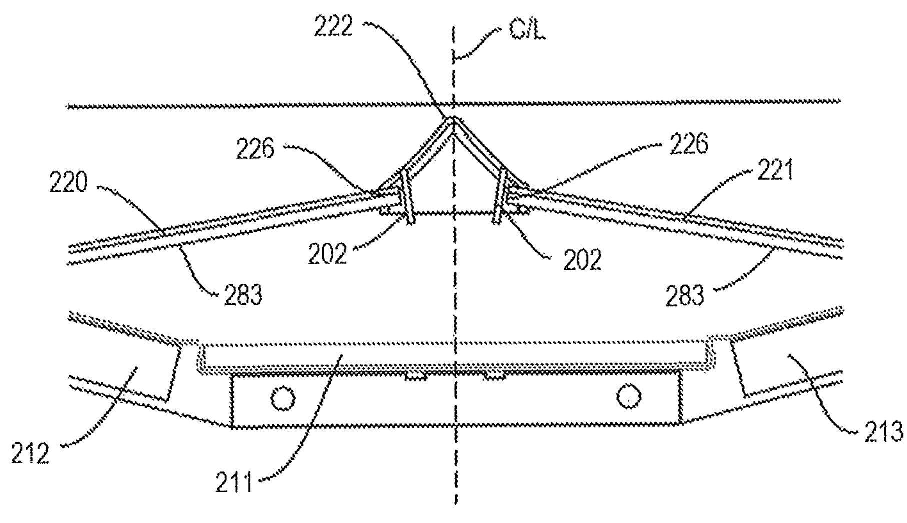

FIG. 118B is an enlarged view of the area marked in FIG. 118A.

Figure 119:
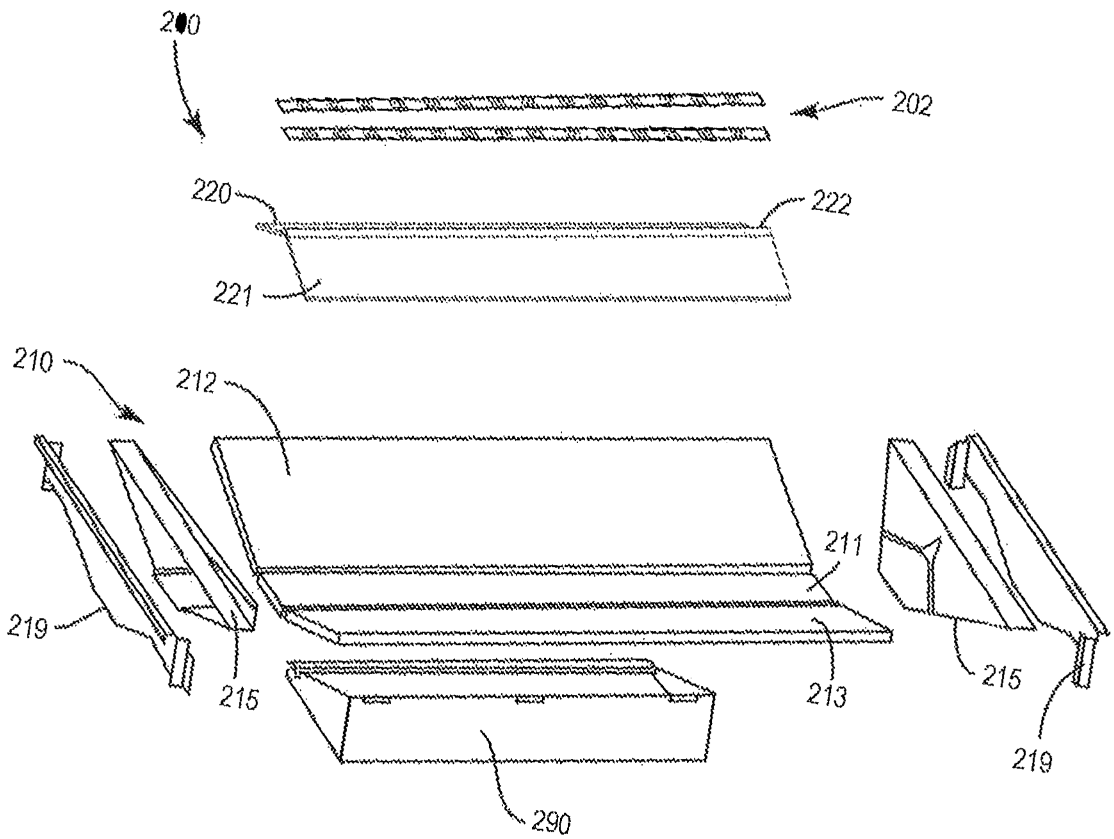

FIG. 119 is an exploded view of a light fixture.

Figure 120A:
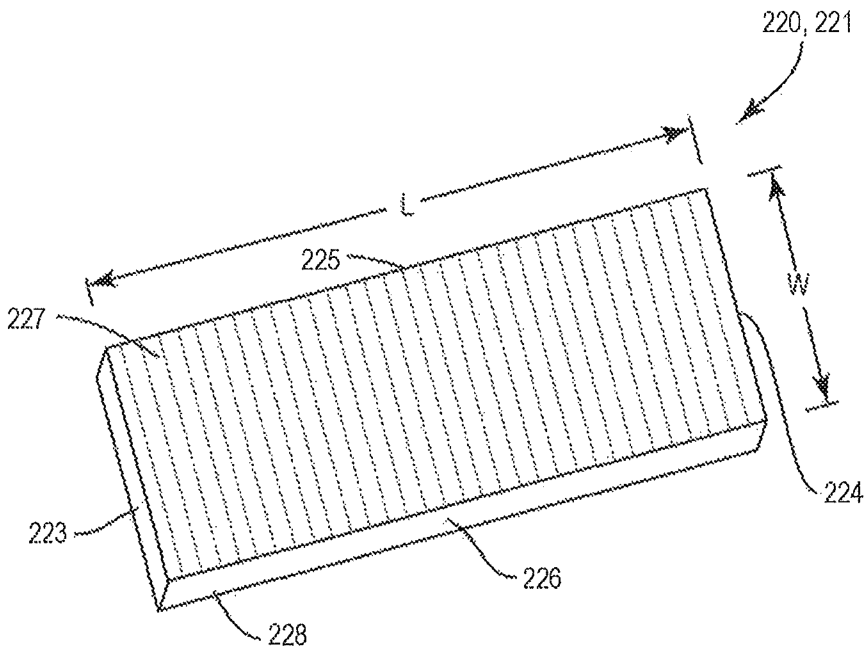

FIG. 120A is a schematic perspective view of a light guide plate.

Figure 120B:
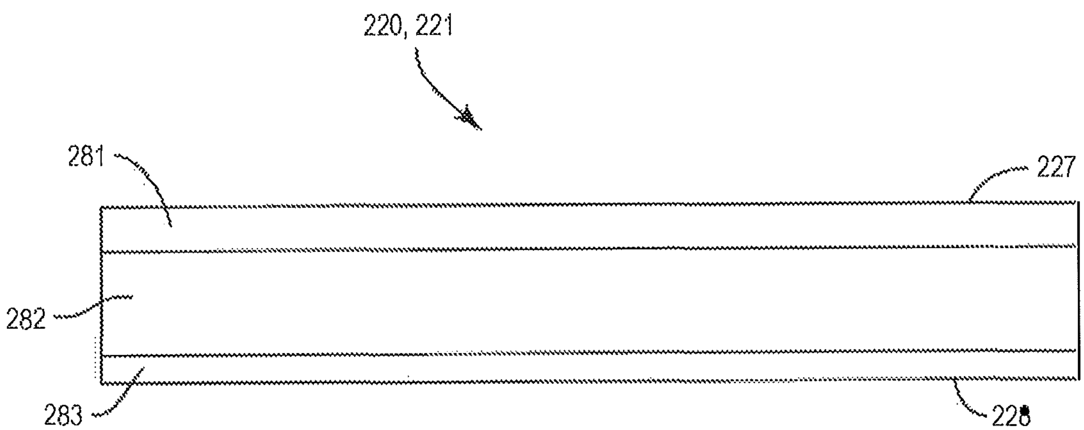

FIG. 120B is a side schematic view of a light guide plate that includes a diffuser layer, a plate layer, and a reflector layer.

Figure 121A:
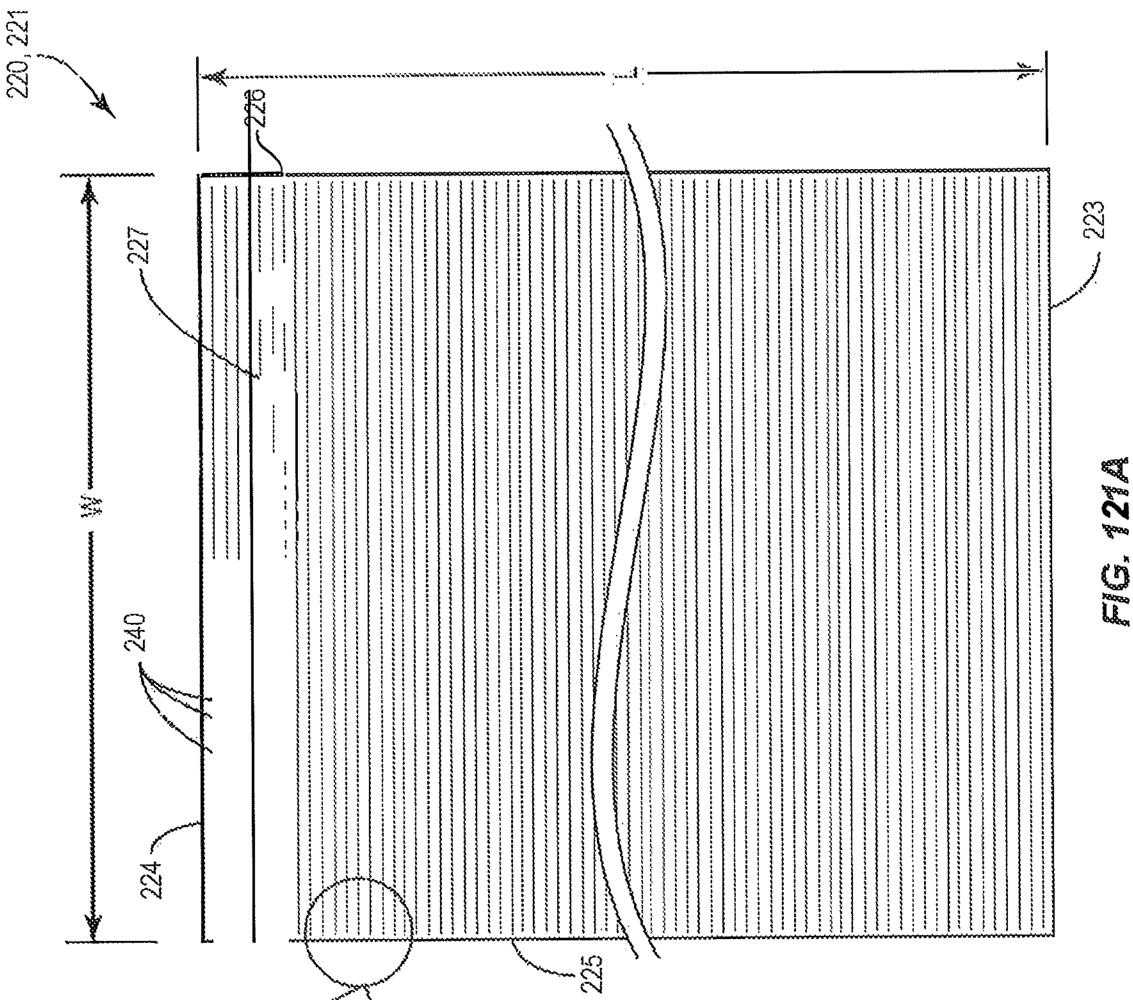

FIG. 121A is a top view of a light guide plate.

Figure 121B:
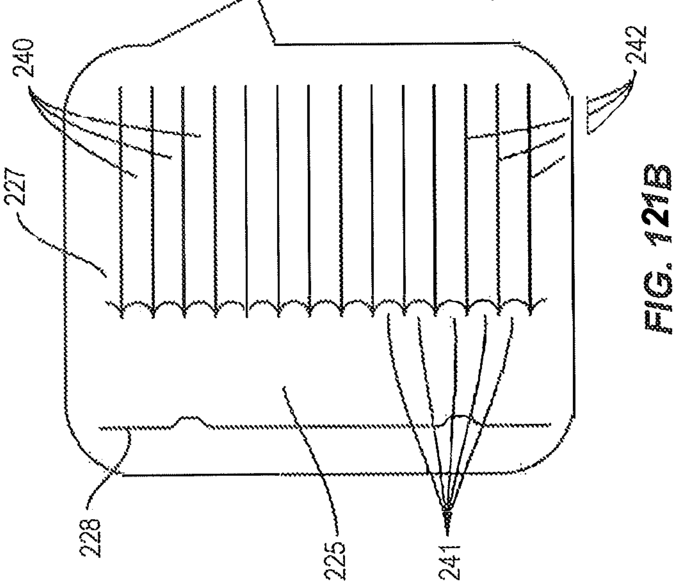

FIG. 121B is a schematic view of the light guide plate of FIG. 121A.

Figure 122A:
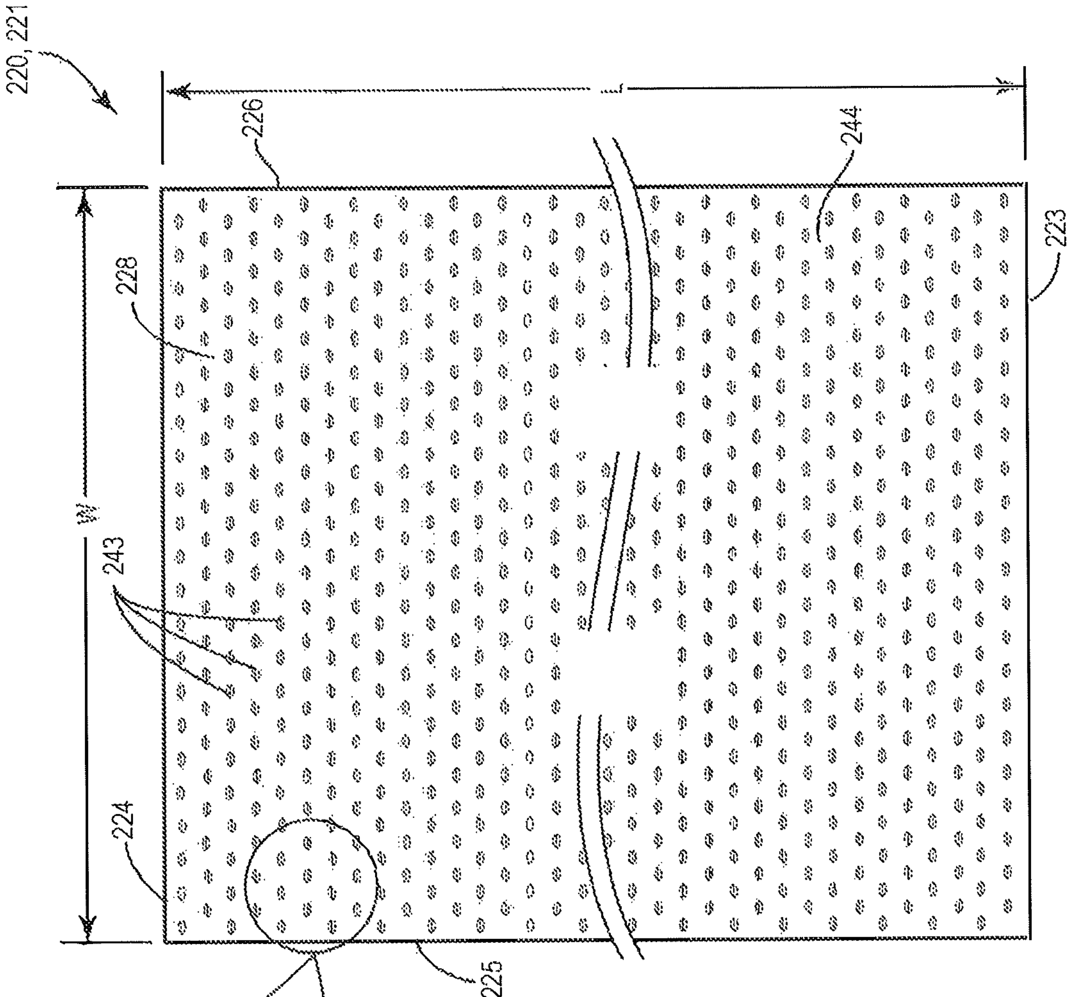

FIG. 122A is a bottom view of a light guide plate.

Figure 122B:
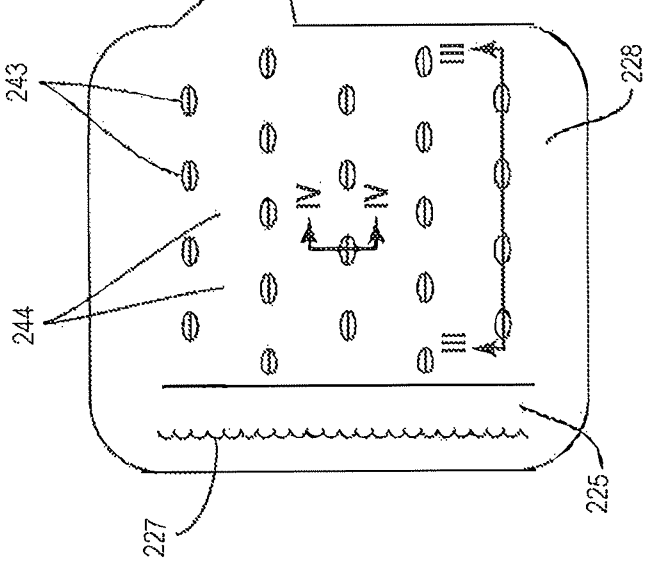

FIG. 122B is a schematic view of the light guide plate of FIG. 122A.

Figure 123:
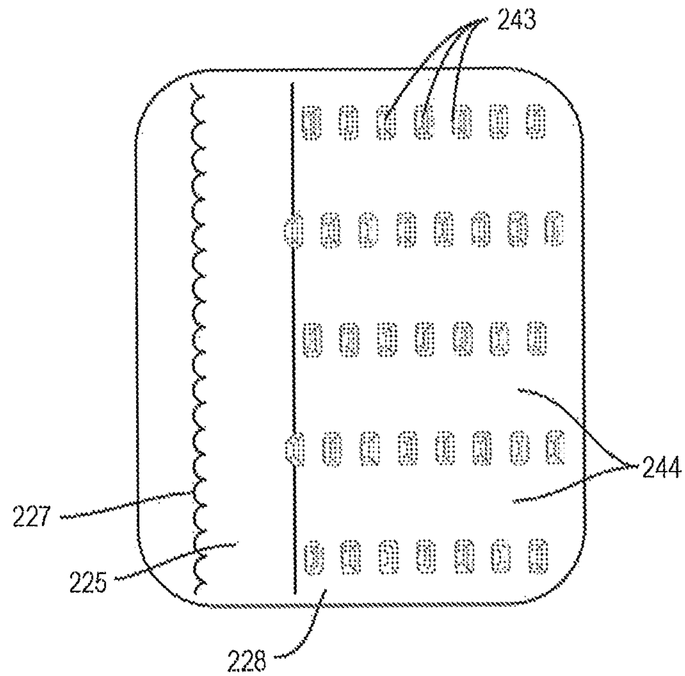

FIG. 123 is a schematic view of a bottom of a light guide plate.

Figure 124A:
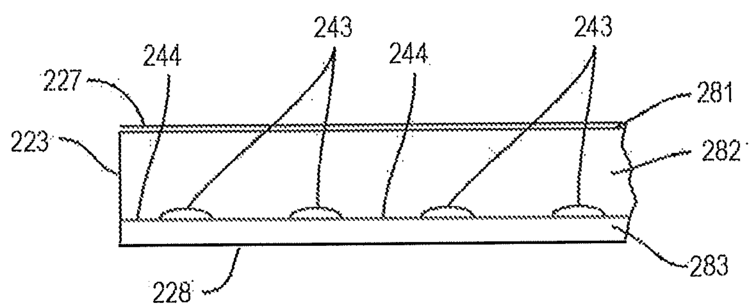

FIG. 124A is a schematic section view cut along line III-III of FIG. 122B.

Figure 124B:
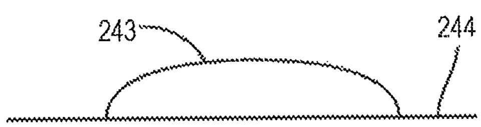

FIG. 124B is a schematic section view of a dip taken along an elongated axis cut along line III-Ill of FIG. 122B.

Figure 124C:
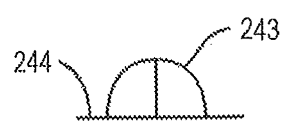

FIG. 124C is a schematic section view of the dip of FIG. 124B taken along a perpendicular axis cut along line IV-IV of FIG. 122B.

Figure 125A:
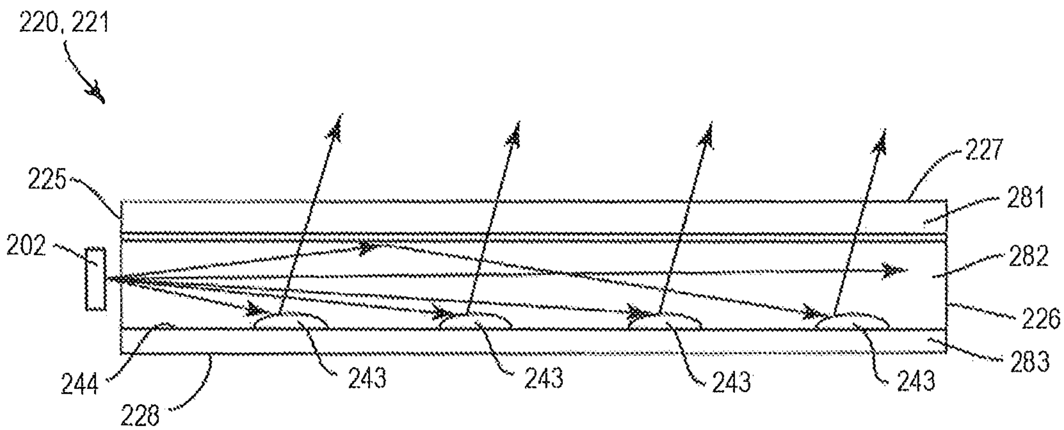

FIG. 125A is a schematic view of light rays reflecting within a light guide plate.

Figure 125B:
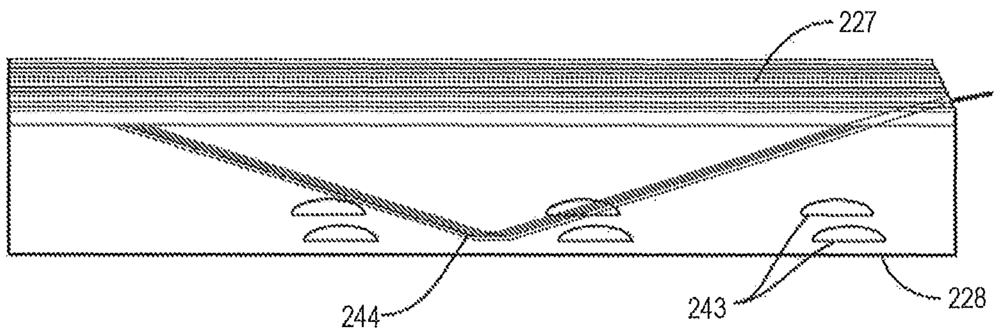

FIG. 125B is a schematic diagram of a light ray reflecting inside the plate from a planar surface of a light guide plate.

Figure 125C:
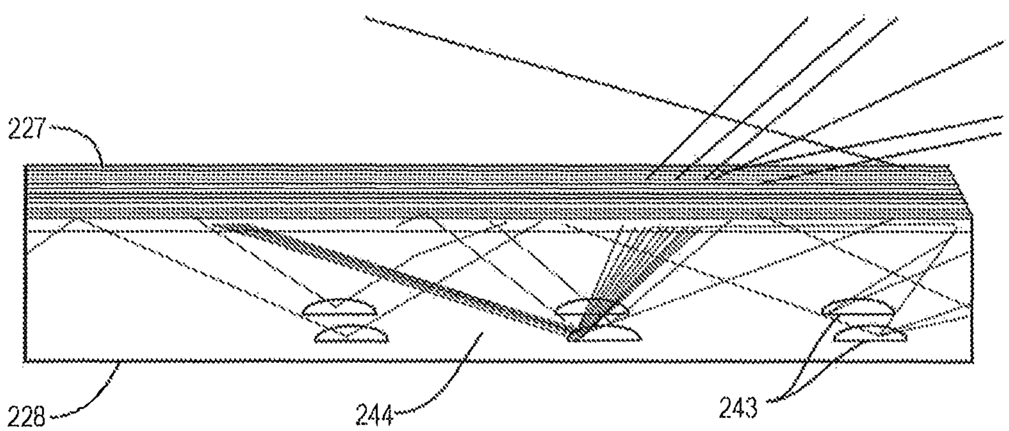

FIG. 125C is a schematic diagram of light rays reflecting inside the plate from a dip surface of a light guide plate.

Figure 126A:
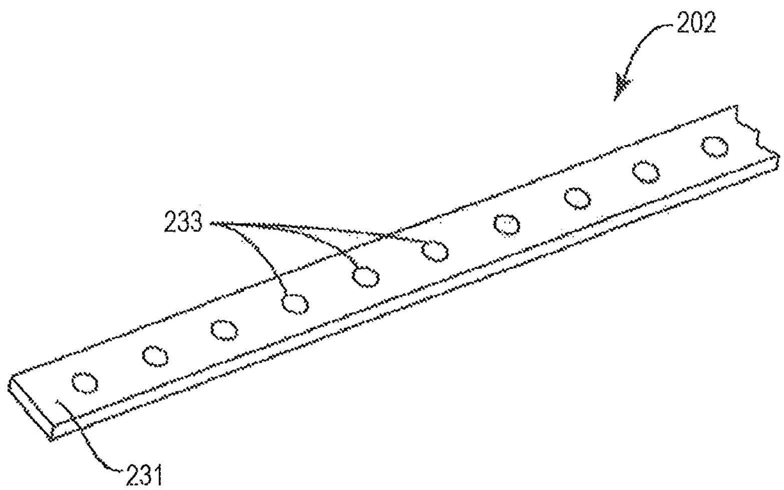

FIG. 126A is a schematic diagram of an LED assembly.

Figure 126B:
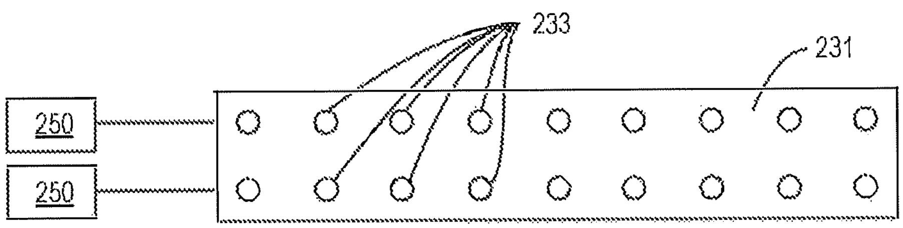

FIG. 126B is a schematic diagram of an LED assembly with a pair of driver circuits.

Figure 127:
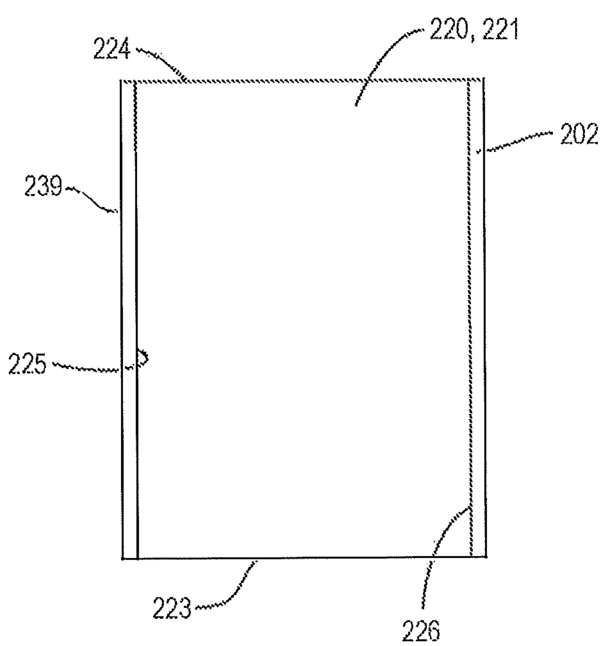

FIG. 127 is a schematic diagram of a light guide plate with an LED assembly attached to a first side and a reflector attached to an opposing side.

Figure 128A:
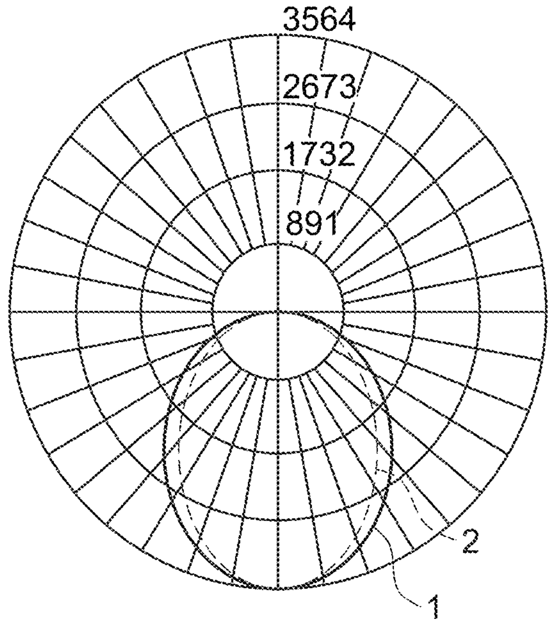

FIG. 128A is an exemplary representation of a simulated candela plot achieved with a first light fixture.

Figure 128B:
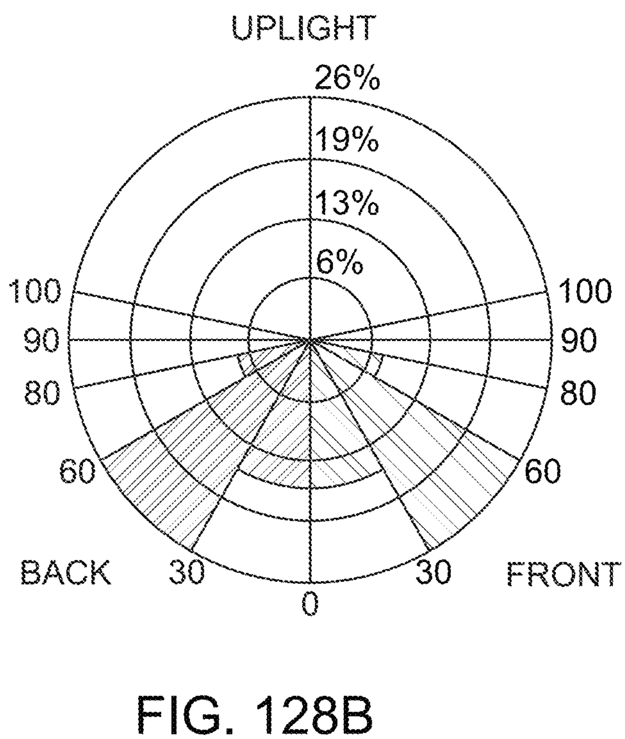

FIG. 128B illustrates luminous flux distribution patterns for a first light fixture.

Figure 128C:
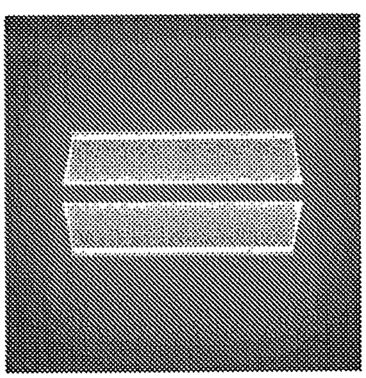

FIG. 128C are luminance appearance and luminance uniformity from the front view of the first light fixture.

Figure 128D:
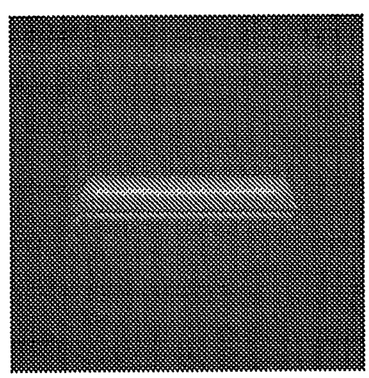

FIG. 128D are luminance appearance and luminance uniformity from a 65° angle relative to a centerline of the first light fixture.

Figure 129C:
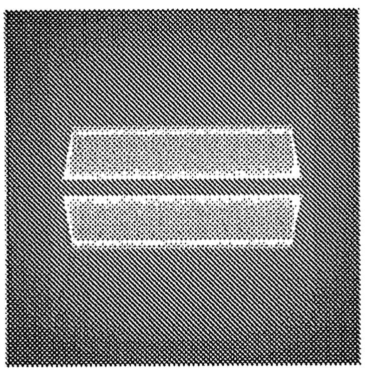
Figure 129D:
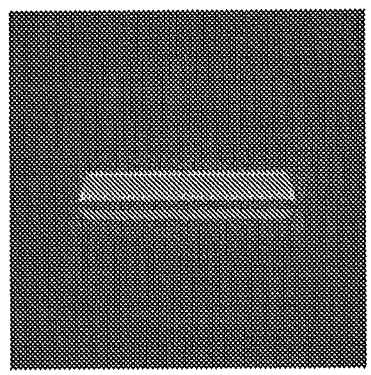
Figure 129A:
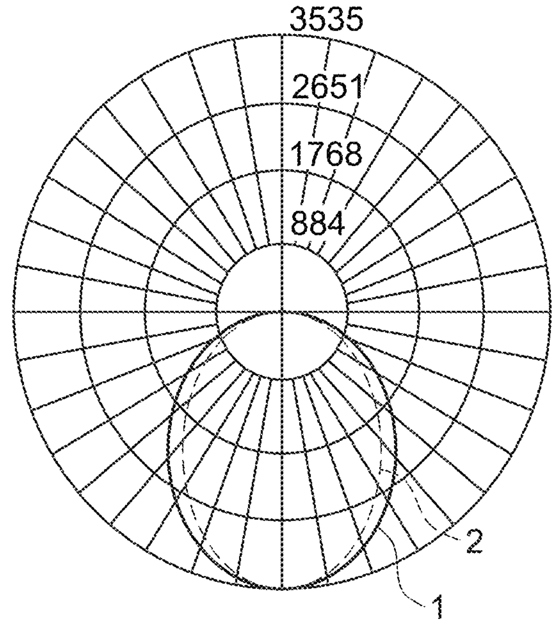

FIG. 129A is an exemplary representation of a simulated candela plot achieved with a second light fixture.

Figure 129B:
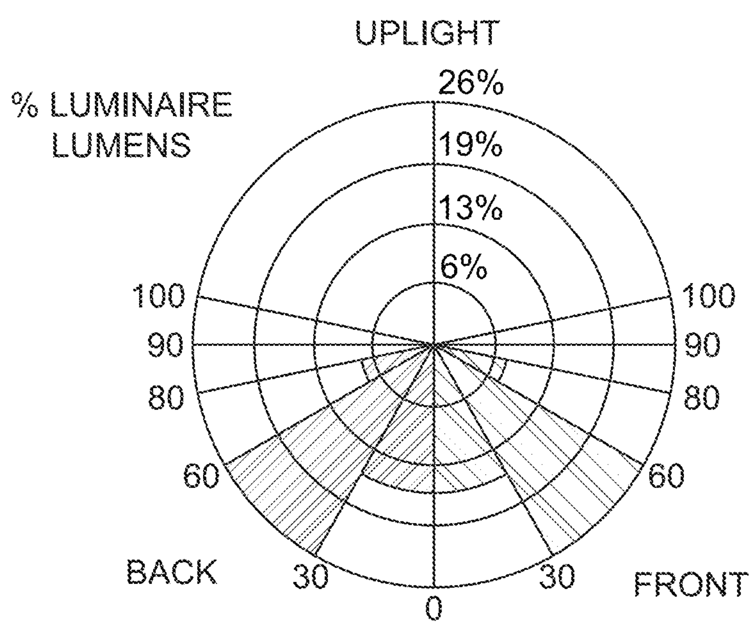

FIG. 129B illustrates luminous flux distribution patterns for a second light fixture.

FIG. 129C are luminance appearance and luminance uniformity from the front view of the second light fixture.

FIG. 129D are luminance appearance and luminance uniformity from a 65° angle relative to a centerline of the second light fixture.

Figure 130C:
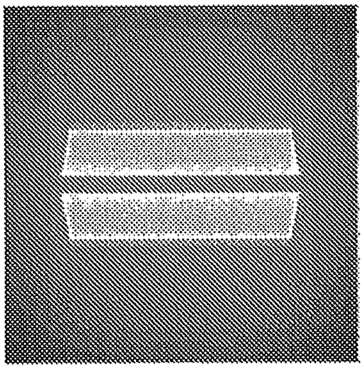
Figure 130D:
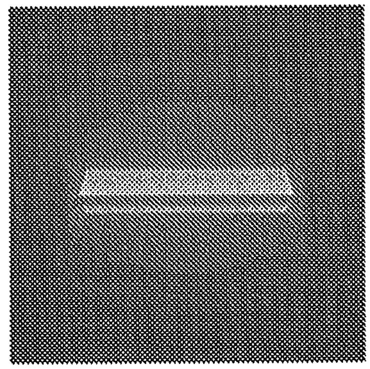
Figure 130A:
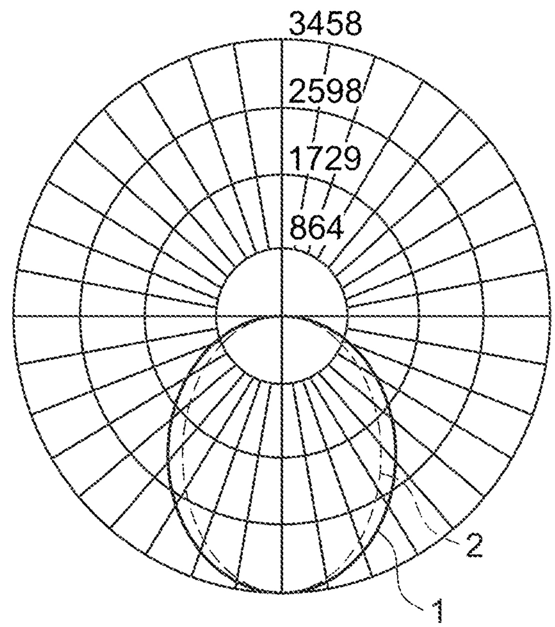

FIG. 130A is an exemplary representation of a simulated candela plot achieved with a third light fixture.

Figure 130B:
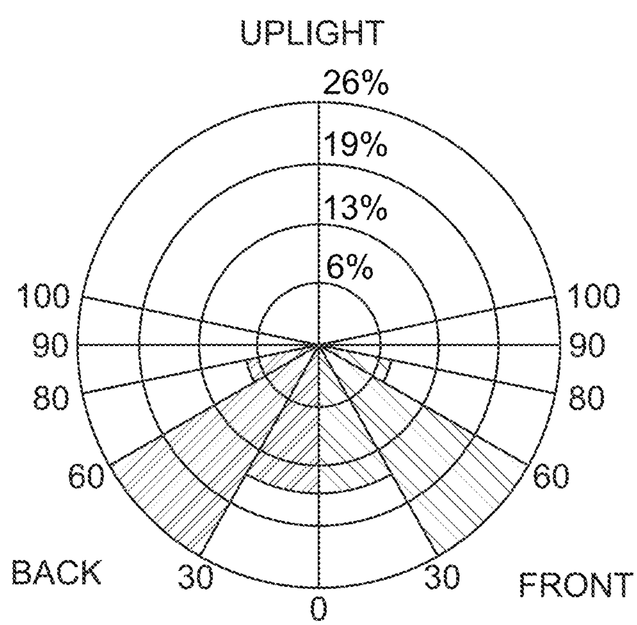

FIG. 130B illustrates luminous flux distribution patterns for a third light fixture.

FIG. 130C are luminance appearance and luminance uniformity from the front view of the third light fixture.

FIG. 130D are luminance appearance and luminance uniformity from a 65° angle relative to a centerline of the third light fixture.

Figure 131A:
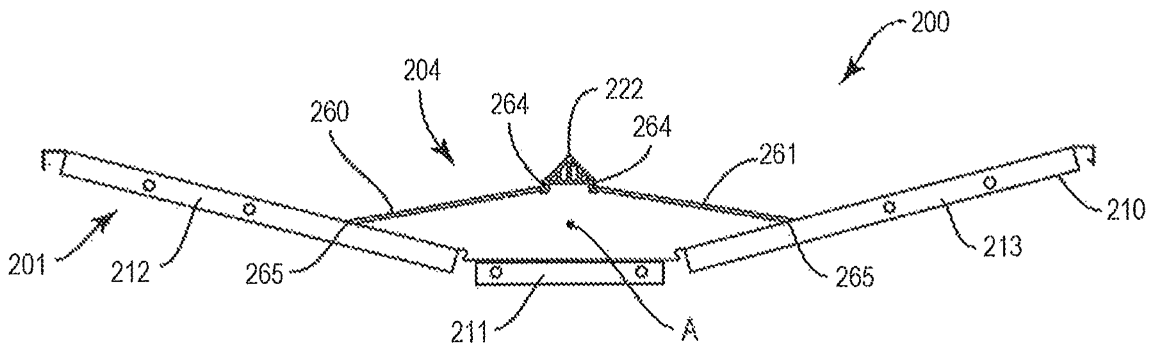

FIG. 131A is a side schematic view of a light fixture having a housing and a light panel assembly.

Figure 131B:
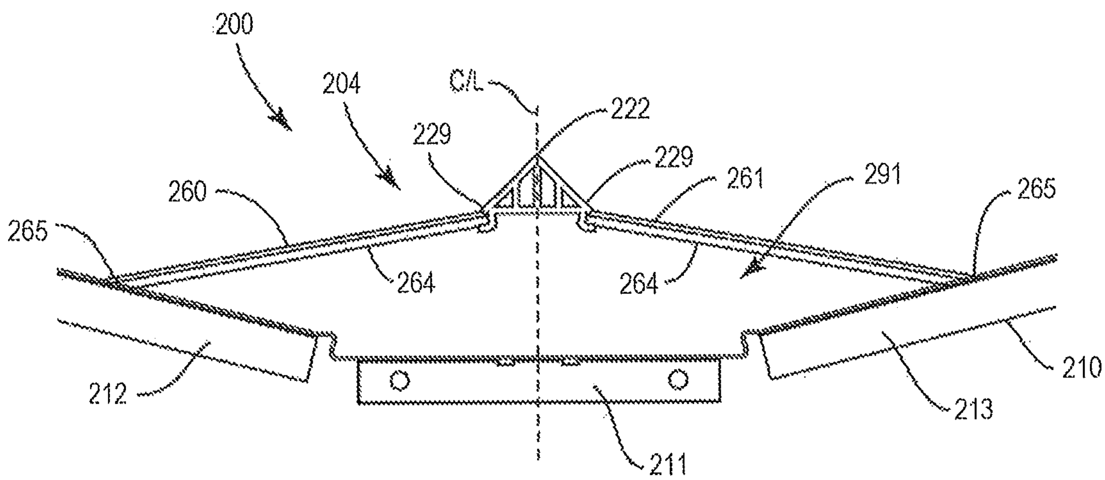

FIG. 131B is an enlarged view of the area marked in FIG. 131A.

Figure 132A:
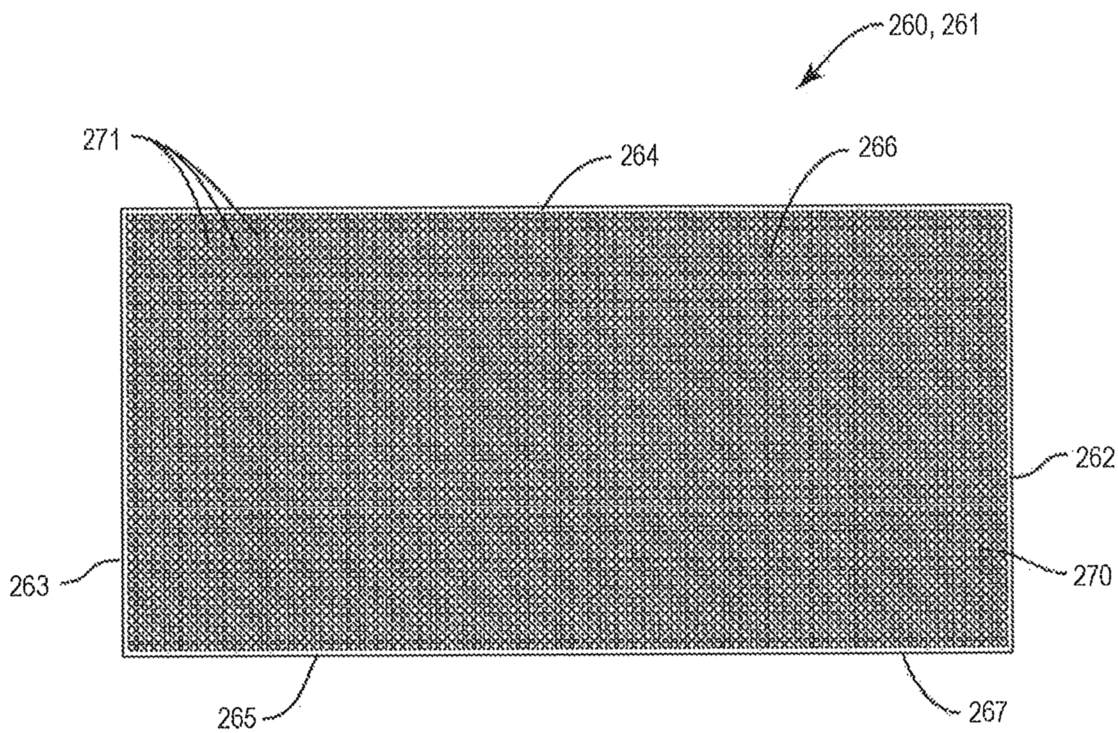

FIG. 132A is a top view of a light panel with an array of pixels.

Figure 132B:
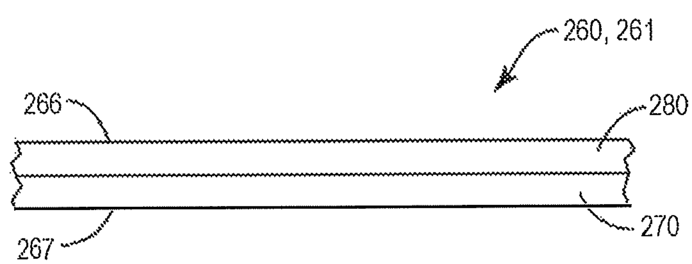

FIG. 132B is a partial schematic side view of a light panel.

Figure 132C:
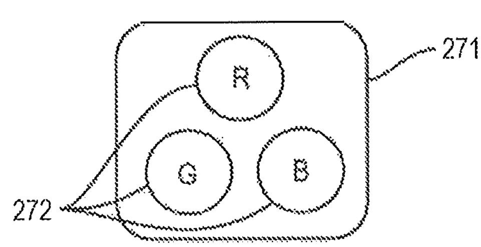

FIG. 132C is a schematic diagram of a pixel having multiple sub-pixels.

Figure 133:
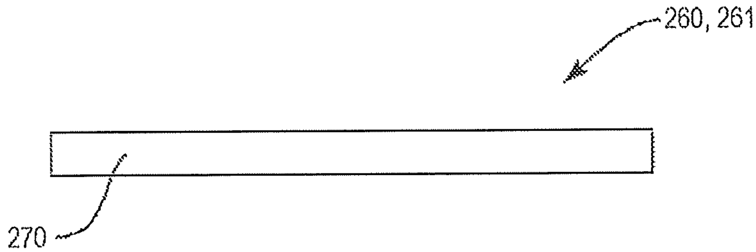

FIG. 133 is a schematic side view of a light panel.

Figure 134:
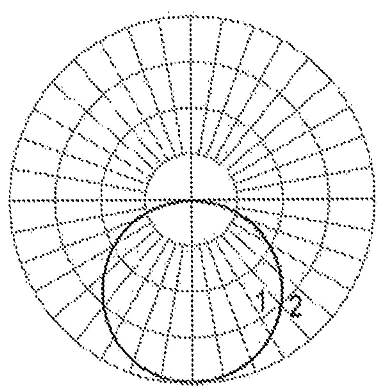

FIG. 134 is an exemplary representation of a simulated candela plot achieved with a light fixture.

Figure 135A:
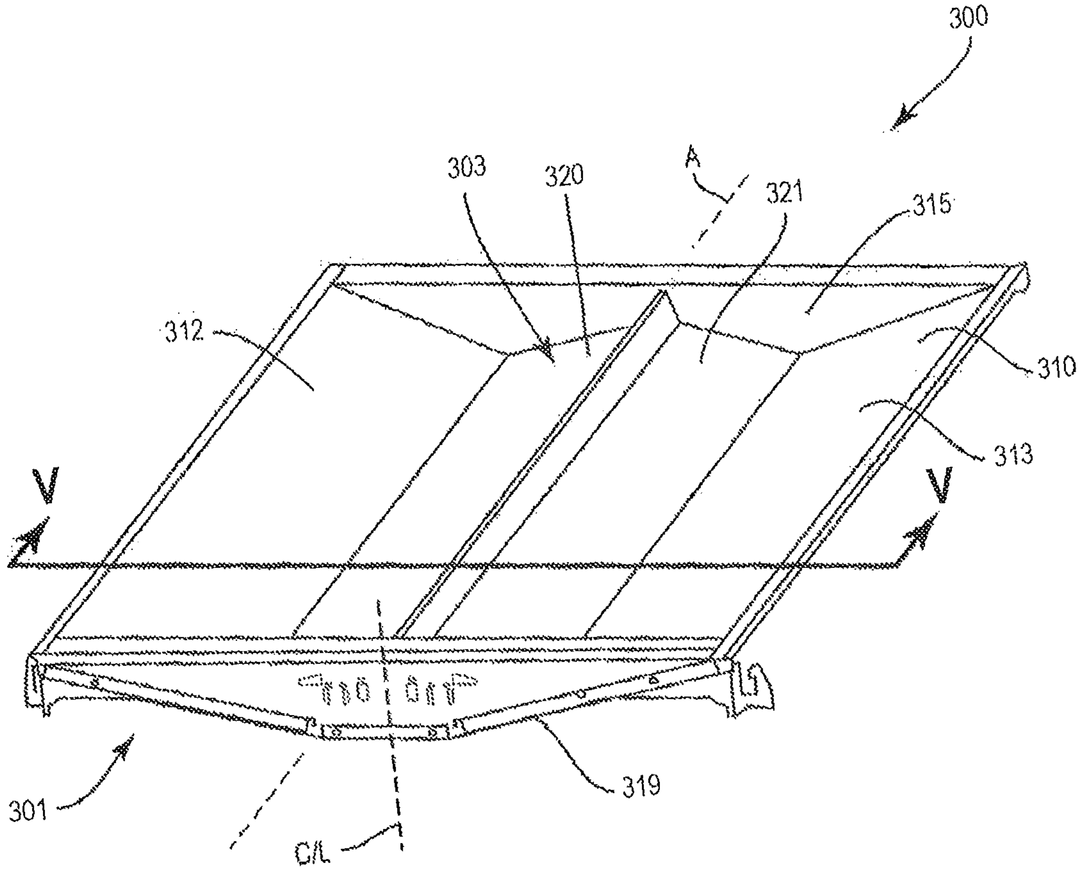

FIG. 135A is a perspective view of a light fixture.

Figure 135B:
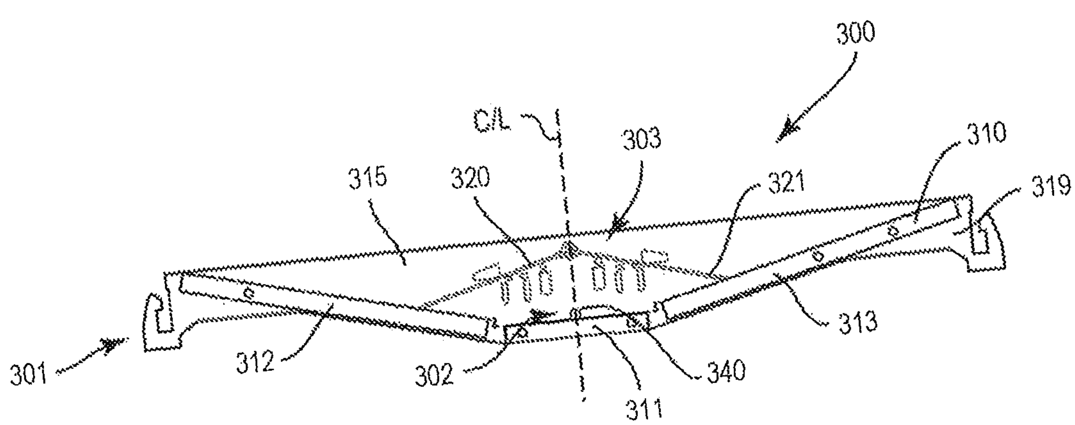

FIG. 135B is a schematic section view cut along line V-V of FIG. 135A.

Figure 136:
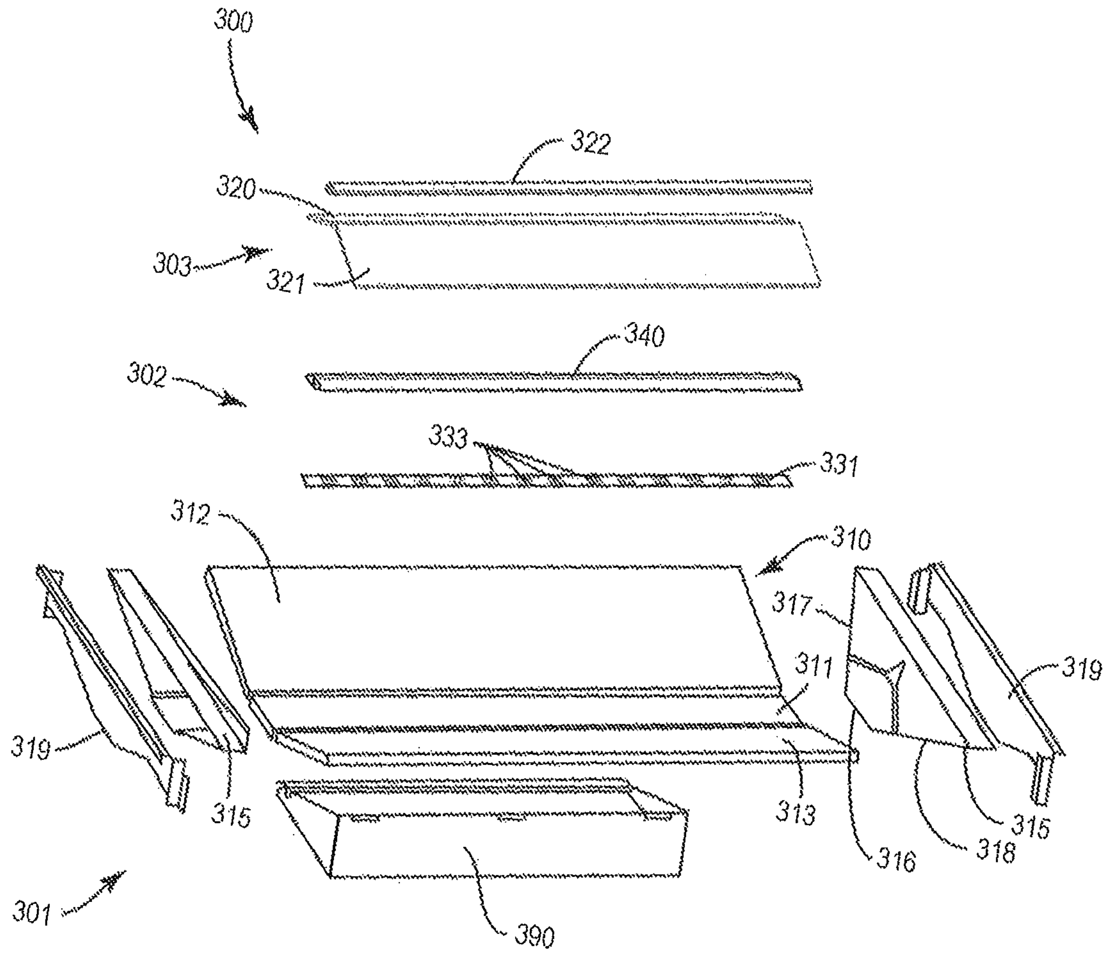

FIG. 136 is an exploded view of a light fixture.

Figure 137A:
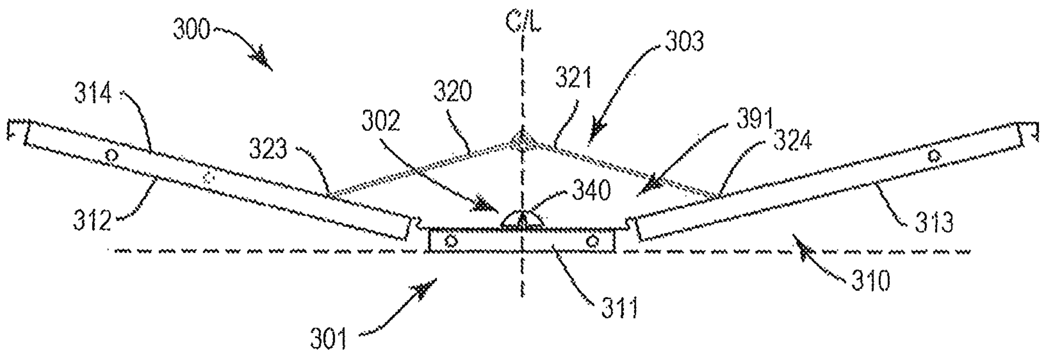

FIG. 137A is a side schematic view of a housing, LED assembly, inner lens, and lens assembly of a light fixture.

Figure 137B:
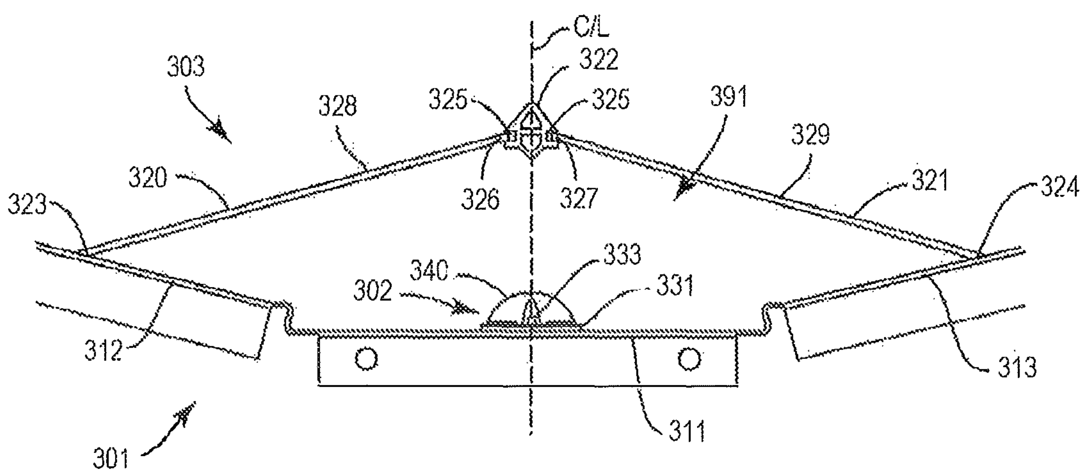

FIG. 137B is a partial side schematic view of a housing, LED assembly, inner lens, and lens assembly of a light fixture.

Figure 138A:
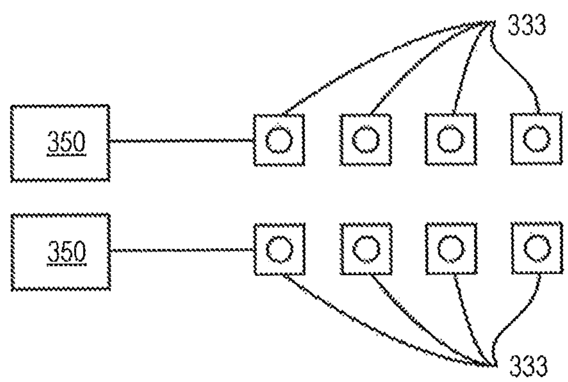

FIG. 138A is a schematic diagram of multiple driver circuits that operate LED elements.

Figure 138B:
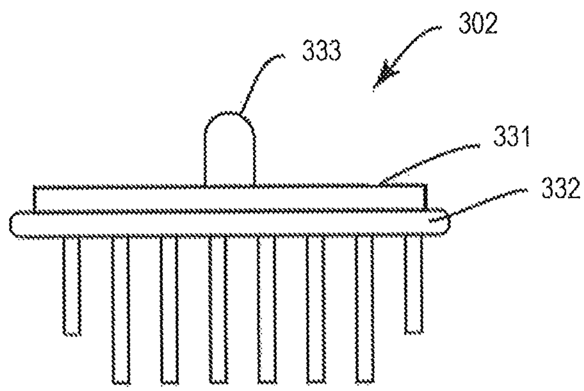

FIG. 138B is a side schematic diagram of an LED assembly mounted to a heat sink.

Figure 139:
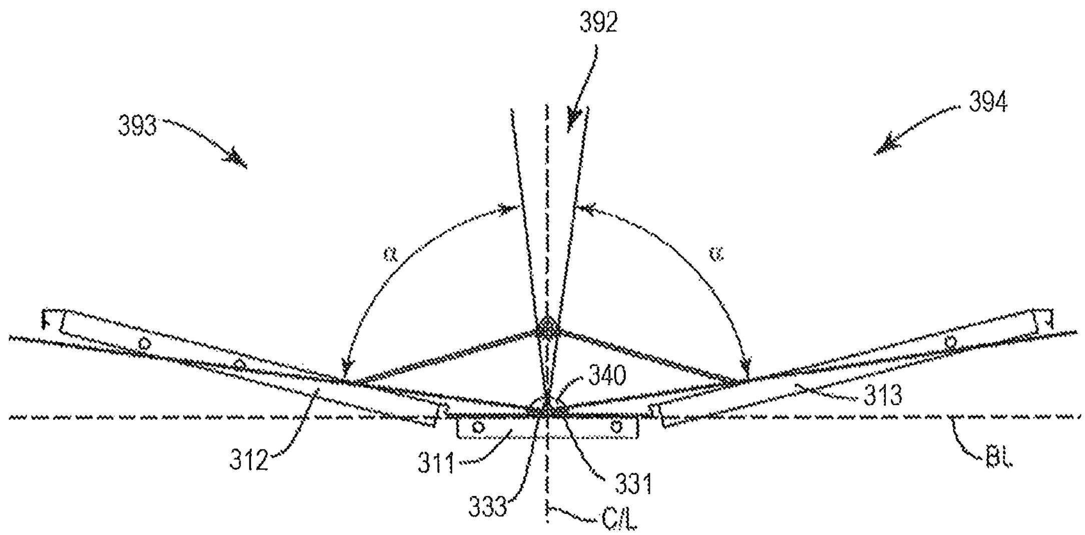

FIG. 139 is a schematic diagram of a light fixture that distributes light into lateral light zones and away from a center zone.

Figure 140:
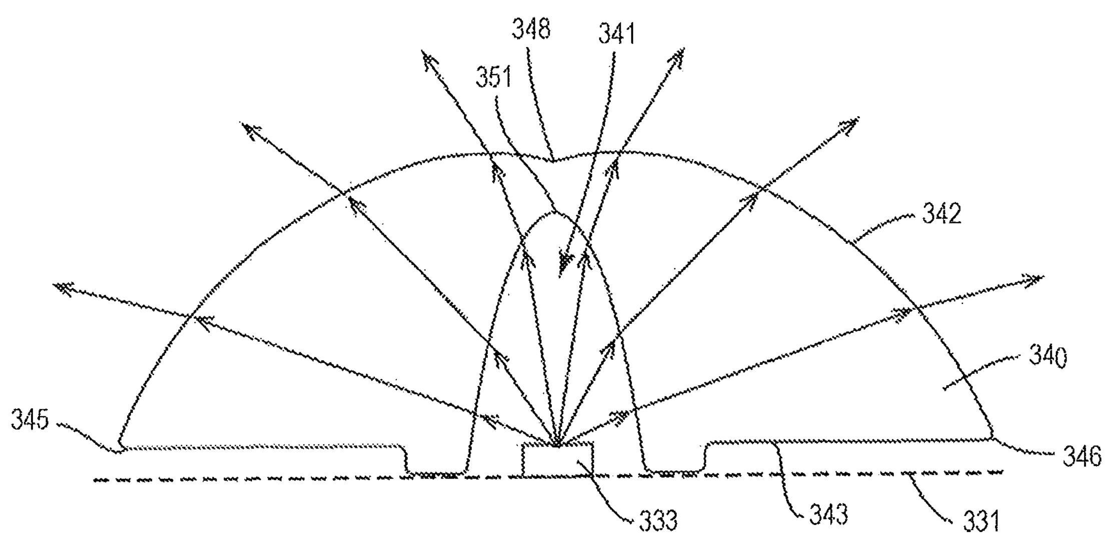

FIG. 140 is a schematic diagram of light rays distributed through an inner lens.

Figure 141A:
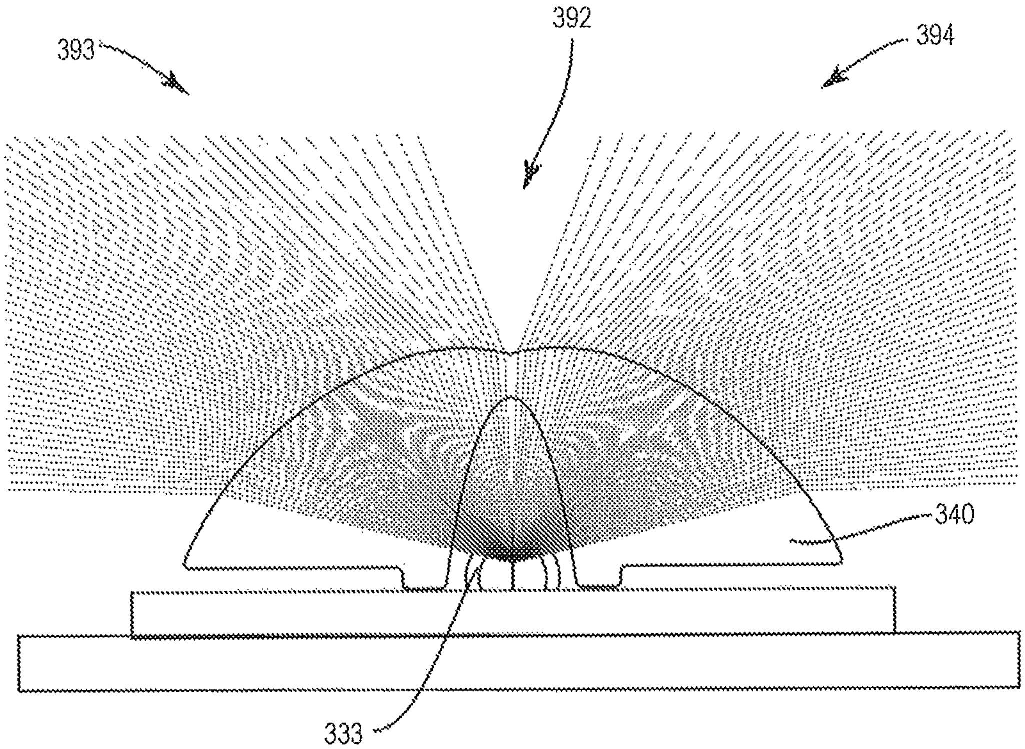

FIG. 141A is schematic diagram of a ray fan of light rays propagating through and from an inner lens.

Figure 141B:
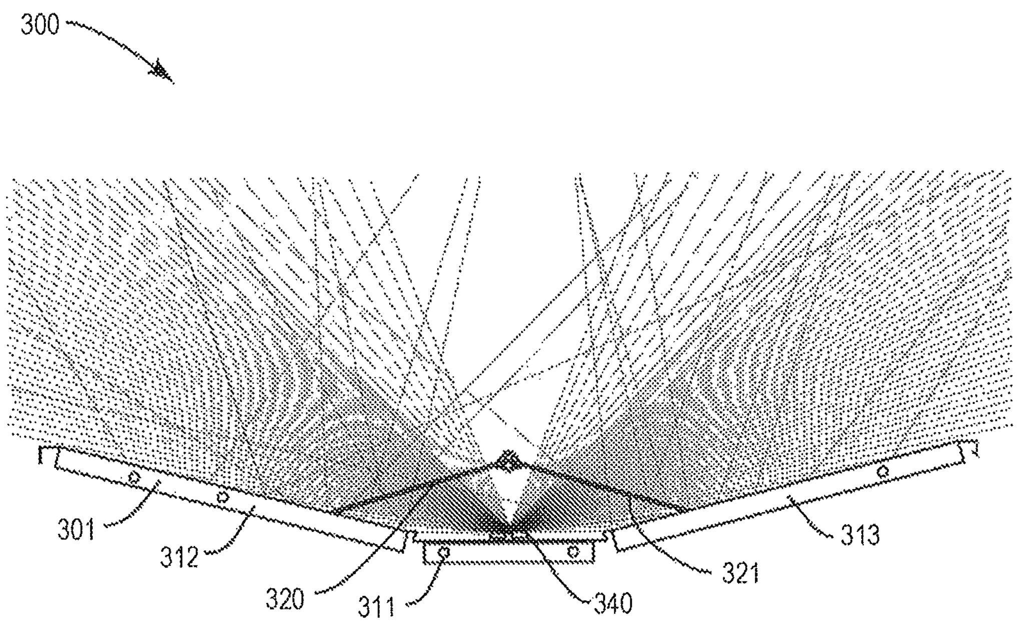

FIG. 141B is a schematic diagram of distribution of light rays from a light fixture.

Figure 142A:
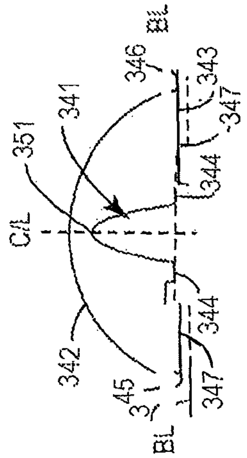

FIG. 142A is a partial perspective view of an inner lens.

Figure 142B:
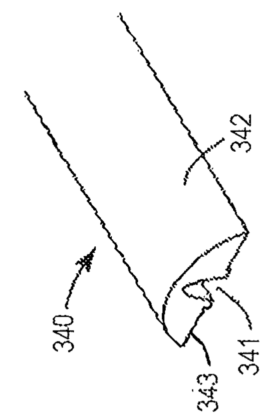

FIG. 142B is an end view of the inner lens of FIG. 142A.

Figure 143A:
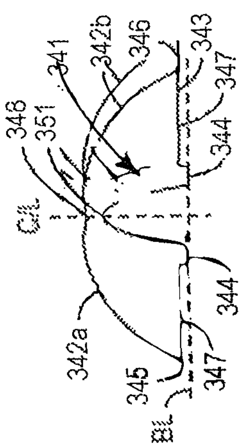

FIG. 143A is a partial perspective view of an inner lens.

Figure 143B:
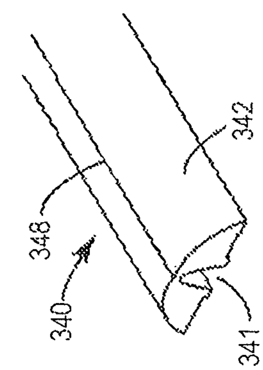

FIG. 143B is an end view of the inner lens of FIG. 143A.

Figure 144A:
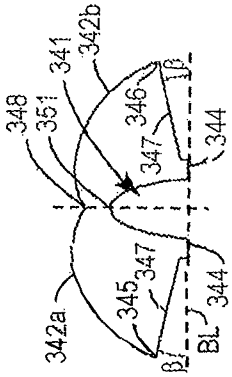

FIG. 144A is a partial perspective view of an inner lens.

Figure 144B:
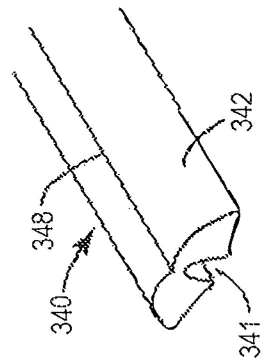

FIG. 144B is an end view of the inner lens of FIG. 144A.

Figure 145A:
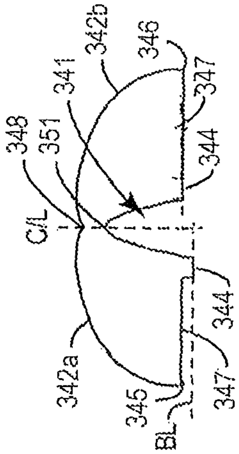

FIG. 145A is a partial perspective view of an inner lens.

Figure 145B:
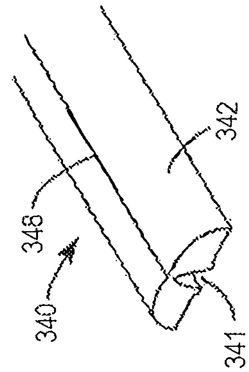

FIG. 145B is an end view of the inner lens of FIG. 145A.

Figure 146A:
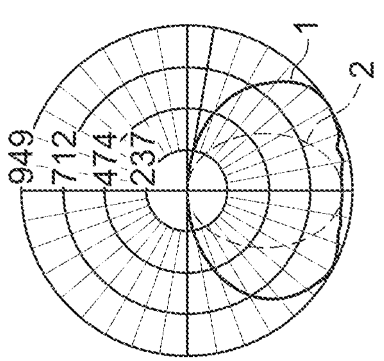

FIG. 146A is an exemplary representation of a simulated candela plot achieved with the first inner lens as in FIG. 142A with first and second plots with the first plot illustrating the intensity in a plane perpendicular to the longitudinal axis and the second plot in a plane along the longitudinal axis.

Figure 146B:
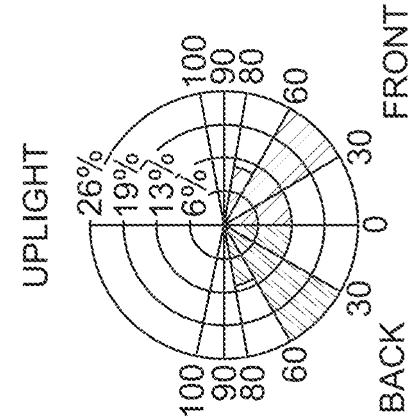

FIG. 146B illustrate luminous flux distribution patterns for a light fixture with a first inner lens as in FIG. 142A.

Figure 147A:
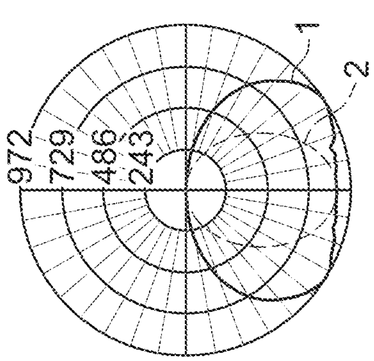

FIG. 147A is an exemplary representation of a simulated candela plot achieved with the second inner lens as in FIG. 143A with first and second plots with the first plot illustrating the intensity in a plane perpendicular to the longitudinal axis and the second plot in a plane along the longitudinal axis.

Figure 147B:
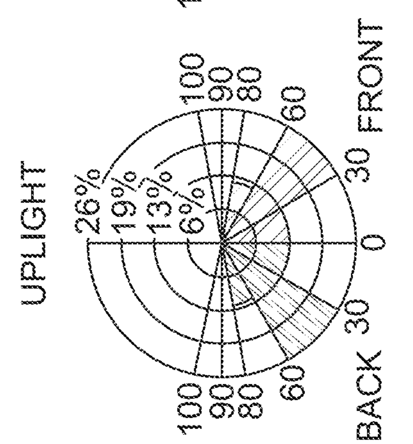

FIG. 147B illustrate luminous flux distribution patterns for a light fixture with a second inner lens as in FIG. 143A.

Figure 148A:
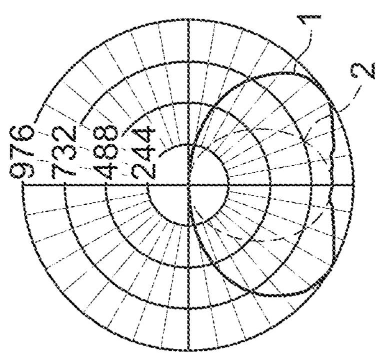

FIG. 148A is an exemplary representation of a simulated candela plot achieved with the third inner lens as in FIG. 144A with first and second plots with the first plot illustrating the intensity in a plane perpendicular to the longitudinal axis and the second plot in a plane along the longitudinal axis.

Figure 148B:
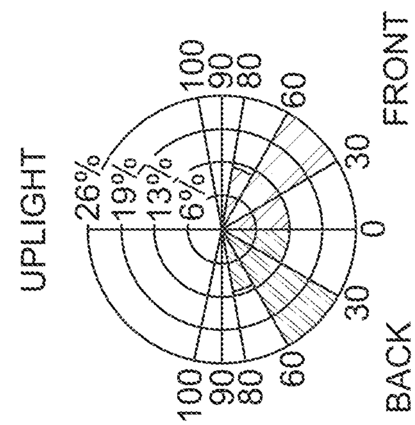

FIG. 148B illustrates luminous flux distribution patterns for a light fixture with a third inner lens as in FIG. 144A.

Figure 149A:
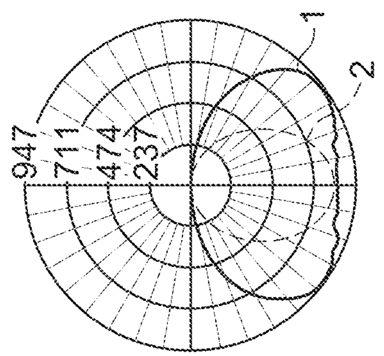

FIG. 149A is an exemplary representation of a simulated candela plot achieved with the fourth inner lens as in FIG. 145A with first and second plots with the first plot illustrating the intensity in a plane perpendicular to the longitudinal axis and the second plot in a plane along the longitudinal axis.

Figure 149B:
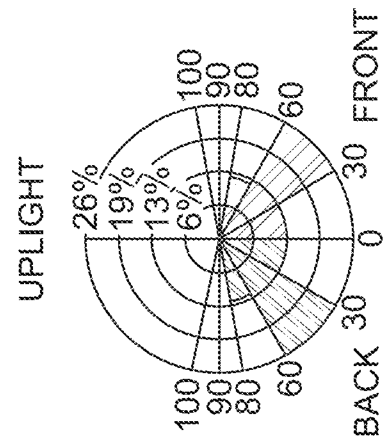

FIG. 149B illustrates luminous flux distribution patterns for a light fixture with a fourth inner lens as in FIG. 145A.

Figure 150A:
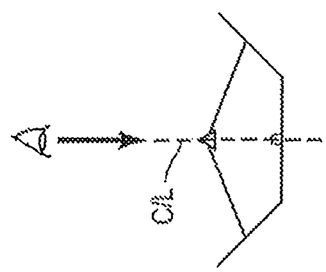

FIG. 150A is a schematic diagram of a front view viewing angle along the centerline C/L.

Figure 150B:
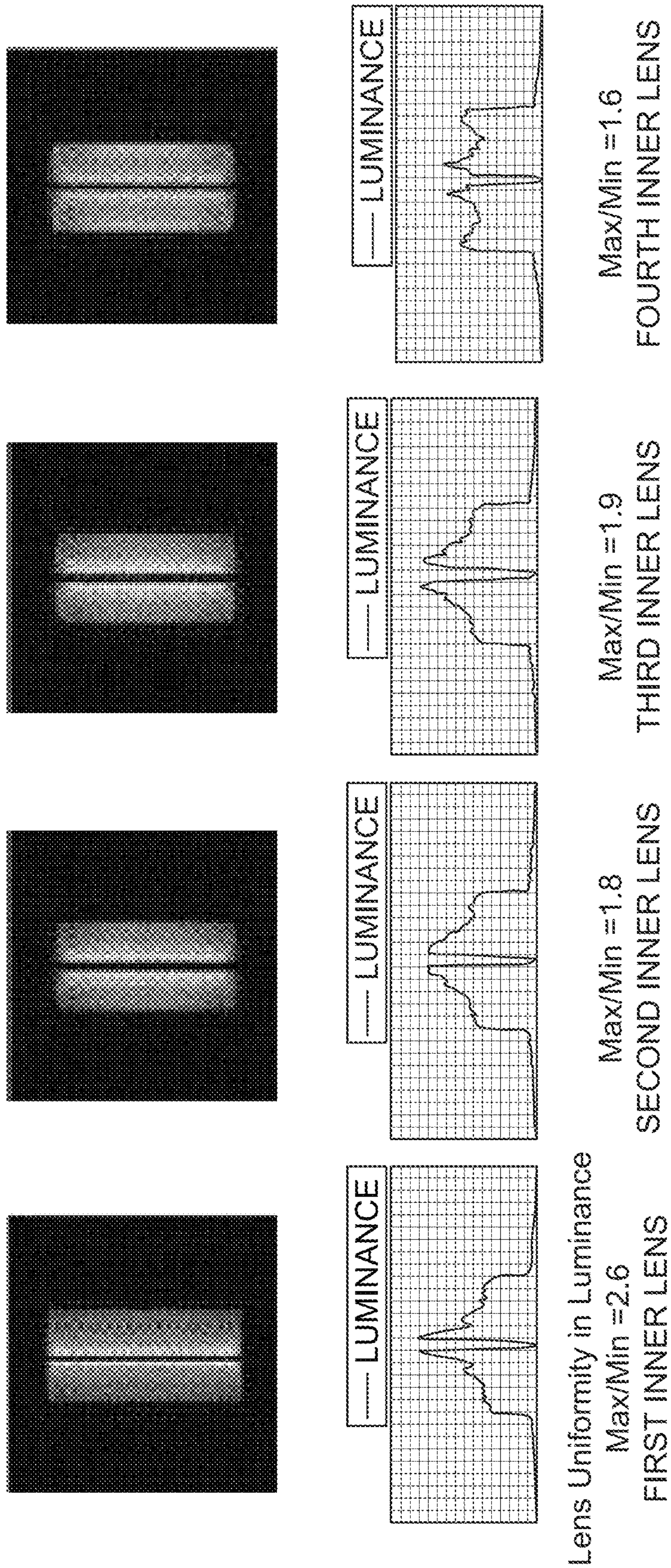

FIG. 150B are luminance appearance and luminance uniformity from the front view of the light fixtures with the first, second, third, and fourth inner lenses.

Figure 151A:
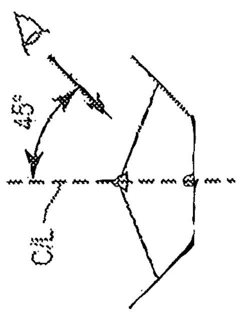

FIG. 151A is a schematic diagram of a 45° viewing angle relative to the centerline C/L.

Figure 151B:
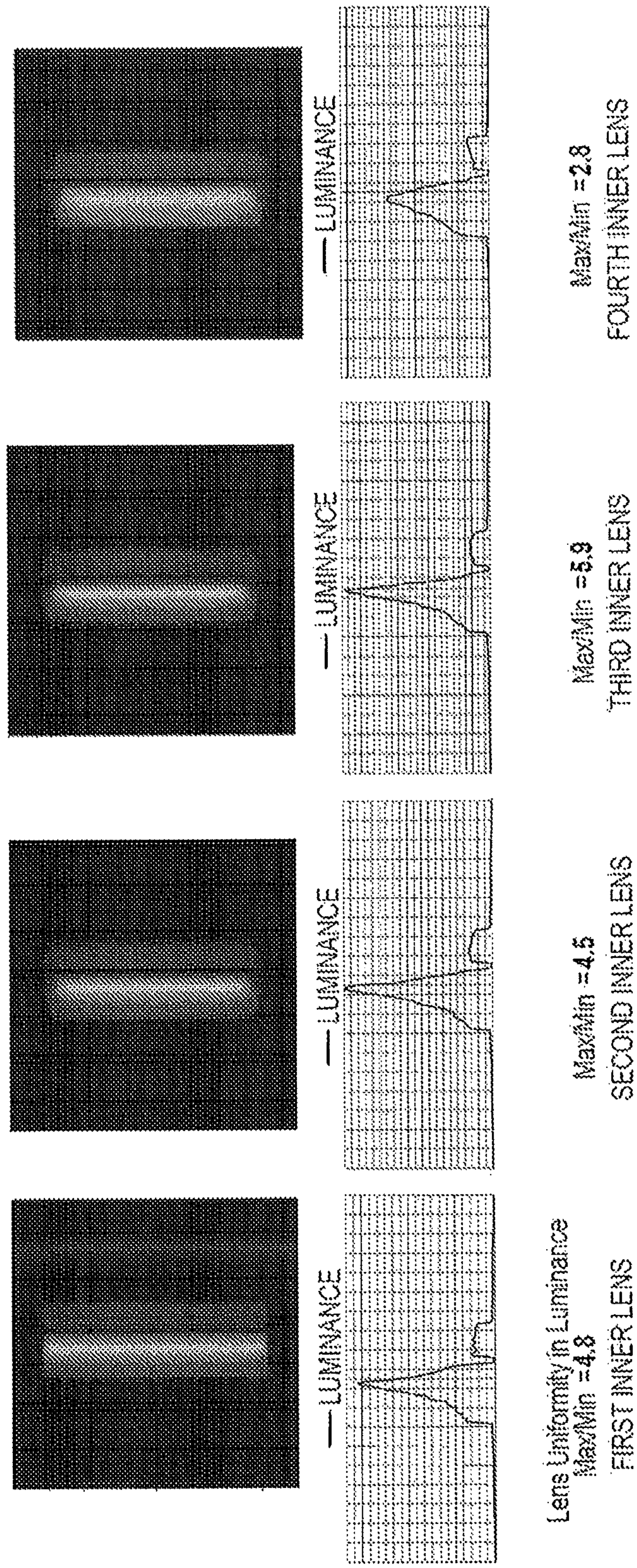

FIG. 151B are luminance appearance and luminance uniformity from the 45° viewing angle of the light fixtures with the first, second, third, and fourth inner lenses.

Figure 152A:
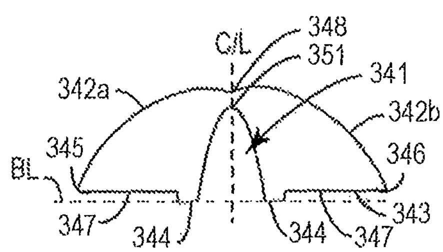

FIG. 152A is an end view of a fifth inner lens.

Figure 152B:
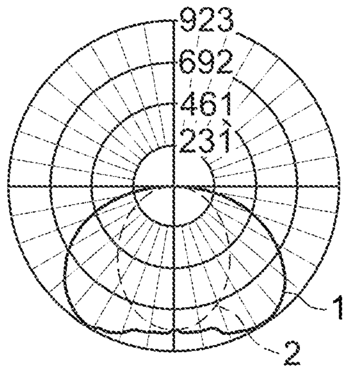

FIG. 152B is an exemplary representation of a simulated candela plot achieved with the fifth inner lens as in FIG. 152A with first and second plots with the first plot illustrating the intensity in a plane perpendicular to the longitudinal axis and the second plot in a plane along the longitudinal axis.

Figure 152C:
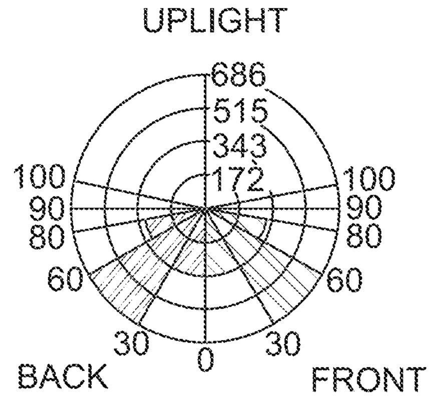

FIG. 152C illustrates luminous flux distribution patterns for a light fixture with a fifth inner lens as in FIG. 152A.

Figure 153A:
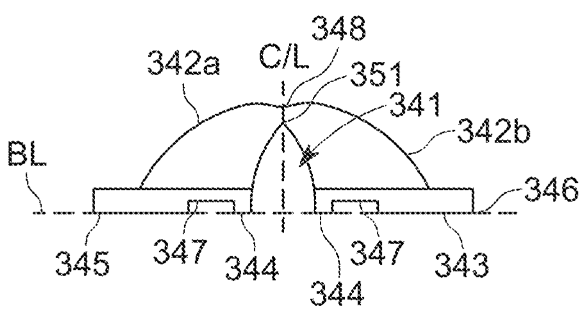

FIG. 153A is an end view of a sixth inner lens.

Figure 153B:
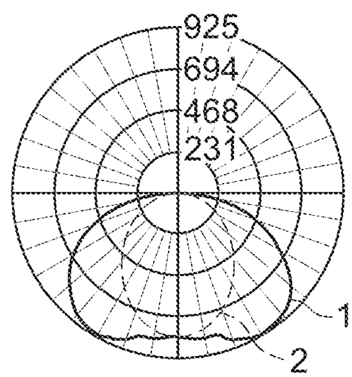

FIG. 153B is an exemplary representation of a simulated candela plot achieved with the sixth inner lens as in FIG. 153A with first and second plots with the first plot illustrating the intensity in a plane perpendicular to the longitudinal axis and the second plot in a plane along the longitudinal axis.

Figure 153C:
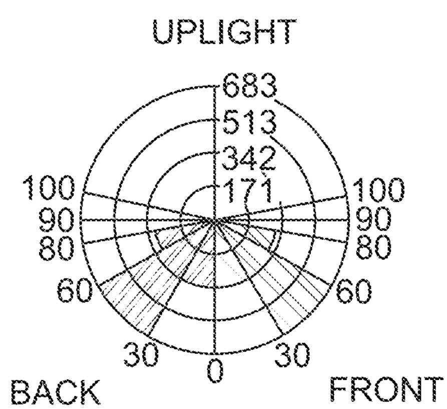

FIG. 153C illustrates luminous flux distribution patterns for a light fixture with a sixth inner lens as in FIG. 153A.

Figure 154A:
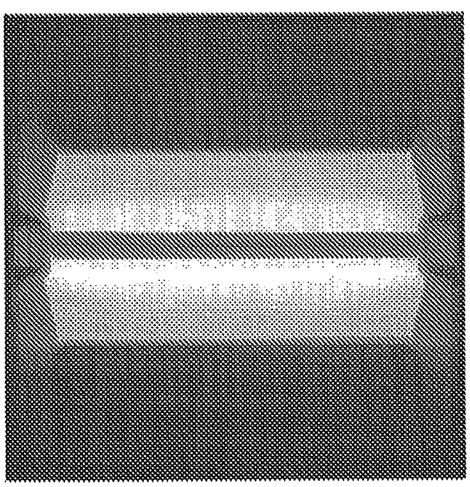
Figure 154B:
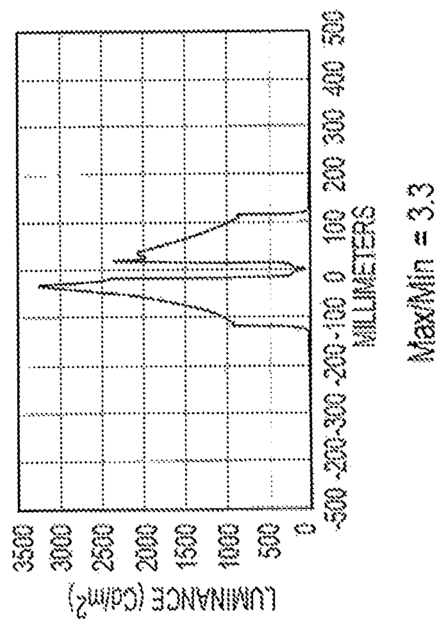

FIGS. 154A and 154B are luminance appearance and luminance uniformity from the front view of a dimmed light fixture with the fifth inner lens.

Figure 154C:
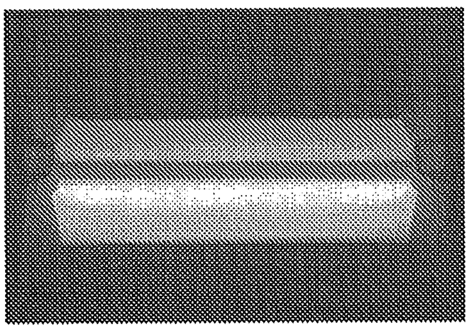
Figure 154D:
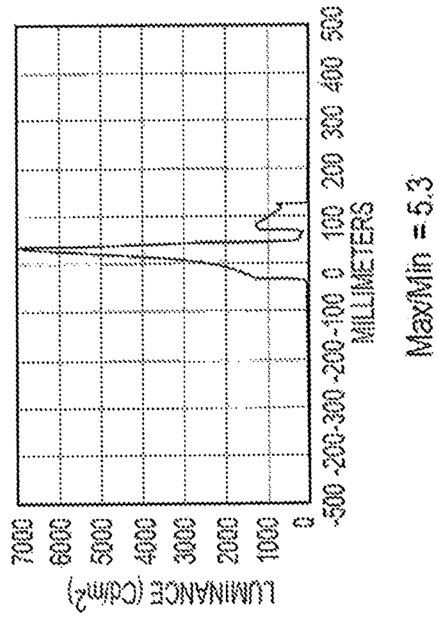

FIGS. 154C and 154D are luminance appearance and luminance uniformity from a 45° angle of a dimmed light fixture with the fifth inner lens.

Figure 155A:
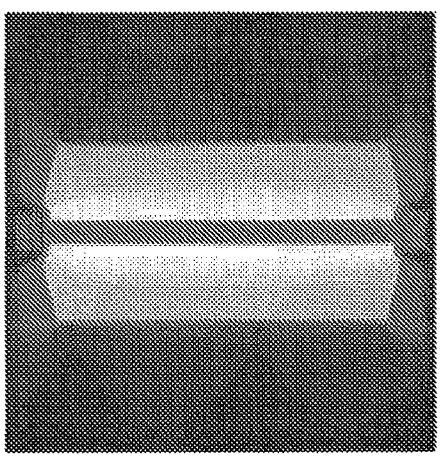
Figure 155B:
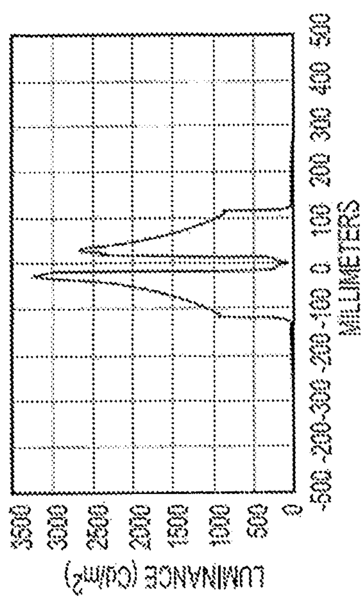

FIGS. 155A and 155B are luminance appearance and luminance uniformity from the front view of a dimmed light fixture with the sixth inner lens.

Figure 155C:
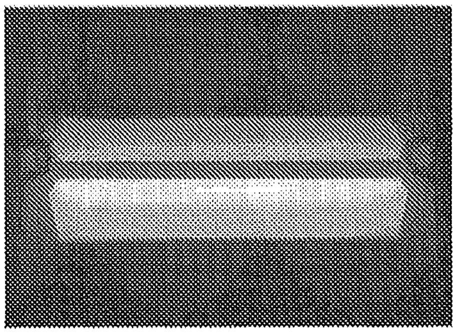
Figure 155D:
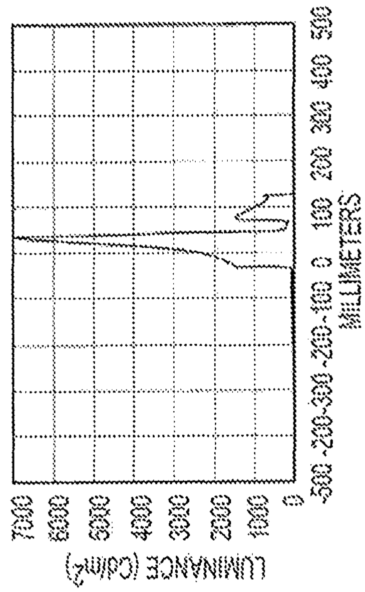

FIGS. 155C and 155D are luminance appearance and luminance uniformity from a 45° angle of a dimmed light fixture with the sixth inner lens.

Figure 156A:
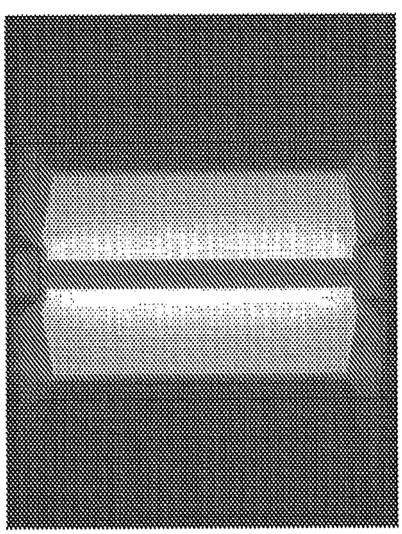
Figure 156B:
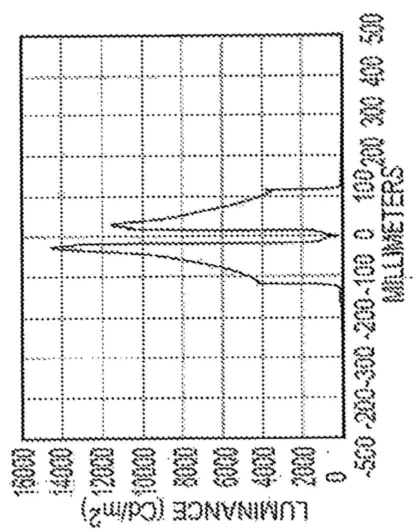

FIGS. 156A and 156B are luminance appearance and luminance uniformity from the front view of a full level light fixture with the sixth inner lens.

Figure 156C:
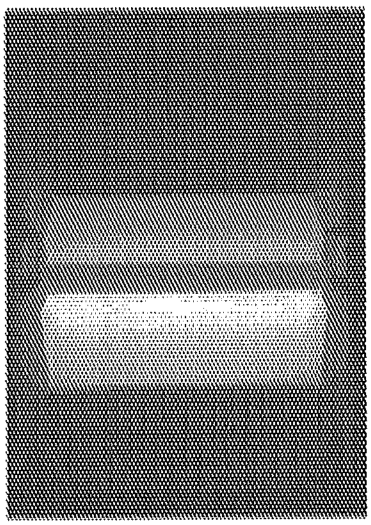
Figure 156D:
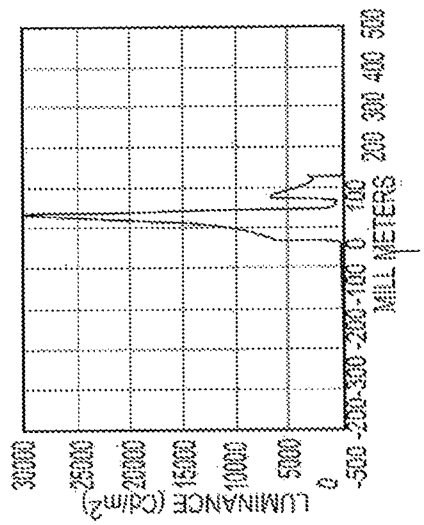

FIGS. 156C and 156D are luminance appearance and luminance uniformity from a 45° angle of a full level light fixture with the sixth inner lens.

Figure 157:
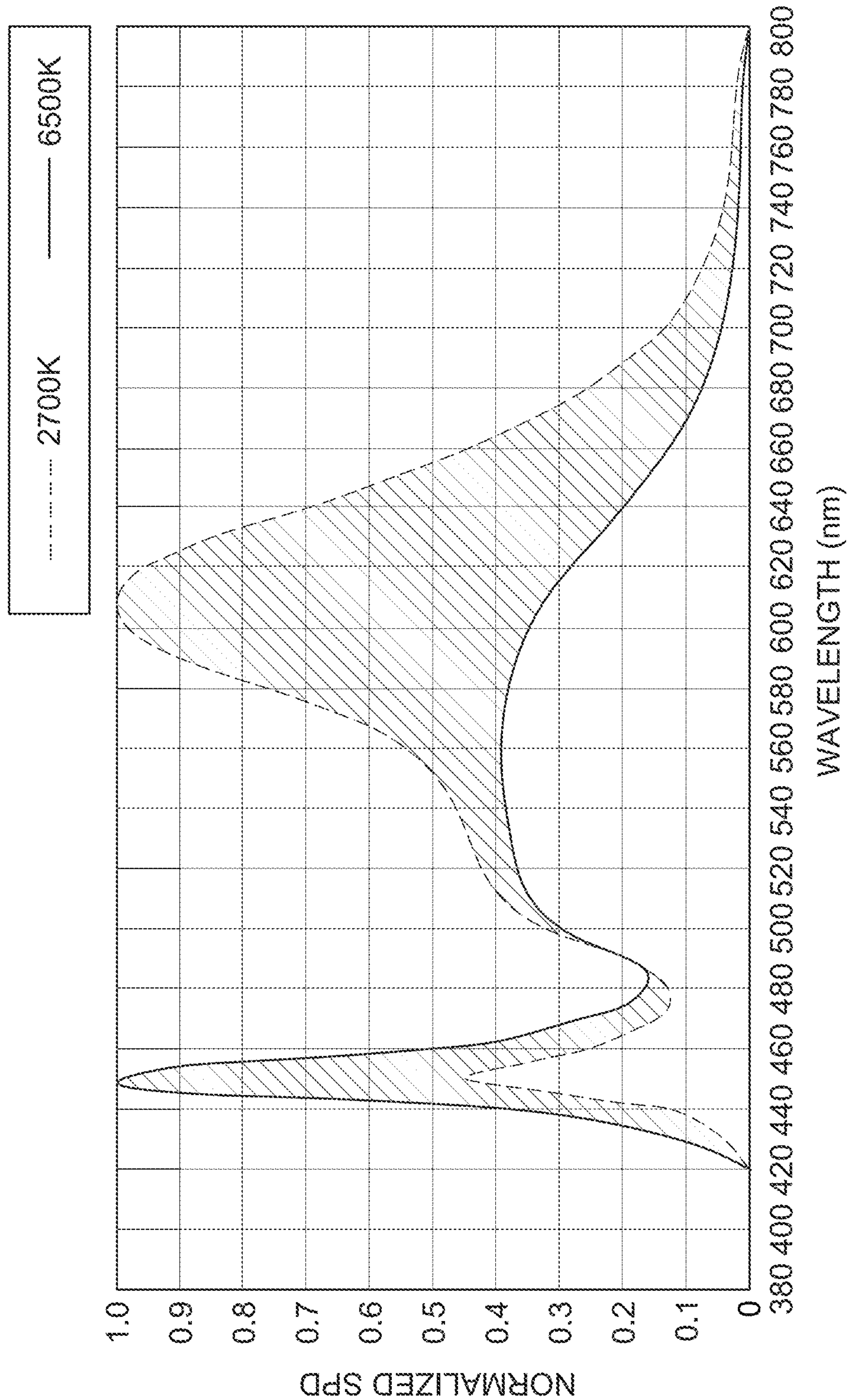

FIG. 157 is a graph of examples of spectra of tunable LED elements at 2700K and 6500K.

Figure 158A:
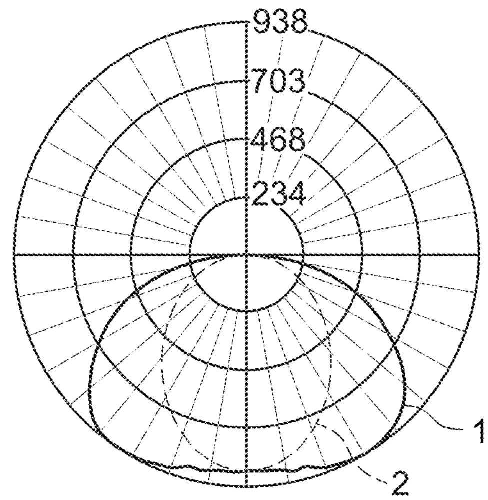

FIG. 158A is an exemplary representation of a simulated candela plot achieved with the fourth inner lens as in FIG. 145A over the spectrum at CCT 2700K with first and second plots with the first plot illustrating the intensity in a plane perpendicular to the longitudinal axis and the second plot in a plane along the longitudinal axis.

Figure 158B:
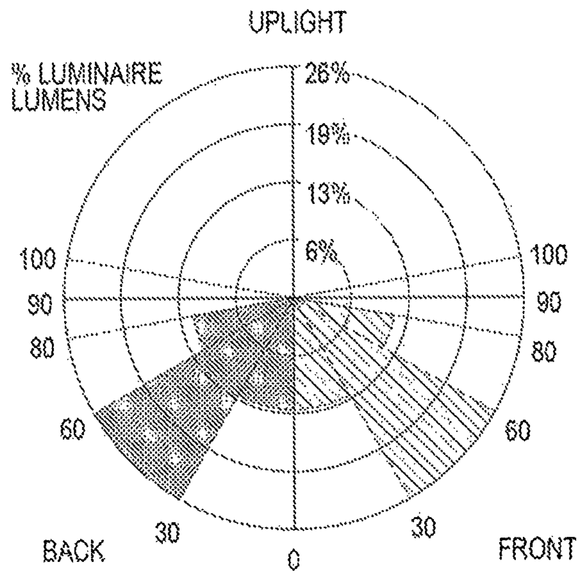

FIG. 158B illustrates luminous flux distribution patterns for a light fixture with a fourth inner lens as in FIG. 145A over the spectrum at CCT 2700K.

Figure 159A:
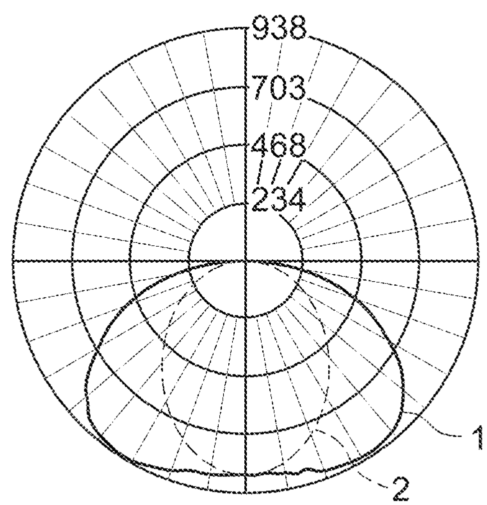

FIG. 159A is an exemplary representation of a simulated candela plot achieved with the fourth inner lens as in FIG. 145A over the spectrum at 6500K with first and second plots with the first plot illustrating the intensity in a plane perpendicular to the longitudinal axis and the second plot in a plane along the longitudinal axis.

Figure 159B:
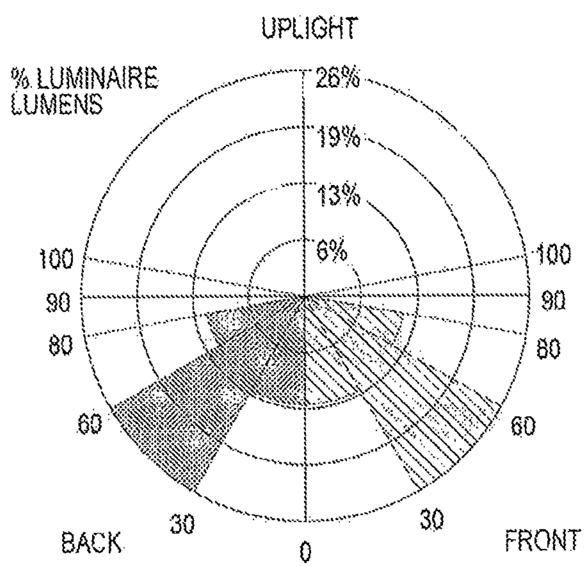

FIG. 159B illustrates luminous flux distribution patterns for a light fixture with a fourth inner lens as in FIG. 145A over the spectrum at CCT 6500K.

Figures 160A, 160B:
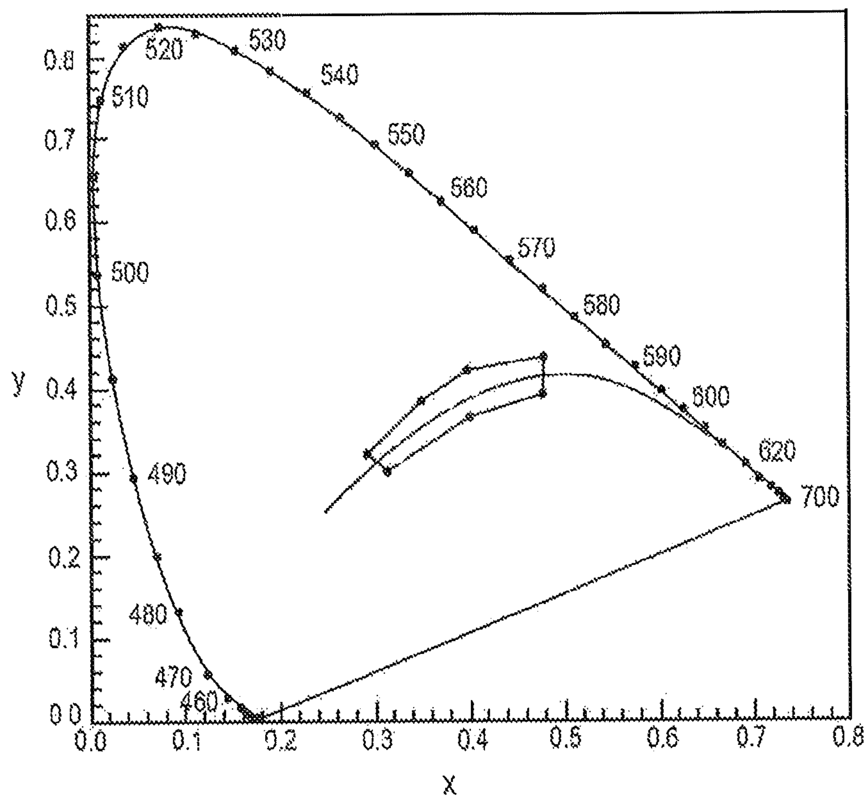

FIG. 160A is a diagram of the color space of a light fixture.

FIG. 160B are the data points for the color space of FIG. 160A.

Figure 161A:
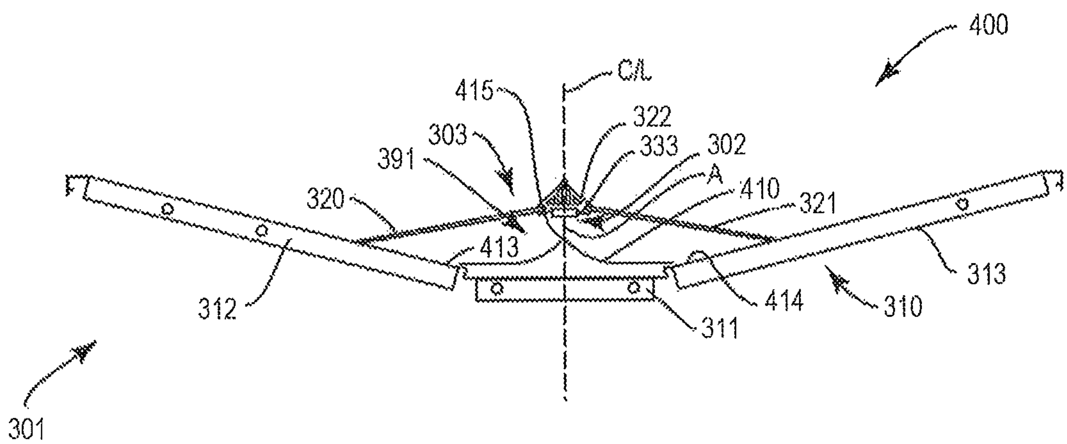

FIG. 161A is a side schematic view of a housing, LED assembly, reflector, and lens assembly of a light fixture.

Figure 161B:
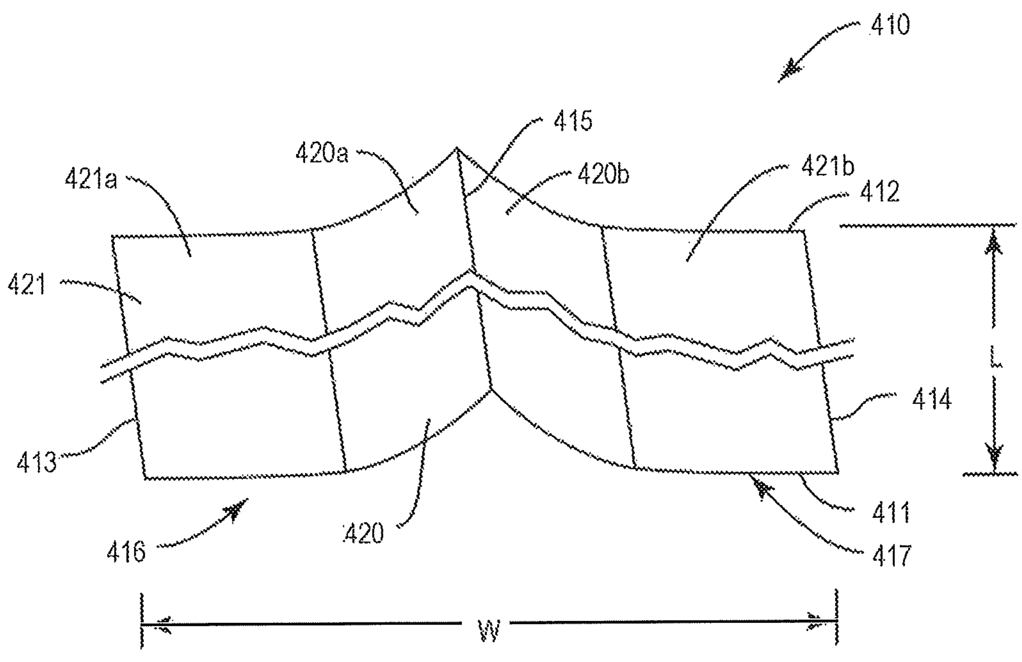

FIG. 161B is a schematic perspective view of a reflector.

Figure 162A:
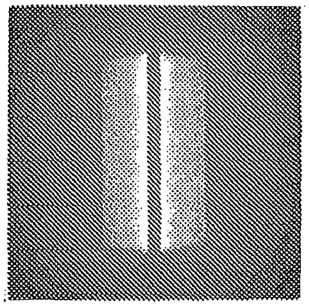

FIG. 162A is a front view along a centerline of a light fixture with a reflector illustrating luminance at the light fixture with a reflector that provides for entirely diffuse reflection.

Figure 162B:
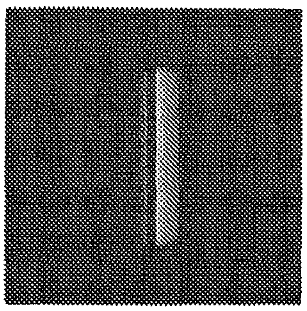

FIG. 162B is the light fixture of FIG. 162A at a 65° viewing angle.

Figure 162D:
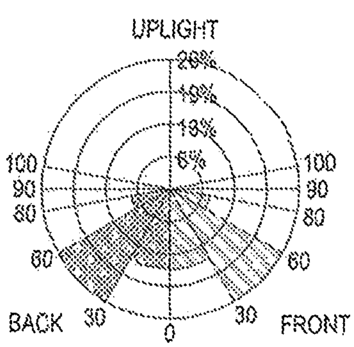
Figure 162C:
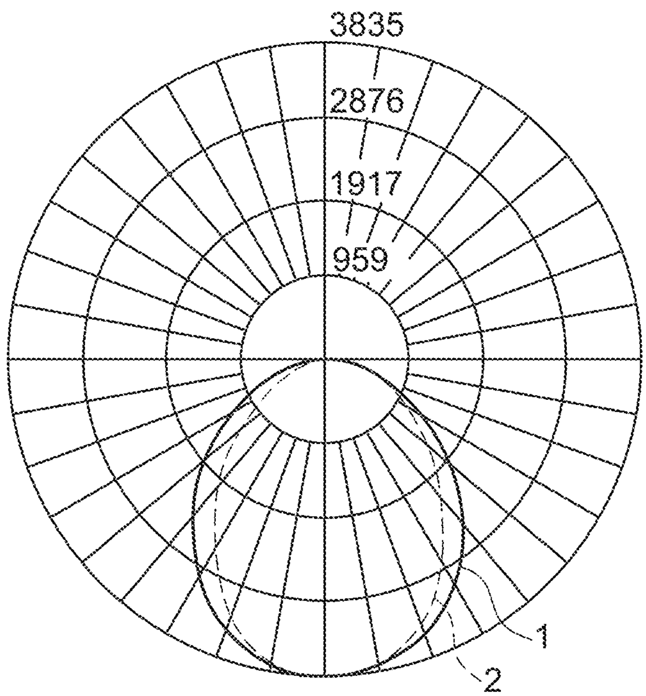

FIG. 162C is an exemplary representation of a simulated candela plot achieved with the light fixture of FIG. 162A with first and second plots with the first plot illustrating the intensity in a plane perpendicular to the longitudinal axis and the second plot in a plane along the longitudinal axis.

FIG. 162D illustrates luminous flux distribution patterns for the light fixture of FIG. 162A.

Figure 163A:
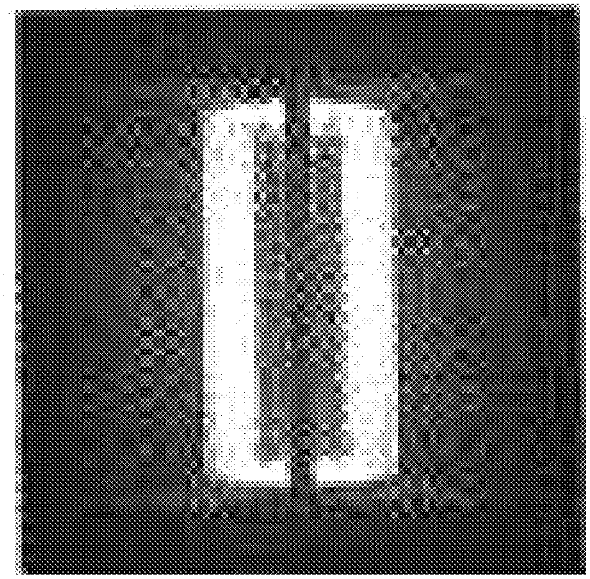

FIG. 163A is a front view along a centerline of a light fixture with a reflector illustrating luminance at the light fixture with a reflector that provides for entirely specular reflection.

Figure 163B:
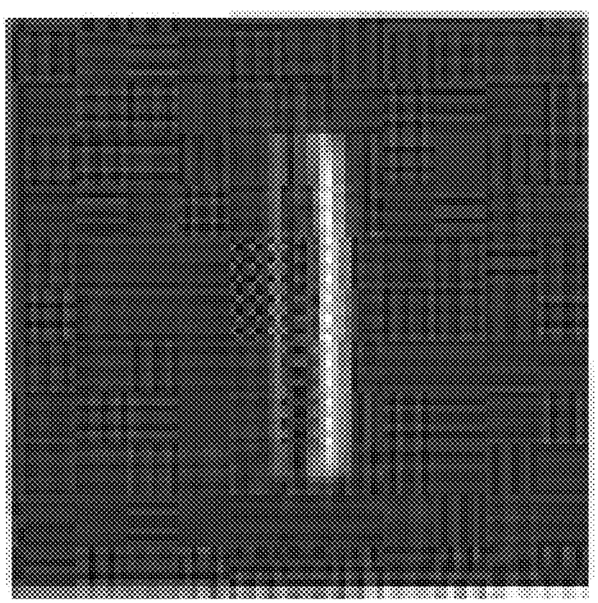

FIG. 163B is the light fixture of FIG. 163A at a 65° viewing angle.

Figure 163C:
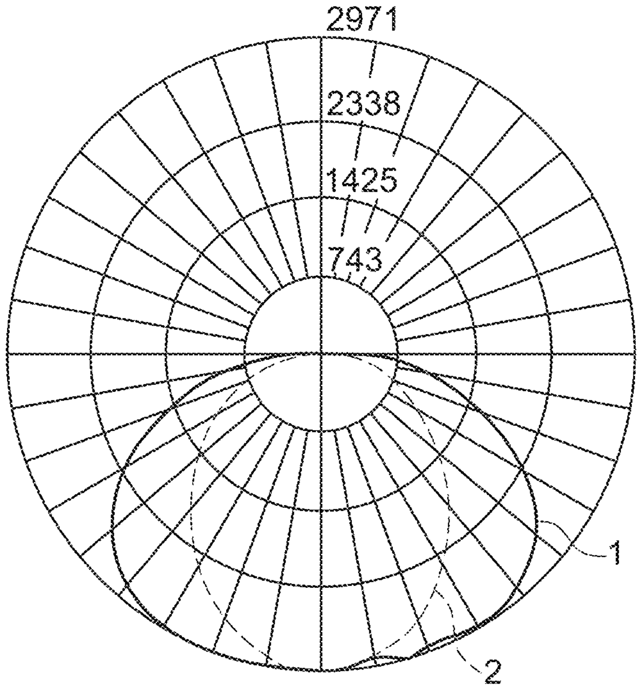

FIG. 163C is an exemplary representation of a simulated candela plot achieved with the light fixture of FIG. 163A with first and second plots with the first plot illustrating the intensity in a plane perpendicular to the longitudinal axis and the second plot in a plane along the longitudinal axis.

Figure 163D:
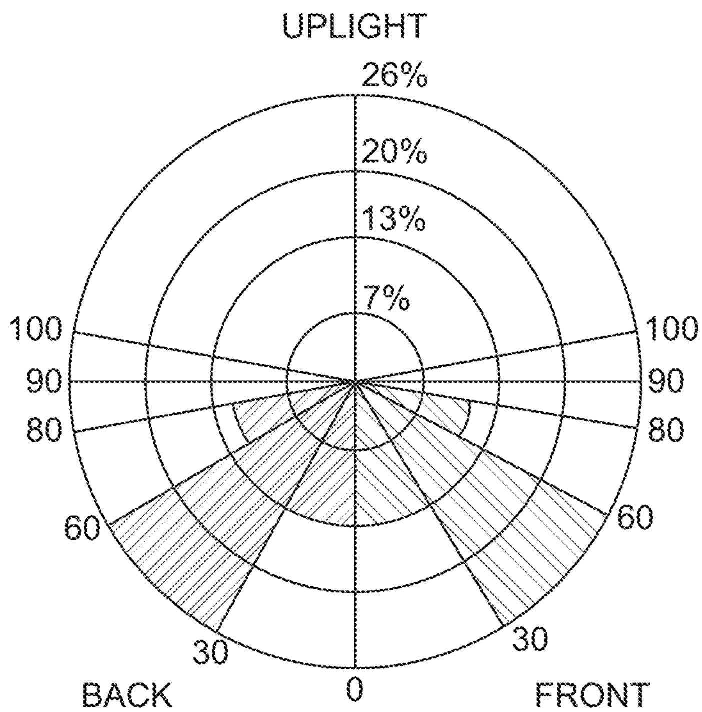

FIG. 163D illustrates luminous flux distribution patterns for the light fixture of FIG. 163A.

Figure 164A:
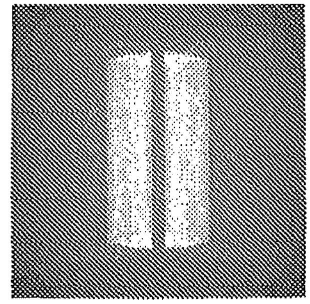

FIG. 164A is a front view along a centerline of a light fixture with a reflector illustrating luminance at the light fixture with a hybrid reflector with both specular and diffuse reflection sections.

Figure 164B:
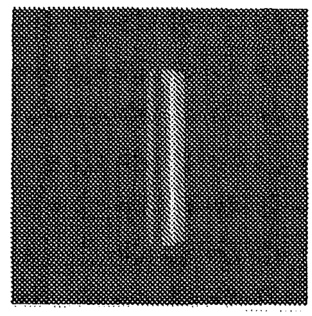

FIG. 164B is the light fixture of FIG. 164A at a 65° viewing angle.

Figure 164D:
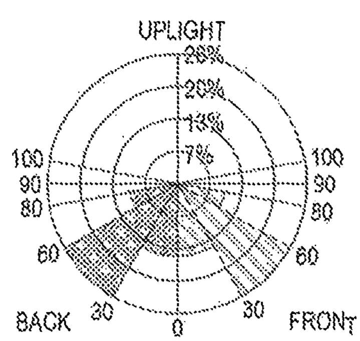
Figure 164C:
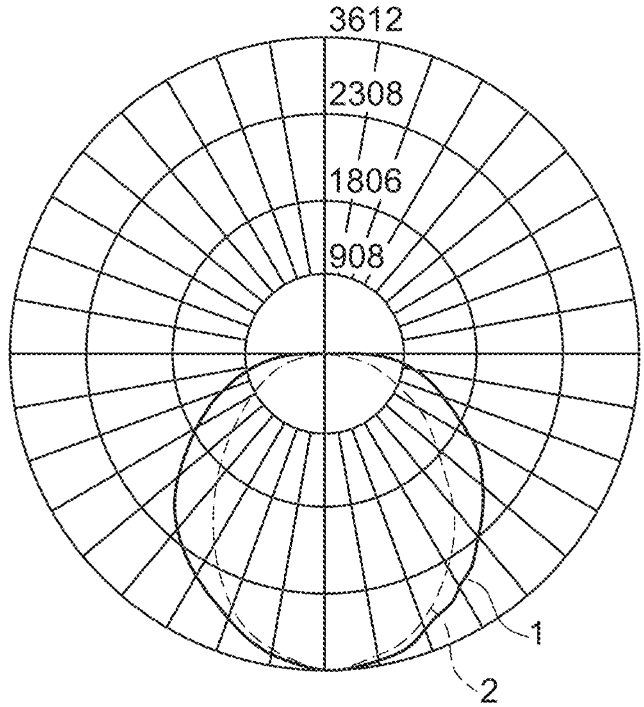
Figure 164D:
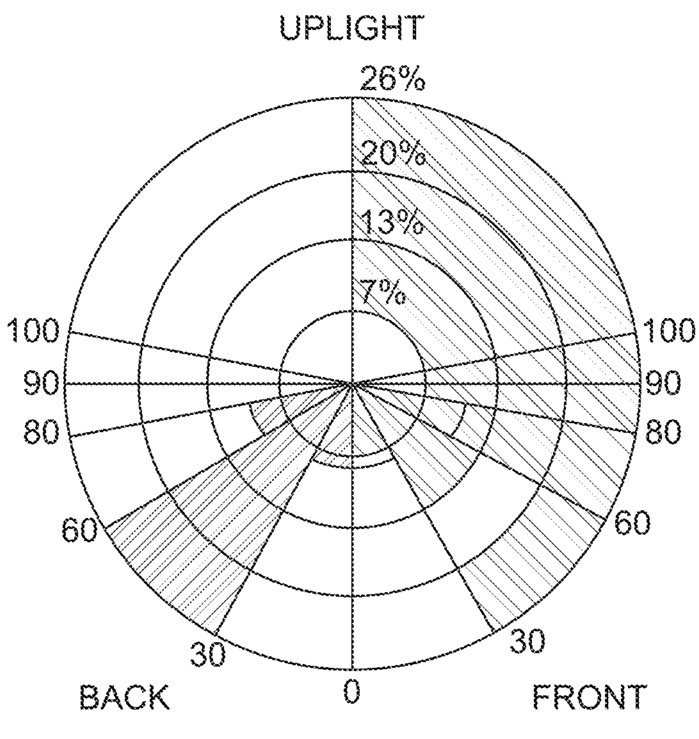

FIG. 164C is an exemplary representation of a simulated candela plot achieved with the light fixture of FIG. 164A with first and second plots with the first plot illustrating the intensity in a plane perpendicular to the longitudinal axis and the second plot in a plane along the longitudinal axis.

FIG. 164D illustrates luminous flux distribution patterns for the light fixture of FIG. 164A.

Figure 165A:
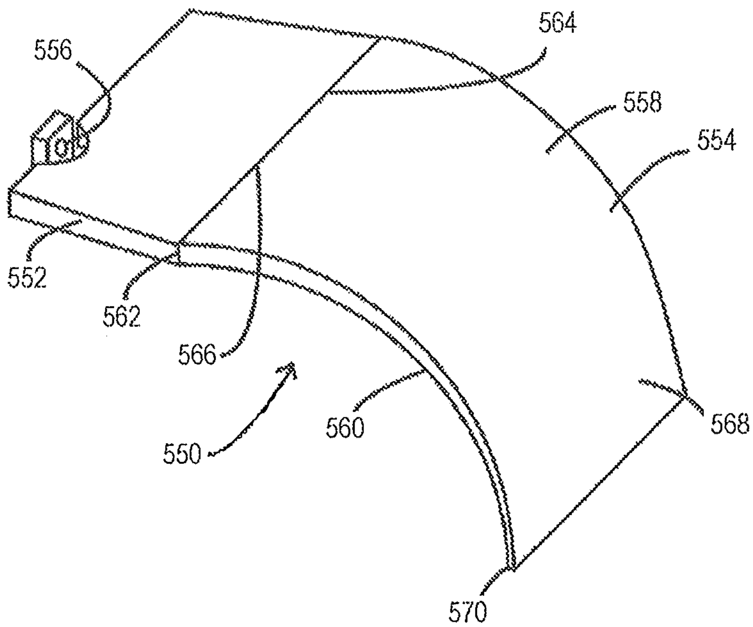

FIG. 165A is an isometric view of a first embodiment of a waveguide.

Figure 165B:
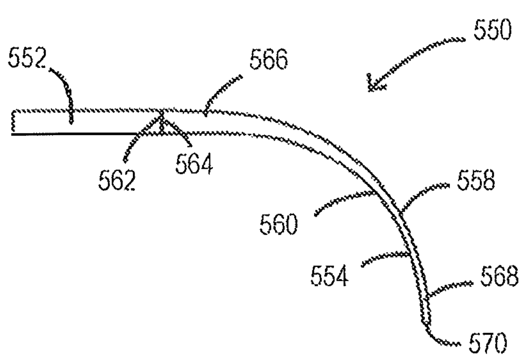

FIG. 165B is a side elevational view of the first embodiment of the waveguide.

Figure 166A:
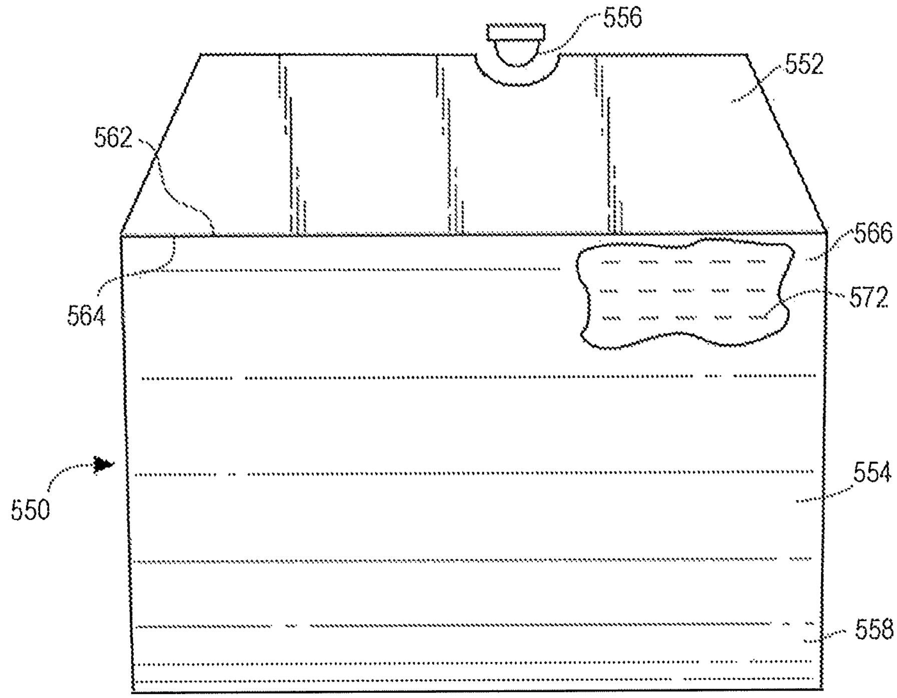

FIG. 166A is a plan view of the waveguide of FIG. 165A.

Figure 166B:
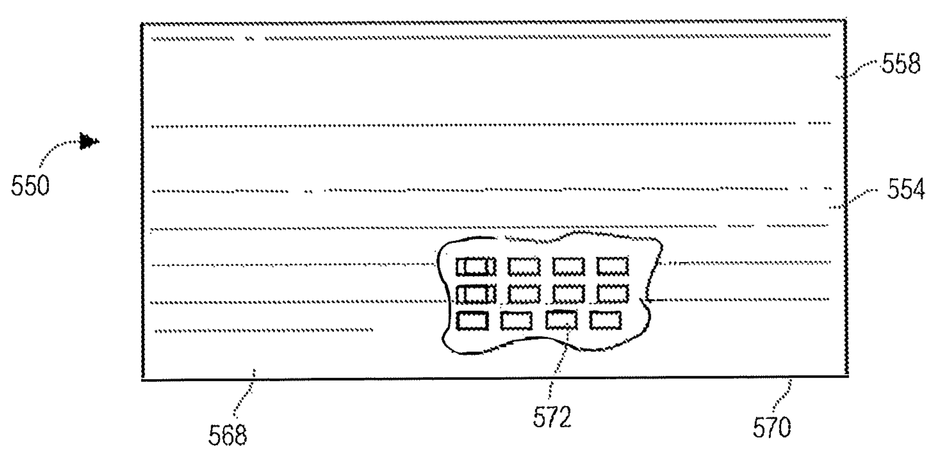

FIG. 166B is a front elevational view of the waveguide of FIG. 165A.

Figure 167A:
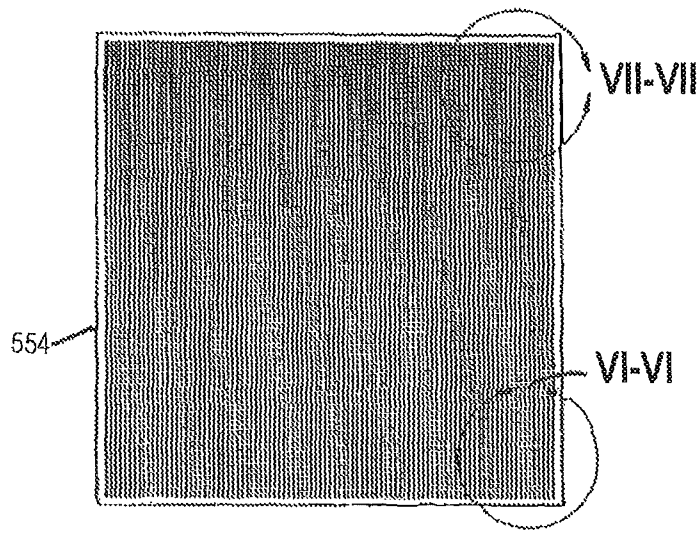

FIG. 167A is a front elevational view of the waveguide body of FIG. 165A shown flattened to illustrate the extraction features.

Figure 167C:
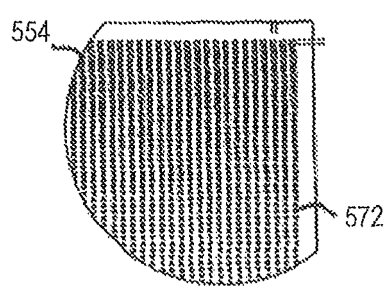
Figure 167B:
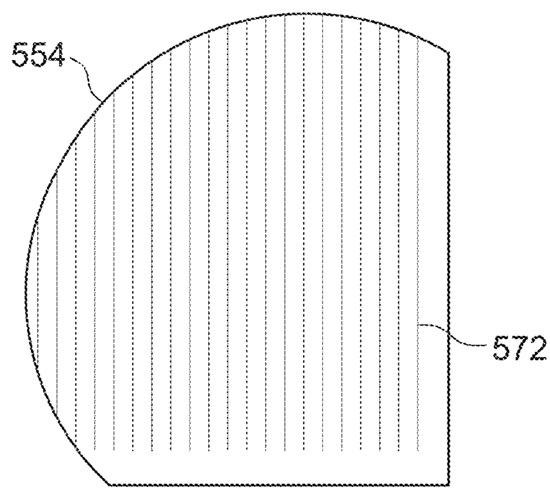

FIG. 167B is an enlarged fragmentary view of an area VI-VI of FIG. 167A.

FIG. 167C is an enlarged fragmentary view of an area VII-VII of FIG. 167A.

Figure 168A:
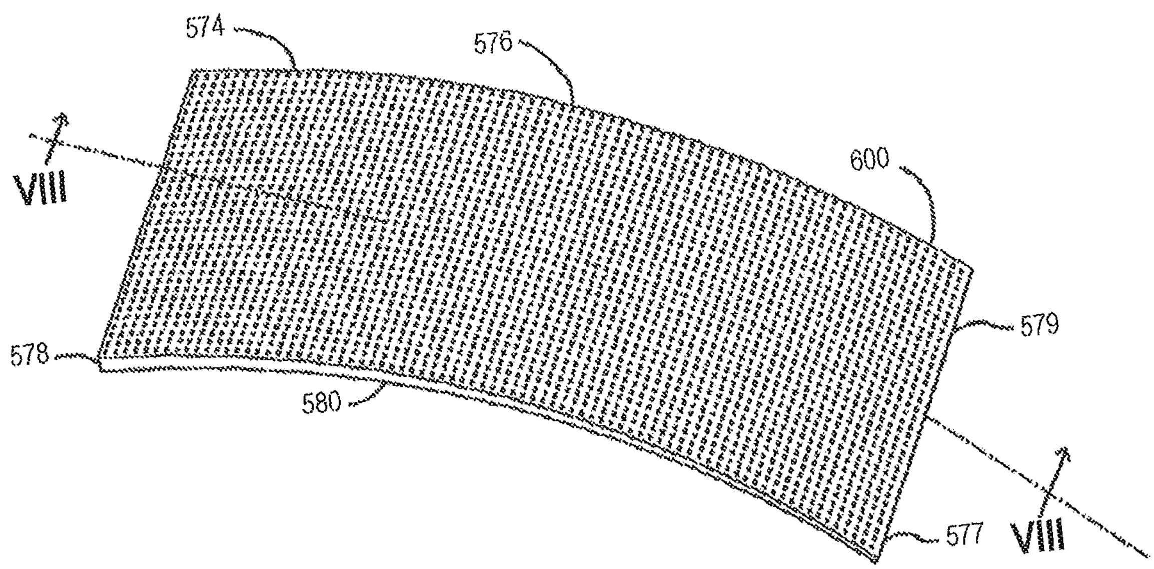

FIG. 168A is a side isometric view of a second embodiment of a waveguide body having a regular array of extraction features.

Figure 168B:
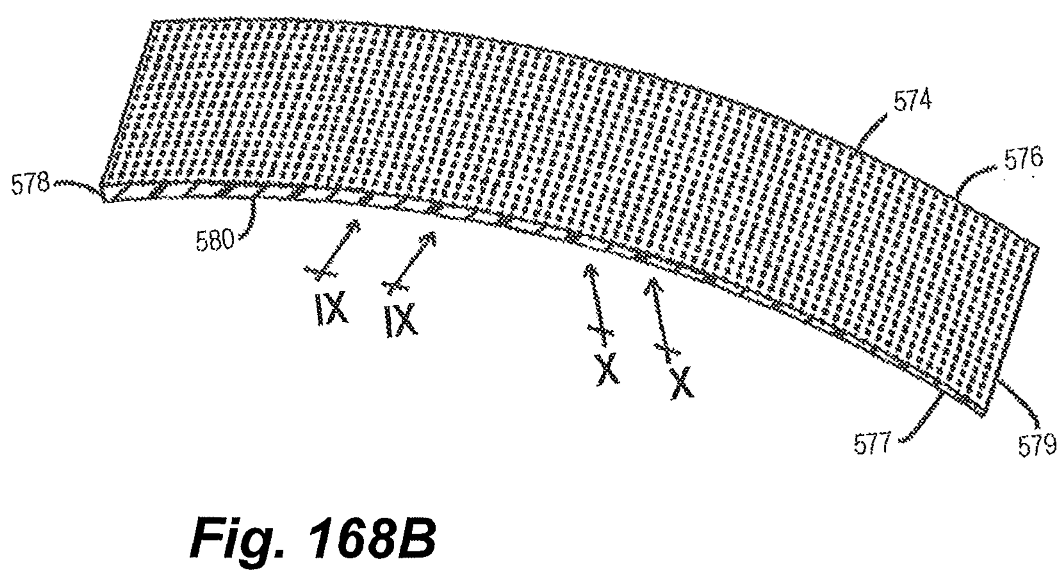

FIG. 168B is a sectional view taken generally along the lines VIII-VIII of FIG. 168A.

Figure 169A:
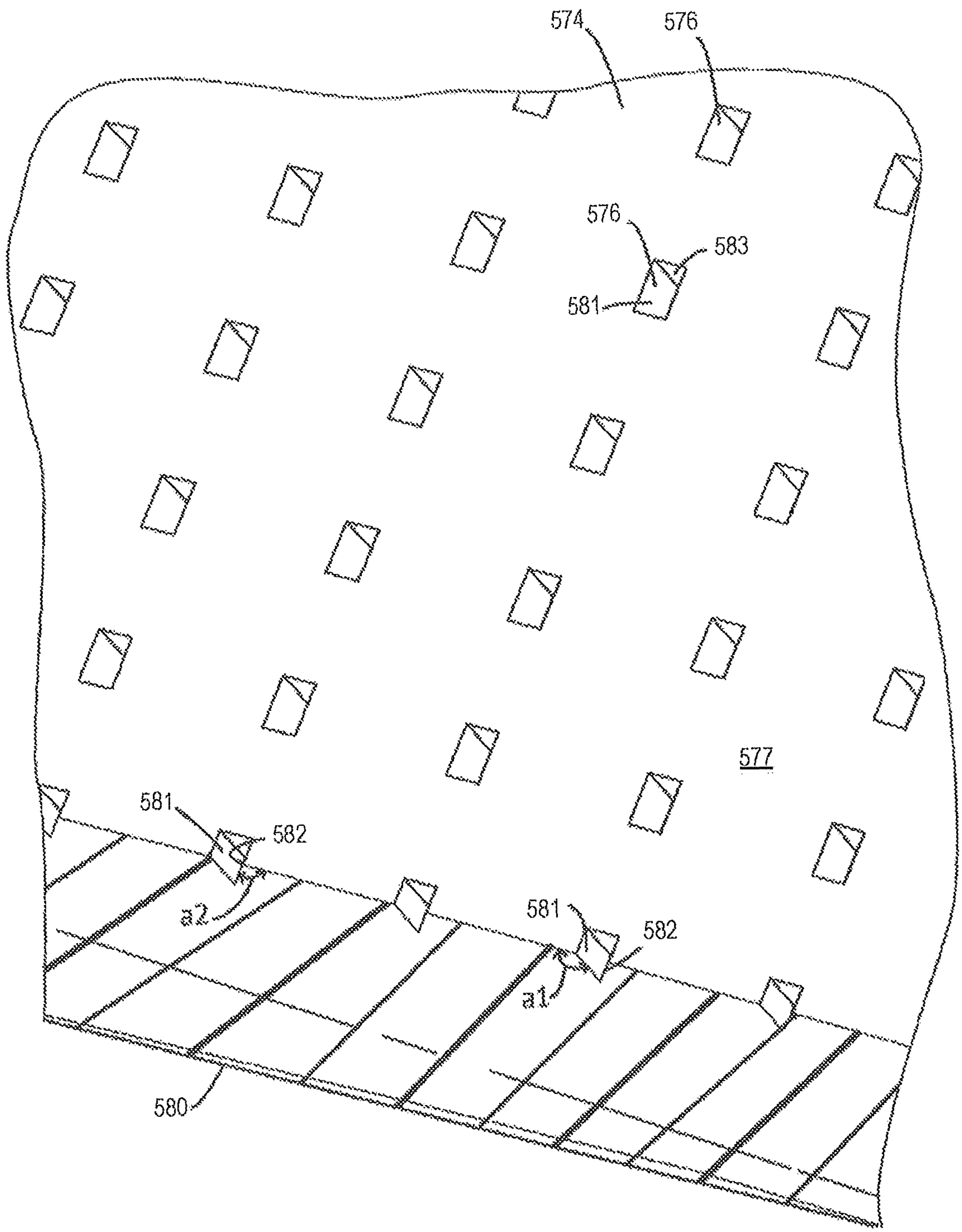

FIG. 169A is an enlarged, sectional, fragmentary, and isometric view taken along the lines of IX-IX in FIG. 168B.

Figure 169B:
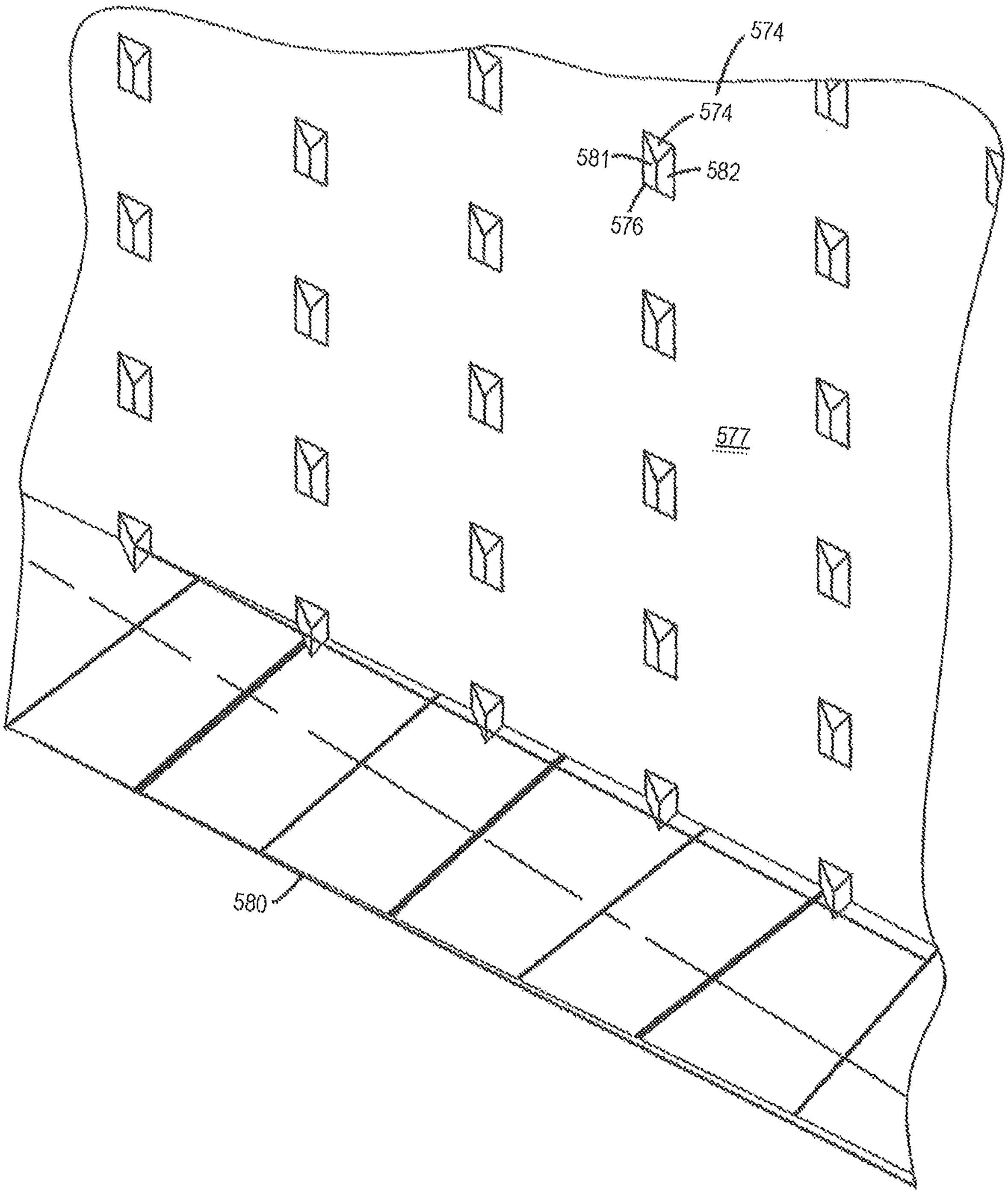

FIG. 169B is an enlarged, sectional, fragmentary, and isometric view taken generally along the lines of X-X of FIG. 168B.

Figure 169C:
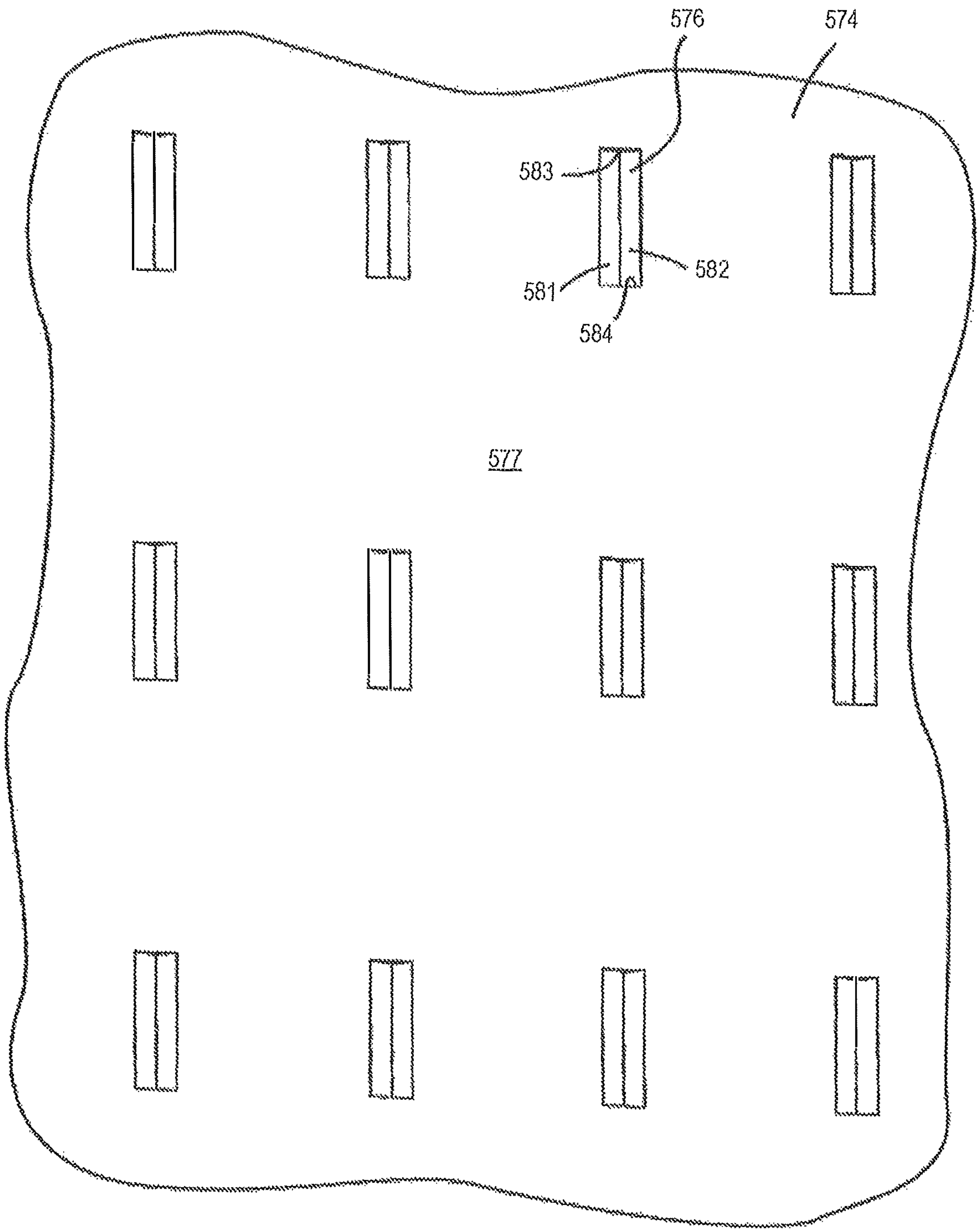

FIG. 169C is an enlarged, fragmentary plan view of several of the extraction features of FIG. 168B.

Figure 170B:
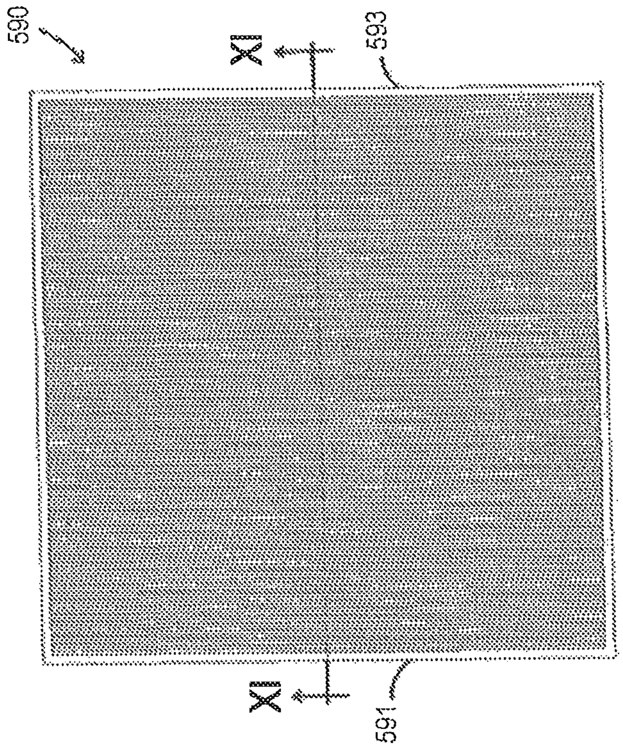
Figure 170A:
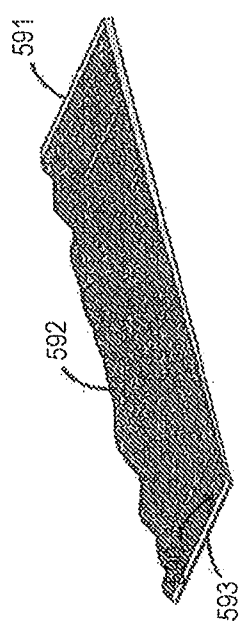

FIG. 170A is an isometric fragmentary view of a third embodiment of a waveguide body having a stepped profile.

FIG. 170B is a plan view of the waveguide body of FIG. 170A.

Figure 170C:
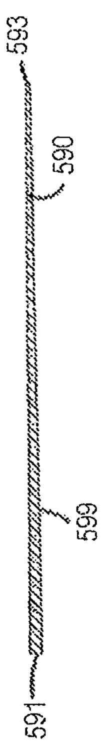

FIG. 170C is a sectional view taken generally along the lines XI-XI of FIG. 170B.

Figure 171A:
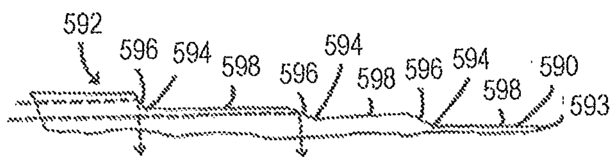

FIG. 171A is a fragmentary, enlarged sectional view illustrating the waveguide body of FIG. 170A-170C in greater detail.

Figure 171B:
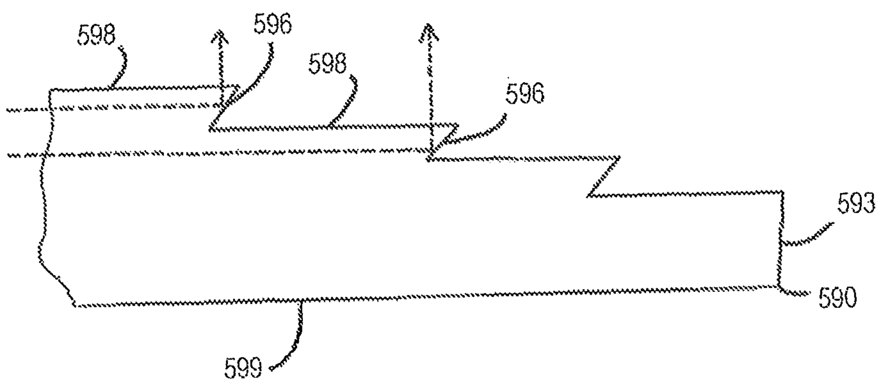

FIG. 171B is a view similar to FIG. 171A illustrating an alternative waveguide body.

Figure 172A:
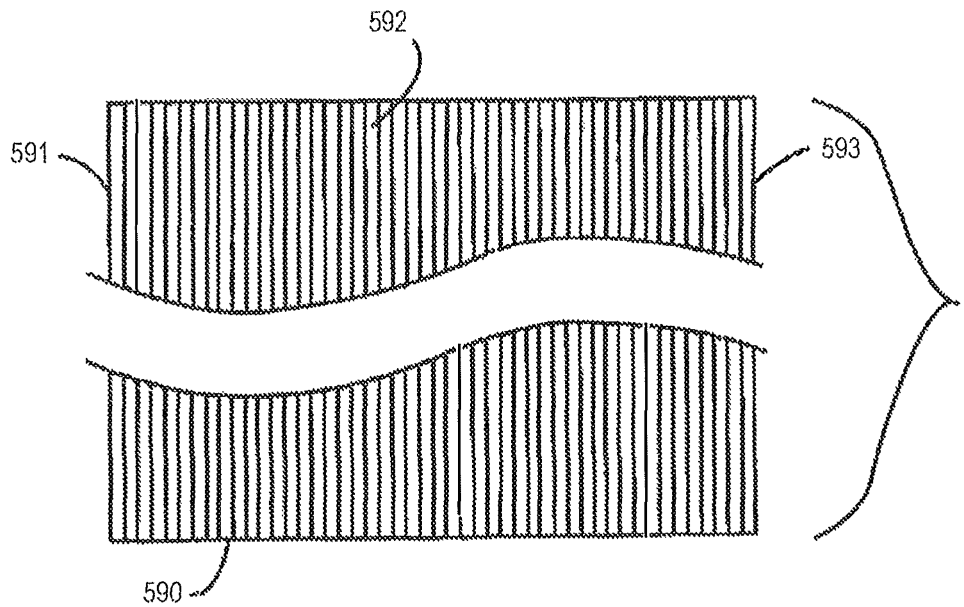
Figure 172B:
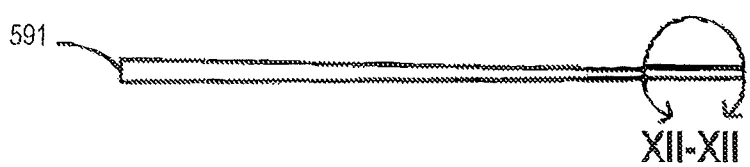

FIGS. 172A and 172B are plan and side views, respectively, of another waveguide body.

Figure 172C:
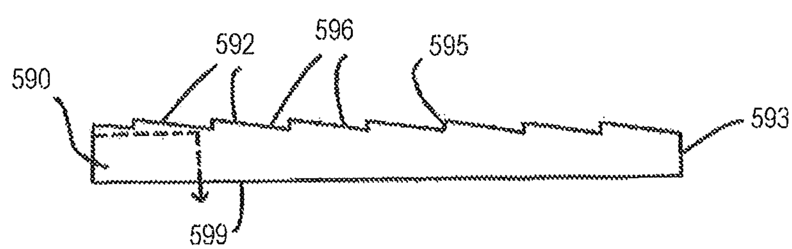

FIG. 172C is an enlarged fragmentary view of a portion of the waveguide body of FIG. 172B illustrated by the line XII-XII.

Figure 173A:
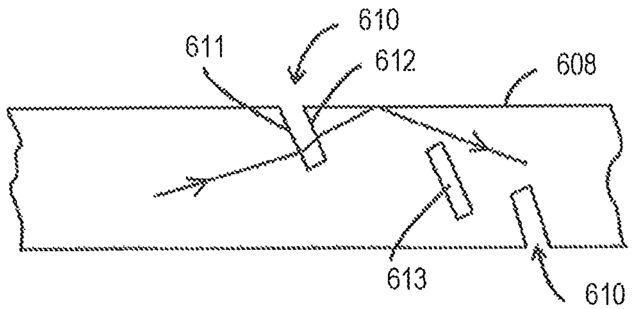

FIG. 173A is a cross sectional view of a waveguide body having slotted extraction features.

Figure 173B:
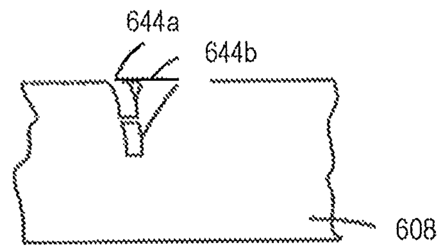

FIG. 173B is a view similar to FIG. 173A showing a segmented slotted extraction feature.

FIGS. 174A-174D are cross sectional views of uncoated, coated, and covered extraction features, respectively.

Figure 175B:
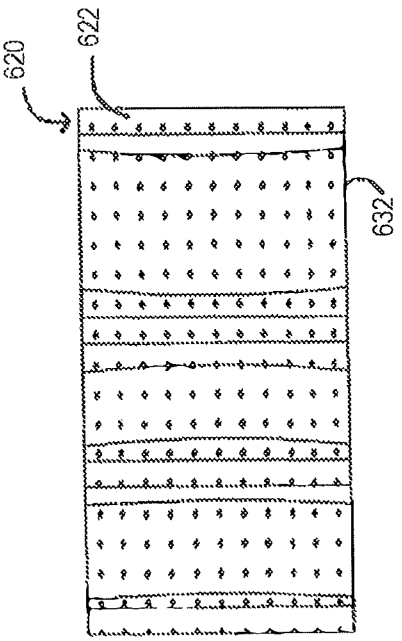
Figure 175C:
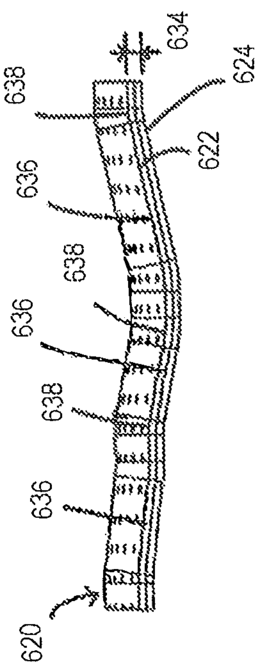
Figure 175A:
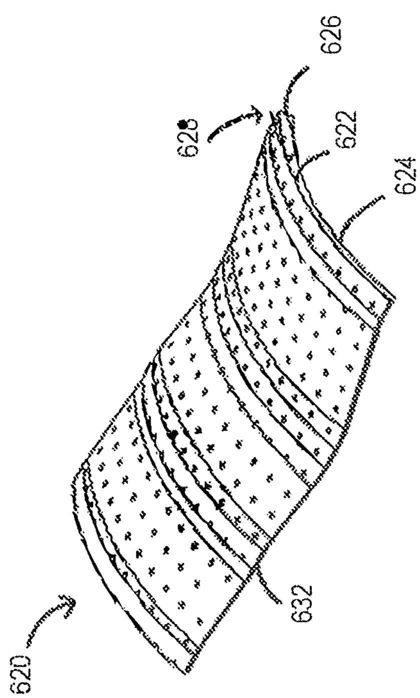

FIG. 175A is an isometric view of a further embodiment of a waveguide body.

FIG. 175B is plan view of the waveguide body of FIG. 175A.

FIG. 175C is a side elevational view of the waveguide body of FIG. 175A.

Figure 176A:
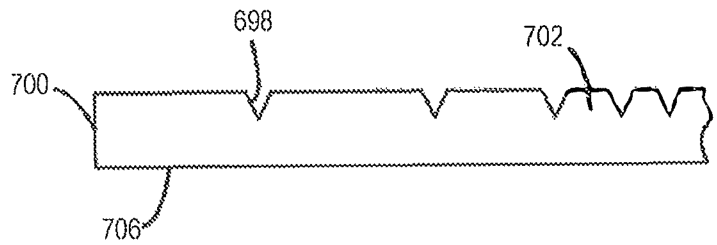

FIG. 176A is a side elevational view of another waveguide body.

Figure 176B:
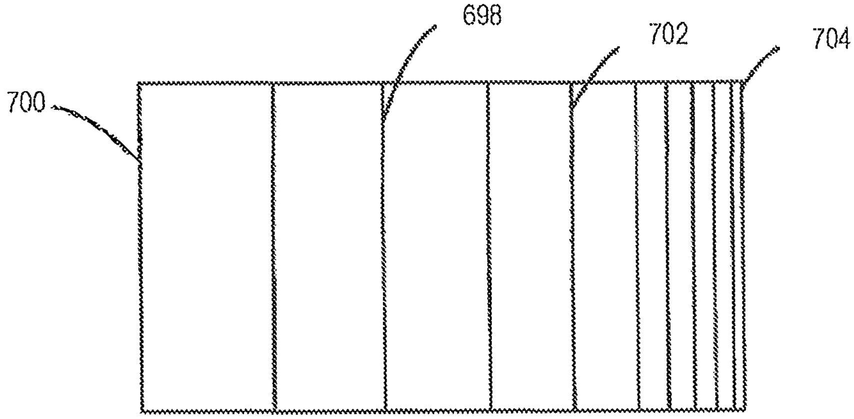

FIG. 176B is a plan view of the waveguide body of FIG. 176A.

Figure 177:
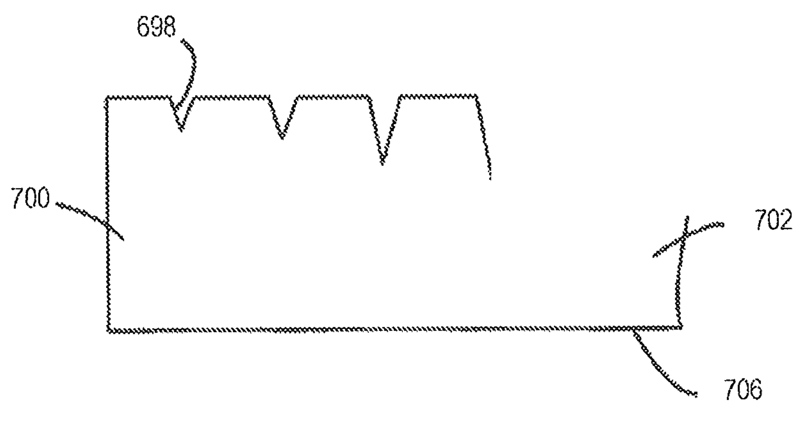
Figure 178A:
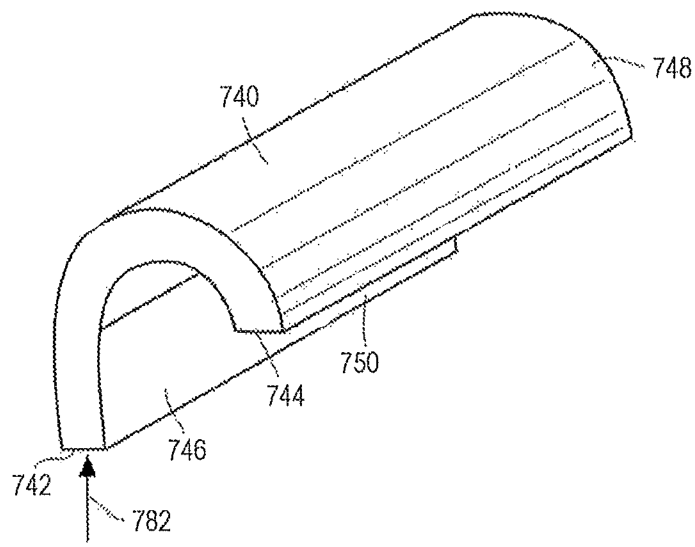
Figure 178B:
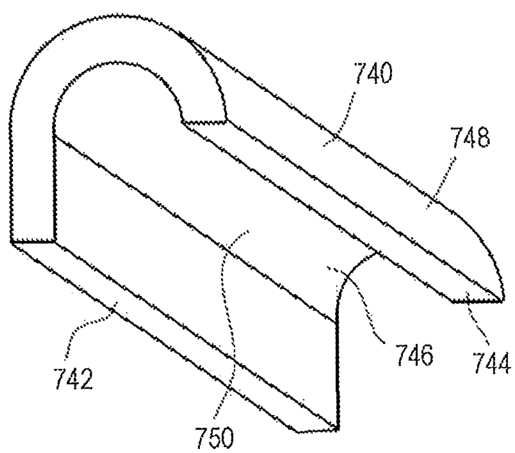
Figure 178C:
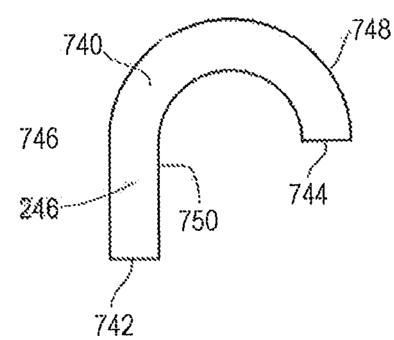
Figure 178D:
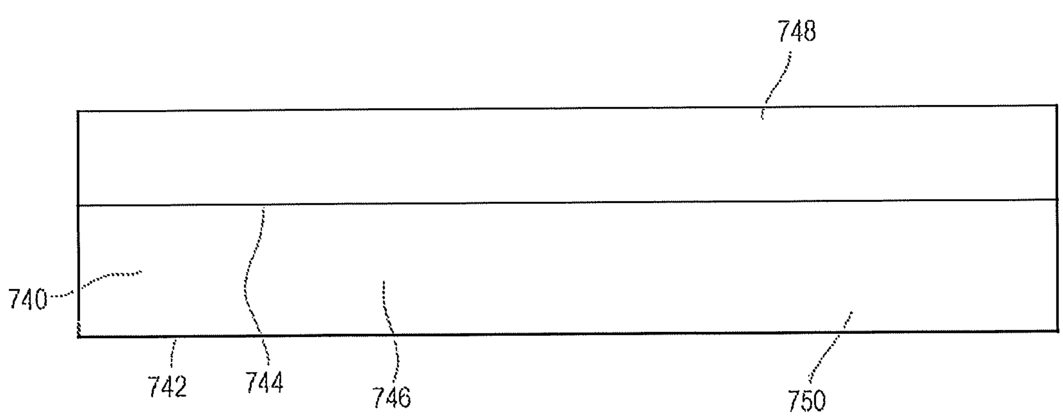

FIG. 177 is a side elevational view of yet another waveguide body.

FIGS. 178A-178D are upper isometric, lower isometric, side elevational, and rear elevational views, respectively, of a still further waveguide body.

Figure 179A:
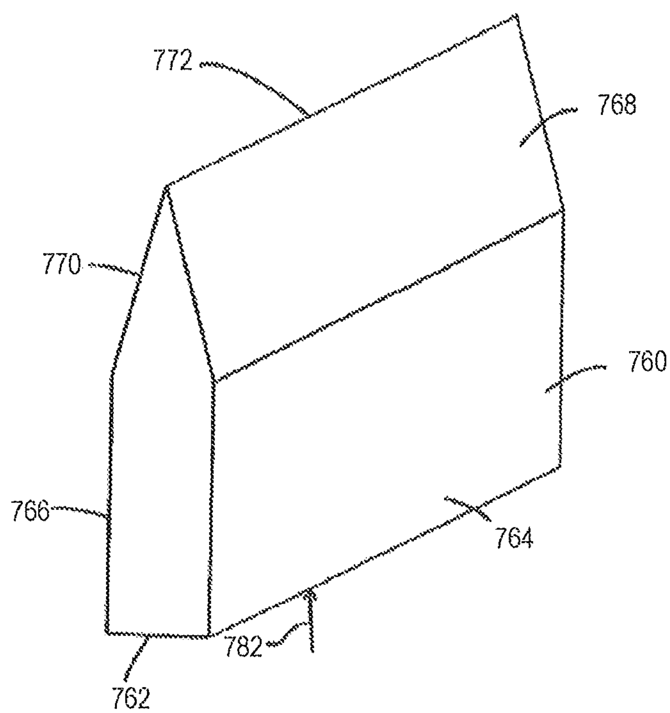
Figure 179B:
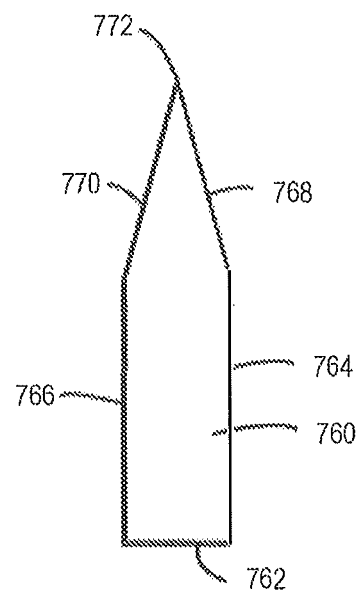
Figure 179C:
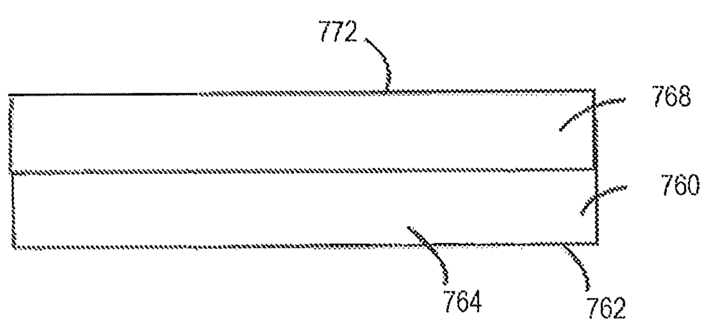

FIGS. 179A-179C are isometric, side elevational, and front elevational views of another waveguide body.

FIGS. 180-192, 193A, 194A, and 195 are isometric views of still further waveguides.

Figure 193A:
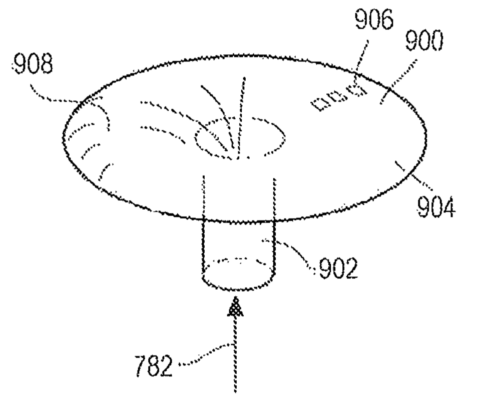
Figure 193B:
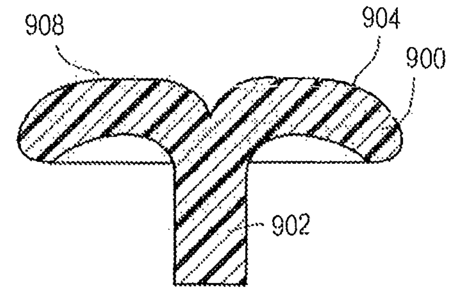

FIG. 193B is a sectional view of the waveguide body of FIG. 193A.

Figure 194A:
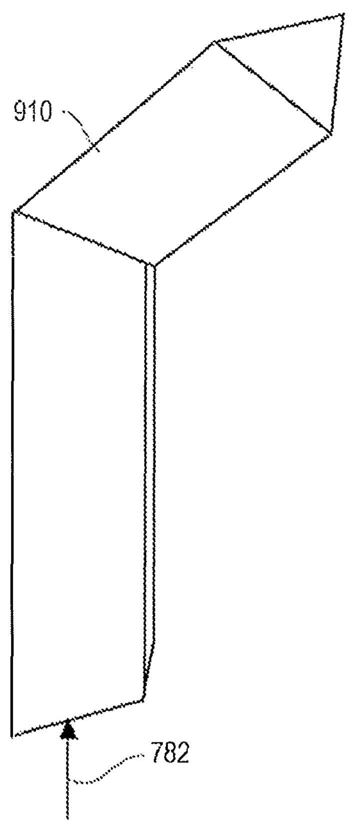
Figure 194B:
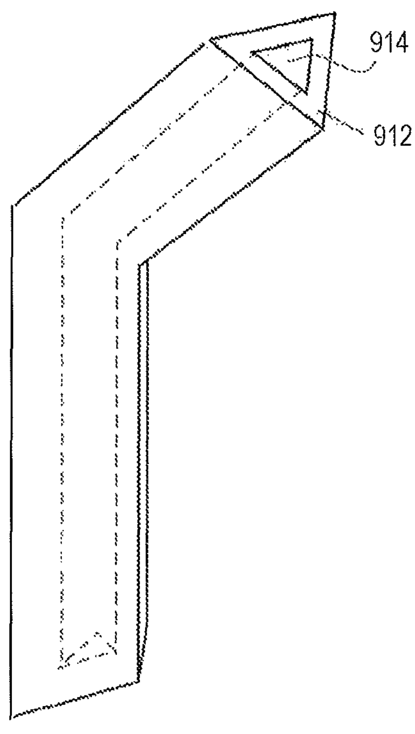

FIG. 194B is an isometric view of a hollow waveguide body.

Figure 196A:
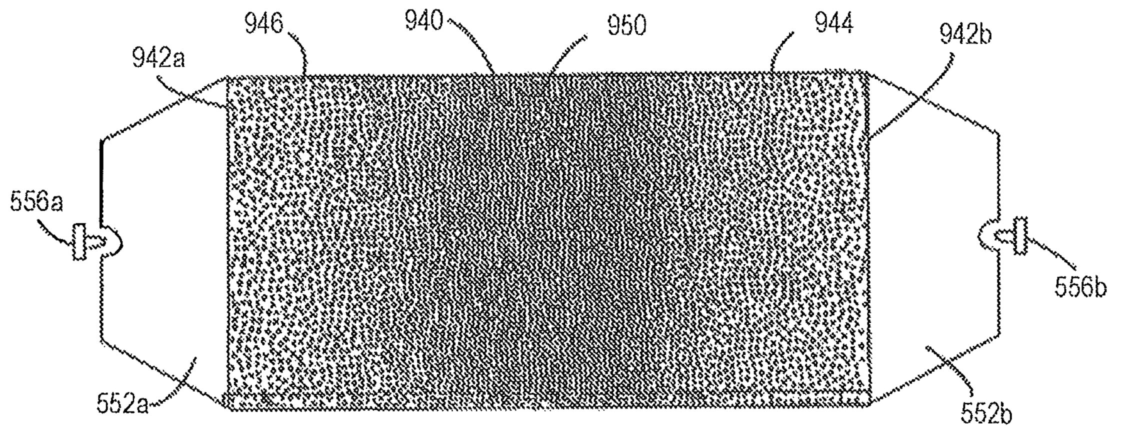
Figure 196B:
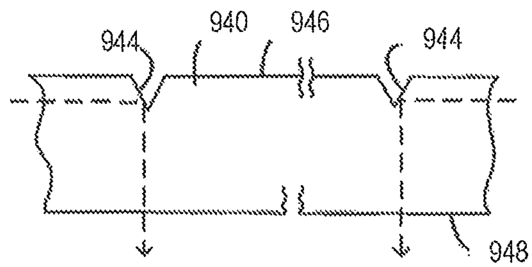

FIGS. 196A and 196B are plan and fragmentary sectional views of yet another waveguide body.

Figure 197:
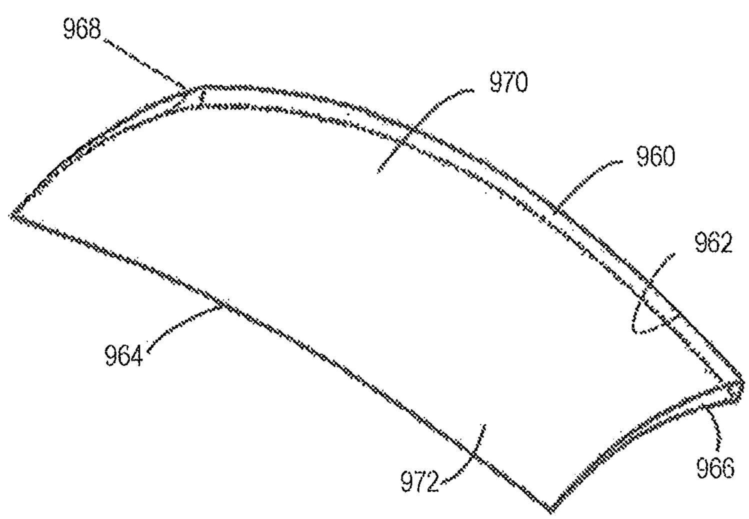

FIG. 197 is an isometric view of another waveguide body that is curved in two dimensions.

Figure 198A:
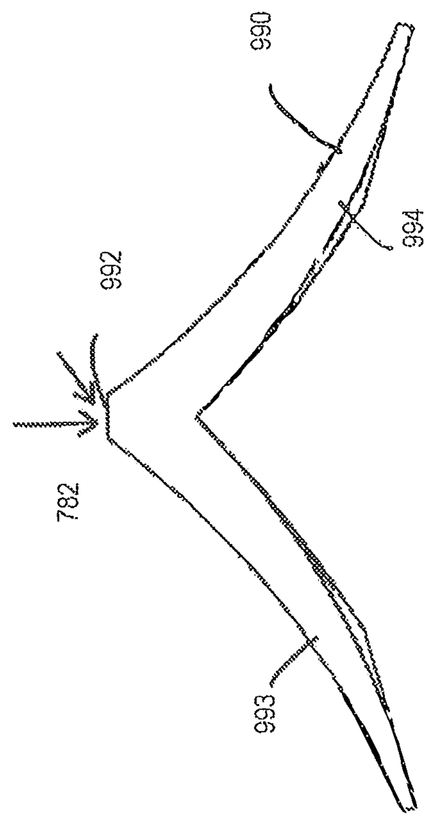
Figure 198B:
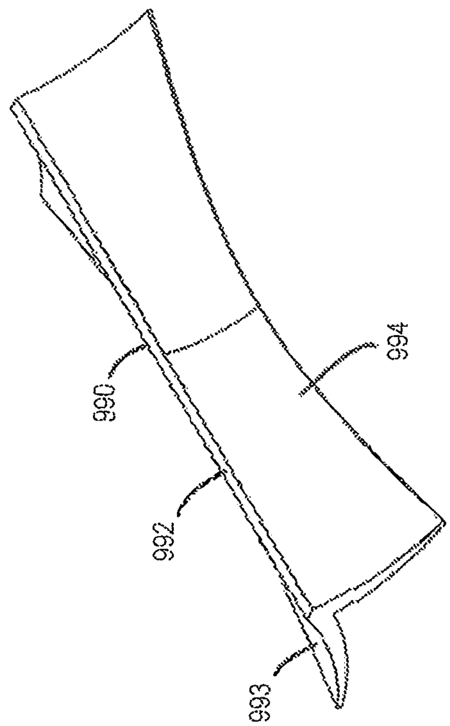
Figure 198C:
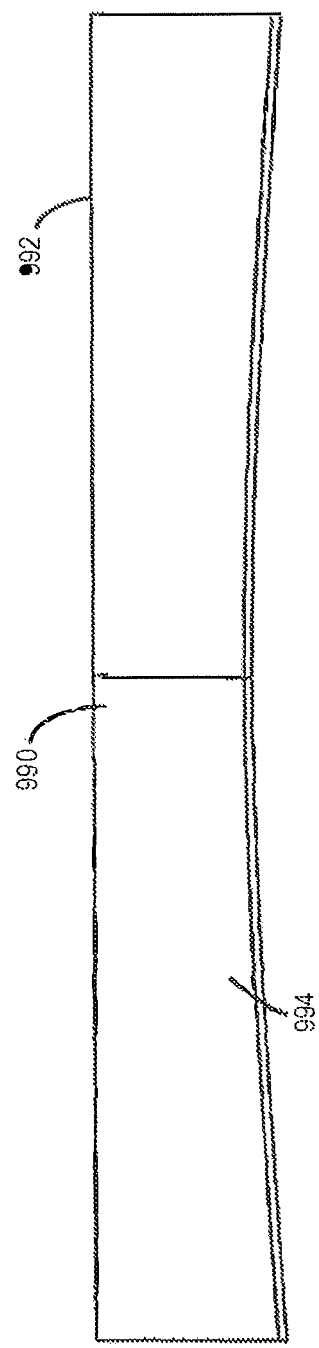

FIGS. 198A-198C are front, side, and bottom elevational views of another waveguide body.

Figure 199A:
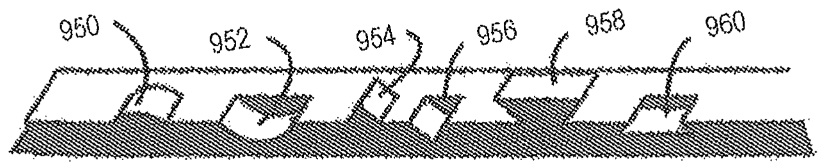

FIG. 199A is an isometric view of alternative extraction features.

Figure 199B:
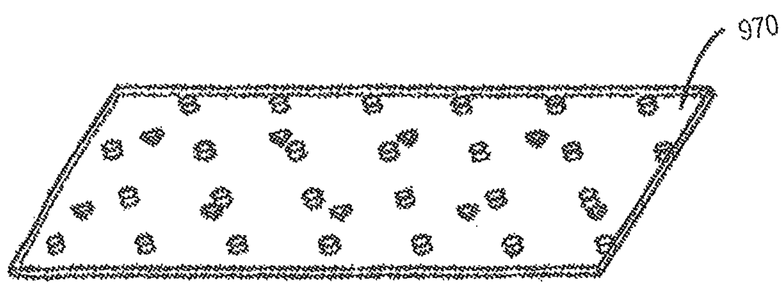

FIG. 199B is an isometric view of a waveguide body utilizing at least some of the extraction features of FIG. 199A.

Figure 200A:
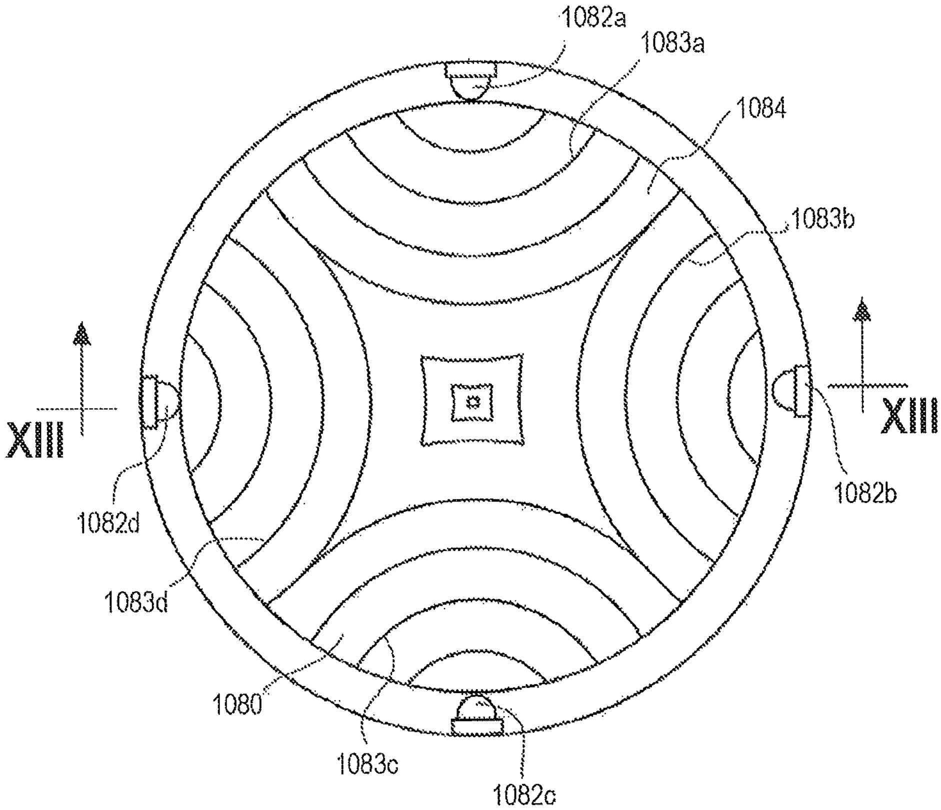

FIG. 200A is a diagrammatic plan view of another waveguide body.

Figure 200B:
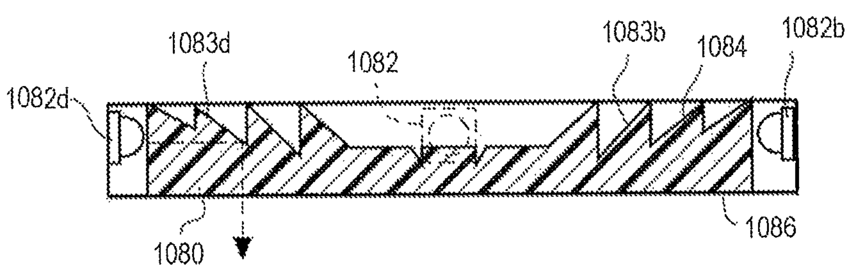

FIG. 200B is a sectional view taken generally along the lines XIII-XIII of FIG. 200A.

Figure 201A:
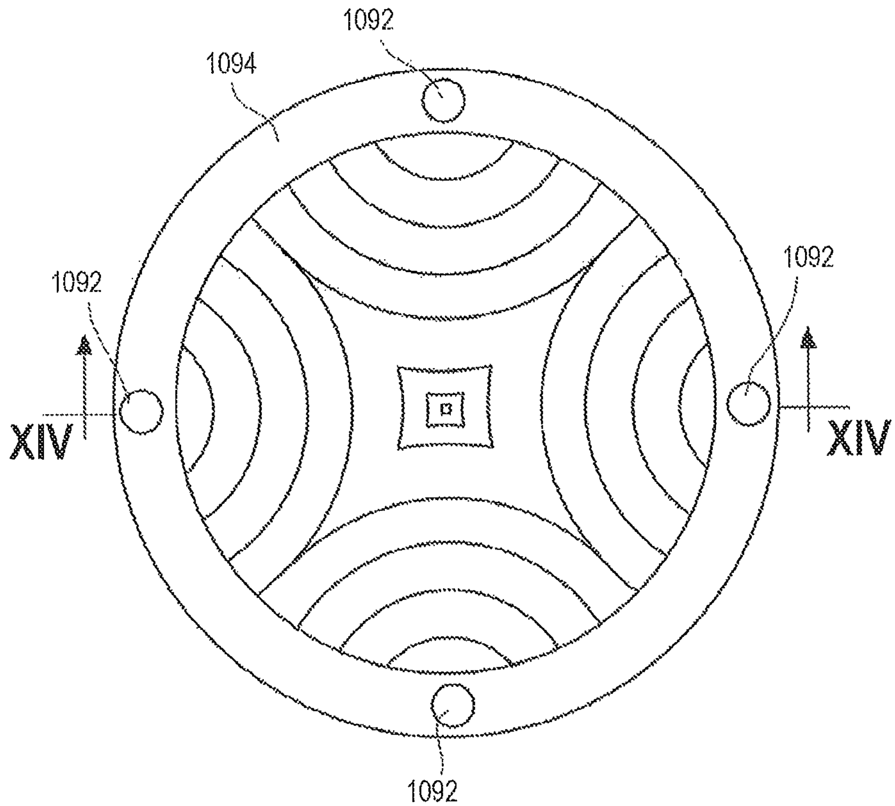

FIG. 201A is a diagrammatic plan view of a still further waveguide body.

Figure 201B:
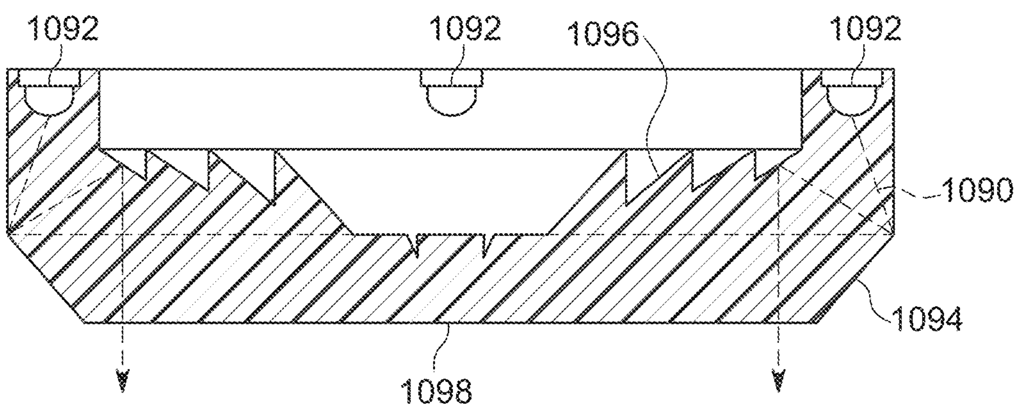

FIG. 201B is a sectional view taken generally along the lines XIV-XIV of FIG. 201A.

Figure 202A:
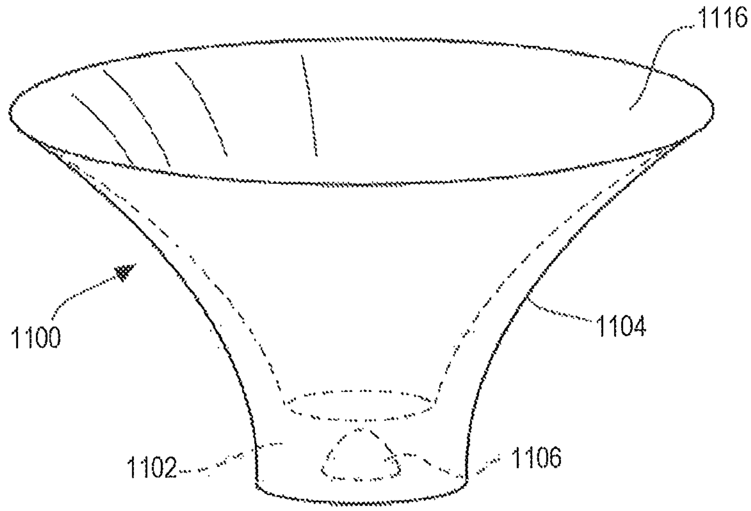

FIG. 202A is an isometric view of yet another waveguide body.

Figure 202B:
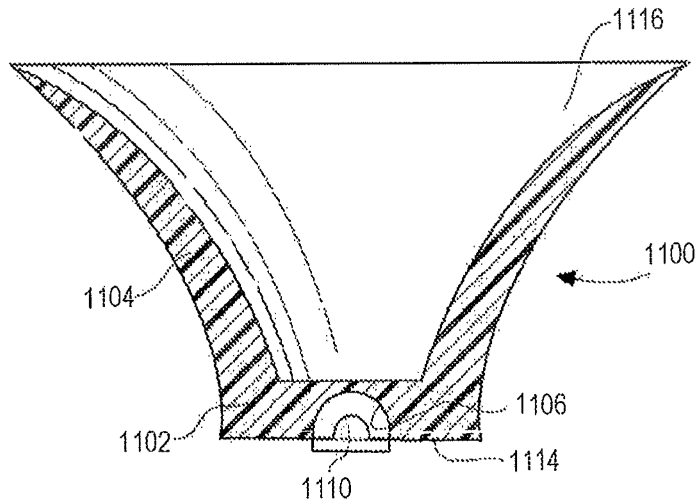

FIG. 202B is a cross sectional view of the waveguide body of FIG. 202A.

Figure 202C:
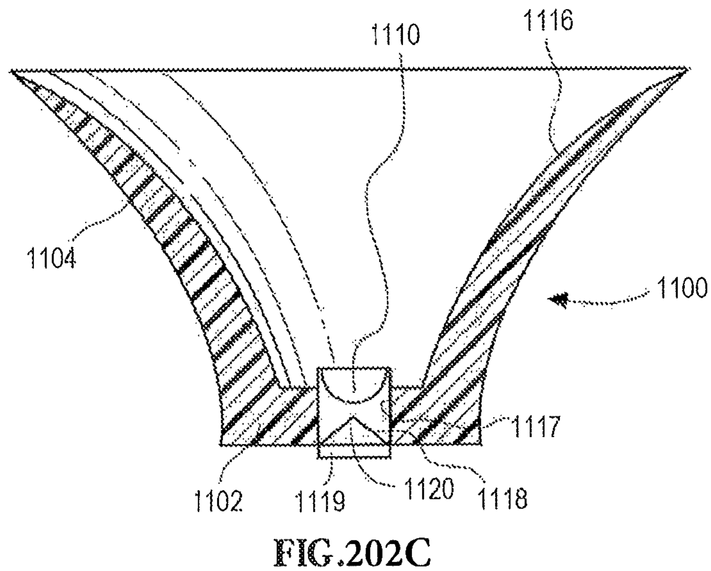

FIG. 202C is a cross sectional view of a still further waveguide body.

Figure 203A:
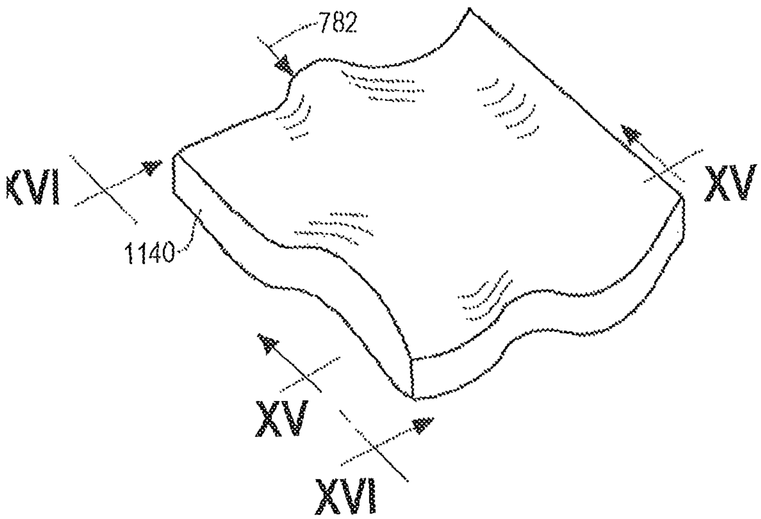

FIG. 203A is an isometric view of yet another waveguide body having inflection points along the path of light therethrough.

Figure 203B:

FIG. 203B is a cross sectional view taken generally along the lines XV-XV of FIG. 203A.

Figure 203C:
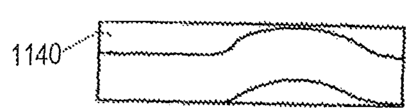

FIG. 203C is a side elevational view taken generally along the view lines XVI-XVI of FIG. 203A.

Figure 204A:
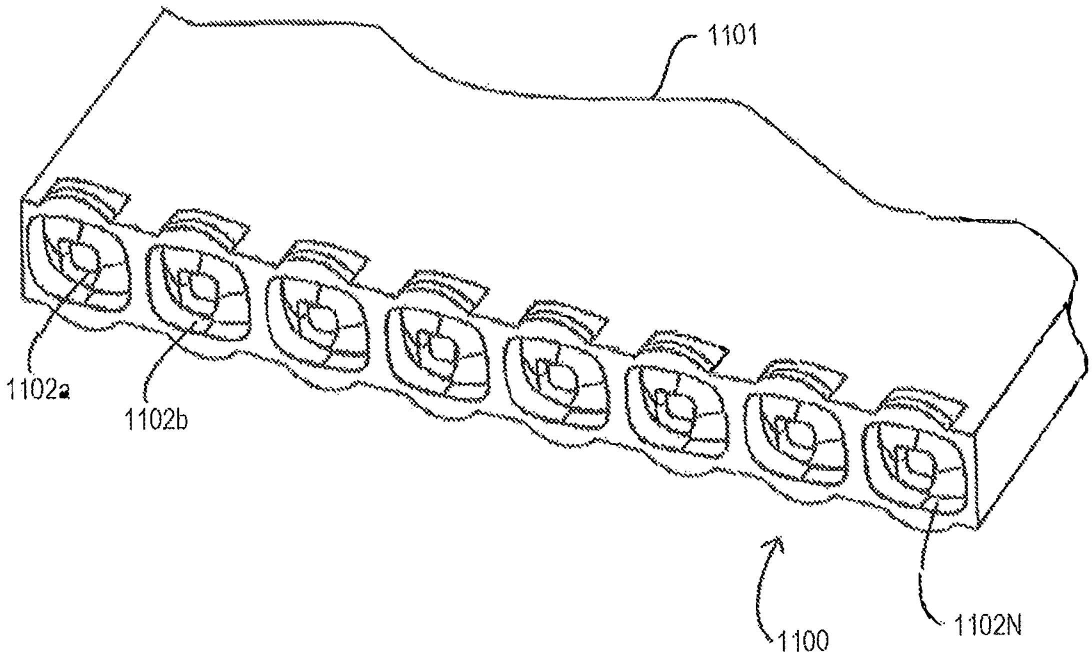

FIG. 204A is a fragmentary isometric view of a coupling optic.

Figure 204B:
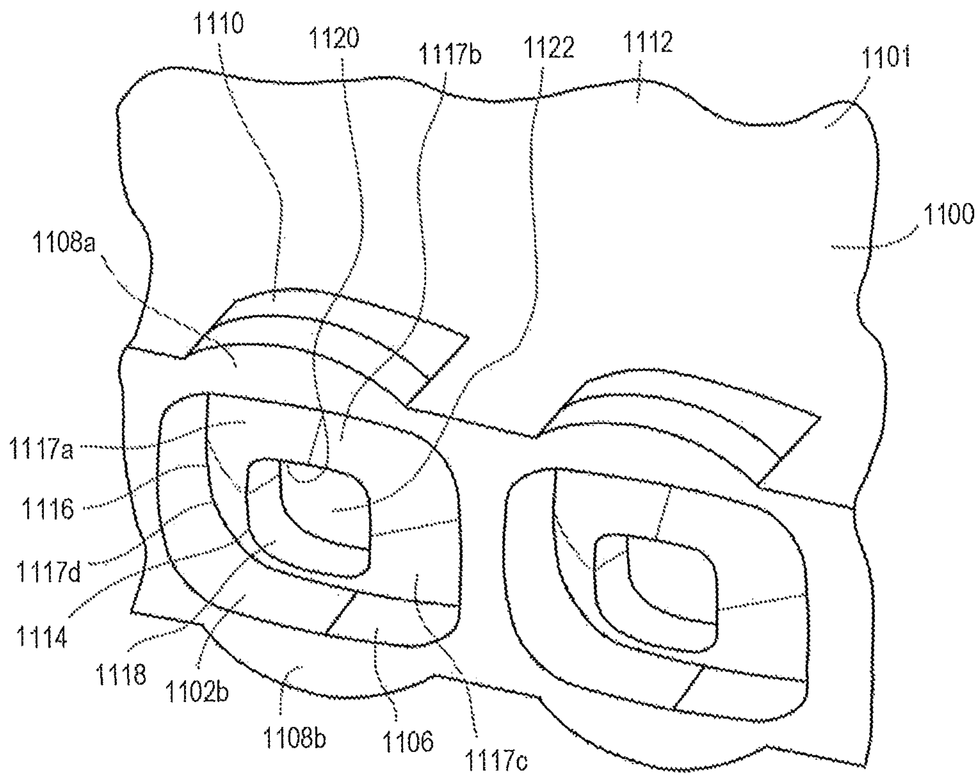

FIG. 204B is a fragmentary enlarged isometric view of the coupling optic of FIG. 166.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures/FIGS. It will be understood that these terms and those discussed above are intended to encompass different orientations of the device in addition to the orientation depicted in the FIGS.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring to FIGS. 1-5, an embodiment of a lighting device in the form of a luminaire 100 that utilizes an optical waveguide is illustrated. FIGS. 1-5 illustrate an embodiment of the luminaire 100. The embodiments disclosed herein are particularly adapted for use in general lighting applications, for example, as an outdoor roadway (including a driveway) or parking lot luminaire, or as any other indoor or outdoor luminaire. Embodiments of the luminaire 100 may comprise any one of a number of different embodiments of waveguide bodies 102. Accordingly, the housing and generally mechanical components of the luminaire 100 are described in detail once herein, while the waveguide body embodiments 102 are separately described. Further, post top luminaire embodiments 300, 300*a*, 300*b* are described hereinbelow, each embodiment thereof also utilizing any of the embodiments of the waveguide bodies 102. Embodiments of the waveguide bodies 102 described herein may be interchangeably swapped one for another within the luminaire 100 and/or the post top luminaire(s) 300, 300*a*, 300*b*.

Figure 3:
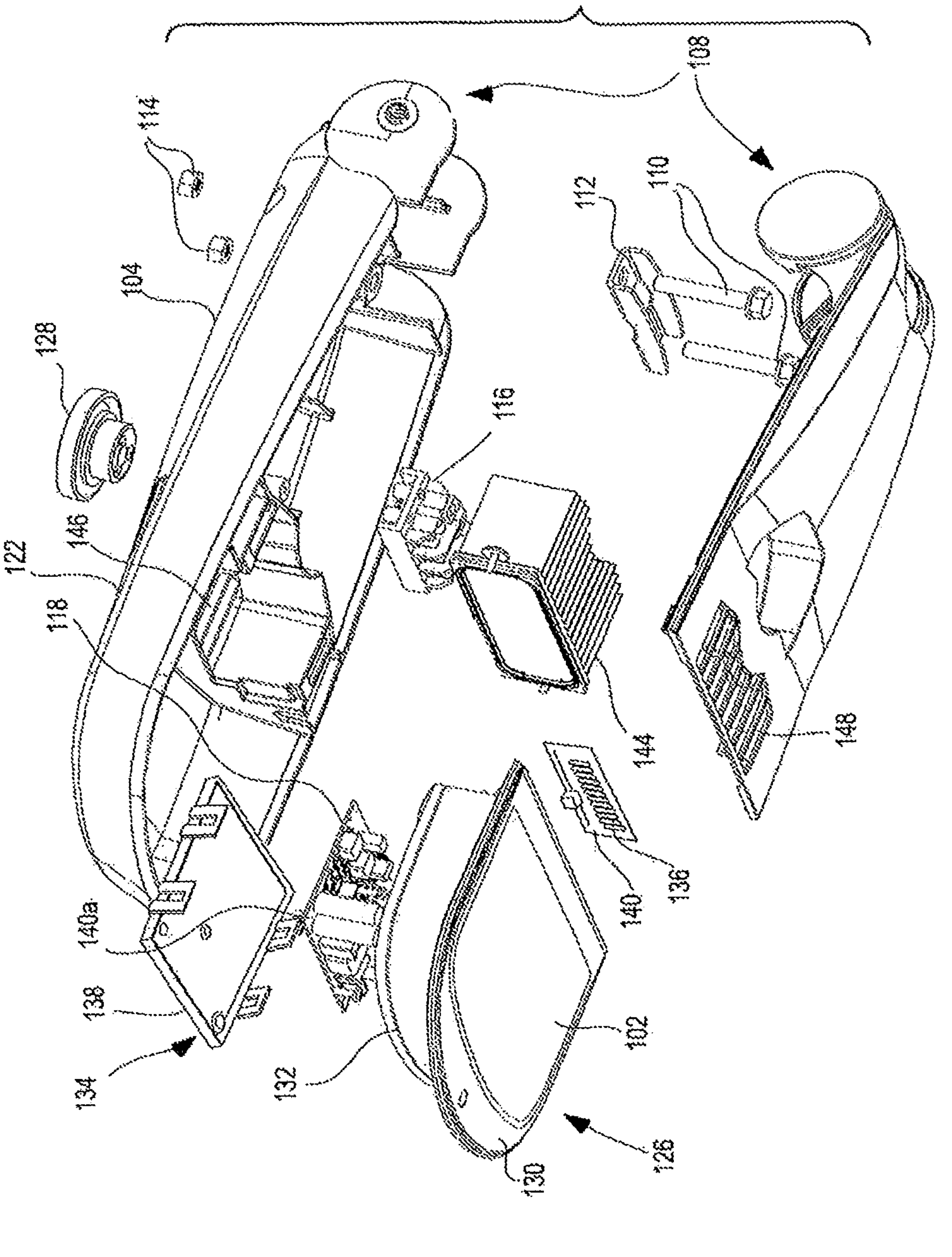
FIG. 3 is an exploded isometric view of the luminaire of FIG. 1.

The luminaire 100 includes a housing 104 adapted to be mounted on a stanchion or post 106. With reference to FIG. 3, the housing 104 includes a mounting portion 108 that is sized to accept an end of any of a number of conventional stanchions. Fasteners 110, such as threaded bolts, extend through apertures in side portions of fastening brackets 112 (only one of which is visible in FIG. 3) and are engaged by threaded nuts 114 disposed in blind bores in an upper portion of the housing 104. The stanchion 106 may be captured between the fastening brackets 112 and a lower surface of the upper portion of the housing to secure the luminaire 100 in a fixed position on the end of the stanchion 106. The housing 104 may alternatively be secured to the stanchion 106 by any other suitable means.

Referring to FIG. 3, electrical connections (i.e., line, ground, and neutral) are effectuated via a terminal block 116 disposed within the mounting portion 108. Wires (not shown) connect the terminal block 116 to an LED driver circuit 118 in the housing 104 to provide power thereto as noted in greater detail hereinafter.

Referring still to FIGS. 1-5, the luminaire 100 includes a head portion 120 comprising an upper cover member 122, a lower door 124 secured in any suitable fashion to the upper cover member 122, respectively, and an optic assembly 126 retained in the upper cover member 122. A sensor 128 may be disposed atop the mounting portion 108 for sensing ambient light conditions or other parameters and a signal representative thereof may be provided to the LED driver circuit 118 in the housing 104.

Figure 6:
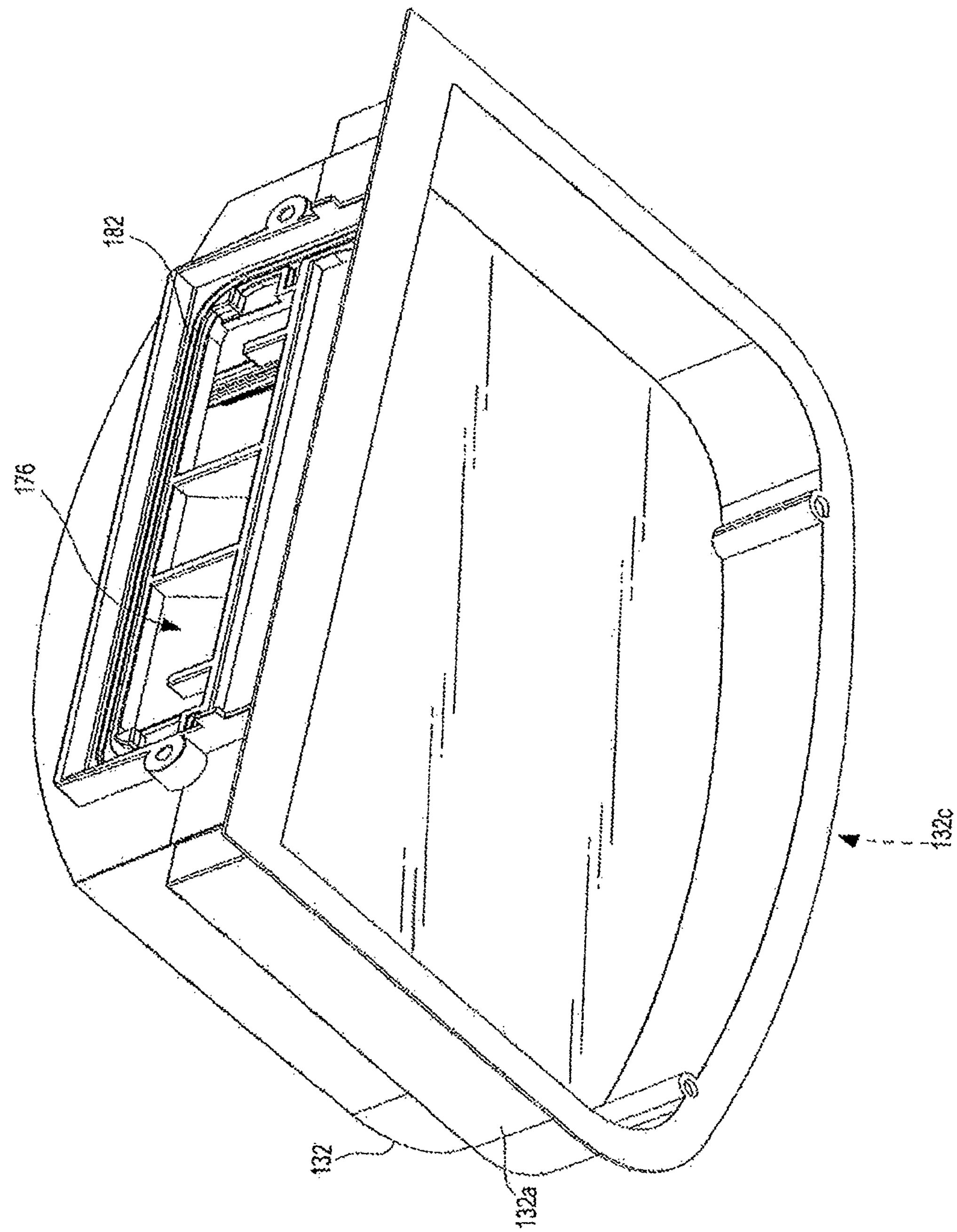
FIG. 6 is an isometric view from below of an embodiment of an optical enclosure.
Figure 7:
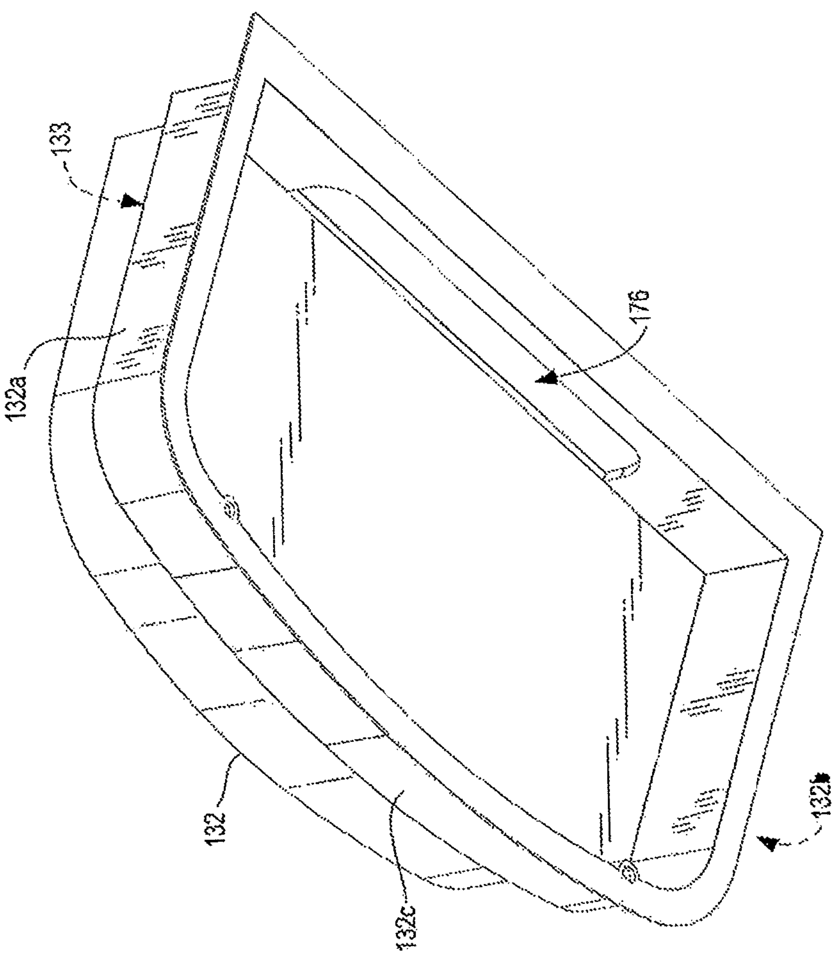
FIG. 7 is an isometric view from below of the optical enclosure of FIG. 6.
Figure 8:
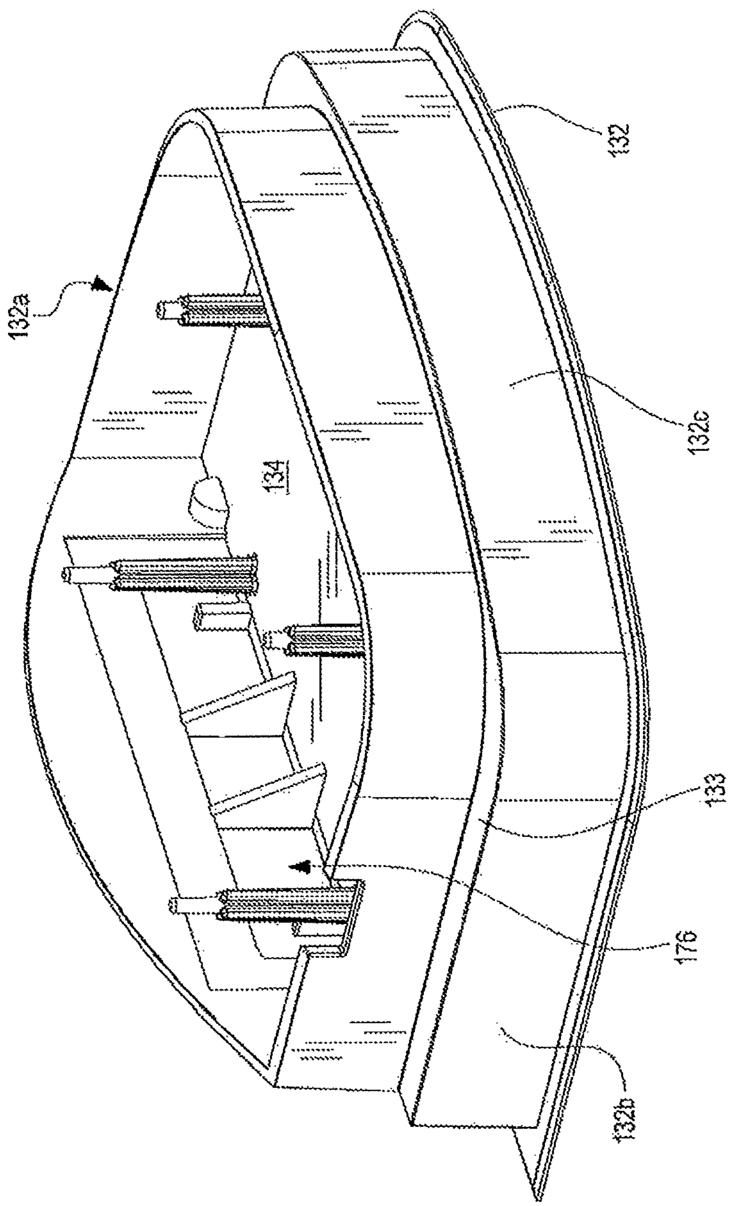
FIG. 8 is an isometric view from above of the optical enclosure of FIG. 6.

Referring next to FIGS. 3-5 and 8-10, the optic assembly 126 comprises an optical waveguide body 102 made of the materials specified hereinbelow or any other suitable materials, a surround member 130, and a reflective enclosure member 132. The interior of the reflective enclosure member 132 is flat, as shown in further views of the reflective enclosure member 132 in FIGS. 6-8. Referring once again to FIGS. 3-5 and 8-10, a circuit housing or compartment 134 with a cover is disposed atop the reflective enclosure member 132, and the driver circuit 118 is disposed in the circuit compartment 134. LED elements 136 are disposed on one or more printed circuit boards (PCBs) 140 and extend into coupling cavities or features 142 (FIGS. 15, 24, and 25) of the waveguide body 102, as noted in greater detail hereinafter. A heat exchanger 144 is disposed behind the one or more PCB(s) 140 to dissipate heat through vents that extend through the luminaire 100 and terminate at upper and lower openings 146, 148. In addition, the terminal block 116 is mounted adjacent the heat exchanger 144 and permits electrical interconnection between the driver circuit 118 and electrical supply conductors (not shown).

The LED elements 136 receive suitable power from the driver circuit 118, which may comprise a SEPIC-type power converter and/or other power conversion circuits mounted on a further printed circuit board 140*a*. The printed circuit board 140*a* may be mounted by suitable fasteners and location pins within the compartment 134 above the reflective enclosure member 132. The driver circuit 118 receives power over wires that extend from the terminal block 116.

Referring next to FIGS. 11-15, an embodiment of the optical waveguide body 102 includes a top surface 150, a bottom surface 152 forming a part of a substrate 154, and a light coupling portion 156 comprising at least one, and, more preferably, a plurality of light input surfaces 164 defining coupling cavities or features 142 extending into the waveguide body 126 from a coupling end surface 158. A total internal reflection section or interior transmission portion 206 is preferably disposed between the light input surface(s) 164 and a light extraction portion 163 and preferably at least partially surrounds the light extraction portion 163. Specifically, surface elements comprising a number of light reflection and redirection elements 161 (described below) are disposed atop the substrate 154 and define the top surface 150. Further surface elements comprising first and second depressed planar surfaces 160*a* and 160*b* are arranged such that the second surface 160*b* partially surrounds the first surface 160*a*, and a plurality of curved light refraction and extraction features 162 (FIGS. 9, 10, 13 and 14) may be disposed on the bottom surface 152. Alternatively, the bottom surface 152 may be textured or smooth and/or polished, or some combination thereof. LED elements (see FIG. 15) 136 comprising individual LED light sources are disposed in or adjacent each of the plurality of light coupling cavities 142 as described in greater detail below.

The substrate 154 may be integral with the surface elements disposed on either the top surface 150 or bottom surface 152, or one or more of the surface elements may be separately formed and placed on or otherwise disposed and retained relative to the substrate 154, as desired. The substrate 154 and some or all of the surface elements may be made of the same or different materials. Further, some or all portions of some or all of the embodiments of the waveguide body 102 is/are made of suitable optical materials, such as one or more of acrylic, air, polycarbonate, molded silicone, glass, cyclic olefin copolymers, and a liquid (including water and/or mineral oils), and/or combinations thereof, possibly in a layered arrangement, to achieve a desired effect and/or appearance.

The light developed by the LEDs 136 travels through the waveguide body 102 and is redirected down and out of the waveguide body 102 at varying angles by the redirection and reflection features 161 disposed on the top surface 150 to be described in detail below, and is emitted out the bottom or emission surface 152 of the waveguide body 102.

Figure 11:
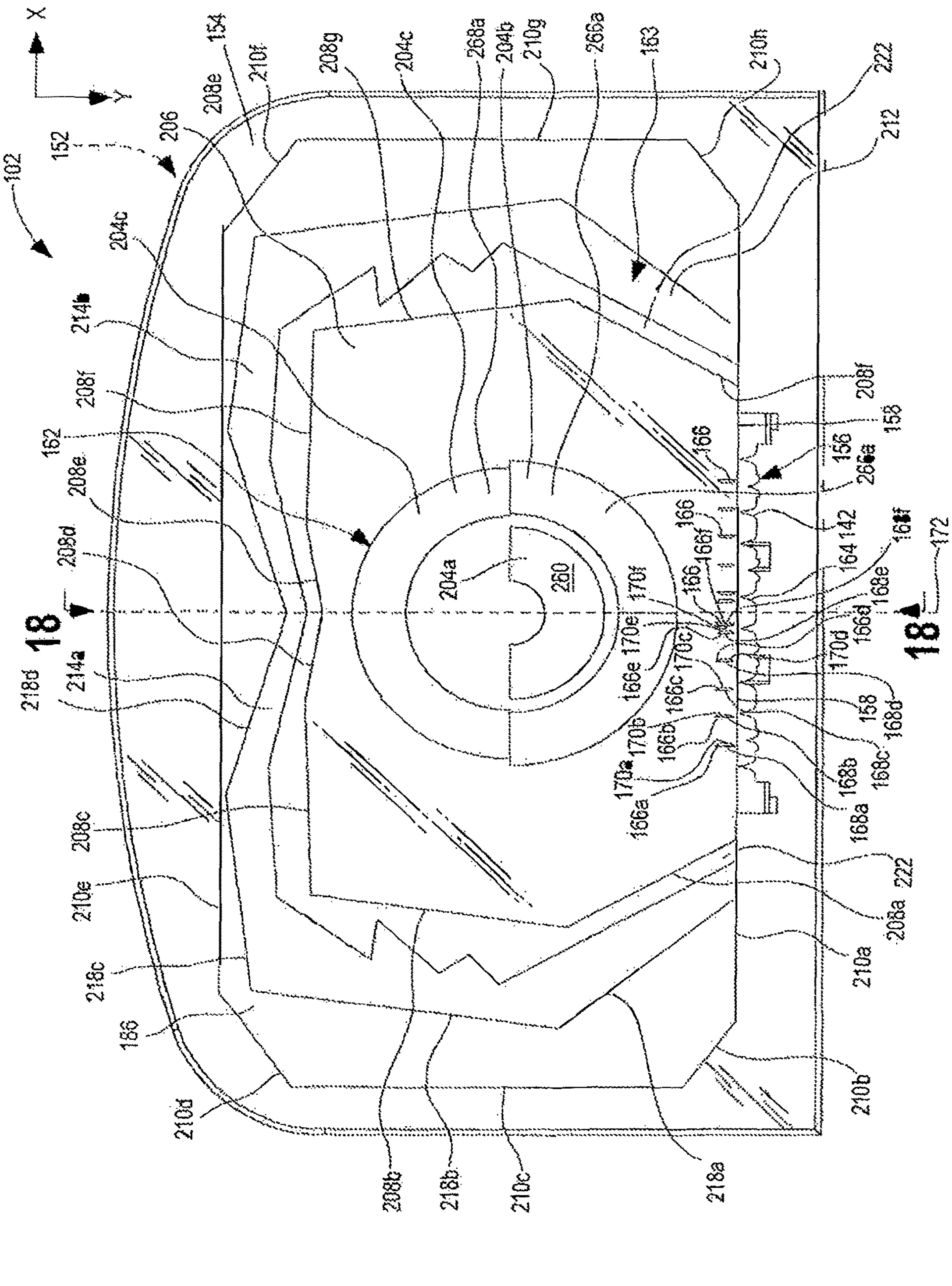
FIG. 11 is a plan view of a waveguide body.
Figure 13:
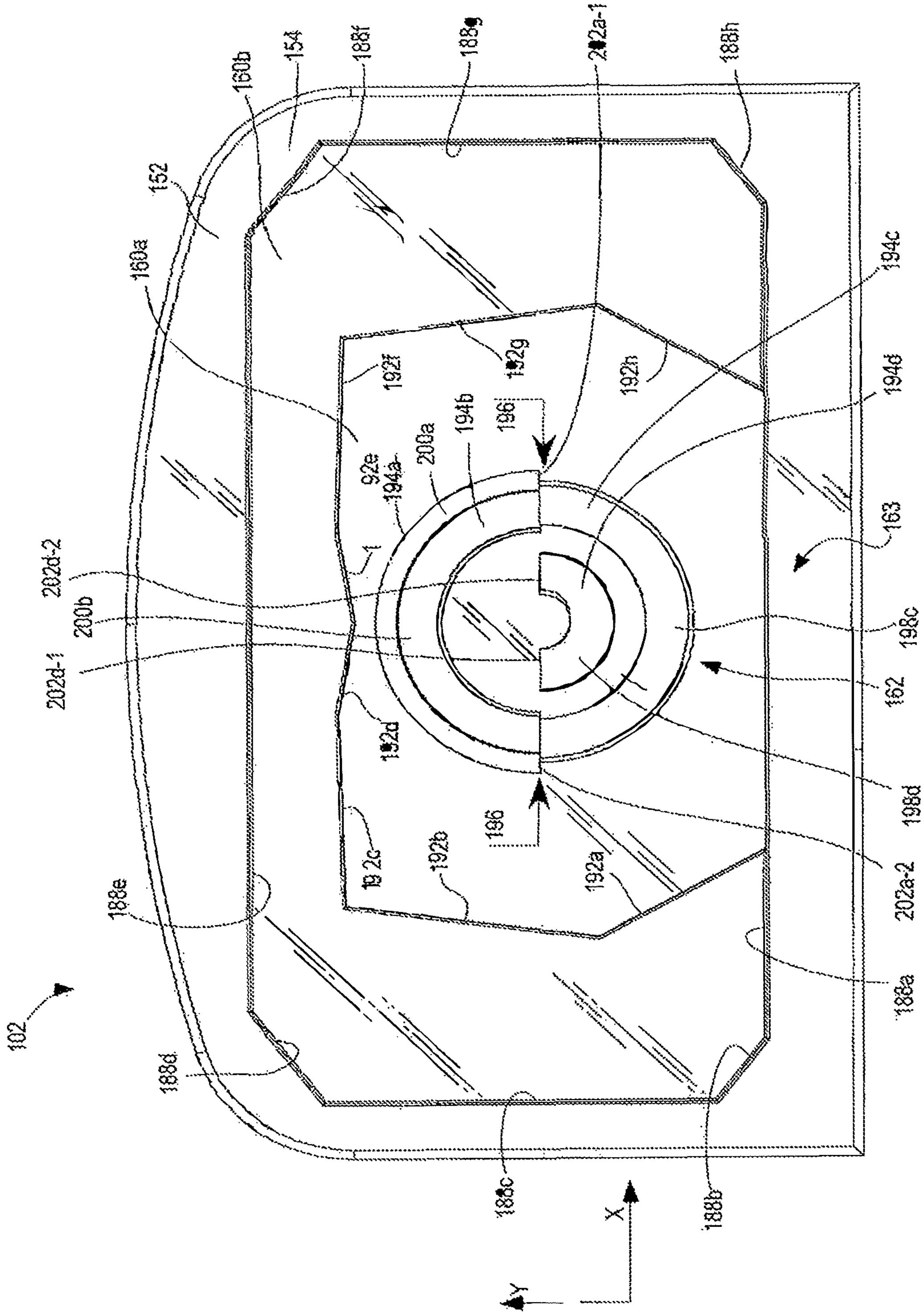
FIG. 13 is a bottom elevational view of the waveguide body of FIG. 11.

The curved light refraction and extraction features 162 on the bottom surface 152, which may comprise two pairs of curved concentric or eccentric ridges, each ridge terminating at a plane parallel to the width (i.e., the x-dimension as indicated in FIGS. 11 and 13) of the waveguide body 102, further facilitate light extraction and assist in extracting light at desirable angles relative the emission surface 152. It should be noted that there could be a different number (including zero) of bottom surface light refraction and extraction features 162, as desired. In any event, the Lambertian or other distributions of light developed by the LED elements 136 are converted into a distribution resulting in an illumination pattern having an extent in the x-dimension and a reach in the y-dimension perpendicular to the x-dimension.

Figure 16A:
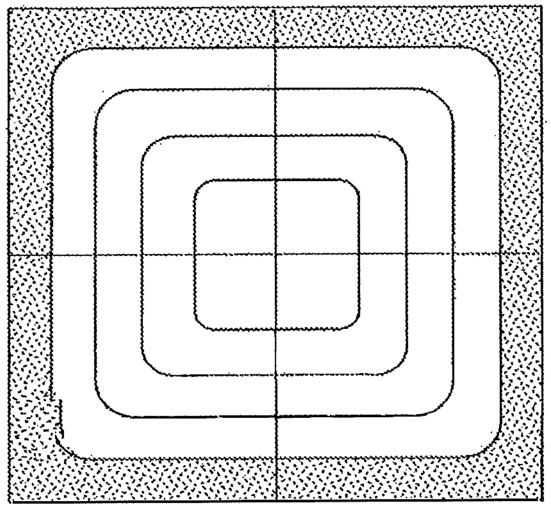
FIG. 16A is a diagram depicting an example Type 5 light distribution.
Figure 16B:
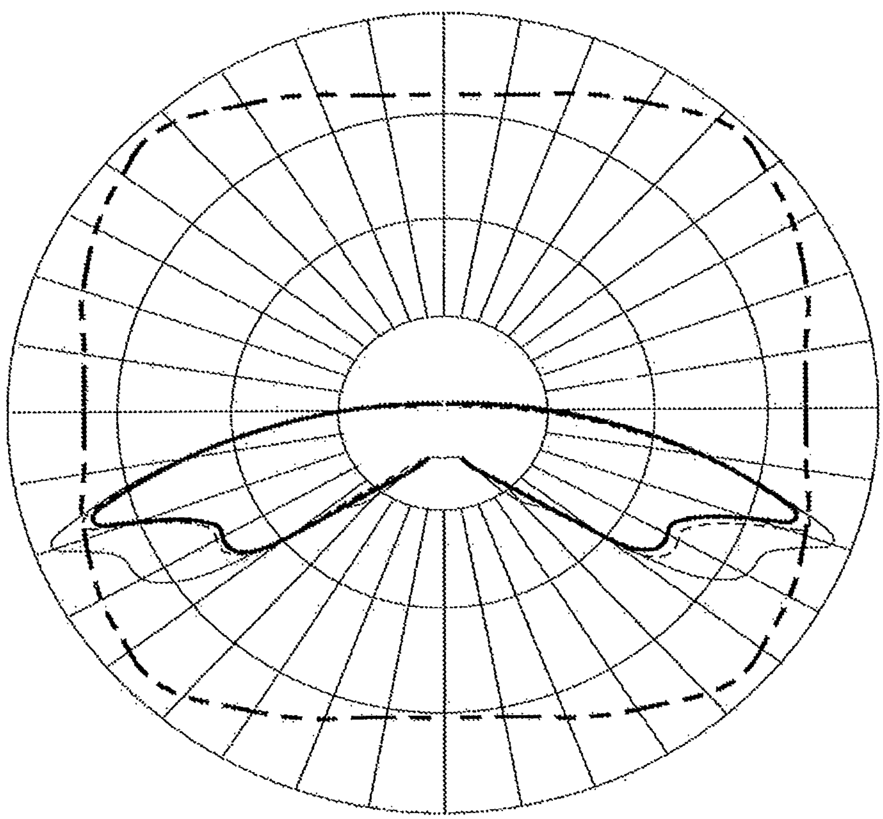
FIG. 16B is a light distribution intensity graph.
Figure 16C:
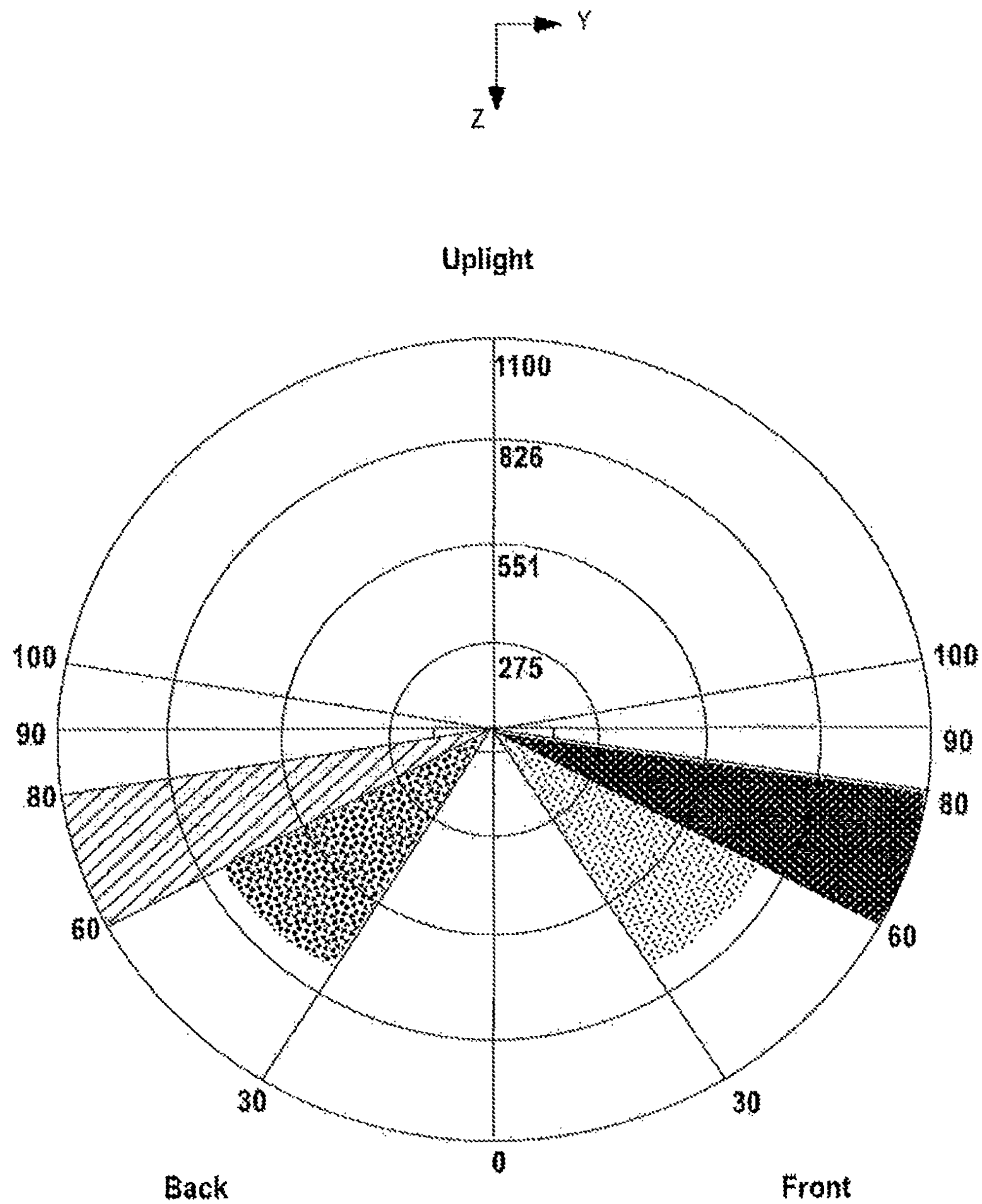
FIG. 16C is a chart depicting luminous flux of the light distribution of FIG. 16B.

The waveguide body 102 directs light developed by the LED element(s) 136 toward a desired illumination target surface, such as a roadway. The illumination pattern may or may not be offset in the y-dimension with respect to a center of the waveguide body 102, depending upon the design of the various elements of the waveguide body 102. The extent of the illumination pattern on the target surface in the x-dimension may be greater than the width of the waveguide body 102, although this need not necessarily be the case. Preferably, the extent of the illumination pattern on the target surface in the y-dimension and the x-dimension is substantially equal, thereby creating a uniform illumination pattern such as that shown in the light pattern diagram of FIG. 16A. FIG. 16B further depicts a light intensity chart showing that light is distributed according to a substantially even pattern with respect to the front and the back of the waveguide body 102 (i.e., along the y-axis). Further, FIG. 16C is a chart depicting luminous flux of the light distribution of FIG. 16B. Any of the embodiments of the luminaire 100 and/or post top luminaire 300, 300*a*, and 300*b* described herein may be used with any of the embodiments of the waveguide body 102 described hereinbelow to develop what is known in the art as a Type 5 or Type 5 Square lighting distribution. The Type 5 or Type 5 Square distribution may be preferable for general parking and/or area lighting applications. The Type 5 distribution typically has a relatively uniform illumination distribution that is generally symmetrical and circular. Alternatively, the Type 5 Square distribution has a relatively uniform square illumination distribution to provide a more defined edge for the distributed light, if suitable for a particular application. Alternatively, the embodiments may develop an asymmetric and/or offset light distribution, depending on the intended application.

As an example, the illumination pattern may be modified through appropriate modification of the light refraction and extraction features 162 on the bottom surface 152 and the light redirection or reflecting elements on the top surface 150. The waveguide bodies shown in the illustrated embodiments cause the illumination pattern on a target surface to be generally equal in extent in the y-dimension and the x-dimension, although this need not be the case. Thus, for example, the light distribution may be greater in the y-dimension than the distribution in the x-dimension, or vice versa. The overall brightness may be increased or decreased by adding or omitting, respectively, LED elements 136 and/or varying the power developed by the driver circuit 118 and delivered to the LED elements.

As should be apparent from the foregoing, the reflective enclosure member 132 is disposed above the waveguide body 102 opposite the substrate 154. The reflective enclosure member 132 includes a lower, interior surface that is coated or otherwise formed with a white or specular material. In example embodiments, the interior of the reflective enclosure member 132 is coated with Miro®™ brand reflector material, as marketed by ALANOD®™ GmbH & Co. KG of Ennepetal, Germany, or enhanced specular reflector (ESR). Further, one or more of the surfaces of the waveguide body 102 may be coated/covered with a white or specular material, e.g., outer surfaces of the light redirection or reflection features 161. Light that escapes (or which would otherwise escape) the upper surface 150 of the waveguide body 102 may be thus reflected back into the waveguide body 102 so that light is efficiently extracted out of the substrate 154. The lower surface of the reflective enclosure 132 may have other than a planar shape, such as a curved surface. In all of the illustrated embodiments, the light emitted out of the waveguide body 102 is preferably mixed such that point sources of light in the LED elements 136 are not visible to a significant extent and the emitted light is controlled and collimated to a high degree. Further, it is preferable that the emitted light be sufficiently mixed to promote even color distribution from different color LED elements 136 and/or uniformity of illumination distribution whether different color LEDs or monochromatic LEDs are used. Light mixing may be facilitated further by using curved surfaces that define one or more of the features 161, 162 as opposed to frustoconical or other surfaces that are not curved in the thickness dimension.

Figure 15:
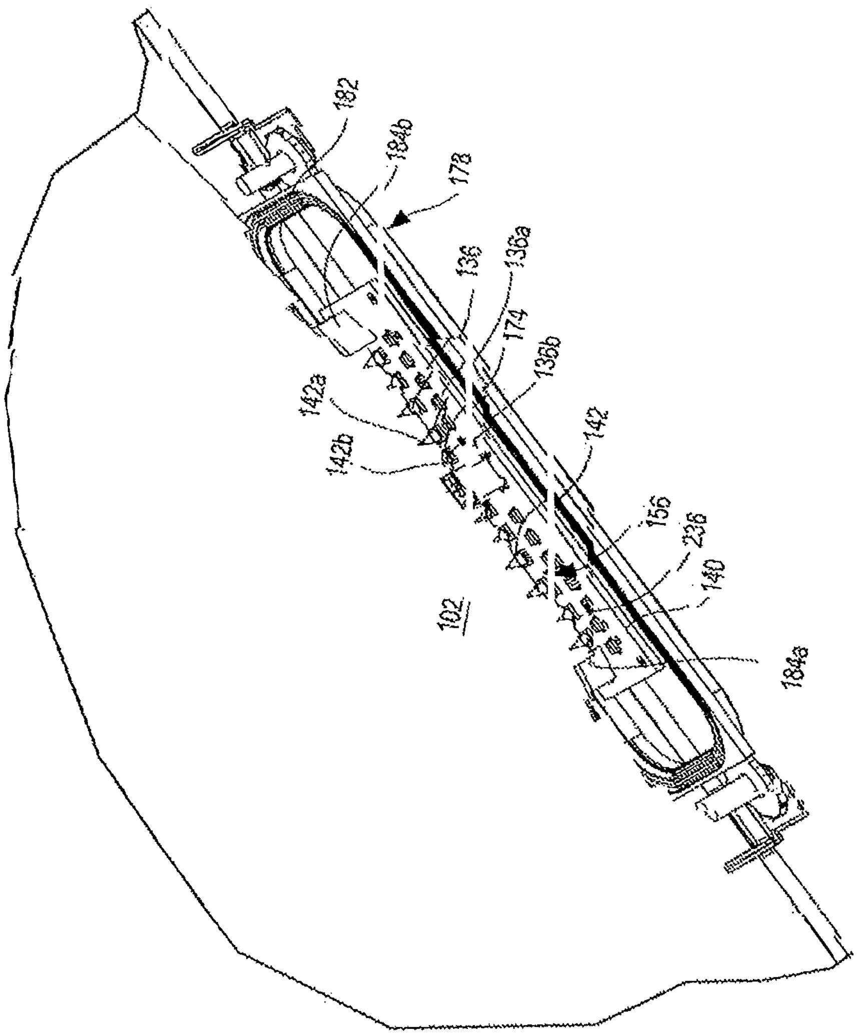
FIG. 15 is an isometric view from above of LED elements coupled to a waveguide body.
Figure 24:
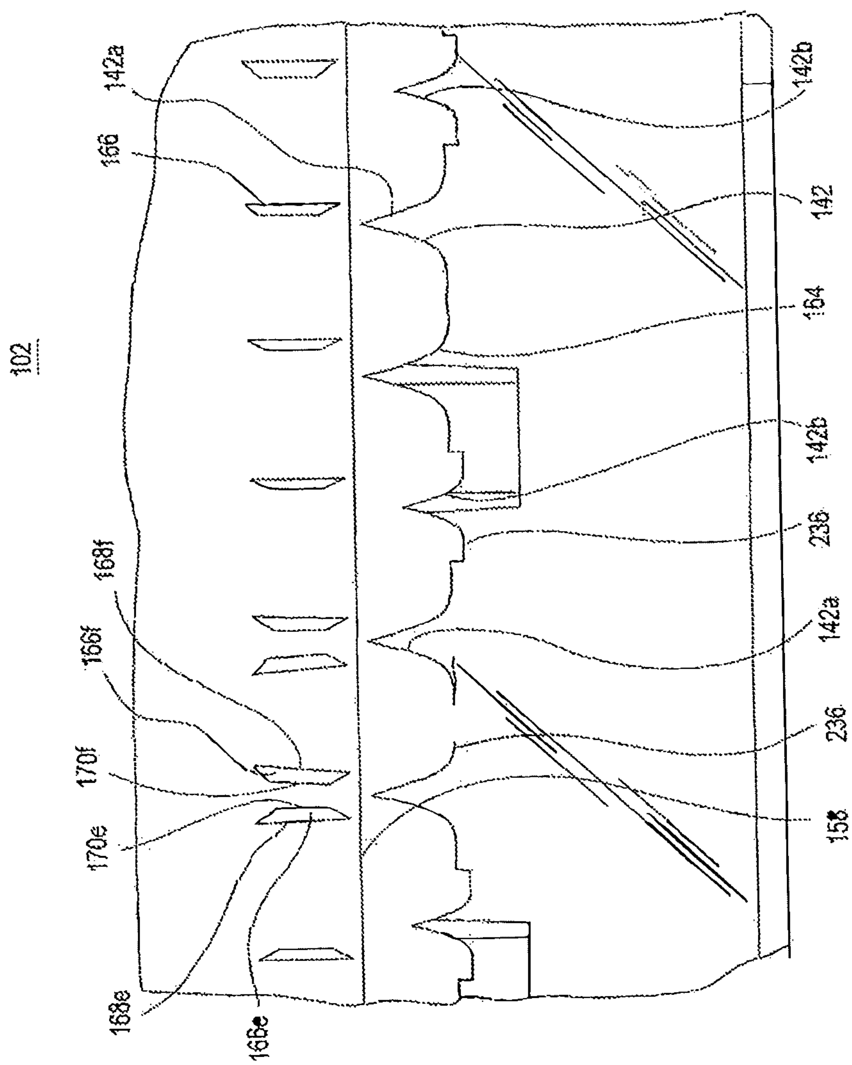
FIG. 24 is an enlarged fragmentary plan view of a parabolic coupling cavity entrance geometry.
Figure 25:
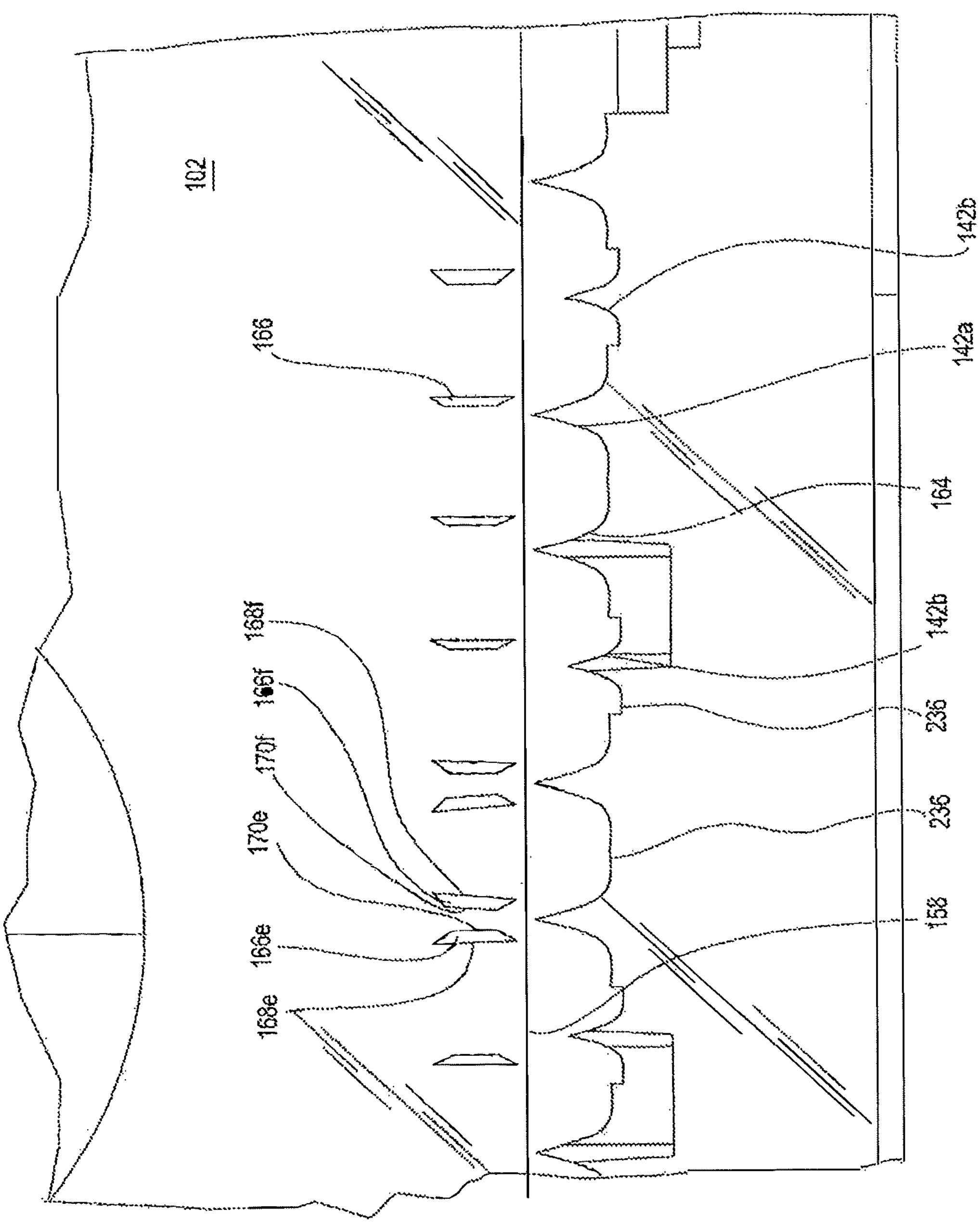
FIG. 25 is an enlarged fragmentary plan view of a wedge-shaped coupling cavity entrance geometry.

As seen in FIGS. 15, 24, and 25, each of the plurality of light coupling cavities 142 has an indentation-type shape, although variations in shape may be used to better manage the convergence or divergence of light inside the waveguide and/or to improve light extraction. Each light coupling cavity 142 is defined by the surface 164 that is substantially or generally parabolic or wedge-shaped in cross-section (as seen in a plan view transverse to the coupling end surface 158 and parallel to the top surface 150), as shown in such FIGS.

Figure 23:
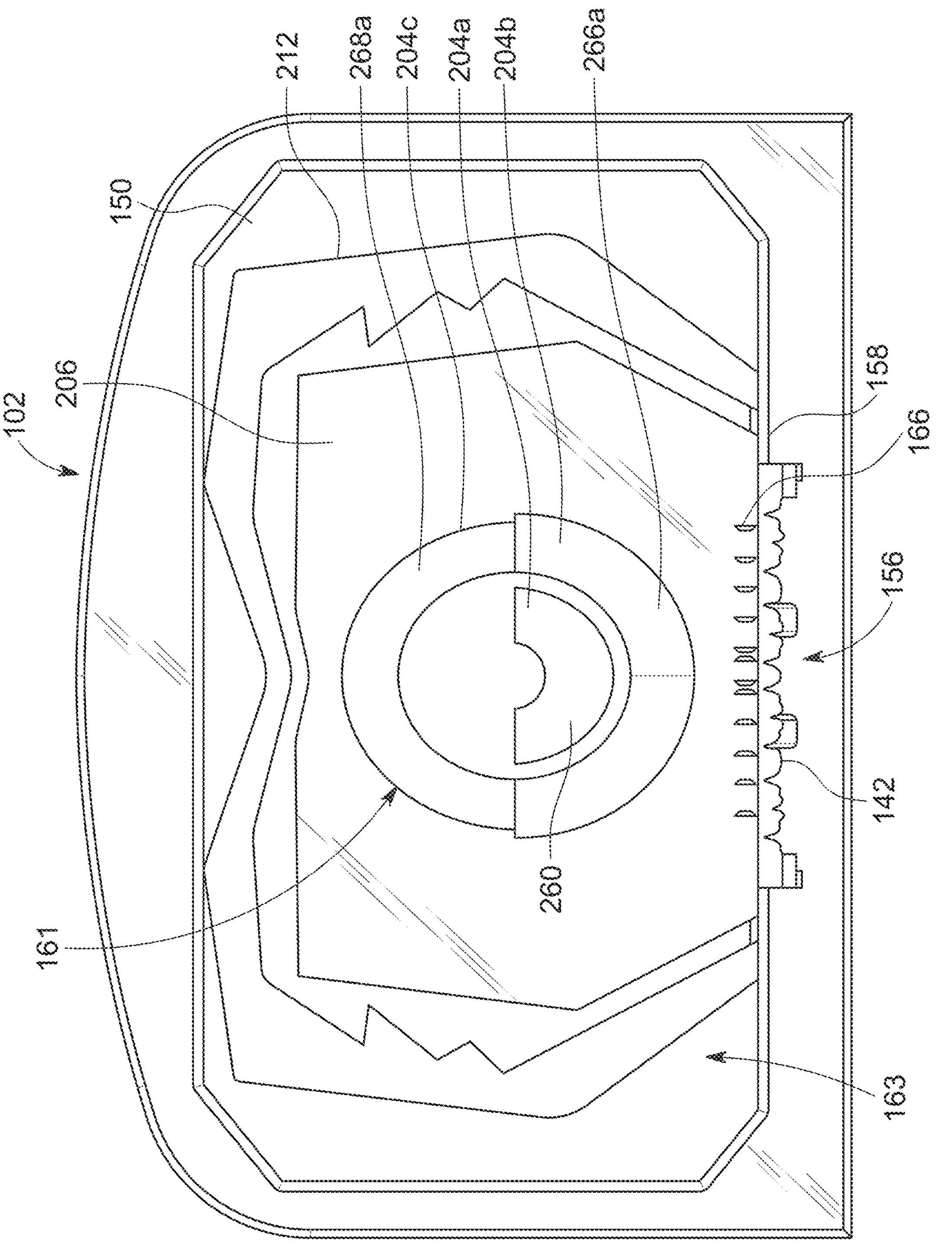
FIG. 23 is a plan view from above of an alternate embodiment of the waveguide body of FIG. 11.

FIG. 11 depicts an embodiment of the waveguide body 102 comprising coupling cavities 142 having a wedge-shaped entrance geometry. Coupling cavities 142 having a wedge-shaped entrance geometry are shown in enlarged detail in FIG. 25. Alternatively, FIG. 23 depicts an embodiment of the waveguide body 102 comprising coupling cavities 142 having a parabolic-shaped entrance geometry. Coupling cavities 142 having a parabolic-shaped entrance geometry are shown in enlarged detail in FIG. 24. The parabolic and wedge-shaped entrance geometries differ in shape at the terminal point of each coupling cavity 142. The wedge-shaped geometry of FIG. 25 has coupling cavities with wedge-shaped, sharp terminal points, while the parabolic geometry of FIG. 24 has coupling cavities with curved terminal points that approximate a parabolic curve in combination with the remaining surfaces 164 of each coupling cavity 142.

Each surface 164 defining each light coupling cavity 142 may be smooth, textured, curved, or otherwise shaped to affect light mixing and/or redirection. For example, each coupling surface 164 may include spaced bumps or other features that protrude at points along a top-to-bottom extent (i.e., along a z-dimension normal to an x-y plane) of each cavity 142 in such a way as to delineate discrete coupling cavities each provided for and associated with an individual LED element 136 to promote coupling of light into the waveguide body 102 and light mixing. Such an arrangement may take any of the forms disclosed in International Patent Application No. PCT/US14/30017, filed Mar. 15, 2014, incorporated by reference herein. Furthermore, each coupling cavity 142 may have a cylindrical prism or lens coupling surface 164 with a spline-like or flexible curve shape in cross-section along a z-dimension. The spline or flexible curve of the coupling cavity surface 164 may be designed so that light rays are separated in two primary directions while being collimated.

As seen in FIG. 15, LED elements 136 are disposed within or adjacent the plurality of coupling cavities 142 of the waveguide body 102. In FIG. 15, details of the redirection and reflection feature(s) 161 are omitted from the top surface 150. Each LED element 136 may be a single white or other color LED, or each may comprise multiple LEDs either mounted separately or together on a single substrate or package to form a module including, for example, at least one phosphor-coated or phosphor-converted LED, such as a blue-shifted yellow (BSY) LED, either alone or in combination with at least one color LED, such as a green LED, a yellow LED, a red LED, etc. The LED elements 136 may further include phosphor-converted yellow, red, or green LEDs. One possible combination of LED elements 136 includes at least one blue-shifted-yellow/green LED with at least one blue-shifted-red LED, wherein the LED chip is blue or green and surrounded by phosphor. Any combination of phosphor-converted white LED elements 136, and/or different color phosphor-converted LED elements 136, and/or different color LED elements 136 may be used. Alternatively, all the LED elements 136 may be the same. The number and configuration of LEDs 136 may vary depending on the shape(s) of the coupling cavities 142. Different color temperatures and appearances could be produced using particular LED combinations, as is known in the art. In one embodiment, each light source comprises any LED, for example, an MT-G LED incorporating TrueWhite®™ LED technology or as disclosed in U.S. patent application Ser. No. 13/649,067, filed Oct. 10, 2012, the disclosure of which is hereby incorporated by reference herein. In embodiments, each light source comprises any LED such as the LEDs disclosed in U.S. Pat. No. 8,998,444, and/or U.S. Provisional Patent Application Ser. No. 62/262,414, filed Dec. 3, 2015, the disclosures of which are hereby incorporated by reference herein. In another embodiment, a plurality of LEDs may include at least two LEDs having different spectral emission characteristics. If desirable, one or more side emitting LEDs disclosed in U.S. Pat. No. 8,541,795, the disclosure of which is incorporated by reference herein, may be utilized inside or at the edge of the waveguide body 102. In any of the embodiments disclosed herein the LED elements 136 preferably have a Lambertian light distribution, although each may have a directional emission distribution (e.g., a side emitting distribution), as necessary or desirable. More generally, any Lambertian, symmetric, wide angle, preferential-sided, or asymmetric beam pattern LED(s) may be used as the light source(s).

The sizes and/or shapes of the coupling cavities 142 may differ or may all be the same. Each coupling cavity 142 extends into the waveguide body. However, an end surface 236 defining an open end of each coupling cavity 142 may not be coincident and may be offset with respect to a corresponding end surface of one or both adjacent coupling cavities. Thus, each of a first plurality of coupling cavities 142*b* has an opening at the end surface 236 thereof that is disposed farther from a center of the waveguide body 102 than corresponding openings of each of a second plurality of coupling cavities 142*a*. Furthermore, in the embodiment illustrated in FIGS. 15, 24, and 25, each of the first plurality of coupling cavities 142*a* has a depth that extends farther into the waveguide body 102 than each of the second plurality of coupling cavities 142*b*. The cavities 142*a* are therefore relatively larger than the cavities 142*b*. As seen in FIGS. 24 and 25, the relative sizes and openings of coupling cavities 142*a* and 142*b* may be retained for the parabolic and the wedge-shaped entrance geometries alike.

In the illustrated embodiment, relatively larger BSY LED elements 136*a* (FIG. 15) are aligned with the coupling cavities 142*a*, while relatively smaller red LED elements 136*b* are aligned with the coupling cavities 142*b*. The arrangement of coupling cavity shapes promotes color mixing in the event that, as discussed above, different color LED elements 136 are used and/or promotes illuminance uniformity by the waveguide body 106 regardless of whether multi-color or monochromatic LEDs are used. In any of the embodiments disclosed herein, other light mixing features may be included in or on the waveguide body 102. Thus, for example, one or more bodies of differing index or indices of refraction than remaining portions of the waveguide body 102 may extend into the waveguide body and/or be located fully within the waveguide body 102.

In particular embodiments, an example of a type of light mixing feature comprises the light mixing facets 166 shown in FIG. 11. The waveguide body 102 of FIG. 11 includes twelve facets 166 with six facets 166 on each side of a center line 172 extending along the y-dimension (at line 18-18) of the waveguide body 102. The facets 166 on each side of the center line 172 are arranged to form a mirror image of one another, therefore the facets on only one side of the waveguide body 102 will be described. The facets 166 are trapezoidal in shape such that each facet 166 has a base surface 168 and a second surface 170 parallel to the base surface 168.

Referring still to FIG. 11 and also to FIGS. 24 and 25, the embodiment therein includes five facets 166*a*-166*e* having respective base surfaces 168*a*-168*e* oriented away from the center line 172 while one facet 166*f* has the opposite orientation with the base surface 168*f* thereof oriented toward the center line 172. Likewise, second surfaces 170*a*-170*f* are opposite the base surfaces 166*a*-166*f* of the associated facet 166*a*-166*f*. The five facets 166*a*-166*e* are equally spaced away from the coupling end surface 158. The facet 166*f* having a contrary orientation is disposed in close proximity with facet 166*e* such that facets 166*e* and 166*f* form a pair of mirror-image facets that are disposed such that the second surfaces 170*e*, 170*f* of the paired facets 166*e*, 166*f* face one another. The base surfaces 168*a*-168*e* of the facets 166*a*-168*e* are preferably substantially parallel to one another. However, the base surface 168*f* of the facet 166*f* is angled slightly away from the parallel base surfaces 168*a*-168*e* of the other facets 166*a*-166*e*. Therefore, the base surfaces 168*e*, 168*f* and the second surfaces 170*e*, 170*f* of the paired facets 166*e*, 166*f* are angled slightly away from one another.

Referring again to FIG. 15, the LED elements 136 are preferably disposed in the illustrated arrangement relative to one another and relative to the plurality of light coupling cavities 142. The LED elements 136 may be mounted on one or more separate support structure(s) 174. In the illustrated embodiment of FIG. 15, the LED elements 136 are disposed on and carried by the metal-coated printed circuit board (PCB) 140. The PCB 140 is held in place relative to an associated opening 176 (see FIGS. 6, 7, 9, and 10) of the reflective enclosure member 132 by a holder assembly 178. The holder assembly 178 comprises a main holding member 180 and a gasket 182. The PCB 140 and the holder assembly 178 may be held in place relative to the waveguide body 102 by screws, rivets, etc. inserted through the PCB 140 and/or holder assembly 178 and passing into threaded protrusions 184*a*, 184*b* that extend out from the waveguide body 102 (see FIGS. 11 and 12). Further, screws or fasteners compress the main holding member 180 against the reflective enclosure member 132 with the gasket 182 disposed therebetween and the PCB 140 aligned with the associated opening 176. Thereby the LED elements 136 are held in place relative to the waveguide body 102 by both the compressive force of the holder assembly 178 and the screws, rivets, etc. inserted through the PCB 140 and passing into threaded protrusions 184*a*, 184*b*.

Referring again to FIGS. 3, 4, 5, 10, and 15, the waveguide body 102 is disposed and maintained within the reflective enclosure member 132 such that the plurality of coupling cavities 142 is disposed in a fixed relationship adjacent the opening 176 in the reflective enclosure 132 and such that the LED elements 136 are aligned with the coupling cavities 142 of the waveguide body 102. Each LED receives power from the LED driver circuit 118 or power supply of suitable type, such as a SEPIC-type power converter as noted above and/or other power conversion circuits carried by a circuit board 140*a* that may be mounted by fasteners and/or locating pins atop the reflective enclosure member 132.

Figure 9:
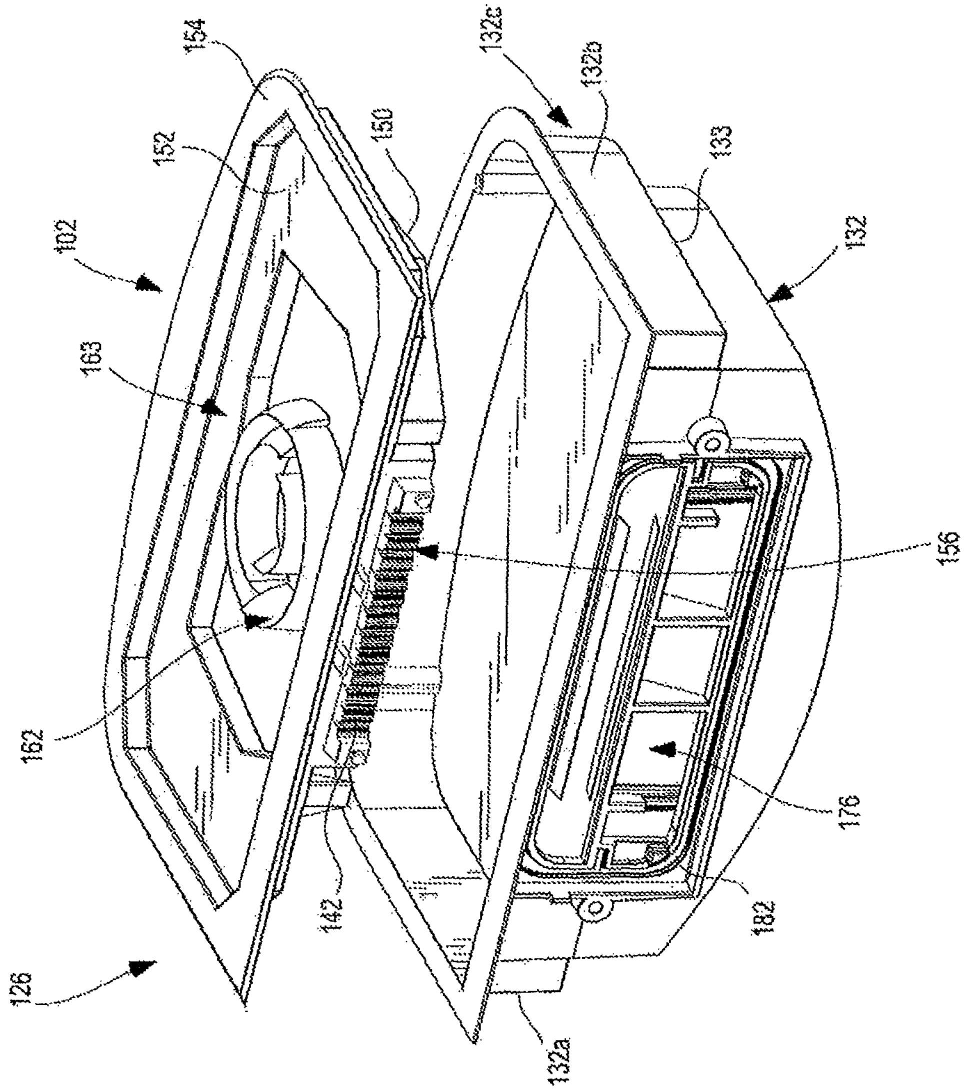
FIG. 9 is an exploded fragmentary isometric view from below of an optical assembly.
Figure 10:
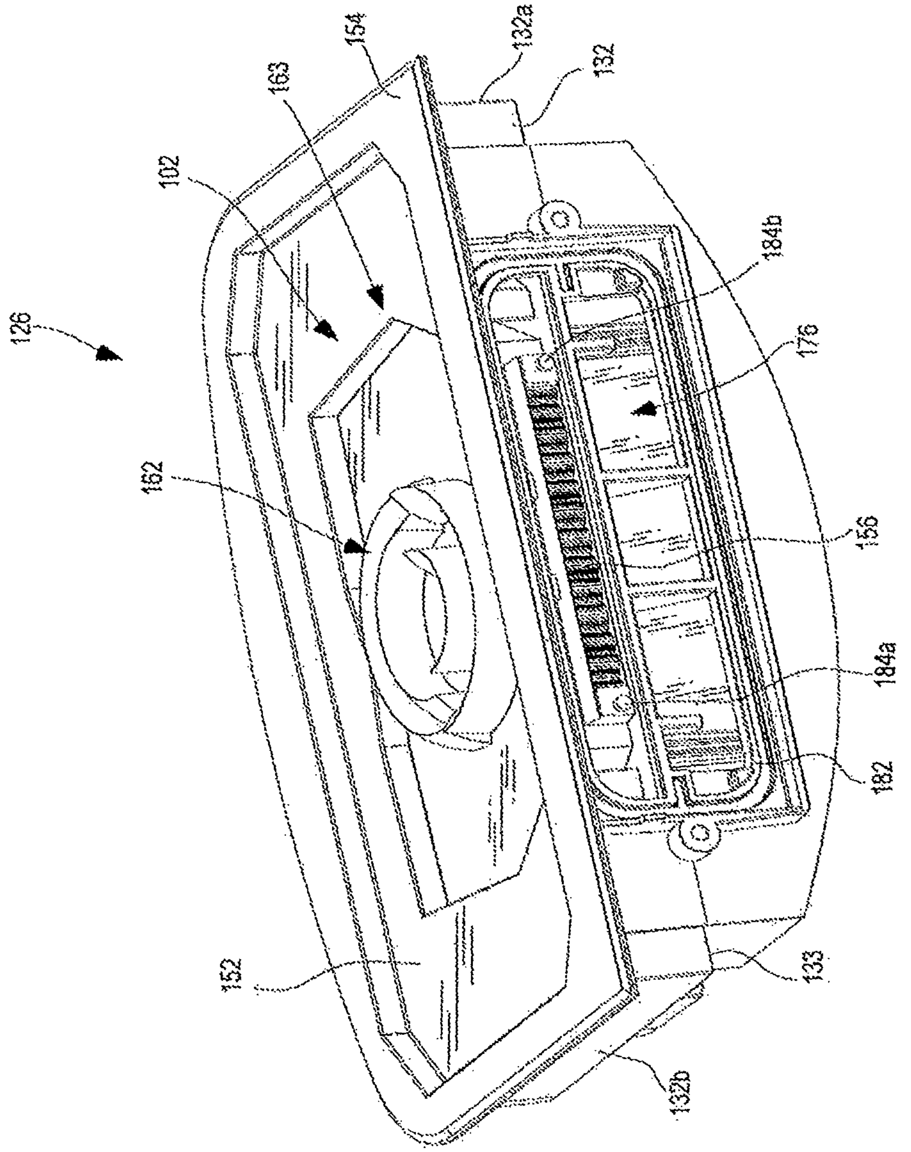
FIG. 10 is an isometric view from below of the optical assembly of FIG. 9.

FIGS. 4-10 illustrate the optic assembly 126 in greater detail. FIGS. 9 and 10 are inverted relative to the orientation of the optic assembly 126 within the luminaire 100. A process for fabricating the assembly 126 includes the steps of forming the waveguide body 102 using, for example, any suitable molding process such as described hereinafter, placing the reflective enclosure member 132 onto the waveguide body 102, and overmolding the surround member 130 onto the waveguide body 102 and/or the reflective enclosure member 132 to maintain the reflective enclosure member 132, the waveguide body 102, and the surround member 130 together in a unitary or integral fashion. The optic assembly 126 further includes an upper cover 138 (FIGS. 6-10) having a straight or linear surface 133 (FIGS. 4 and 8), left- and right-side surfaces 132*a* and 123*b*, respectively, (FIGS. 4-10) to interfit with the housing 104 shown in FIG. 8. However, a forward surface 132*c* may itself be curved and create a curved or filleted abutment where it meets each of the left- and right-side surfaces 132*a* and 132*b*. In an alternate embodiment of the luminaire 100, the reflective enclosure member 132 has a size and shape, such as including tapered or curved side surfaces, to receive closely the respective waveguide body 102 in a nesting fashion. The fitting of the optic assembly 126 and the gasket 182 with the enclosure member 132 provides a seal around the waveguide body 102. Such a seal may be watertight or otherwise provide suitable protection from environmental factors.

Any of the waveguide bodies disclosed herein may be used in the luminaire embodiments of FIGS. 1-5 and/or the post top embodiment of FIGS. 44-51, including the waveguide bodies of FIGS. 11-14 and 21-34. For example, embodiments of the luminaire 100 and/or post top 300 may incorporate the waveguide body 102 of a particular embodiment to achieve appropriate illumination distributions for desired output light illumination levels and/or other light distribution characteristics. The waveguide bodies of FIGS. 11-14 and 21-34 may be fabricated by a molding process, such as multilayer molding, that utilizes a tooling recess common to production of all three waveguide bodies, and by using a particular bottom insert in the tooling cavity unique to each of the three waveguide bodies. The insert allows for an interior section of each waveguide body 102 to have different extraction members and/or redirection elements while a bottom surface 152 and an outboard portion 186 of an upper surface 150 are common to the waveguides 102. A similar molding process may be utilized for the fabrication of the waveguide bodies 102 shown in FIGS. 13, 14, 30, and 34 as the waveguides shown herein also have identically shaped bottom surface 152 and outboard portion 186.

The different interior sections of the waveguides allow for the illumination distribution pattern produced by the waveguide body 102 to be varied. The varied illumination distribution patterns may be compliant with the American Institute of Architects lighting standards that are commonly known in the art. The boundaries of each illumination pattern on the illuminated surface are defined by the threshold of minimum acceptable lighting conditions, which depend on the illumination requirements, such as for a highway luminaire or parking lot luminaire. For example, an embodiment of the waveguide body 102 may provide an illumination pattern on a target surface having a relatively even, circular, or square with rounded corners light distribution having a diameter (in the case of a circular distribution) or a side-to-side extent (for a square distribution) of about one to about seven times the mounting height of the luminaire 100. In a typical parking lot configuration, the luminaire 100 is mounted feet high. However, for high lumen applications, such as a luminaire replacing an incandescent bulb of approximately 750-10000 watts, the mounting height may instead be 30-40 feet, with a concomitant increase in power delivered to the LED elements to archive the desired intensity. In an example embodiment, the luminaire 100 is mounted at a height of 20 feet and the spacing ratio between luminaries is 7:1. Therefore, the width of the light distribution should cover at least 140 ft. Alternatively, for a mounting height of 40 feet and a spacing ratio of 7:1 between luminaries, the illumination width needed for desired light distribution may be 280 feet. The light distribution width may further be modified according to the spacing criteria for separating luminaries. Typical spacing ratios may be 4:1, 6:1, and 7:1 to cover most area applications.

In an example embodiment, the luminaire 100 may have a maximum length ranging from about 400 mm to about 800 mm, preferably from about 500 mm to about 550 mm, a maximum width ranging from about 200 mm to about 500 mm, preferably from about 225 mm to about 275 mm, and a maximum height ranging from about 100 mm to about 200 mm, preferably from about 125 mm to about 150 mm. Moreover, the waveguide bodies 102 incorporated into the luminaire 100 and/or post top luminaire 300*b* may have a length along the y-direction ranging from about 75 mm to about 250 mm, preferably from about 125 mm to about 175 mm, a width along the x-direction ranging from about 150 mm to about 300 mm, preferably from about 200 mm to about 250 mm, and a height (i.e., thickness) ranging from about 5 mm to about 50 mm, preferably from about mm to about 35 mm. The waveguide bodies 102 depicted in FIGS. 11-14 and 21-34 may be used in a luminaire having a lumen output ranging from about 3,000 lumens to about 32,000 lumens and, preferably, in luminaires having a lumen output between about 3,000 lumens and about 8,000 lumens. In a further example embodiment, the post top luminaries 300, 300*a*, 300*b* may have housings measuring approximately 375 mm×375 mm×450 mm up to about 450 mm×450 mm×525 mm, with lumen outputs preferably ranging from about 3,000 lumens to about 32,000 lumens. Moreover, the waveguide bodies 102*a*-102*d* incorporated into the post top luminaries 300*a*, 300*b* may have a length along the y-direction ranging from about 75 mm to about 250 mm, preferably from about 125 mm to about 150 mm, a width along the x-direction ranging from about 150 mm to about 300 mm, preferably from about 125 mm to about 175 mm, and a height (i.e., thickness) ranging from about 5 mm to about 50 mm, preferably from about 15 mm to about 35 mm.

The waveguide bodies 102 of FIGS. 11-14 and 21-34 include the bottom surface 152 and the outboard portion 186 of the top surface 150 as common to all such embodiments.

Figure 14:
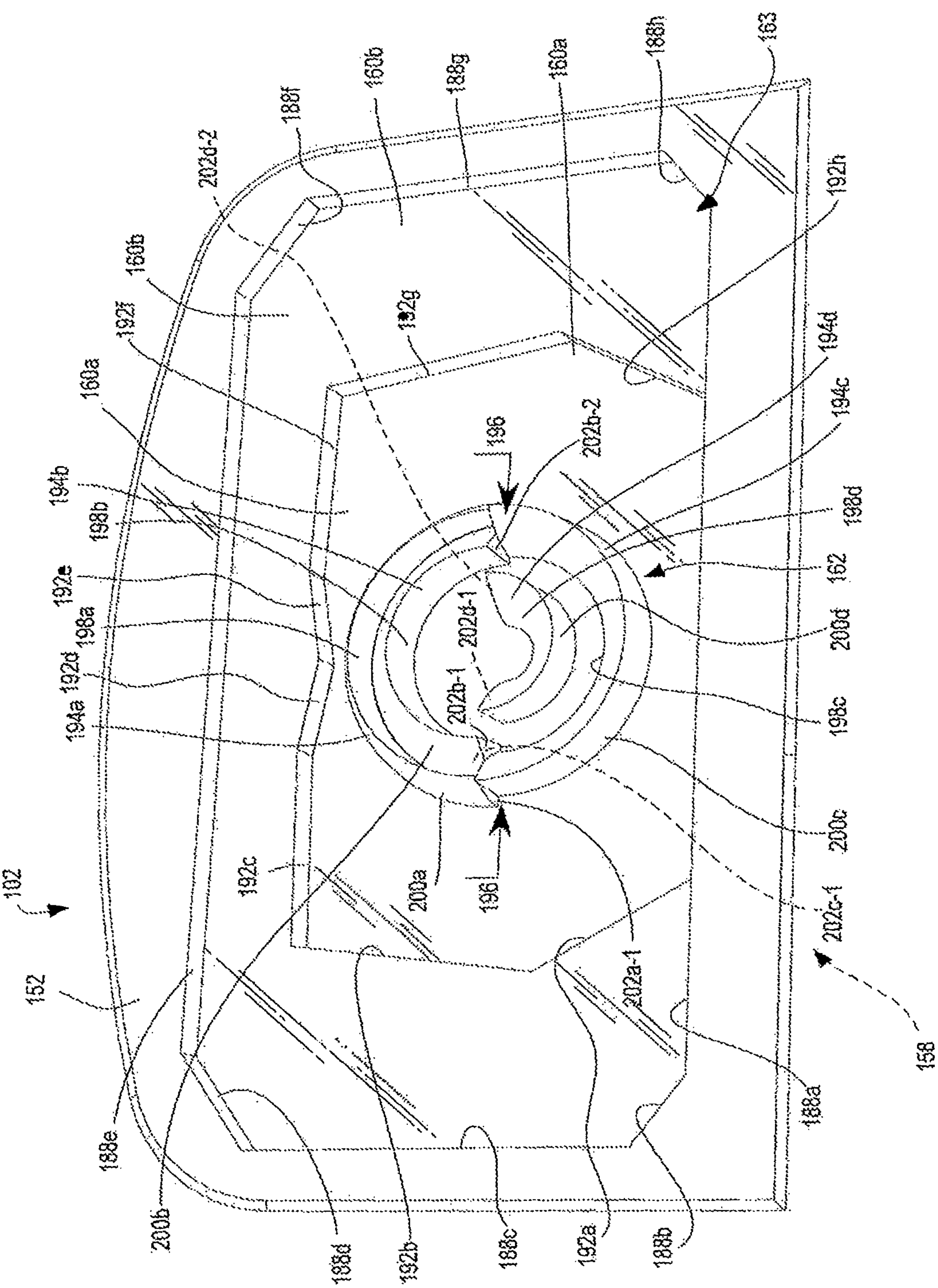
FIG. 14 is an isometric view from below of the waveguide body of FIG. 11.

The bottom surface 152 illustrated in FIGS. 13 and 14 is tray-shaped and includes the first and second depressed planar surfaces 160*a*, 160*b*. Second, outer depressed planar surface 160*b* has planar side surfaces 188*a*-188*h* disposed thereabout. An outer planar surface extends outwardly from and transverse to the side surfaces 188*a*-188*h*. The first depressed planar surface 160*a* is disposed within the second depressed planar surface 160*b* and is defined by planar side surfaces 192*a*-192*h*, 188*a* disposed thereabout. Planar side surface 188*a* comprises a side surface adjacent both the first and second depressed planar surfaces 160*a*, 160*b*.

Disposed within the first, inner depressed planar surface 160*a* are two sets of curved, partially or fully semi-circular, concentric or eccentric ridges 194*a*-194*d*, wherein each ridge terminates at a ridge meeting plane 196 that extends along lines 196-196 in FIGS. 13 and 14, parallel to the width (i.e., the x-dimension, as indicated in FIGS. 11 and 13) of the waveguide body 102. The ridge meeting plane 196 discussed below in describing the orientation of various waveguide body 102 features may instead be a particular line dividing the waveguide body 102, such line being substantially centered or offset from the center of the body 102 by a selected amount. The ridge meeting plane 196 is parallel to the coupling end surface 158. Alternatively, the ridges 194 may not terminate at a ridge meeting plane, but instead may terminate at ends that are spaced from one another.

The ridges 194*a*, 194*b* are disposed forward of the ridge meeting plane 196 while ridges 194*c*, 194*d* are disposed on a side of the ridge meeting plane 196 nearer the coupling end surface 158. Each ridge 194*a*-194*d* comprises an inner side surface 198*a*-198*d*, respectively, and an outer side surface 200*a*-200*d*, respectively. The ridge 194*a* is disposed outside and around the ridge 194*b*. More particularly, the outer ridge 194*a* is defined by the outer side surface 200*a*, which rises from the first depressed planar surface 160*a*. The ridge outer side surface 200*a* meets the ridge inner side surface 198*a* to form a wedge shape. The ridge inner side surface 198*a* is disposed adjacent the outer side surface 200*b* of the inner forward ridge 194*b*. Alternatively, the ridge inner side surface 198*a* may be adjacent the inner depressed planar surface 160*a* instead of abutting the outer side surface 200*b* of the inner forward ridge 194*b*. In such an embodiment, the inner forward ridge 194*b* has a diameter smaller than that shown in FIG. 14, and considerably smaller than outer forward ridge 194*a*. The outer side surface 200*b* meets the inner side surface 198*b* of the inner forward ridge 194*b* again to form a wedge shape. The inner side surface 198*b* of the inner forward ridge 194*b* then abuts the inner depressed planar surface 160*a*, as shown in FIG. 14.

The ridge 194*c* is disposed outside and around the ridge 194*d* nearer the coupling end surface 158 and in back of the ridge meeting plane 196. The back ridge 194*c* is defined by the outer side surface 200*c*, which rises from the first depressed planar surface 160*a*. The ridge outer side surface 200*c* meets the ridge inner side surface 198*c* to form a wedge shape. The ridge inner side surface 198*c* abuts the first depressed planar surface 160*a*. A portion of the first depressed planar surface 160*a* extends between the outer back ridge 194*c* and the inner back ridge 194*d*. The inner back ridge 194*d* is defined by the outer side surface 200*d*, which rises from the portion of the first depressed planar surface 160*a* extending between the outer and inner back ridges 194*c*, 194*d*. The outer side surface 200*d* meets the inner side surface 198*d* of the inner back ridge 194*d* to form a wedge shape. In the embodiment of FIGS. 13 and 14, the inner back ridge 194*d* has a diameter considerably smaller than that of the outer back ridge 194*c*, although the relative diameters thereof may be modified to achieve varying desired light distribution patterns.

Each of the ridges 194*a*-194*d* is curved in the width and length dimensions of the body 102 to form an arcuate ridge comprising a semi-circle about a central point on the first depressed planar surface 160*a*. In the embodiment of FIGS. 13 and 14 the semi-circular curved ridges 194*a*-194*d* form partial concentric circles. In alternate embodiments, the central point of one or more of the semi-circular curved ridges 194*a*-194*d* may be offset from the central point of one or more of the other semi-circular ridges 194*a*-194*d*. Thus, the curved ridges 194*a*-194*d* may be arranged in an eccentric pattern. In further alternate embodiments of the waveguide body 102, the curved ridges 194*a*-194*d* may be semi-elliptical, semi-parabolic, or another suitable arcuate or linear shape or combination of arcuate and/or linear shapes instead of semi-circular in shape.

As shown in FIG. 14, each of the curved ridges 194*a*-194*d* has two end surfaces 202*a*-1, 202*a*-2, 202*b*-1, 202*b*-2, 202*c*-1, 202*c*-2, 202*d*-1, 202*d*-2. Outer forward curved ridge 194*a*, inner forward curved ridge 194*b*, and outer back curved ridge 194*c* have end surfaces that are adjacent one another or, alternatively, meet such as to eliminate any interface therebetween. The end surface alignment is mirrored on left and right sides of the waveguide body, and hence, only one side will be described herein. The end surface 202*a*-1 of the outer forward ridge 194*a* is parallel with and adjacent the end surface 202*b*-1 of the inner forward ridge 194*b*. The end surface 202*c*-1 of the outer back ridge 194*c* faces and partially abuts the end surfaces 202*a*-1, 202*b*-1. The end surface 202*d*-1 of the inner back ridge 194*d* does not abut or conjoin with another end surface.

In any of the embodiments described herein, any sharp corner may be rounded and have a radius of curvature of less than 0.6 mm. The geometry of the redirection features and reflection features may be altered to manipulate the illumination pattern produced by the waveguide body 102. Additionally, the redirection features may have the same or similar shapes as the reflection features, but may differ in size.

Figure 12A:
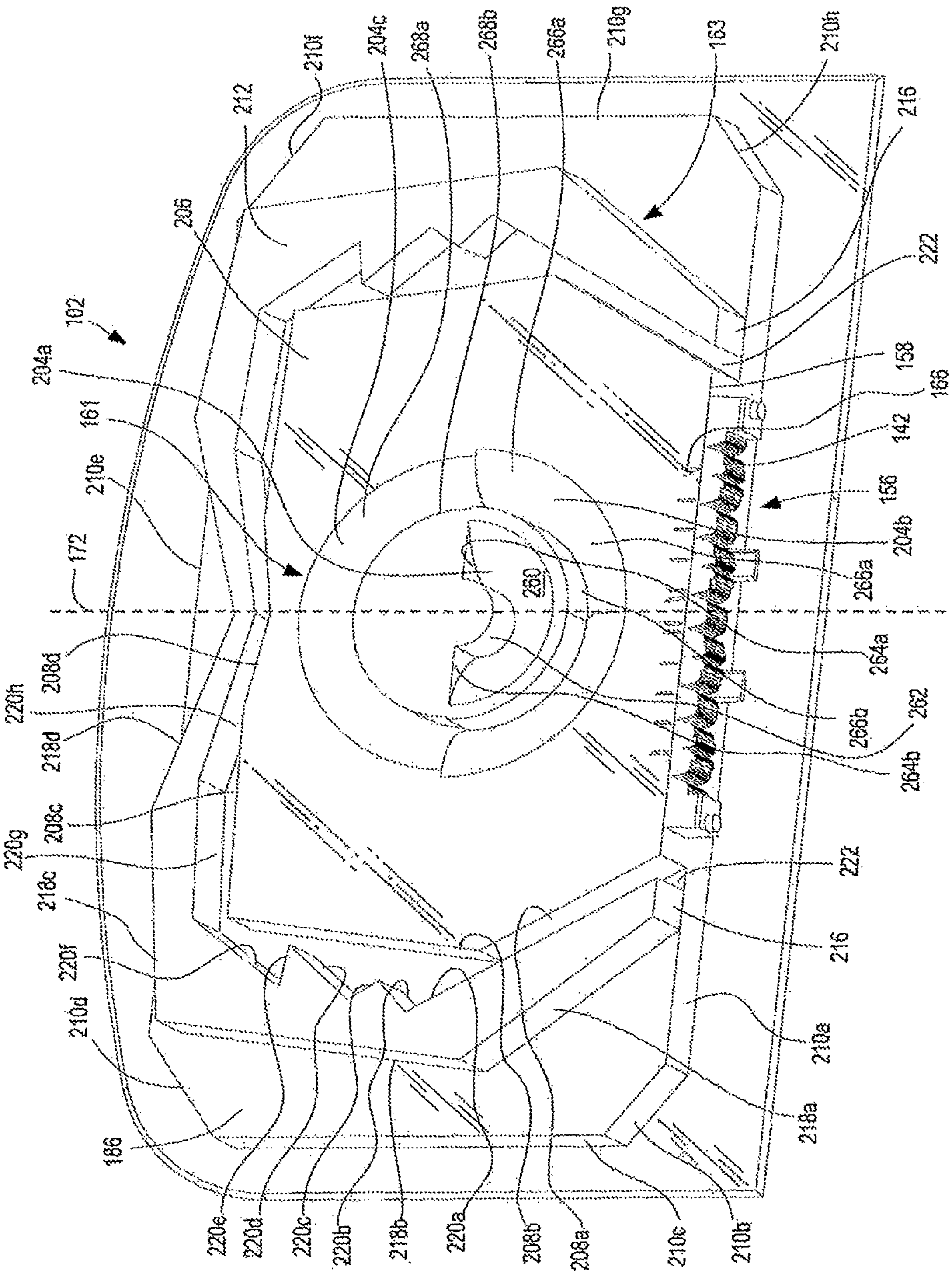
FIG. 12A is an isometric view from above-back of the waveguide body of FIG. 11.
Figure 12B:
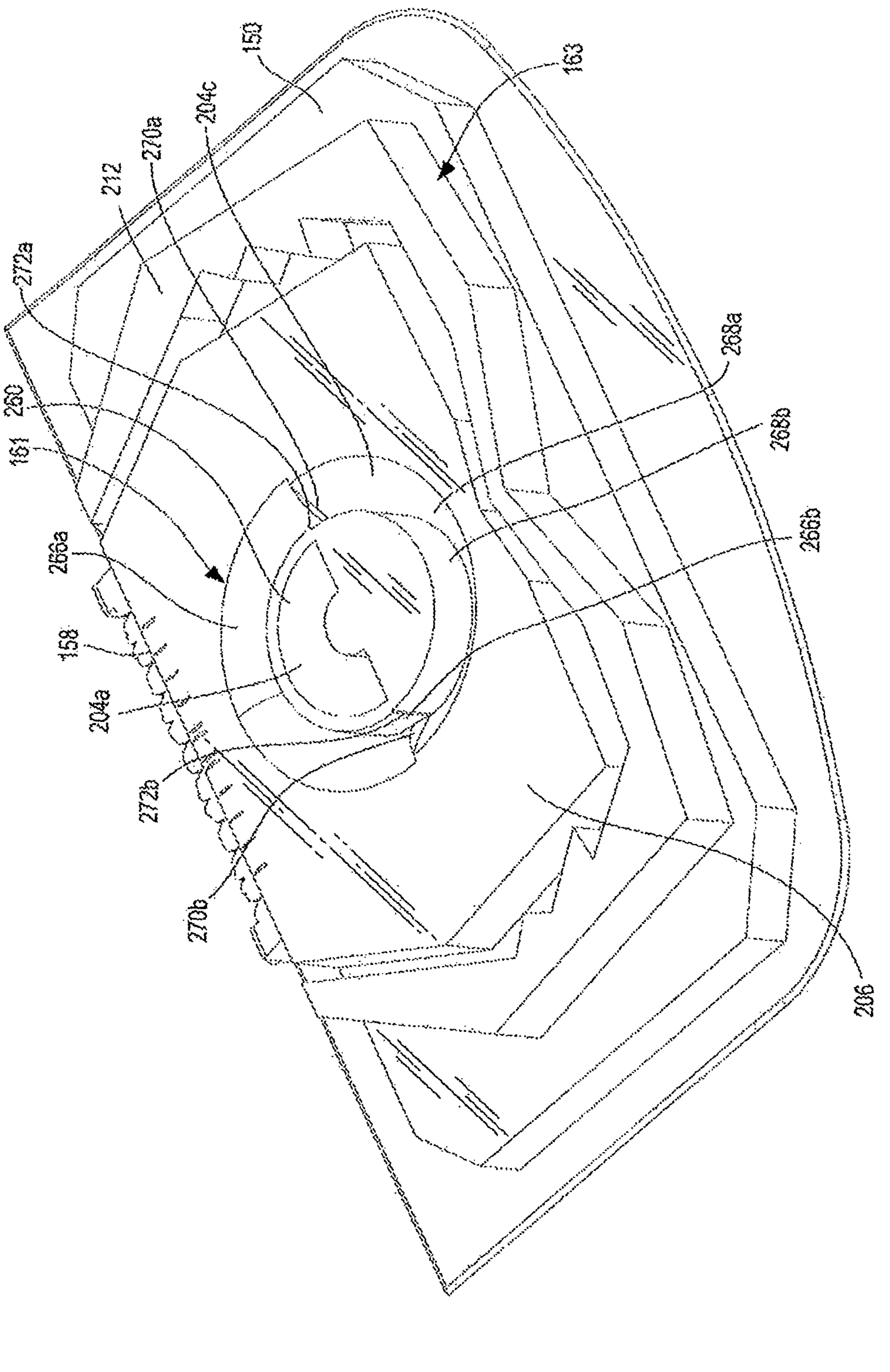
FIG. 12B is an isometric view from above-front of the waveguide body of FIG. 11.

Referring to FIGS. 11, 12A, and 12B, the outboard portion 186 of the upper surface 150 comprises first, second, and third arcuate redirection features 204*a*, 204*b* disposed within a raised interior transmission portion 206 itself having eight sidewalls 208*a*-208*h*. The eight sidewalls 208*a*-208*h* define the perimeter of the raised interior transmission portion 206 in conjunction with the coupling end surface 158. The interior transmission portion 206 is preferably (although not necessarily) symmetric about the center line 172. The interior transmission section 206 is disposed on the outboard portion 186 of the upper surface 150 such that the coupling end surface 158 of the interior transmission portion 206 is conjoined with side wall 210*a* defining a part of the outboard portion 186. Sidewall 210*a* along with sidewalls 210*b*-210*h* define the perimeter of the outboard portion 186.

As depicted in FIGS. 11, 12A, and 12B, further disposed on the outboard portion 186 is a recycling feature 212. The recycling feature 212 has two branches 214*a*, 214*b* arranged symmetrically about the interior transmission portion 206. The branches 214*a*, 214*b* are mirror images of one another on left and right sides of the center line 172, and hence, only the branch 214*a* will be described in detail herein. The branch 214*a* is defined by end surface 216. The end surface 216 is parallel and in the same plane as the sidewall 210*a* of the outboard portion 186. The recycling feature branch 214*a* has four outer sidewalls 218*a*-218*d* sequentially arranged at obtuse angles between each outer sidewall and the next. The outer sidewall 218*d* abuts the mirror image outer sidewall of the recycling feature branch 214*b* on a right side of the interior transmission portion 206. The outer sidewall 218*d* and the mirror image counterpart thereof meet proximal the center line 172 to form a v-shaped, indented light re-directing feature.

Still referring to FIGS. 11, 12A, and 12B, the branch 214*a* has eight inner side walls 220*a*-220*h* that are sequentially arranged in abutment one to the next from the end surface 216. The inner sidewalls 220*b* and 220*c* abut one another at an obtuse angle to create a wedge-shaped light re-directing feature. Further, the inner sidewalls 220*d* and 220*e* abut at an acute angle to former a relatively sharper wedge-shaped light re-directing feature. Further, the inner sidewall 220*e* abuts the inner sidewall 220*f* at an acute angle to form a v-shaped, indented light re-directing feature. The inner surface 220*h* meets a mirror image counterpart thereof proximal the centerline 172 of the waveguide body 102 to form a further wedge-shaped light re-directing feature having a relatively less sharp angle. In other embodiments, features and sidewalls may be identical, similar, and/or different from other sections and sidewalls, and the angles therebetween may be customized to suit a particular application and/or achieve desired illumination patterns.

The recycling feature 212 at least partially surrounds the interior transmission portion 206, but the sidewalls thereof do not abut the interior portion 206. Thus, an interior planar portion 222 of the outboard portion 186 is defined by the inner sidewalls 220*a*-220*h* as well as the sidewalls 208*a*-208*h* of the interior transmission portion 206. This interior planar portion 222 of the outboard portion 186 also at least partially surrounds the interior transmission portion 206. Light that enters the waveguide body 102 through the plurality of coupling cavities 142 along the coupling end surface 158 may be totally internally reflected by the sidewalls 208*a*-208*h* of the interior transmission portion 206 before approaching the arcuate redirection features 204*a*, 204*b*, 204*c*. However, as a matter of course, some light is not totally internally reflected and instead escapes laterally from the interior transmission portion 206. This escaped light may be totally internally reflected by one or more of the inner and outer sidewalls 220*a*-220*h*, 218*a*-218*d* of the recycling feature 212. The escaped light is redirected by total internal reflection off these surfaces back towards the interior transmission portion 206 for eventual extraction by the features thereof.

Referring to FIGS. 11, 12A, 12B, 17, 18, 22A, and 22B, the first redirection feature 204*a* is defined by four sidewalls 260, 262, 264*a*, 264*b*. The first sidewall 260 partially defines the extent of the first redirection feature 204*a*. The sidewall 260 comprises an arcuate surface curved in the length, width, and thickness dimensions (see FIGS. 18, 22A, and 22B). Further the sidewall 262 is straight in the thickness dimension but curved in the width and length dimensions to form a semi-circle as described above such that the central point thereof is coincident with the central point of the outer perimeter of the first sidewall 260. The first and second sidewalls 260, 262 may be concentric, or may be offset from one another. The sidewalls 264*a*, 264*b* define end surfaces of the overall indentation into the top surface 150 formed by the first redirection feature 204*a*. These sidewalls 264*a*, 264*b* may be straight in the length and width dimensions while being curved in the thickness dimension as shown in FIGS. 12A and 12B or instead may be curved in more than one dimension.

Referring still to FIGS. 11, 12A, 12B, 18, 22A, and 22B, the second redirection feature 204*b* is defined by two sidewalls 266*a*, 266*b*. The first sidewall 266*a* comprises an arcuate surface curved in the length, width, and thickness dimensions (see FIGS. 18, 22A, and 22B) and partially defines the extent of the second redirection feature 204*b*. Further sidewall 266*b* is straight in the thickness dimension but curved in the width and length dimensions as noted above to form a semi-circle such that the central point thereof is the same as the central point of the outer perimeter of the first sidewall 266*a* of the second redirection feature 204*b*. Like the first redirection feature 204*a*, the sidewalls 266*a*, 266*b* define generally an indentation into the top surface 150 of the waveguide body 102 and may be curved in one or more dimensions.

Still with reference to FIGS. 11, 12A, 12B, 18, 22A, and 22B, the third redirection feature 204*c* has an orientation opposite the first and second redirection features 204*a*, 204*b*. The third redirection feature 204*c* is defined by six sidewalls 268*a*, 268*b*, 270*a*, 270*b*, 272*a*, 272*b*. Similar to the arrangement of sidewalls 260, 266*a* of the previous two described redirection features, first sidewall 268*a* of the third redirection feature 204*c* is curved the length, width, and thickness dimensions (see FIGS. 18, 22A, and 22B). Further sidewall 268*b* is vertically straight in the thickness dimension but curved in the width and length dimensions to form a semi-circle as described above such that the central point thereof is coincident with the central point of the outer the first sidewall 268*a* of the third redirection feature 204*c*.

Referring now specifically to FIG. 12B, the reflection and redirection features 161 formed by the second and third extraction features 204*b*, 204*c* abut one another and form a continuous circular indentation in the top surface 150 of the waveguide body 102. However, the sidewalls 270*a*, 270*b*, 272*a*, 272*b* define a difference in depth (i.e., along the thickness dimension) between the second and third redirection features 204*b*, 204*c*. The outer sidewalls 270*a*, 270*b* face the coupling end surface 158. The sidewalls 266*b*, 268*b* have slightly different radii of curvature, with the surface 266*b* having a slightly greater radius of curvature than the surface 268*b*, resulting in the inner sidewalls 272*a*, 272*b* in the embodiment shown in FIGS. 12A and 12B being relatively small in side-to-side extent. However, the sidewalls 270*a*, 270*b*, 272*a*, 272*b*, may extend to a lesser or greater extent into the volume of the indentations formed by the second and third redirection features 204*b*, 204*c* to provide more or less definition between the two features so as to achieve desired illumination patterns.

Figure 17:
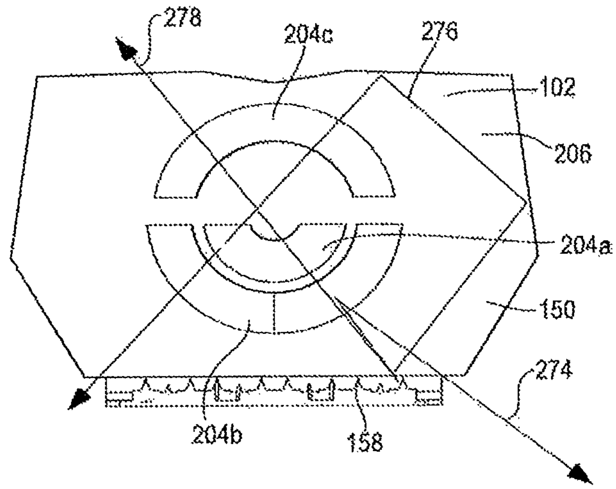
FIG. 17 is a plan view diagram depicting light rays traveling through a portion of a waveguide body.

Referring now to FIGS. 17, 18, 19, 20, and 21, ray trace diagrams depict how light may travel through the waveguide body 102 from the light coupling cavities 142. In FIG. 17, light that enters through the coupling cavities 142 is transmitted through the interior transmission section 206 by total internal reflection off of the sidewalls 208*a*-208*h*. Through this total internal reflection of light through the interior transmission portion 206, a portion of light rays 274 are supplied with a directional component opposite that of the light rays entering the waveguide body 102 at the coupling cavities 142. This allows some light to impinge on the redirection feature 204*c* from an angle that approaches an extracting surface of the sidewall 268*b*. However, another portion of light rays 274 is not transmitted about the interior transmission portion 206, but instead directly impinges incident on redirection sidewalls 260, 266*a* of the first and second redirection features 204*a*, 204*b*. The extraction portion 163 extracts light rays by changing directions of light rays through the combination of top and bottom features

161, 162. This aspect assists in light/color mixing of different color light from BSY and Red-Orange (RDO) LED elements 136*a*, 136*b* by dispersing light rays in individually different directions, relative to the entrance trajectory of light through the coupling cavities 142, by total internal reflection off of pairs of curved surfaces in the redirection and reflection features 161 and the extraction and refraction features 162.

From the foregoing, and as is evident by an inspection of the FIGS., the redirection and reflection features 161 are disposed in a first (i.e., upper) thickness portion of the body 102, whereas the extraction and refraction features 162 are disposed in a second (i.e., lower) thickness portion of the body 102. The first and second thickness portion may be distinct (as illustrated) or not distinct.

Figure 18:
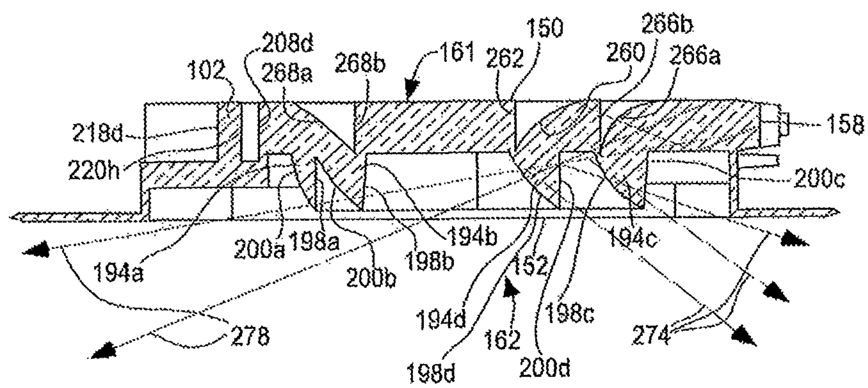
FIG. 18 is a cross-sectional view taken generally along the lines 18-18 indicated in FIG. 11.

FIG. 18 depicts the interaction between the surfaces of the bottom refraction and extraction features 162 and the reflection surfaces of the arcuate redirection and reflection features 161 on the top surface 150. As an example, light rays 274 entering through the coupling cavities 142 totally internally reflect off of the reflection sidewalls 260, 266*a*, of the redirection features 204*a*, 204*b*. Further in the illustrated example, the reflected light is incident on the curved reflection sidewalls 198*c*, 198*d*. The reflected light exits the waveguide body 102 through the bottom emission surface 152 at an angle back towards the coupling end surface 158 with a directional component opposite the general direction of light entering the waveguide body 102.

Figure 19:
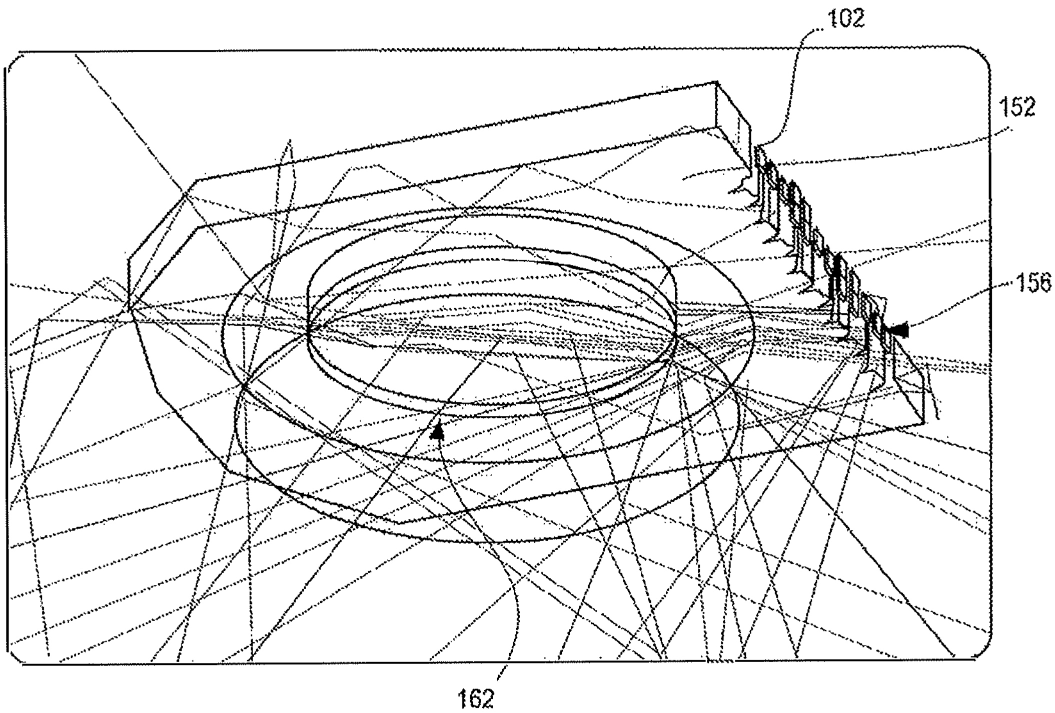
FIG. 19 is an isometric view from above of a ray trace diagram of a portion of a waveguide body.
Figure 20:
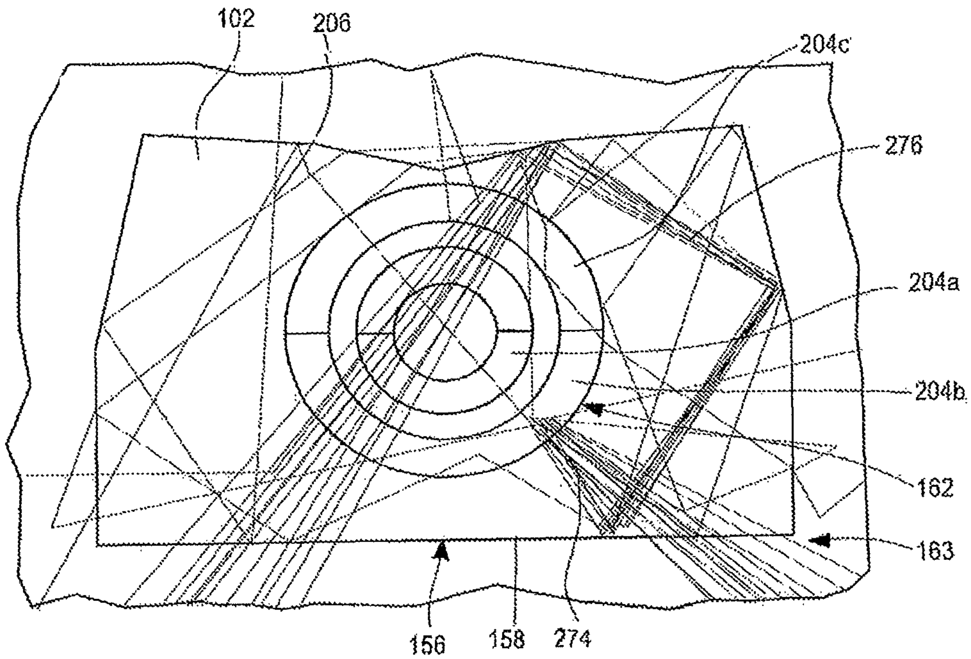
FIG. 20 is a plan view from above of a ray trace diagram of a portion of a waveguide body.
Figure 21:
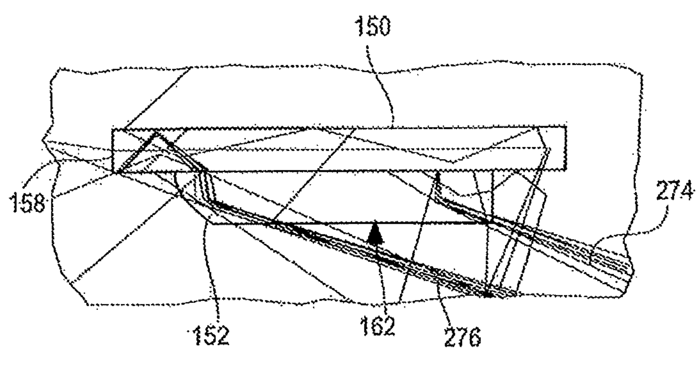
FIG. 21 is a side elevational view of the ray trace diagram of FIG. 20.

With further reference to FIG. 19, some light rays are not totally internally reflected by the top surface redirection features 204*a*, 204*b*. Instead, another portion of light rays 278 are transmitted through the interior transmission portion 206 until directly impinging on the sidewalls 198*c*, 198*d*, 200*c*, 200*d* of the curved ridges 194*c*, 194*d*. For this portion of light rays 278, the sidewalls 198*c*, 198*d*, 200*c*, 200*d* extract the light by refracting the light out of the bottom emission surface 152. The light rays 278 refracted out by the refraction and extraction features 162 of the bottom surface 152 are emitted at an angle forward and away from the coupling end surface 158 with a directional component along the general direction of light entering the waveguide body 102. In this capacity the refraction and extraction features 162 comprising curved ridges 194*a*, 194*d* perform extraction and refraction of light rays. Likewise, some light rays are transmitted through the interior transmission portion 206, perhaps reflecting on the sidewalls 208*a*-208*h* thereof or the sidewalls 220*a*-220*h*, 218*a*-218*d* of the recycling feature before impinging on the sidewalls 198*a*, 198*b*, 200*a*, 200*b* of the curved ridges 194*a*, 194*b*. For this portion of light rays, the sidewalls 198*a*, 198*b*, 200*a*, 200*b* extract the light by refracting the light out of the bottom, emission surface 152 at an emission angle forward and away from the coupling end surface 158 with a directional component along the general direction of light entering the waveguide body 102. Light rays may simply exit the waveguide body 102, or may exit and reenter the waveguide one or more times before finally exiting the waveguide body 102.

The various portions of light are extracted to produce an overall or cumulative desired illumination pattern. The configuration of the light refraction and extraction features 162, the light redirection features 204*a*, 204*b*, 204*c*, and the light redirecting sidewalls directs substantially all of the light out of the bottom surface 152 of the waveguide body 102. In alternative embodiments, additional subsets of LEDs elements 136 may be coupled into additional portions of the waveguide body 102 to be redirected, reflected, and extracted, or redirected to be extracted in a different portion of the waveguide body 102, or directly refracted without reflection and extracted to produce a composite or cumulative desired illumination pattern.

Figure 22A:
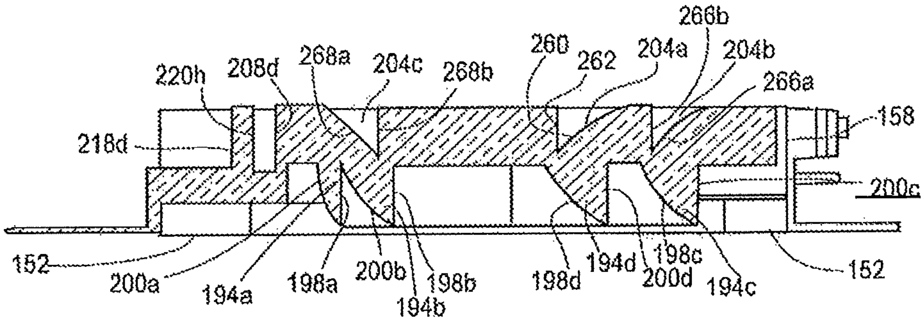
FIGS. 22A and 22B are cross-sectional views of embodiments of a waveguide body taken along lines corresponding to lines 18-18 of FIG. 11.
Figure 22B:
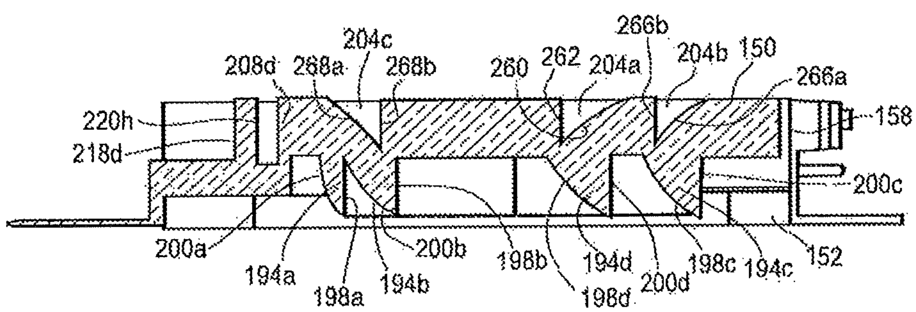

FIGS. 22A and 22B depict a cross-sectional view of the waveguide body shown in FIG. 11 taken from the center of the waveguide body 102 along the y-dimension at the line 18-18. FIG. 22A depicts a cross-sectional view taken along the same plane as FIG. 22B, but illustrates an embodiment having less optical material of the waveguide body 102 separating the surfaces of redirection features disposed on the top surface 150 and the curved bottom light refraction and extraction features 162. The thickness of material separating the top and bottom features may modify the angles at which light rays are refracted and/or reflected from the waveguide body 102 and emitted from the bottom surface 152.

Referring now to FIG. 23, an embodiment of the waveguide body 102 similar to that depicted in FIGS. 11-14 is shown. The embodiment of FIG. 23 has the top and bottom surfaces 150, 152 comprising identical or similar extraction, reflection, recycling, and other features and dimensions to the embodiment of the waveguide body 102 shown in FIGS. 11-14. However, the various features common to the waveguide body 102 shown in FIGS. 11-14 may instead be formed with the plurality of coupling cavities 142 having the parabolic entrance geometry as discussed herein. FIG. 24 shows a detailed view of a portion of the plurality of coupling cavities 142 having the parabolic entrance geometry. In contrast, FIG. 25 depicts an embodiment of the plurality of coupling cavities 142 wherein the coupling cavities 142 comprise the wedge-shaped geometry shown in the waveguide body 102 embodiment of FIGS. 11 and 12. Furthermore, the embodiments of the waveguide body 102 depicted in FIGS. 23-25 include the facets 166*a*-166*e*.

Figure 26A:
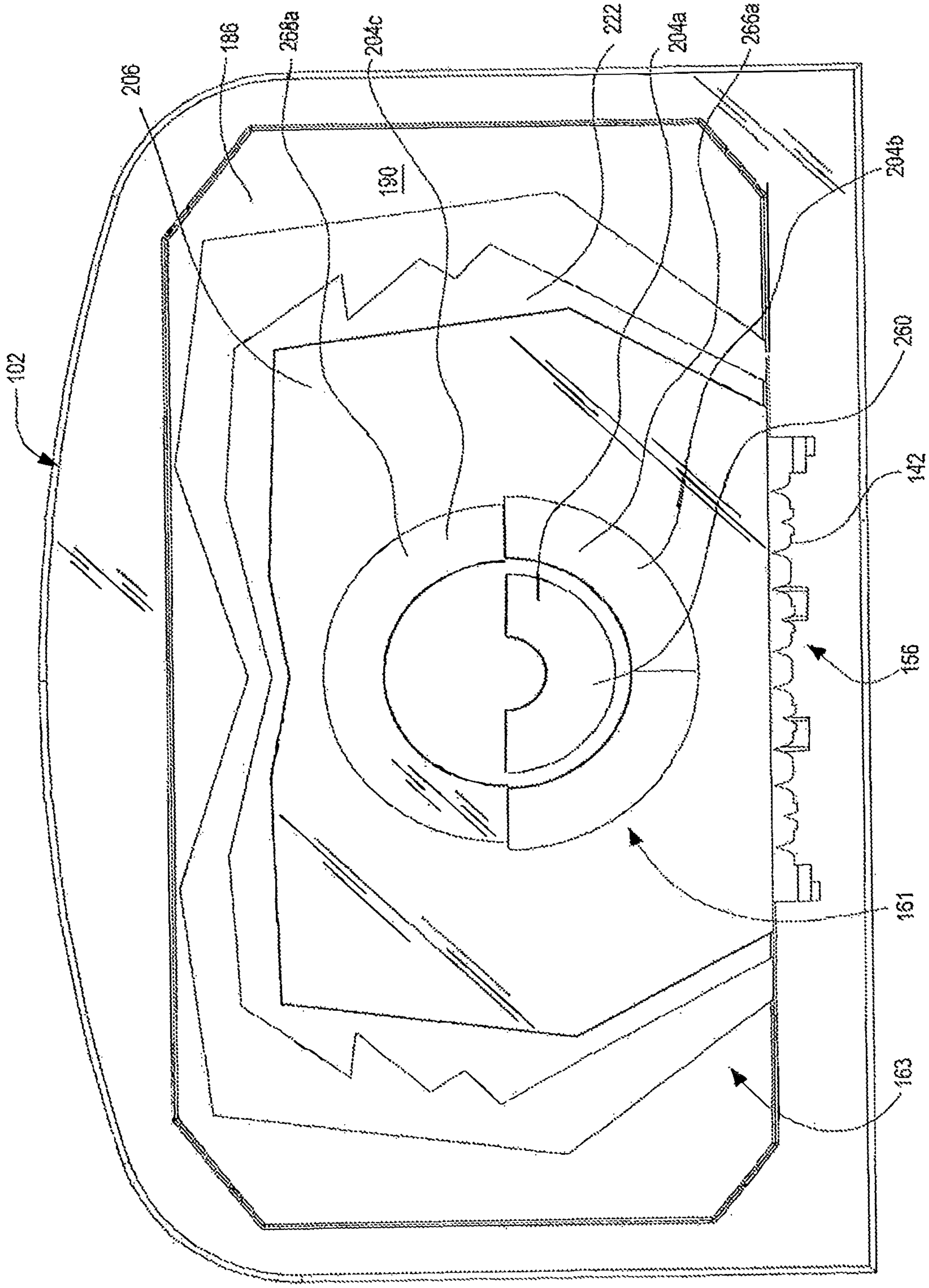
FIG. 26A is a plan view of an alternate embodiment of the waveguide body of FIG. 11.
Figure 26B:
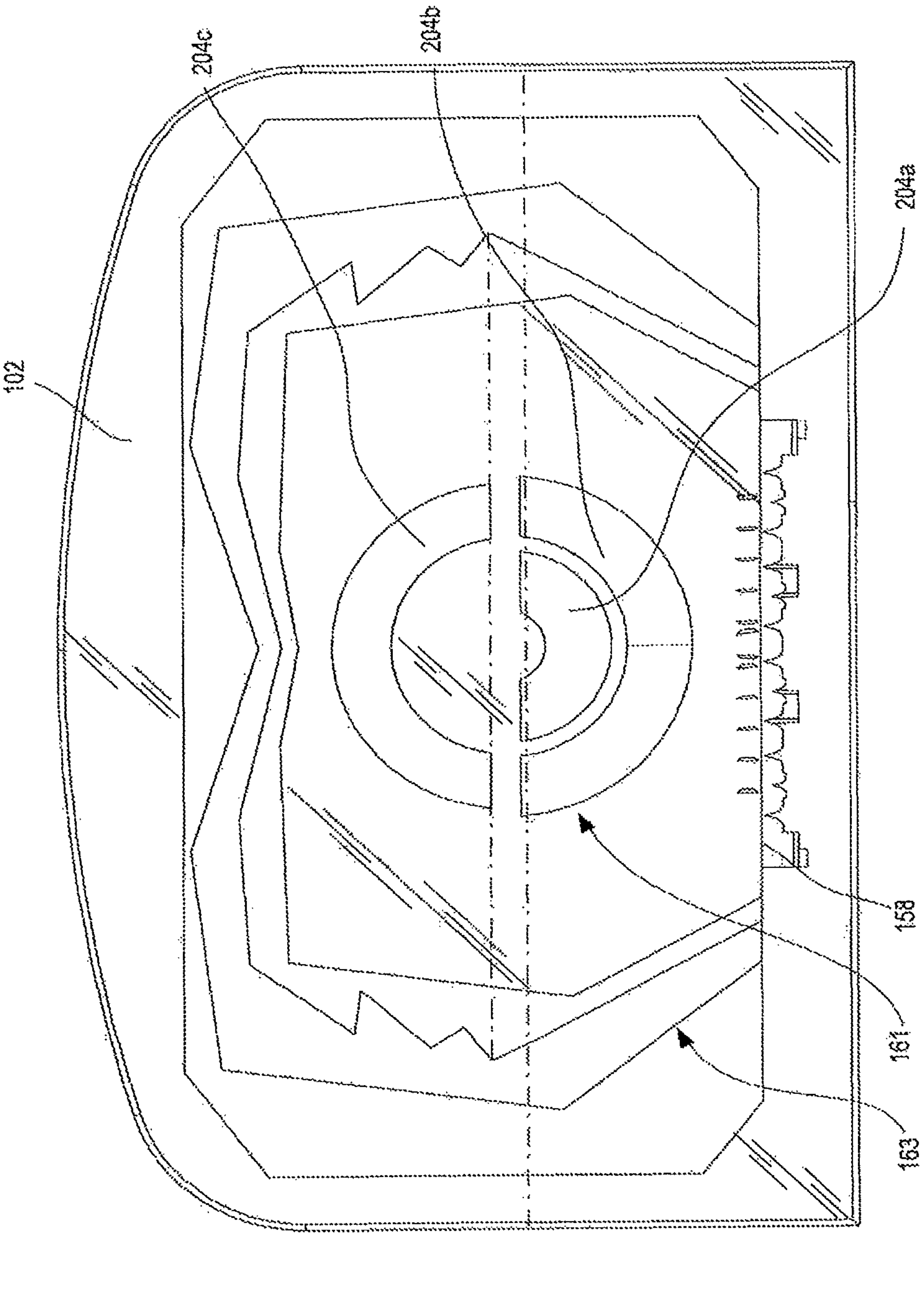
FIG. 26B is a plan view of an alternate embodiment of the waveguide body of FIG. 11.

Referring now to FIG. 26A, an alternate embodiment of the waveguide body 102 is shown. In this embodiment, the facets 166 of the embodiments depicted in FIGS. 11-14 and 23-25 are omitted. This embodiment relies on the geometry of the coupling cavities 142 and the internal operation of the light extraction, redirection, refraction, and reflection surfaces to achieve suitable light/color mixing. Further alternate embodiment shown in FIG. 26B includes a gap between the back redirection features 204*a*, 204*b* and the front redirection feature 204*c*.

Figure 27A:
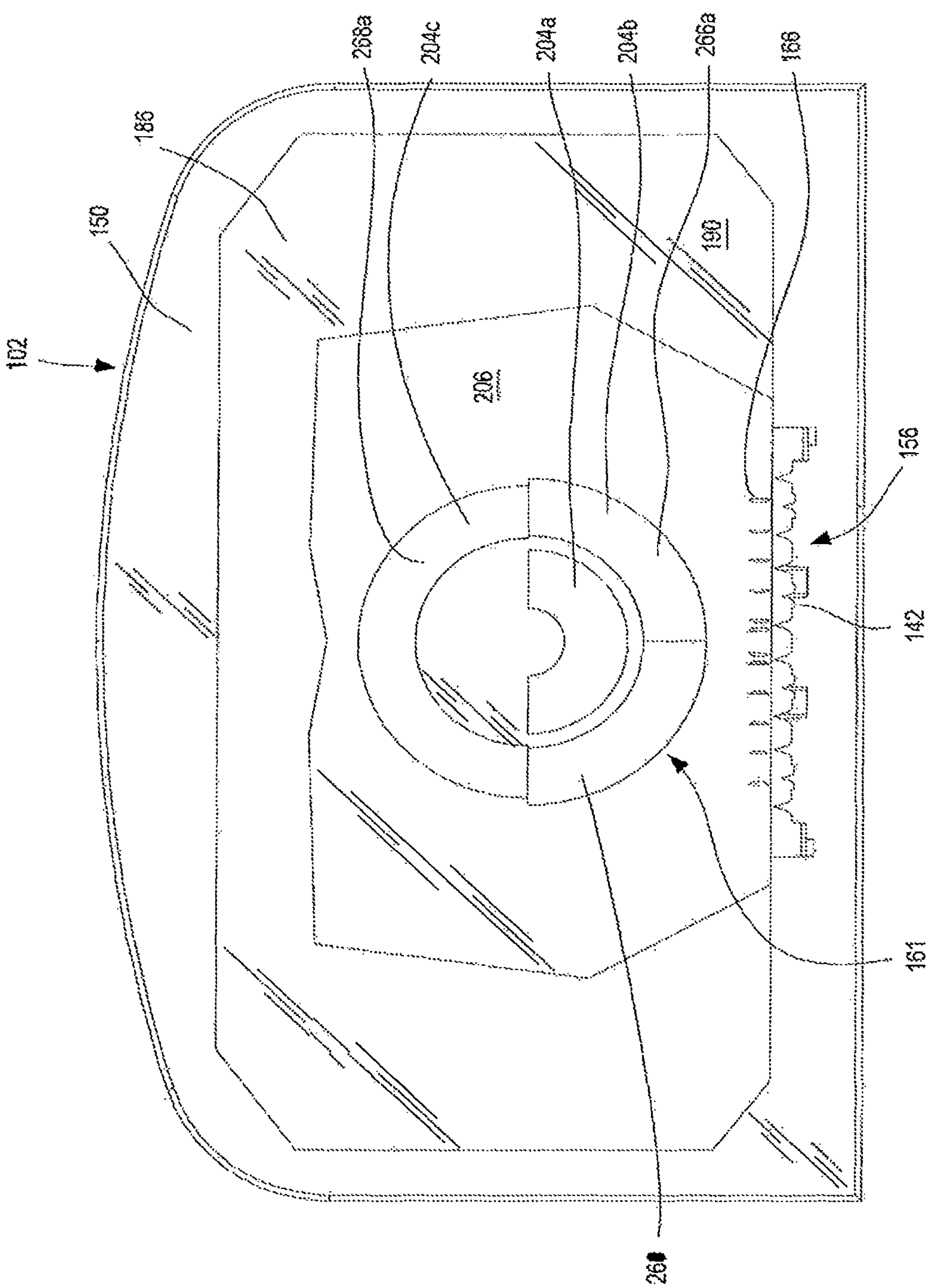
FIG. 27A is a plan view of an alternate embodiment of the waveguide body of FIG. 11.
Figure 27B:
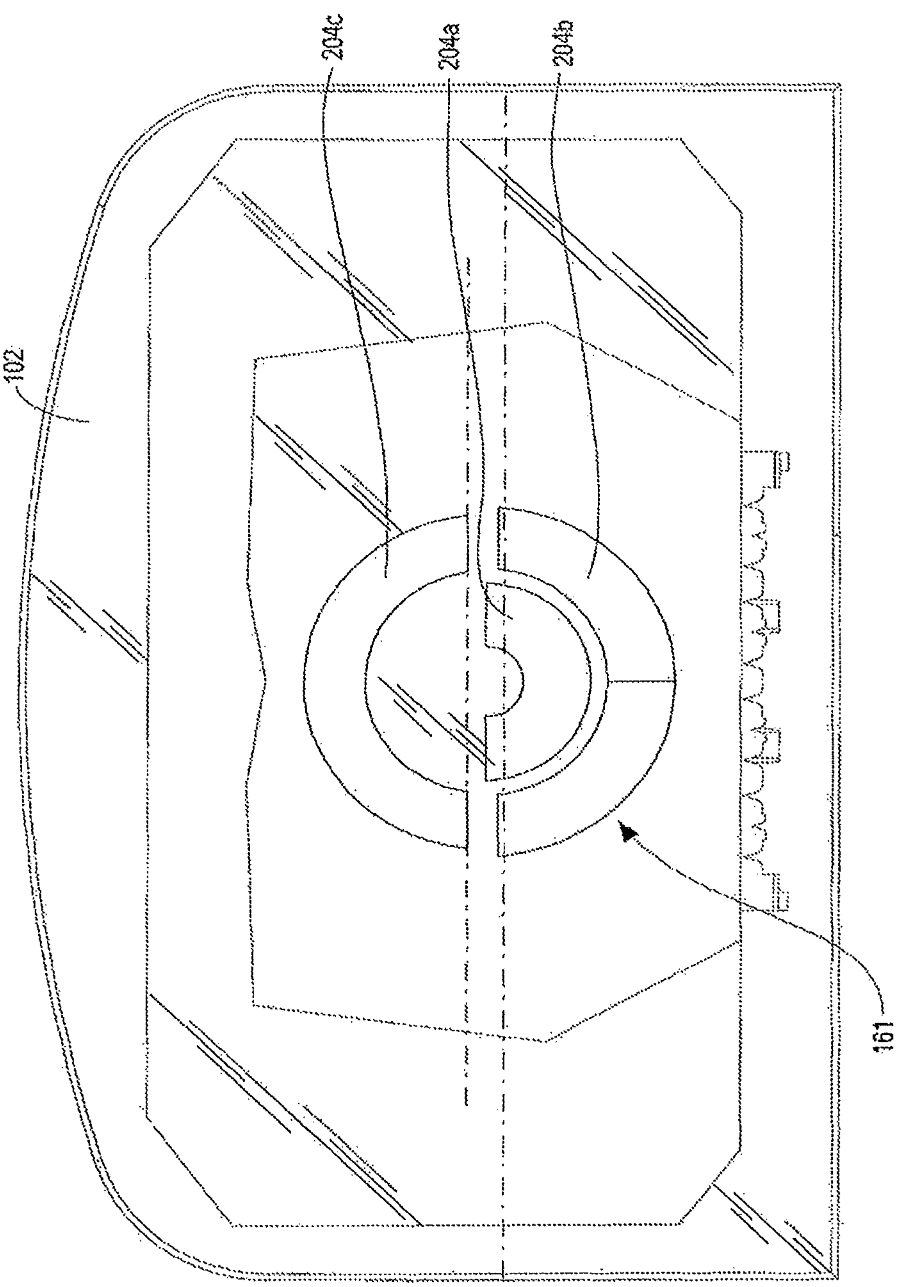
FIG. 27B is a plan view of an alternate embodiment of the waveguide body of FIG. 11.
Figure 28:
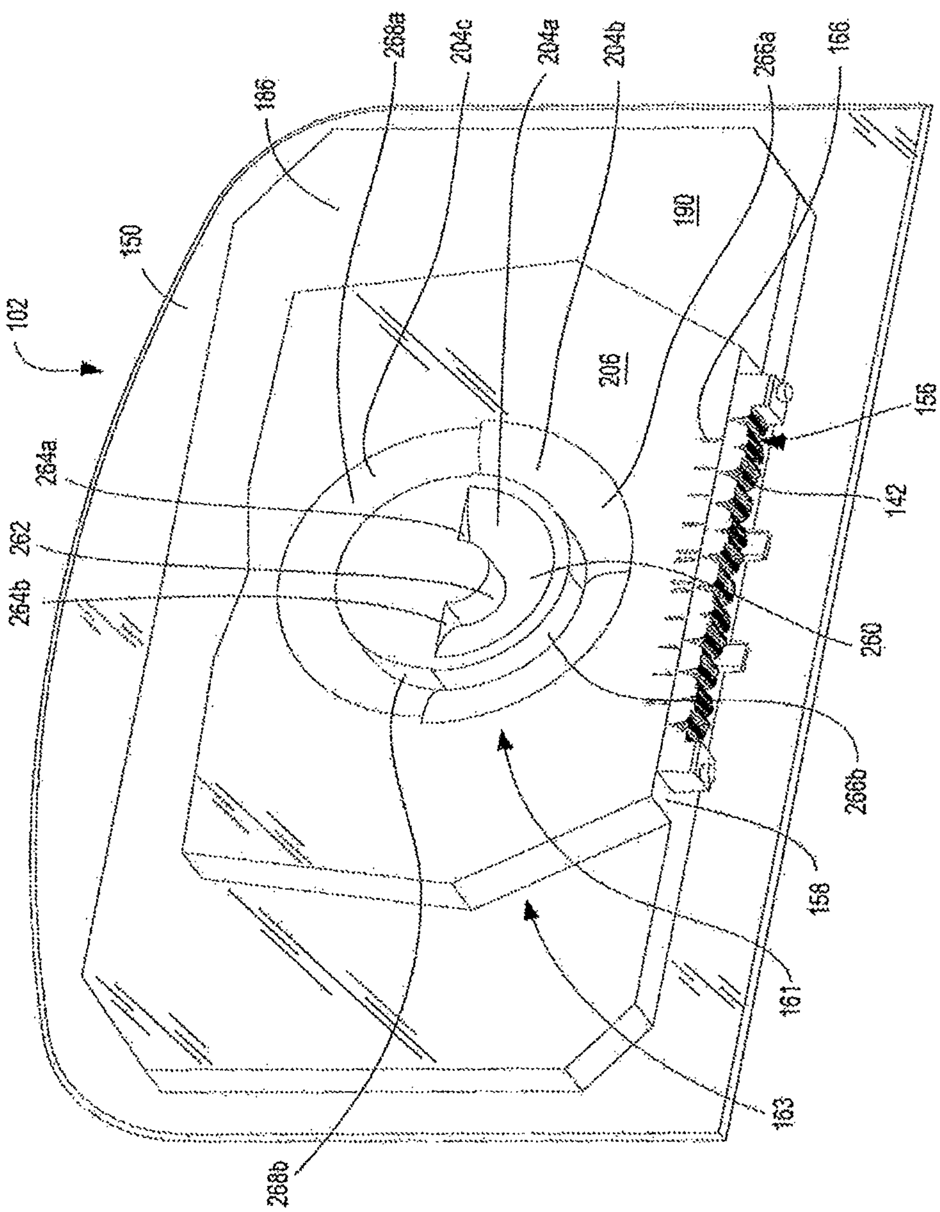
FIG. 28 is an isometric view from above of the waveguide body of FIG. 27A.
Figure 29:
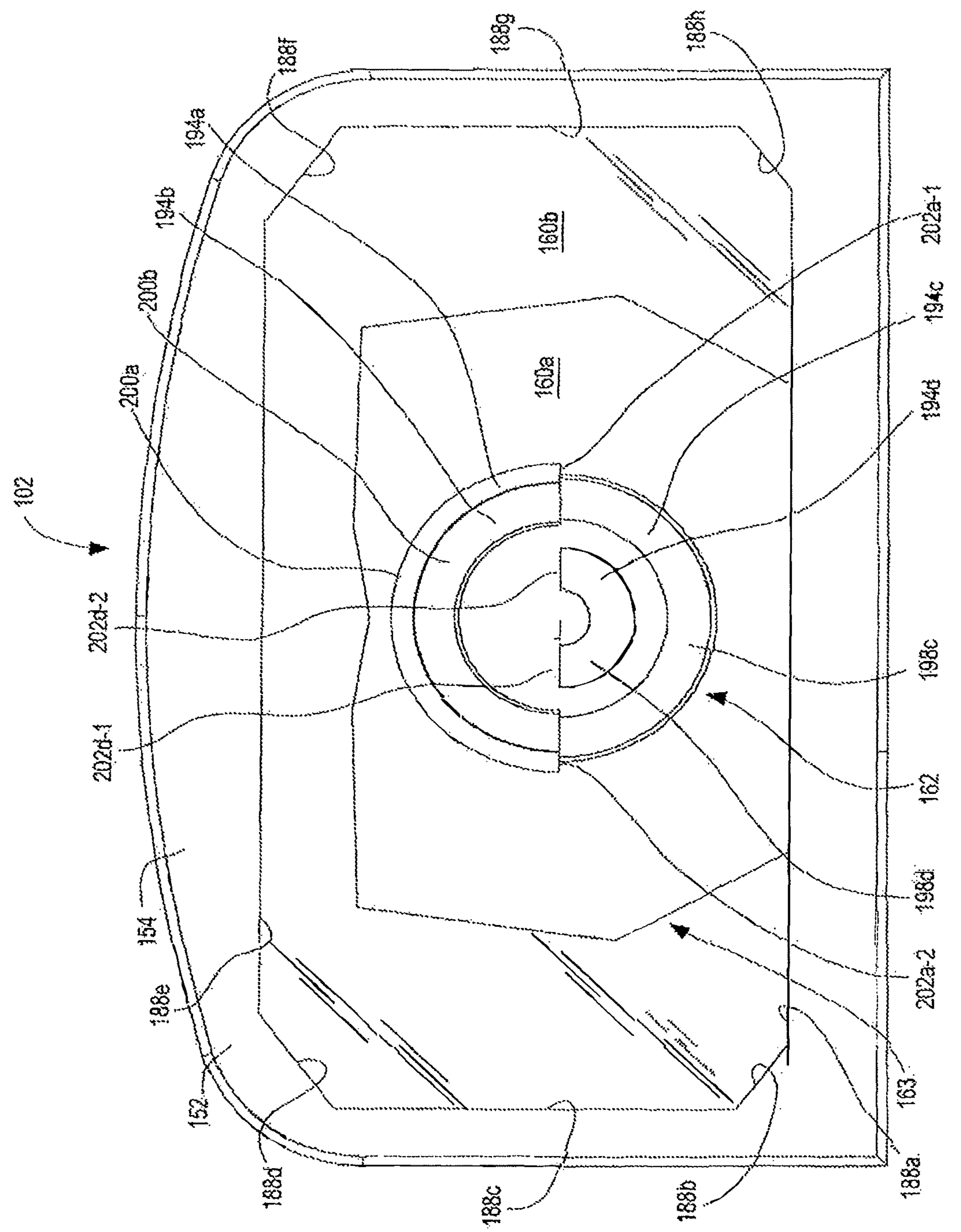
FIG. 29 is a bottom elevational view of the waveguide body of FIG. 27A.
Figure 30:
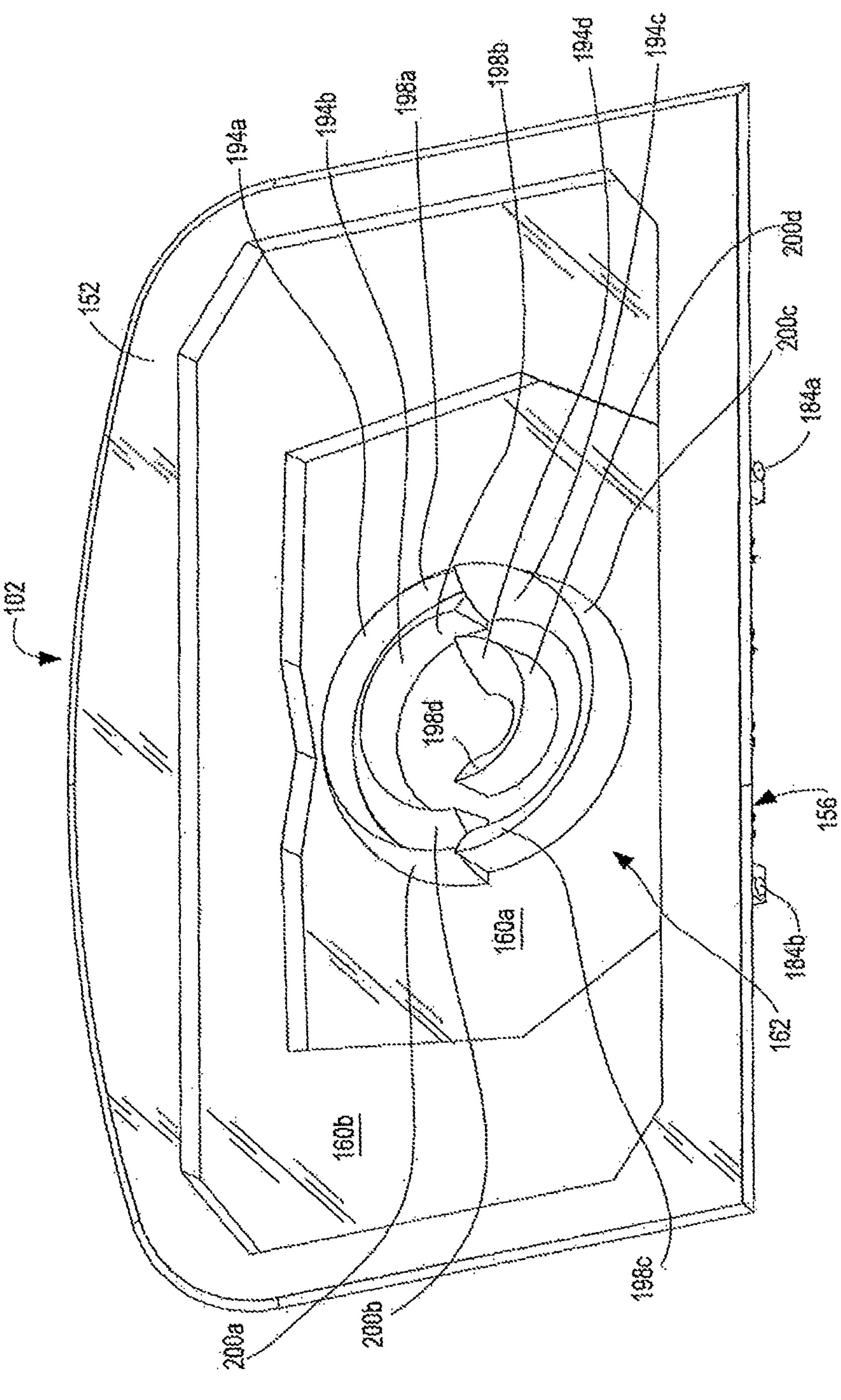
FIG. 30 is an isometric view from below of the waveguide body of FIG. 27A.

Referring next to FIGS. 27A-30, a further alternate embodiment of the waveguide body 102 is shown. In this embodiment, the facets 166 are included near the plurality of coupling cavities 142 and proximal the coupling end surface 158 for the purpose of light/color mixing within the waveguide body 102. However, the recycling feature 212 is omitted. As seen in FIGS. 27A and 28, the interior planar portion 222 of the outboard portion 186 is not delineated by the inner sidewalls 220*a*-220*h* of each recycling feature branch 214*a*, 214*b*. Instead, a planar surface 190 of the outboard portion 186 is defined by the sidewalls 210*a*-210*h* of the outboard portion 186 and further by the sidewalls 208*a*-208*h* of the interior transmission portion 206. Alternate embodiments of the waveguide body 102 with the recycling feature 212 omitted therefrom may include the facets 166 as depicted in FIGS. 27A and 28 or may instead also have the facets 166 omitted. Regardless of whether the recycling feature 212 and/or the facets 166 are omitted, the features of the bottom surface 152 seen in FIGS. 29 and 30 are similar or identical to the features of the bottom surface 152 described with reference to FIGS. 13 and 14 hereinabove. The alternate embodiment shown in FIG. 27B includes a gap between the back redirection features 204*a*,

204*b* and the front redirection features 204*c*. Further in this embodiment, the redirection feature 204*a* is offset with respect to the other redirection features 204*b*, 204*c*.

FIGS. 31-34 depict another alternate embodiment of the waveguide body 102 having modified features on the top surface 150. In this embodiment, additional material is added in and around the interior transmission portion 206 and the recycling feature 212. The branches 214*a*, 214*b* of the recycling feature 212 are merged with the interior transmission portion 206. This configuration is provided by shortening or omitting a portion of the interior planar portion 222 of the outboard portion 186 such that the coupling end surface 158 is conjoined with the end surface 216 of the recycling feature 212. This modification provides an additional sidewall 224 that defines the interior planar portion 212 nearer the coupling end surface 158. While the interior planar portion 222 does not fully separate the recycling feature 212 from the interior transmission portion 206, the interior planar portion 222 is now separated into identical left and right interior planar portions 222*a*, 222*b*. A connecting section 226 proximal the center line 172 of the waveguide body 102 is disposed between the interior planar portions 222*a*, 222*b*. The connecting section 226 provides an additional sidewall 228 to further define the interior planar portion 222*a*. The additional sidewalls 224 and 228 that further define the interior planar portion 222*a* have substantially identical mirror image counterparts on the opposite side of the center line 172 defining the interior planar portion 222*b*.

Figure 31:
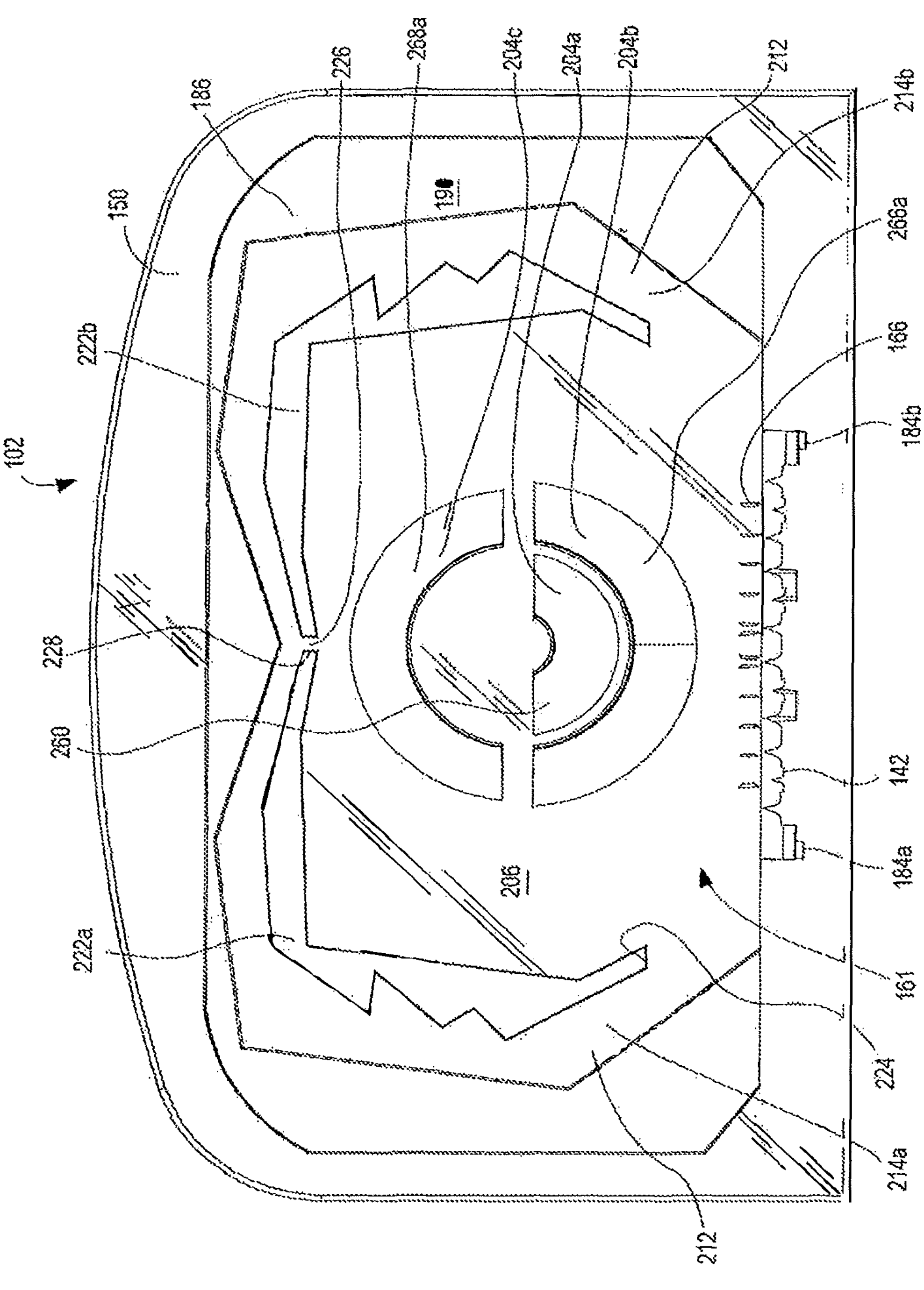
FIG. 31 is a plan view of an alternate embodiment of the waveguide body of FIG. 11.
Figure 32:
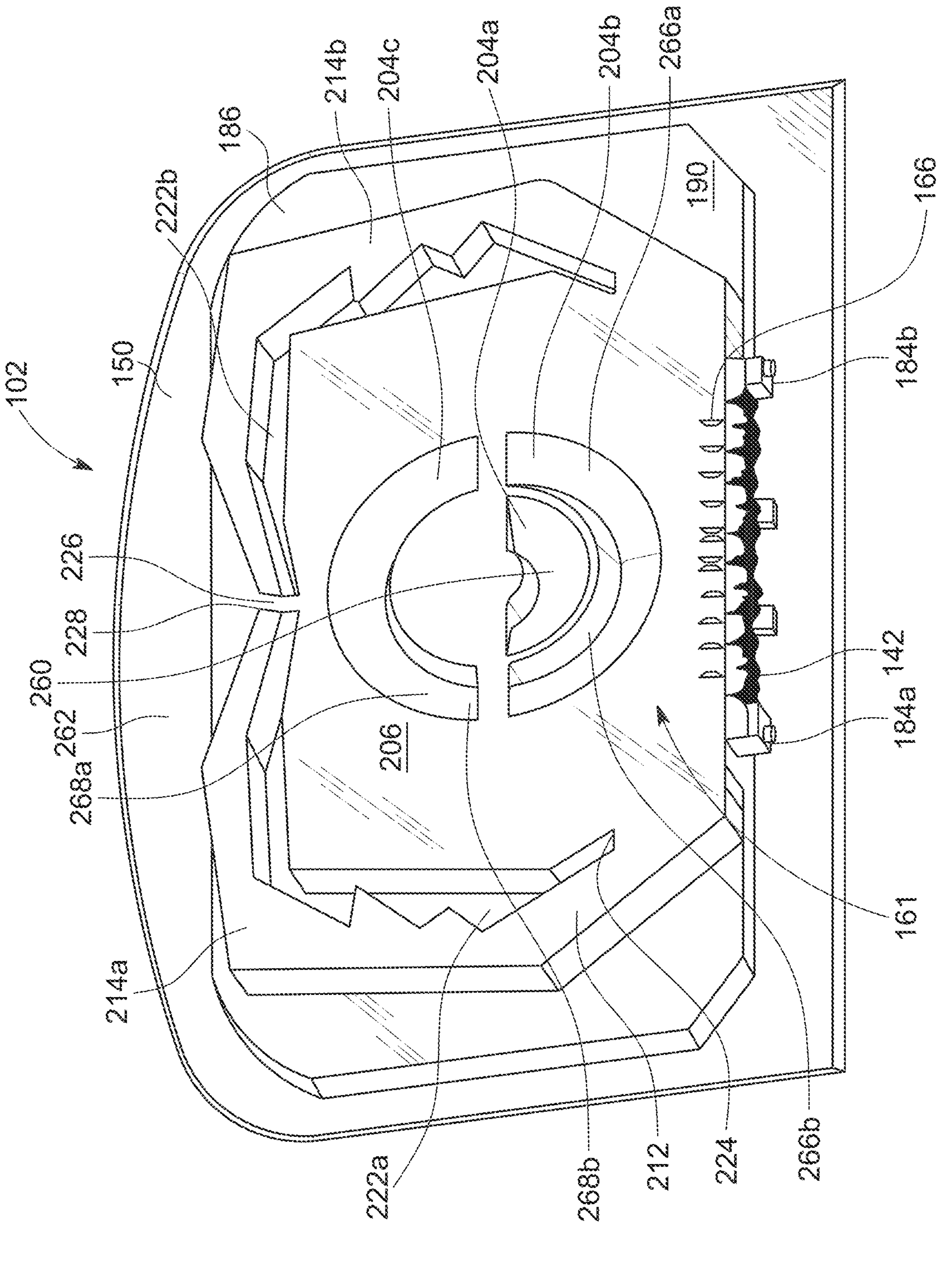
FIG. 32 is an isometric view from above of the waveguide body of FIG. 31.
Figure 33:
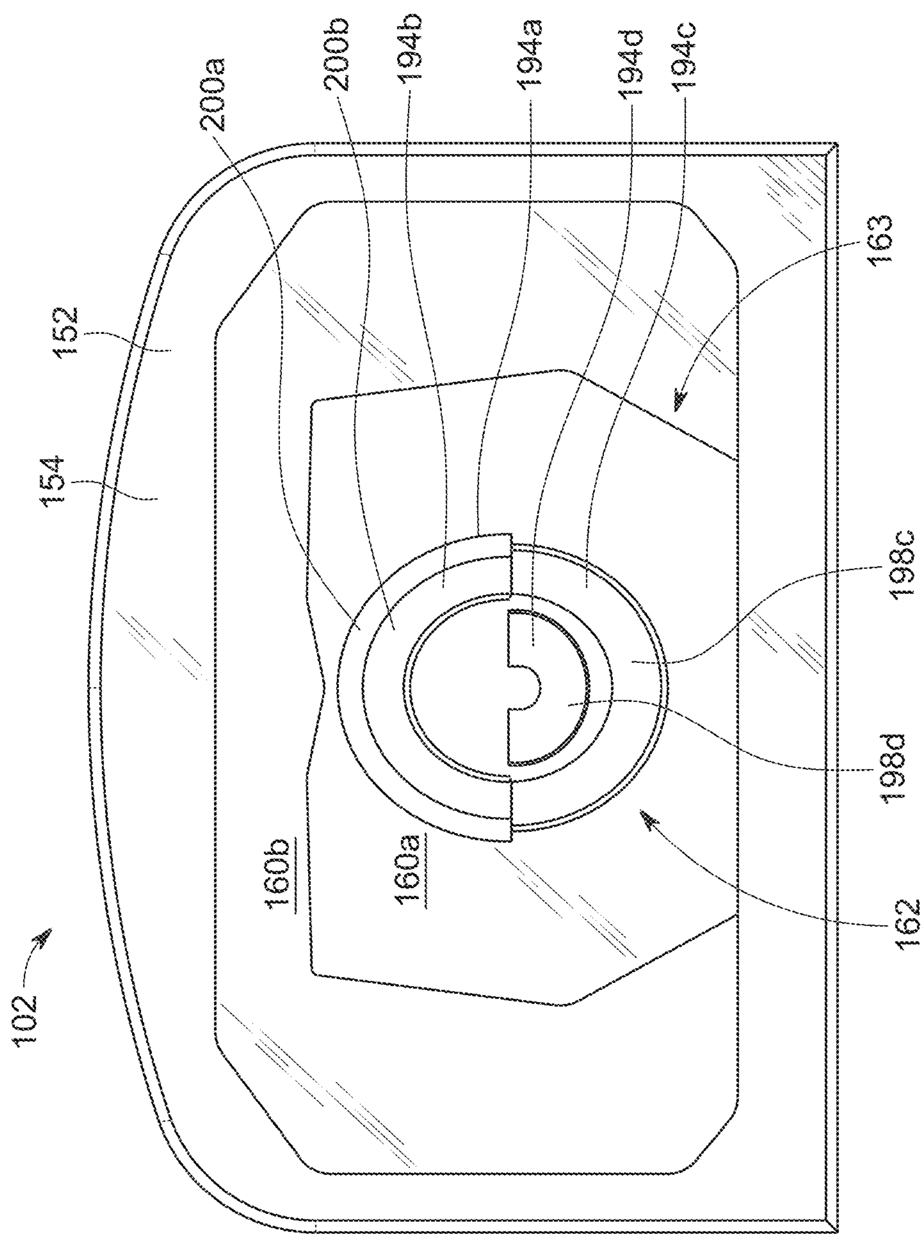
FIG. 33 is a bottom elevational view of the waveguide body of FIG. 32.
Figure 34:
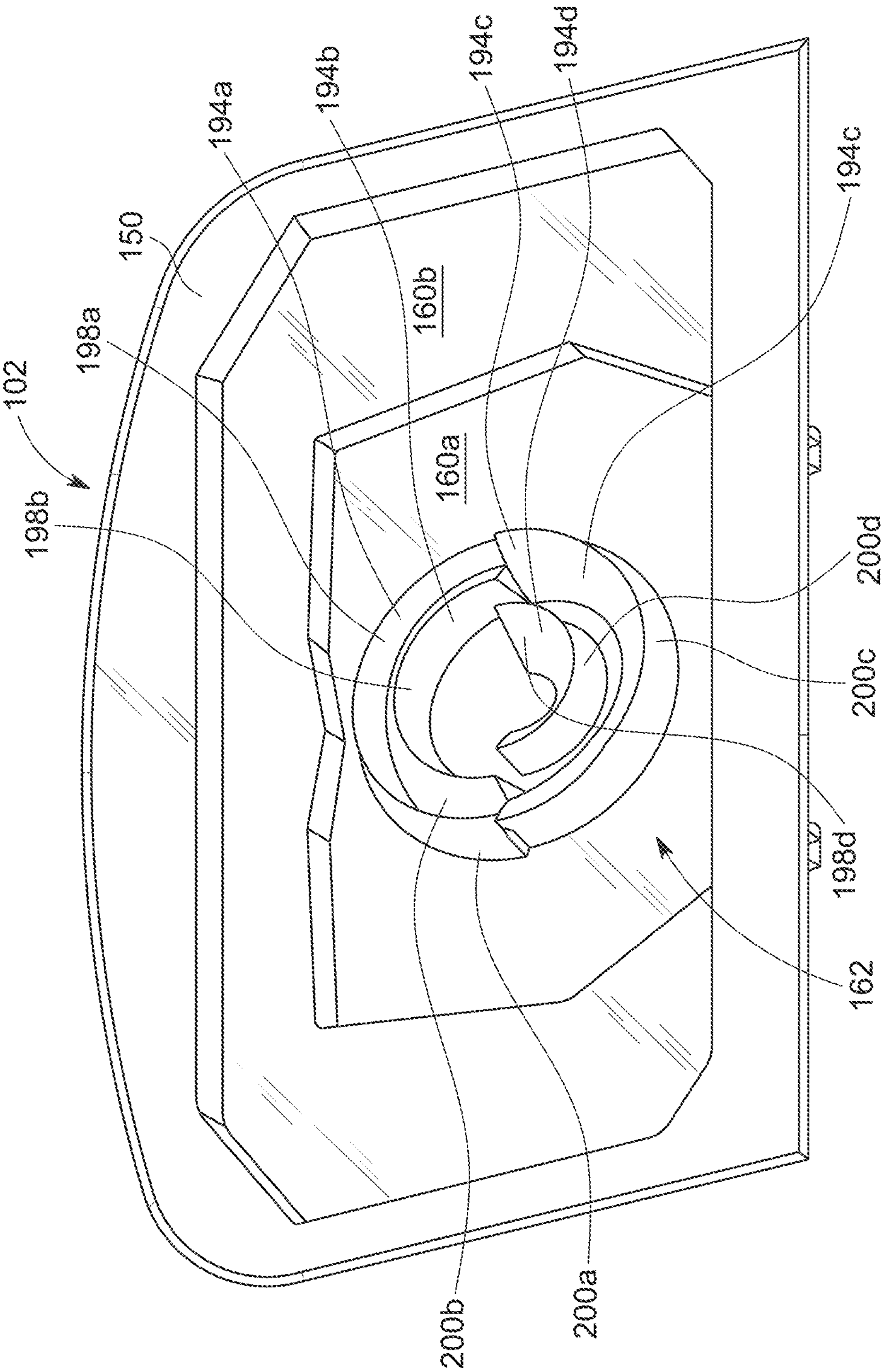
FIG. 34 is an isometric view from above of the waveguide body of FIG. 32.

This alternate embodiment of the waveguide body 102 may have parabolic or wedge-shaped entrance geometries of the coupling cavities 142 arranged along the coupling end surface 158. Further, this alternate embodiment may include the facets 166 near the coupling end surface 158, as seen in FIGS. 31 and 32, for additional color and light mixing, or the same may be omitted. FIGS. 33 and 34 depict the bottom surface 152 of the waveguide body 102 as substantially identical to the bottom surface 152 depicted previously and detailed with reference to FIGS. 13 and 14.

Figure 35:
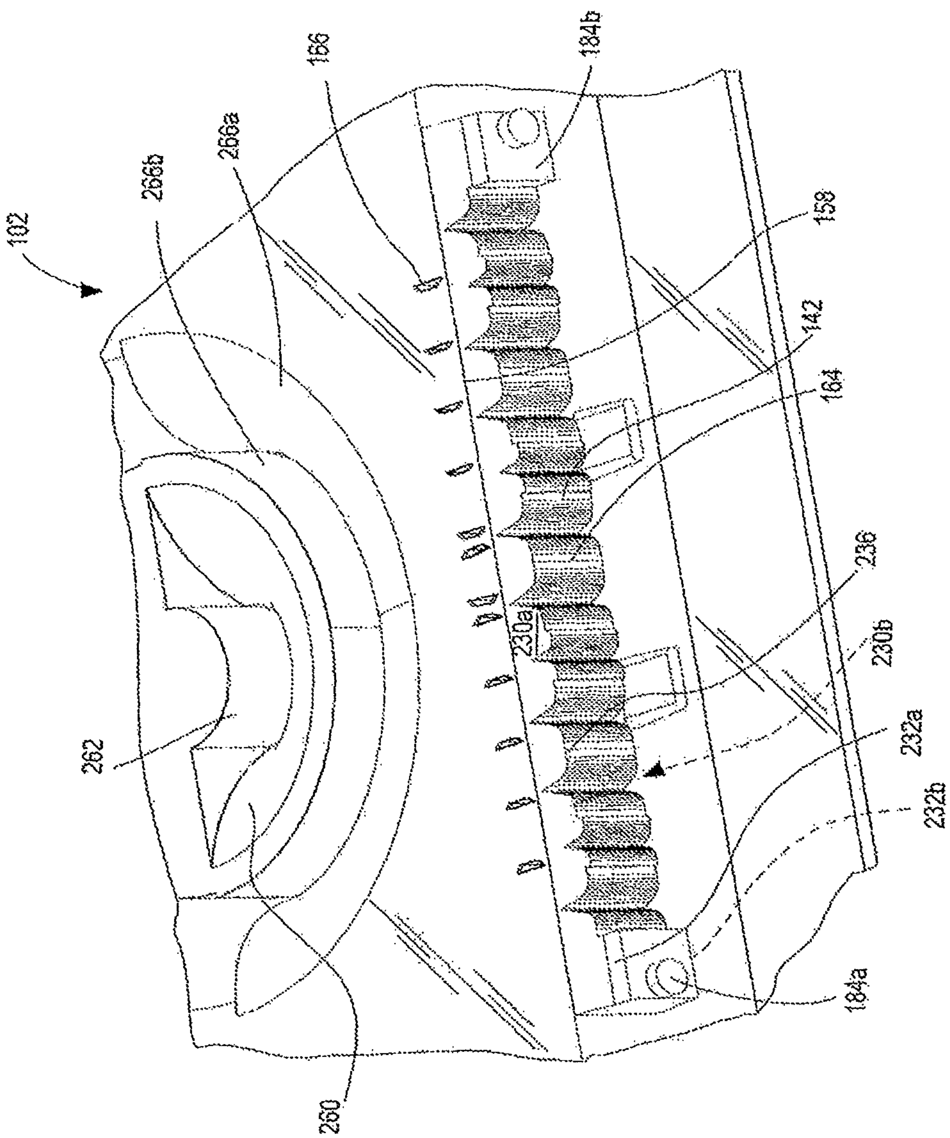
FIG. 35 is an enlarged, fragmentary, isometric view from above of a wedge-shaped coupling cavity entrance geometry of an embodiment of the waveguide body.
Figure 36:
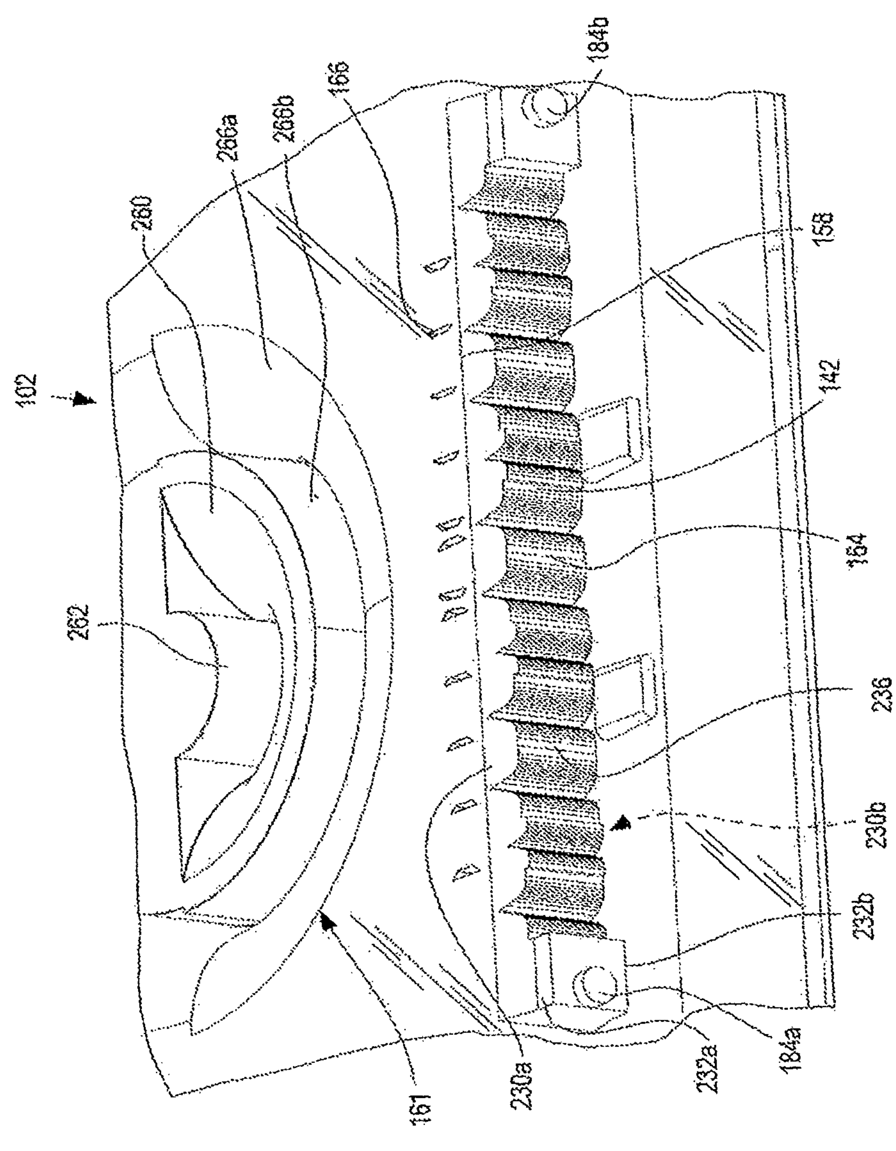
FIG. 36 is an enlarged, fragmentary, isometric view from above of a parabolic coupling cavity entrance geometry of an embodiment of the waveguide body.
Figure 37:
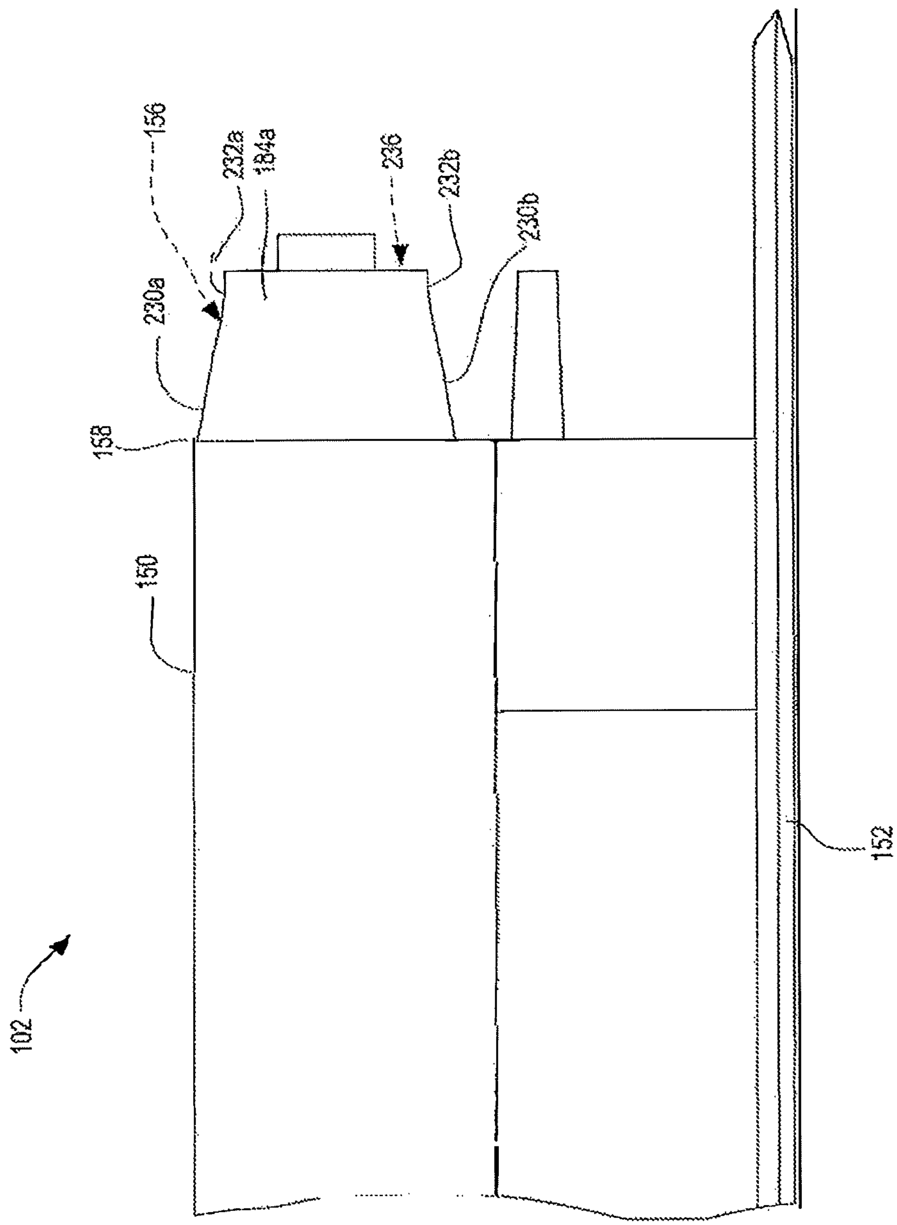
FIG. 37 is a side elevational view of the wedge-shaped coupling cavity entrance geometry of FIG. 35.
Figure 38:
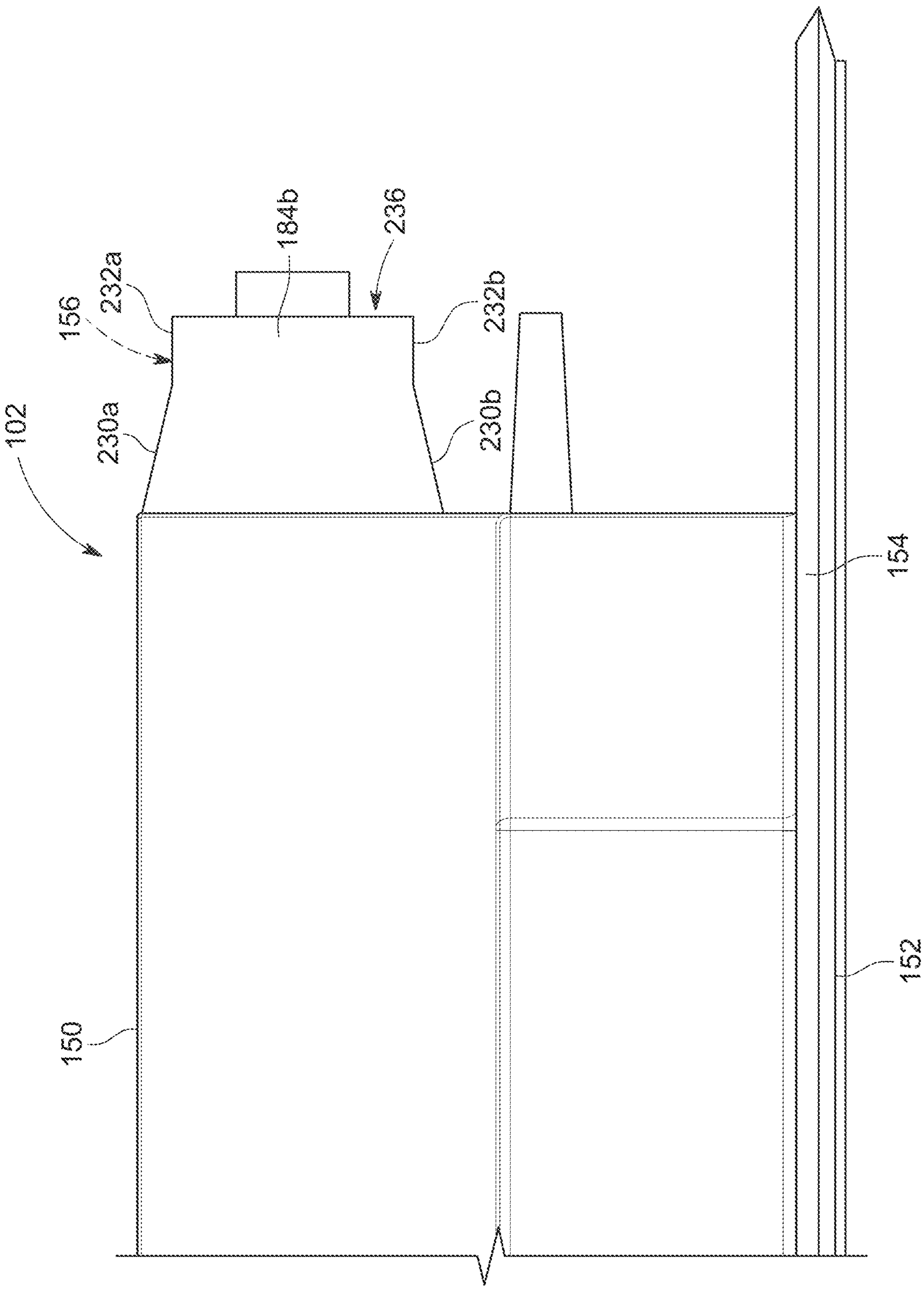
FIG. 38 is a side elevational view of the parabolic coupling cavity entrance geometry of FIG. 36.

Referring now to FIG. 35, an enlarged isometric view of the wedge-shaped coupling cavity entrance geometry of FIG. 25 is shown along with protrusions 184*a*, 184*b* for attaching and aligning the LED elements 136 and main holding member 180 to the waveguide body 102. Likewise, FIG. 36 shows an enlarged isometric view of the parabolic coupling cavity entrance geometry as previously seen in FIG. 24. FIGS. 37 and 38 show the wedge-shaped and parabolic coupling cavity entrance geometries, respectively. In FIGS. 35-38 the upper and lower surfaces 230*a*, 230*b*, 232*a*, 232*b* are shown. In both the wedge-shaped and parabolic coupling cavity entrance geometry embodiments, the upper and lower surfaces 230*a*, 230*b*, are tapered from where said surfaces meet the coupling end surface 158 to an end 236 of the coupling cavities 142 that meets the PCB 140 and LED elements 136. The upper and lower surfaces 230*a*, 230*b* are wider apart at the coupling end surface 158 and are tapered to be closer to one another at distances further therefrom until the upper and lower surfaces 230*a*, 230*b* are a height suitable for coupling to a column of LED elements as shown in FIG. 15.

As seen in FIG. 37 illustrating the wedge-shaped entrance geometry, the upper and lower surfaces 230*a*, 230*b* abut the upper and lower surfaces 232*a*, 232*b* near the end 236 of the coupling cavities 142. Further shown in FIG. 38, which illustrates the parabolic entrance geometry, the upper and lower surfaces 230*a*, 230*b*, also abut the upper and lower surfaces 232*a*, 232*b* near the end 236 of the coupling cavities 142. However, the upper and lower surfaces 232*a*, 232*b* are relatively larger in the parabolic entrance geometry embodiment of FIGS. 36 and 38, as compared with the corresponding upper and lower surfaces 232*a*, 232*b* of the wedge-shaped entrance geometry embodiment in FIGS. 35 and 37.

Figure 39:
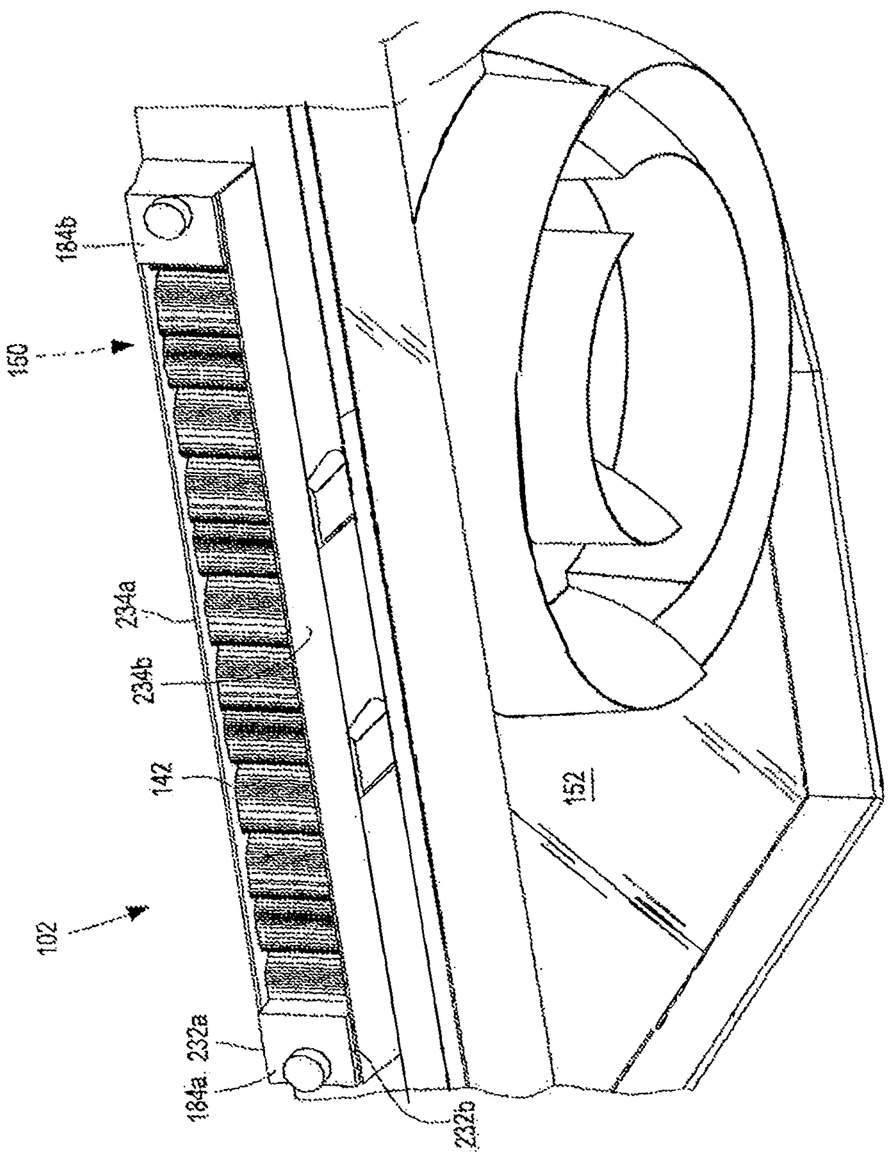
FIG. 39 is an enlarged, fragmentary, isometric view from above of a parabolic coupling cavity entrance geometry with reflective panels thereabout.
Figure 40:
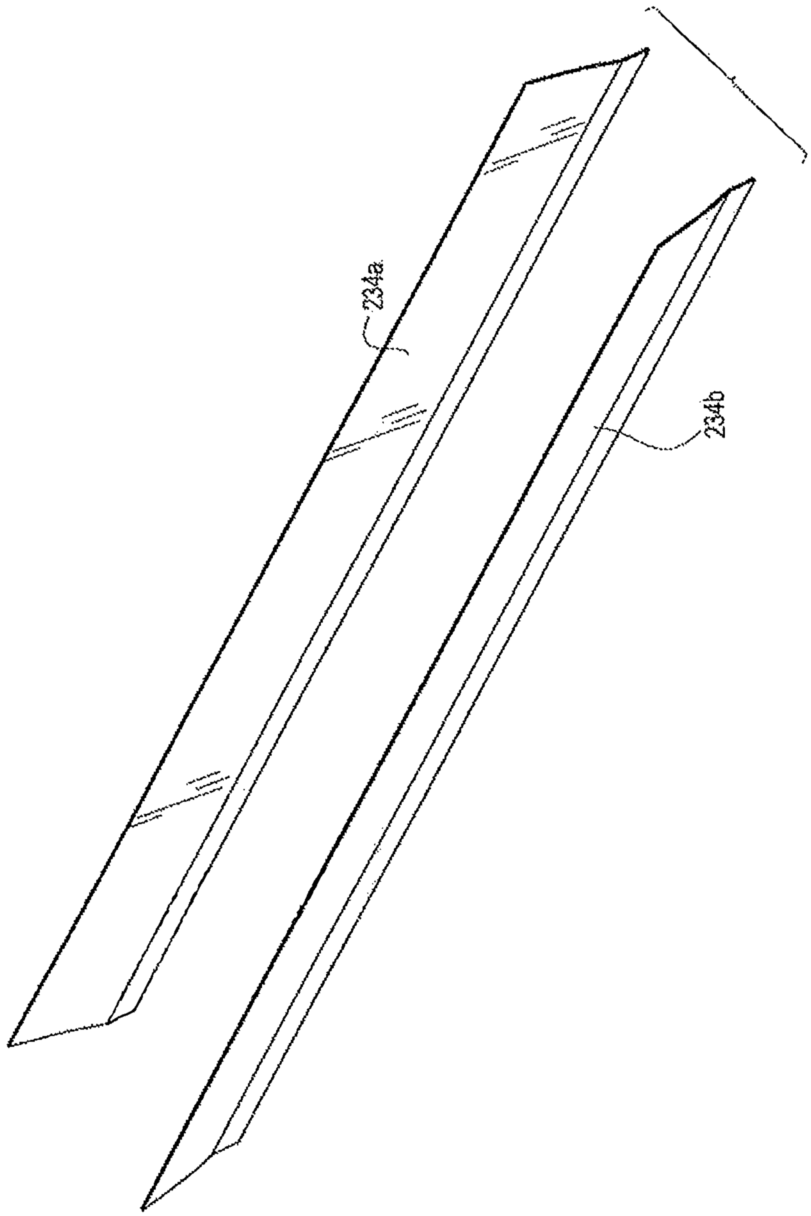
FIG. 40 is an isometric view of the reflective panels of FIG. 39.
Figure 41:
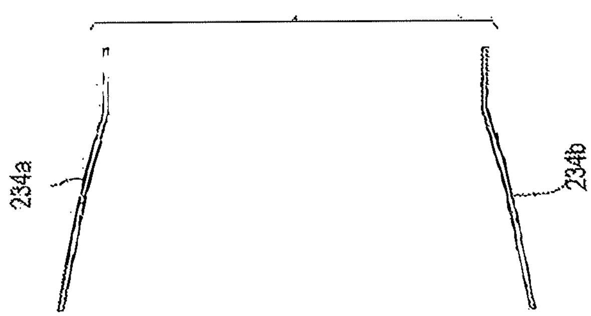
FIG. 41 is a side elevational view of the reflective panels of FIG. 39.
Figure 42:
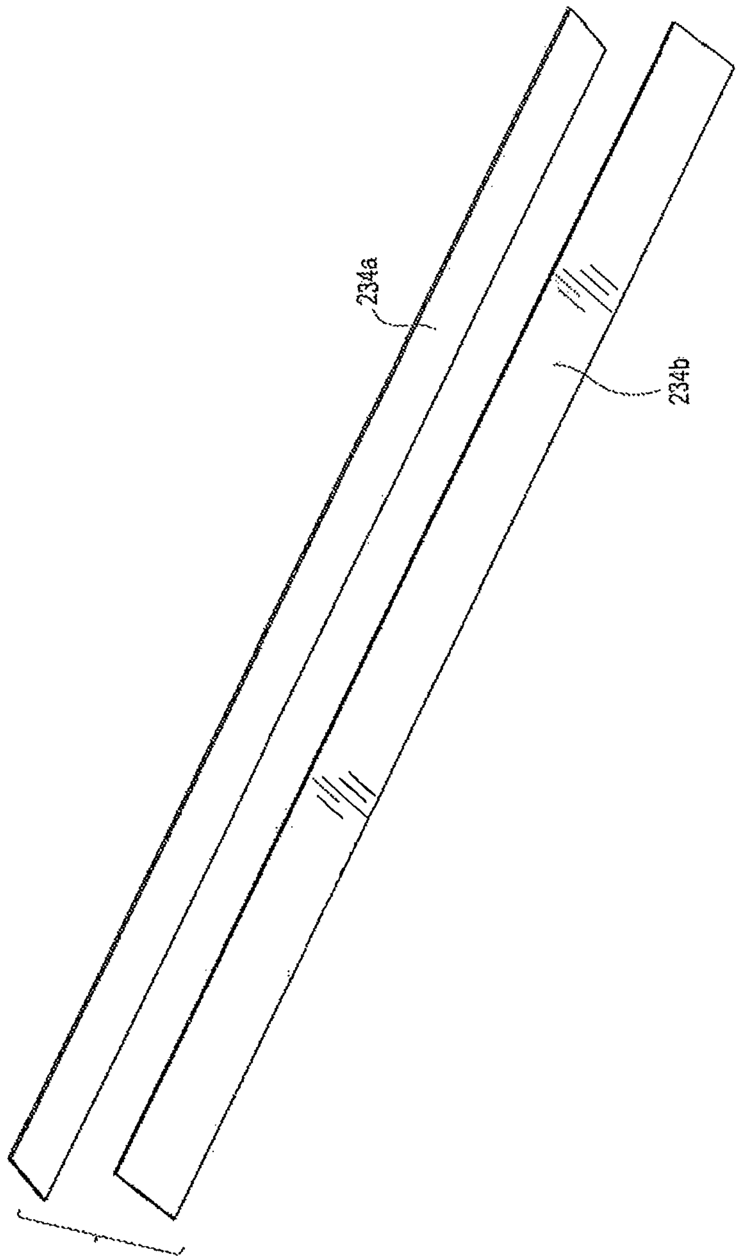
FIG. 42 is an isometric view of reflective panels for use with the wedge-shaped coupling cavity entrance geometry of FIG. 36.
Figure 43:
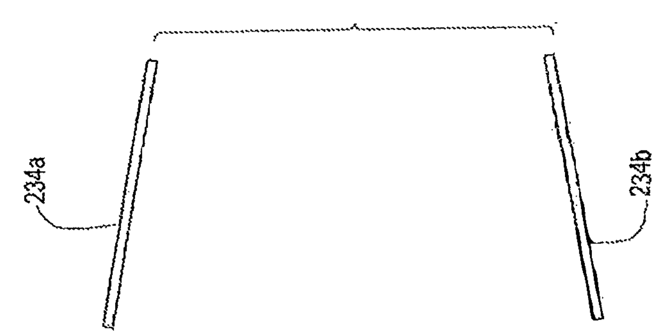
FIG. 43 is a side elevational view of the reflective panels of FIG. 42.

Referring now to FIG. 39, upper and lower reflective panels 234*a*, 234*b* may be arranged above and below the plurality of coupling cavities 142 along the upper and lower entrance geometry surfaces 230*a*, 230*b*. The reflective panels 234*a*, 234*b* assist in directing light from the LED elements 136 into the coupling cavities 142. FIGS. 39, 42, ad 43 show the reflective panels 234*a*, 234*b* utilized with the wedge-shaped entrance geometry. As illustrated, the reflective panels 234*a*, 234*b* for the wedge-shaped entrance geometry are substantially planar and may abut only the upper and lower wedge-shaped entrance geometry surfaces 230*a*, 230*b* without contacting the surfaces 232*a*, 232*b*. FIGS. 40 and 41 depict an embodiment of the reflective panels 234*a*, 234*b* for use with the parabolic entrance geometry. In this embodiment, each of the reflective panels 234*a*, 234*b* is configured such that the reflective panel 234*a*, 234*b* is bent or otherwise shaped to match the contour of the surfaces 230*a*, 230*b* as well as the surfaces 232*a*, 232*b* of the parabolic entrance geometry as seen in FIGS. 36 and 38.

Any number of any of the embodiments of the waveguide body 102 shown and described hereinabove may be utilized in the post top luminaries 300, 300*a*, 300*b* depicted in FIGS. 44-51 to produce an illumination pattern extending 360 degrees about the luminaire 300, 300*a*, 300*b*.

Figure 44:
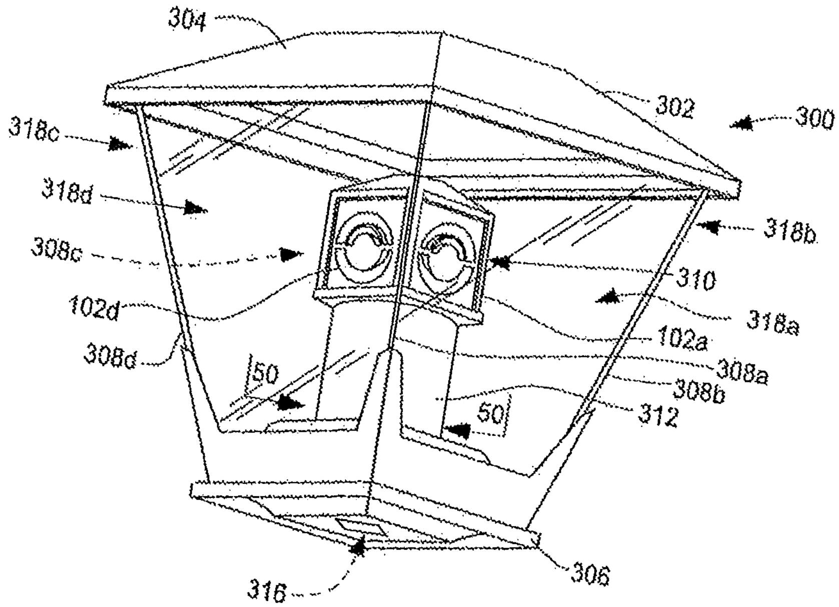
FIG. 44 is a side elevational view of a post top luminaire utilizing a waveguide body.
Figure 45:
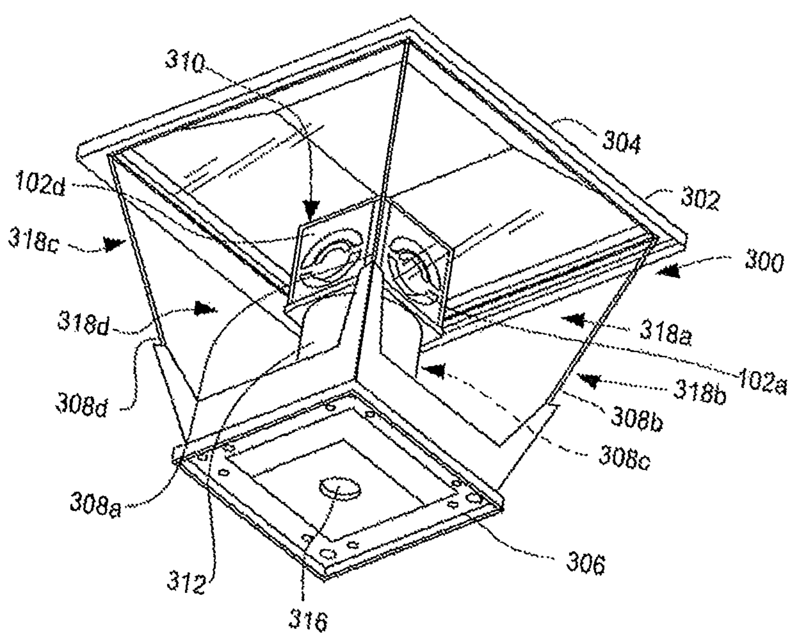
FIG. 45 is an isometric view from below of the post top luminaire of FIG. 44.

As seen in FIGS. 44 and 45, four waveguide bodies 102*a*-102*d* are arranged vertically in a square optical configuration 310 within a post top luminaire housing 302. The post top luminaire housing 302 includes a cover 304, a base 306, and at least four corner struts 308*a*-308*d* arranged therebetween. The struts, 308*a*-308*d*, the cover 304, and the base 306 together define four sides 318*a*-318*d* of the post top luminaire 300. The sides 318*a*-318*b* may have disposed therein a panel made of glass, plastic, or another suitable light transmissive material. The embodiment of the waveguide bodies 102*a*-102*d* utilized in the post top 302 are modified to remove segments of the outboard portion 186 and the interior transmission portion 206 as shown in FIGS. 44 and 45. Furthermore, the waveguide bodies 102*a*-102*d* are arranged vertically, and adjacent one another to form the square optical configuration 310 such that LED elements 136 may be coupled with the coupling cavities 142 thereof from either the top (nearer the cover 304) or bottom (nearer the base 306). In the embodiment of FIGS. 44 and 45 the bottom surface 152 as described hereinabove faces inward toward the center of the square optical configuration 310, while the previously described top surface 150 of each waveguide body 102*a*-102*d* faces out and away from the square optical configuration 310.

Referring still to FIGS. 44 and 45, the square optical configuration 310 is disposed on a circular cylindrical support post 312. The cylindrical support post 312 may contain operating circuitry 314 (see FIGS. 50 and 51) for powering the LED elements 136 or otherwise controlling the post top luminaire 300. Wiring or other access to a power source may pass through a hole 316 in the base 306 that leads into an interior of the cylindrical support post 312. The support post 312 may have an alternate shape, for example the support post 312 may be square in cross section. As described above, the light distribution provided by the waveguide bodies 102*a*-102*d* is symmetrical about 360 degrees in a Type 5 distribution pattern. Thus, the square optical configuration 310 shown in FIGS. 44 and 45 provides a distribution of light in all (or substantially all) directions from each side 318*a*-318*d* of the post top luminaire 300. However, in an alternate embodiment the waveguide bodies 102*a*-102*d* may develop a Type 3 light distribution pattern to provide additional downlight, or the waveguide bodies 102*a*-102*d* may develop a different symmetric or asymmetric light distribution individually or in combination. Utilizing the vertical configuration 310 of the four waveguide bodies 102*a*-102*d*, a Type 5 distribution may be created, on the whole, with a circular or square pattern by appropriately modifying the light redirection and reflection features 161 and/or the light refraction and extraction features 162 of the waveguide bodies 102*a*-102*d*, or through the inclusion of additional facets or features. In addition, Type 2, Type 3, or Type 4 distributions may be developed by omitting one of the four waveguide bodies 102*a*-102*d* and by adjusting the facets or features 161, 162 of the three retained waveguide bodies.

Figure 46:
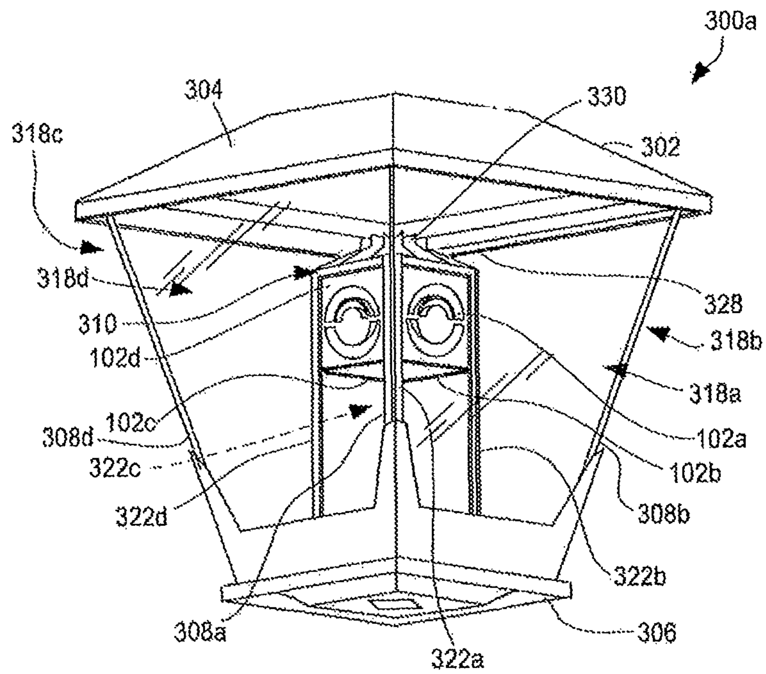
FIG. 46 is a side elevational view of an alternate embodiment of a post top luminaire utilizing a waveguide body.
Figure 47:
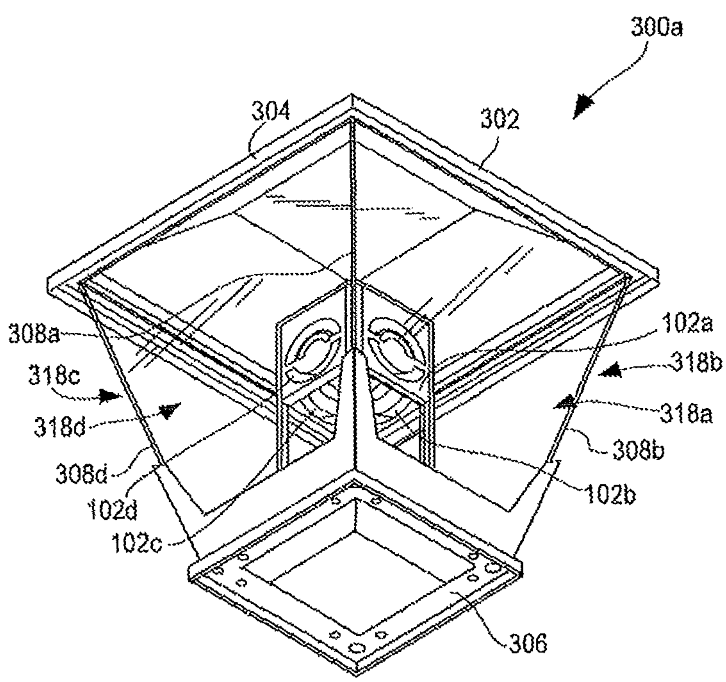
FIG. 47 is an isometric view from below of the alternate post top luminaire of FIG. 46.

Referring now to FIGS. 46 and 47, a luminaire 300*a* retains many of the features described with respect to the post top luminaire 300 of FIGS. 44 and 45. However, in this embodiment, the cylindrical support post 312 is replaced with four support members 322*a*-322*d*. Thus, the operating circuitry 314 is relocated into the cover 304. Furthermore, in the optical configuration 310*a* of FIGS. 46 and 47, the previously described bottom surface 152 of each of the waveguide bodies 102*a*-102*d* faces out and away from the optical configuration 310*a*, while the previously described top surface 150 of each of the waveguide bodies 102*a*-102*d* is oriented toward the interior of the square optical configuration 310*a*. Again, the optical configuration 310*a* provides a distribution of light in all directions and from each side 318*a*-318*d* of the post top luminaire 300*a*. A mounting section 328 operatively connects the square optical configuration 310*a* with the cover 304 and the operating circuitry 314 disposed therein. The mounting section 328 provides a heat sink function or is in thermal communication with a heat sink 330 arranged within the cover 304. The support members 322*a*-322*d* may also provide a heat sinking function for the square optical configuration 310*a*.

Figure 48:
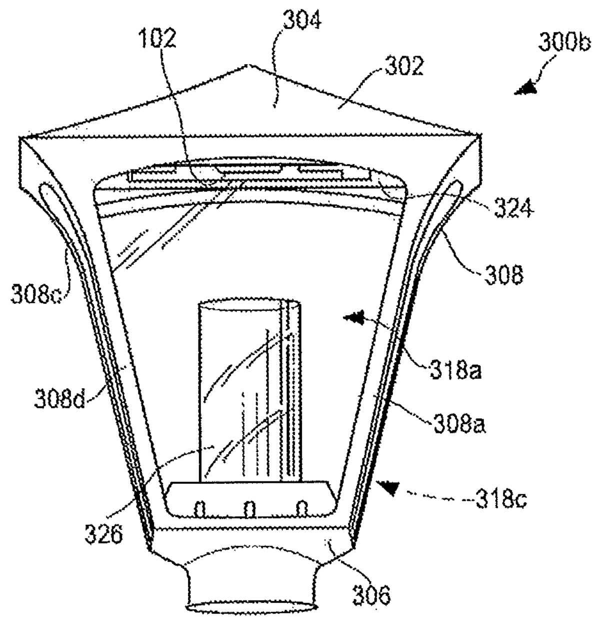
FIG. 48 is a side elevational view of an alternate embodiment of a post top luminaire utilizing the waveguide body of FIG. 11.
Figure 49:
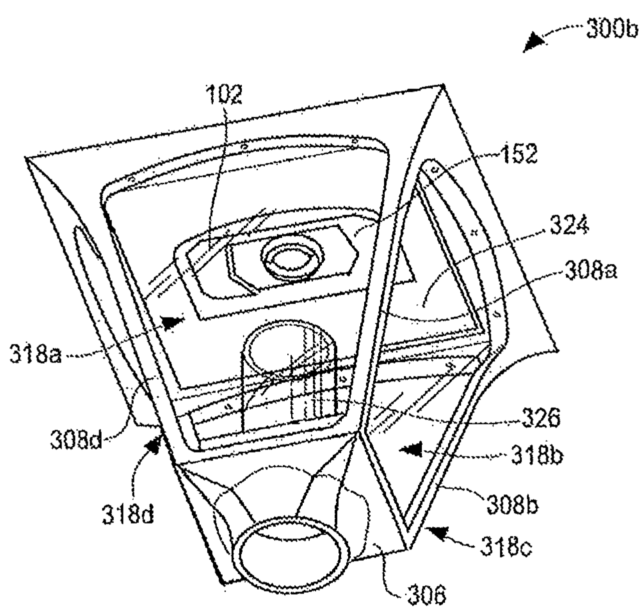
FIG. 49 is an isometric view from below of the alternate post top luminaire of FIG. 48.
Figure 50:
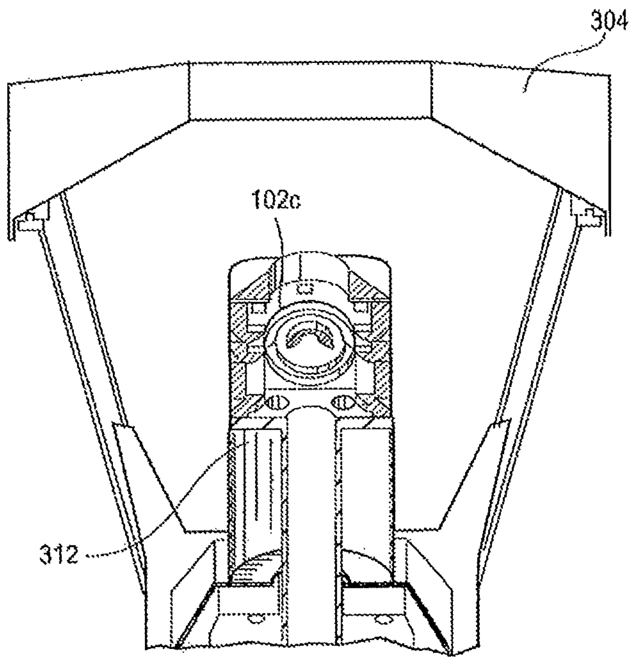
FIG. 50 is a cross-sectional view of the post top luminaire taken generally along the lines 50-50 indicated in FIG. 44.
Figure 51:
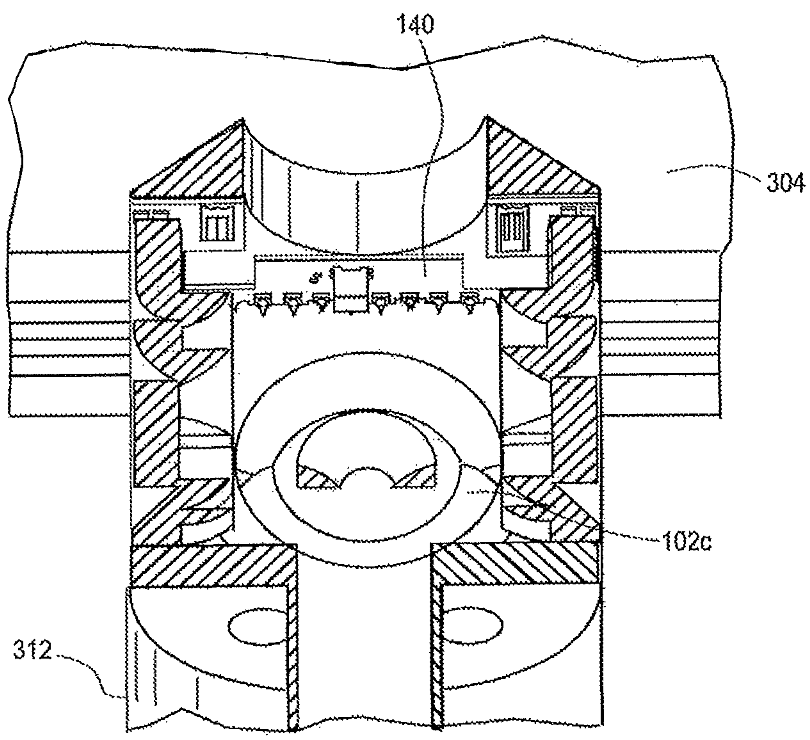
FIG. 51 is an enlarged, isometric view from below of the cross-sectional view shown in FIG. 50.

An alternate embodiment of the post top luminaire 300*b* is pictured in FIGS. 48 and 49. In this embodiment, the square optical configuration 310, 310*a* and the cylindrical support post 312 are omitted. Instead of four modified waveguide bodies 102*a*-102*d*, the optical waveguide body 102, as shown and described hereinabove for utilization in the luminaire 100, is disposed as a single waveguide within the cover 304. The waveguide body 102 is laterally arranged similar to the configuration thereof in the luminaire 100, such that the waveguide body 102 is horizontal with the bottom surface 152 facing downward toward the interior of the post top luminaire housing 302. The LED elements 136 are aligned with the coupling cavities 142 of the waveguide body 102 from one side thereof within the post top luminaire cover 304. The single waveguide body 102 is inserted in and retained by any suitable means within a lower surface 324 of the cover 304. The waveguide body 102 is proximal a center of the lower surface 204 of the cover 304, and is further arranged above, but spaced from a decorative lens 326. The operating circuitry 314 and a heatsink 330 are disposed above the waveguide body 102 within the cover 304. As with the luminaire 100, the post top luminaire 300*b* comprising the waveguide body 102 in a lateral configuration may develop a Type 5 light distribution that is emitted in 360 degrees through the four sides 318*a*-318*d* of the post top 314. This emission distribution may be facilitated by light redirected by the decorative lens. Alternatively, Type 2, Type 3, or Type 4 light distributions may also be created by modifying the refraction and extraction features 162 and/or the light redirection and reflection features 161 or other facets of the waveguide body 102 while maintaining the lateral configuration. In addition, by combining the lateral waveguide body 102 with a specially shaped decorative lens 326 in conjunction with reflection or scattering means associated with the decorative lens 326, various light distributions may be efficiently developed.

In some embodiments, the waveguide body includes a plurality of reflection and/or refraction features and a plurality of redirection features. In further embodiments, redirection and reflection features are disposed on or in a first surface of the waveguide and refraction and extraction features are disposed on or in a second surface of the waveguide opposite the first surface. Further still, the waveguide and luminaire dimensions are exemplary only, it being understood that one or more dimensions could be varied. For example, the dimensions can all be scaled together or separately to arrive at a larger or smaller waveguide body, if desired. While a uniform distribution of light may be desired in certain embodiments, other distributions of light may be contemplated and obtained using different sidewall surfaces of extraction/reflection/refraction features.

Other embodiments of the disclosure including all of the possible different and various combinations of the individual features of each of the foregoing embodiments and examples are specifically included herein. Any one of the light reflection features could be used in an embodiment, possibly in combination with any one of the light redirection features of any embodiment. Similarly, any one of the light redirection features could be used in an embodiment, possibly in combination with any one of the light reflection features of any embodiment. Thus, for example, a luminaire incorporating a waveguide of one of the disclosed shapes may include redirection and reflection features of the same or a different shape, and the redirection and reflection features may be symmetric or asymmetric, the luminaire may have combinations of features from each of the disclosed embodiments, etc. without departing from the scope of the invention.

The spacing, number, size, and geometry of refraction and extraction features 162 determine the mixing and distribution of light in the waveguide body 102 and light exiting therefrom. At least one (and perhaps more or all) of the refraction and extraction features 162 *r* any or all of the other extraction/refraction/redirection features disclosed herein may be continuous (i.e., the feature extends in a continuous manner), while any remaining extraction features may be continuous or discontinuous ridges or other structures (i.e., partial arcuate and/or non-arcuate features extending continuously or discontinuously) separated by intervening troughs or other structures.

If desired, inflections (e.g., continuous or discontinuous bends) or other surface features may be provided in any of the extraction features disclosed herein. Still further, for example, as seen in the illustrated embodiment of FIG. 11, all of the refraction and extraction features 162 may be symmetric with respect to the center line 172 of the waveguide body 102, although this need not be the case. Further, one or more of the redirection and reflection features 161 or refraction and extraction features 162 may have a texturing on the top surface 150 of the waveguide body 102, or the redirection features and reflection features may be smooth and polished. In any of the embodiments described herein, the top surface 150 of the waveguide body 102 may be textured in whole or in part, or the top surface 150 may be smooth or polished in whole or in part.

In addition to the foregoing, the waveguide body 102 and any other waveguide body disclosed herein may be tapered in an overall sense from the coupling end surface 158 to the end surface in that there is less material in the thickness dimension at the general location of the non-coupling front end surface than at portions adjacent the coupling cavities 142. Such tapering may be effectuated by providing extraction features and/or redirection features that become deeper and/or more widely separated with distance from the coupling cavities 142. The tapering maximizes the possibility that substantially all the light introduced into the waveguide body 102 is extracted over a single pass of the light therethrough. This results in substantially all of the light striking the outward directed surfaces of the redirection and reflection features 161, which surfaces are carefully controlled so that the extraction of light is also carefully controlled. The combination of tapering with the arrangement of redirection and reflection features 161 and refraction and extraction features 162 results in improved color mixing with minimum waveguide thickness and excellent control over the emitted light.

The driver circuit 118 may be adjustable either during assembly of the luminaire 100 or thereafter to limit/adjust electrical operating parameter(s) thereof, as necessary or desirable. For example, a programmable element of the driver circuit 118 may be programmed before or during assembly of the luminaire 100 or thereafter to determine the operational power output of the driver circuit 118 to one or more strings of LED elements 136. A different adjustment methodology/apparatus may be used to modify the operation of the luminaire 100 as desired.

In addition, an adjustable dimming control device may be provided inside the housing 104 and outside the reflective enclosure member 132 that houses the circuit board 140*a*. The adjustable control device may be interconnected with a NEMA ambient light sensor and/or dimming leads of the driver circuit and may control the driver circuit 118. The adjustable dimming control device may include a resistive network and a wiper that is movable to various points in the resistive network. An installer or user may operate (i.e., turn) an adjustment knob or another adjustment apparatus of the control device operatively connected to the wiper to a position that causes the resistive network to develop a signal that commands the output brightness of the luminaire 100 to be limited to no more than a particular level or magnitude, even if the sensor is commanding a luminaire brightness greater than the limited level or magnitude.

If necessary or desirable, the volume of the reflective enclosure member 132 may be increased or decreased to properly accommodate the driver circuit 118 and to permit the driver circuit to operate with adequate cooling. The details of the parts forming the reflective enclosure member 130 may be varied as desired to minimize material while providing adequate strength.

Further, any of the embodiments disclosed herein may include a power circuit having a buck regulator, a boost regulator, a buck-boost regulator, a SEPIC power supply, or the like, and may comprise a driver circuit as disclosed in U.S. patent application Ser. No. 14/291,829, filed May 30, 2014, or U.S. patent application Ser. No. 14/292,001, filed May 30, 2014, incorporated by reference herein. The circuit may further be used with light control circuitry that controls color temperature of any of the embodiments disclosed herein in accordance with user input such as disclosed in U.S. patent application Ser. No. 14/292,286, filed May 30, 2014, incorporated by reference herein.

Any of the embodiments disclosed herein may include one or more communication components forming a part of the light control circuitry, such as an RF antenna that senses RF energy. The communication components may be included, for example, to allow the luminaire to communicate with other luminaries and/or with an external wireless controller, such as disclosed in U.S. patent application Ser. No. 13/782,040, filed Mar. 1, 2013, or U.S. Provisional Application Ser. No. 61/932,058, filed Jan. 27, 2014, the disclosures of which are incorporated by reference herein. More generally, the control circuitry includes at least one of a network component, an RF component, a control component, and a sensor. The sensor, such as a knob-shaped sensor, may provide an indication of ambient lighting levels thereto and/or occupancy within the room or illuminated area. Such sensor may be integrated into the light control circuitry.

As noted above, any of the embodiments disclosed herein can be used in many different applications, for example, a parking lot light, a roadway light, a light that produces a wall washing effect, a light usable in a large structure, such as a warehouse, an arena, a downlight, etc. A luminaire as disclosed herein is particularly adapted to develop high intensity light greater than 1000 lumens, and more particularly greater than 10,000 lumens, and can even be configured to develop 35,000 or more lumens by adding LED elements and, possibly, other similar, identical or different waveguide bodies with associated LEDs in a luminaire.

Further, any LED chip arrangement and/or orientation as disclosed in U.S. patent application Ser. No. 14/101,147, filed Dec. 9, 2013, incorporated by reference herein and owned by the assignee of the present application, may be used in the devices disclosed herein. Where two LED elements are used in each light coupling cavity (as in the illustrated embodiments), it may be desired to position the LEDs elements within or adjacent the coupling cavity along a common vertical axis or the LED elements may have different angular orientations, as desired. The orientation, arrangement, and position of the LEDs may be different or identical in each waveguide body section of a waveguide as desired. Still further, each light coupling cavity may be cylindrical or non-cylindrical and may have a substantially flat shape, a segmented shape, an inclined shape to direct light out a particular side of the waveguide body, etc.

Figure 52:
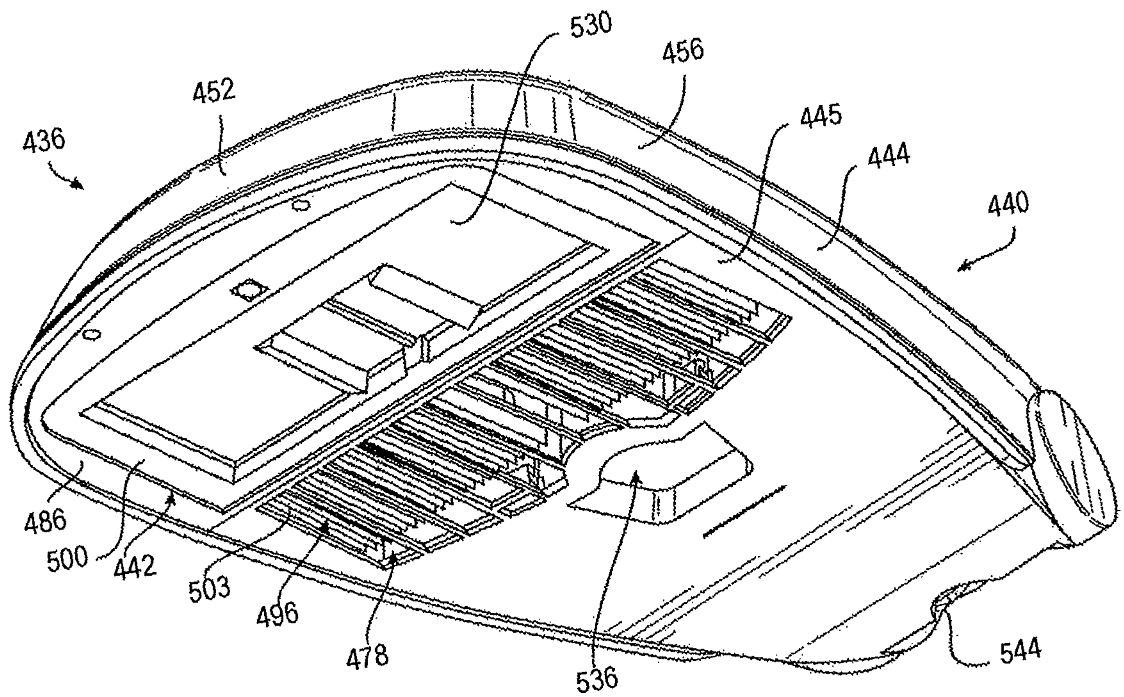
FIG. 52 is a bottom perspective view of an embodiment of a lighting device.
Figure 53:
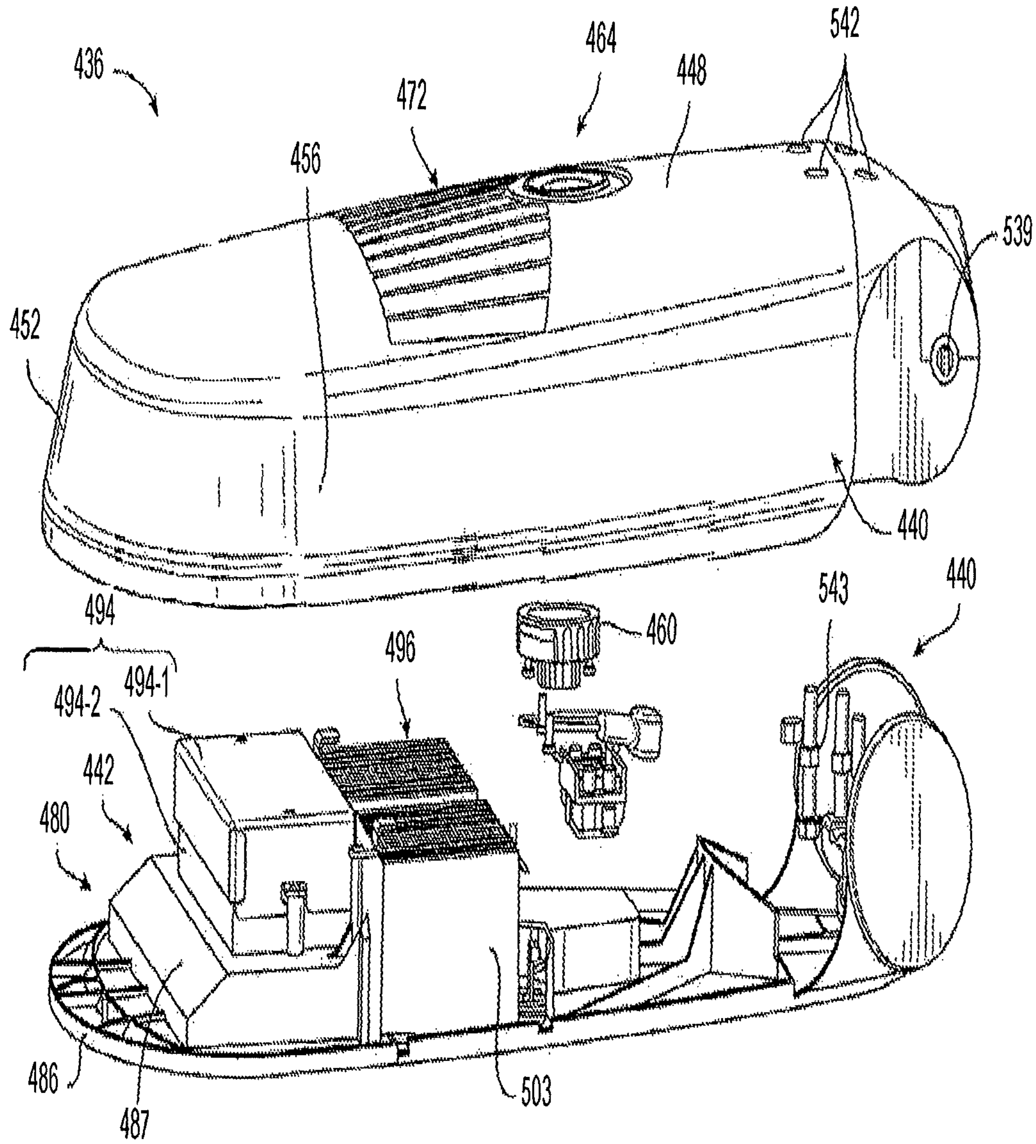
FIGS. 53 and 54 are exploded views of the lighting device of FIG. 52.
Figure 54:
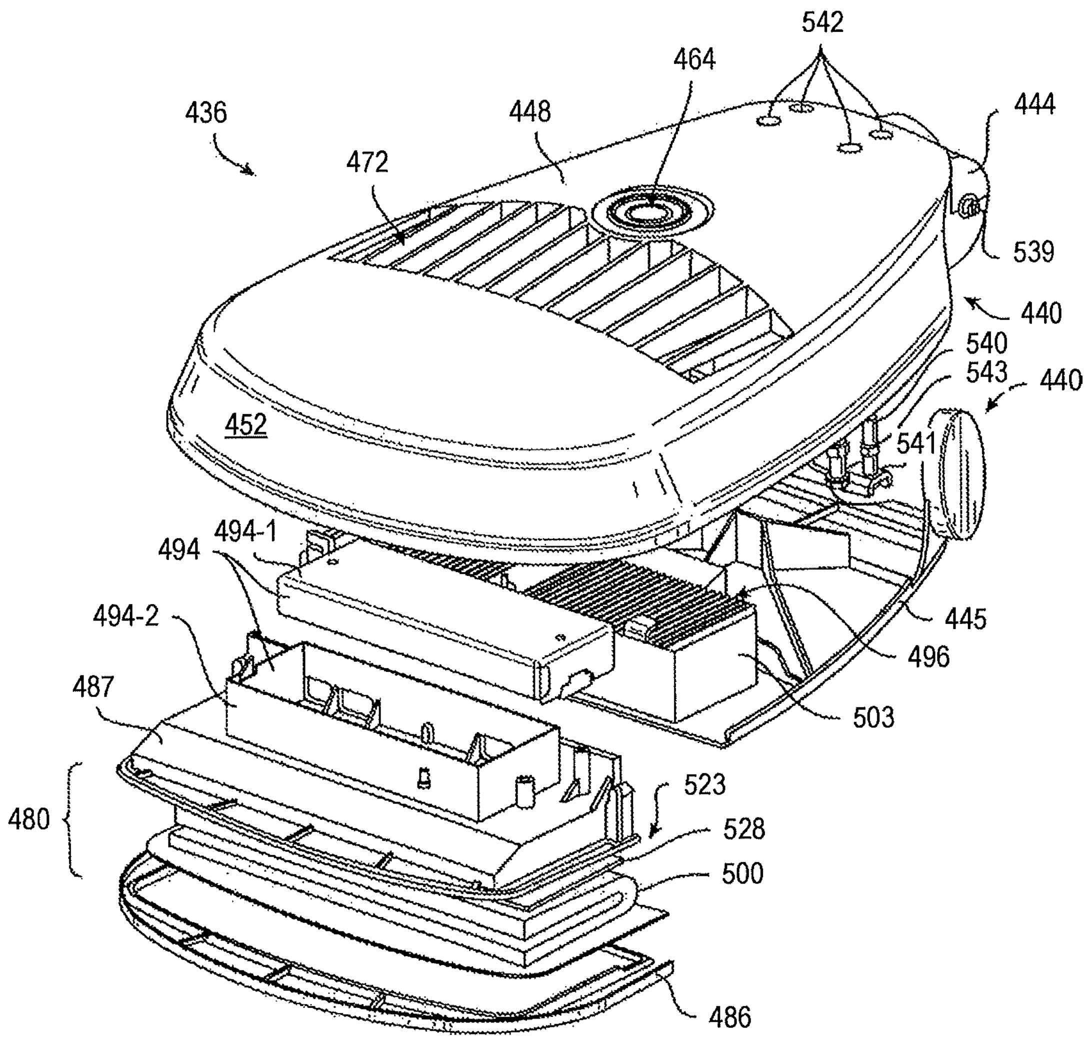

FIGS. 52 through 54 show an embodiment of the waveguide of the invention in an example embodiment of a lighting device 436. While one embodiment of a lighting device is shown and described with reference to FIGS. 52 through 54, lighting devices using the waveguides as disclosed herein may take many other forms and may be used in lighting applications other than as specifically shown and described herein. The lighting device shown and described herein is for explanatory purposes and is not intended to limit the applicability of the waveguides as disclosed herein. Lighting device 436 is suitable for outdoor applications such as in a parking lot or roadway and is capable of being mounted on a stanchion, pole or other support structure. Lighting devices that take advantage of the waveguides disclosed herein may take many other forms.

As shown in FIGS. 52 through 54, the lighting device 436 comprises a housing 440 and a head assembly 442. The housing 440 comprises a top housing portion 444 and a bottom housing portion 445. The top housing portion 444 comprises a top surface 448, a front wall 452, and side walls 456. A communication component 460 such as an RF antenna that senses RF energy, a light sensor or the like may be disposed in a receptacle 464 in the housing 440. The communication component may be located at any suitable position on the lighting device and more than one communication component may be used. An upper convection opening 472 is disposed in the top housing portion 444. The bottom housing portion 445 comprises a lower convection opening 478 disposed below the upper convection opening 472.

The head assembly 442 is at least partially enclosed by the housing 440 and comprises an optical assembly 480. The optical assembly 480 comprises a waveguide 500, a light source 523, a lower frame member 486 partially surrounding the waveguide 500 and forming a barrier between the waveguide 500 and the housing 440, and an upper frame member 487 disposed above the optical waveguide 500. The light source 523 comprises a plurality of LEDs 525 (FIG. 55) supported on an LED board 528 and disposed adjacent the waveguide 500 to direct light into the waveguide 500. The head assembly 442 further comprises a driver housing 494 that contains the LED driver circuit and other lamp electronics 522 (FIG. 55) to drive LEDs 525. A reflective bottom surface of the upper frame member 487 may be disposed adjacent one or more exterior surfaces of the optical waveguide 500.

The LED driver circuit and other lamp electronics 522 may be disposed in the driver housing 494, which is disposed proximal to the LEDs 525 on LED board 528. The driver housing 494 may comprise an upper portion 494-1 and a lower portion 494-2. The upper portion 494-1 forms a top cover of the driver housing 494. Part of the driver housing 494 may be made of a metal capable of efficient heat transfer.

A heat exchanger 496 is included in the housing 440. The heat exchanger 496 may comprise a plurality of fins 503. The fins 503 transfer heat at least by convection through the upper and lower convection openings 472 and 478. The heat exchanger 496 is in thermal communication (via conduction, convection, and/or radiation) with the LEDs 525, LED board 528 and the LED driver circuit and other lamp electronics 522. One or more thermally conductive LED boards 528, such as printed circuit boards (PCBs), receive and mount the LEDs 525 and conduct heat therefrom. The LED boards 528 are preferably made of one or more materials that efficiently conduct heat and are disposed in thermal communication with the heat exchanger 496. Alternative paths may be present for heat transfer between the LED driver circuit and other lamp electronics 522, the LEDs 525, the LED board 528 and the heat exchanger 496, such as a combination of conduction, convection, and/or radiation. In the illustrated embodiments, the upper and lower convection openings 472 and 478 are disposed above and below the heat exchanger 496, respectively, thus providing for efficient heat transfer via a direct vertical path of convection flow.

Figure 55:
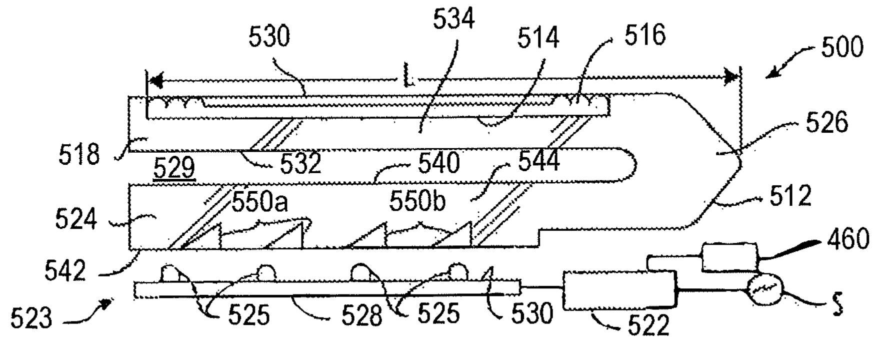
FIG. 55 is a side section view of an embodiment of a waveguide.

The bottom housing portion 445 may be opened by exerting a downward force on handle 536 to disconnect mating snap-fit connectors on the bottom housing portion 445 and the top housing portion 444. Also, as a result of the downward force, the bottom housing portion 445 rotates about pins 539 such that a front portion of the bottom housing portion 445 pivots downward, thus allowing access to the interior of the housing 440. In one embodiment, the lighting device 436 may be placed onto a stanchion such that an end of the stanchion extends through a mounting aperture 544. Fasteners 540, 543 engage fastener bores 542 to secure the stanchion to the housing. Many other mechanisms for supporting a light fixture may also be used. Electrical connections may be made from a power source S to the LED driver circuit and other lamp electronics 522 to power the LEDs 525 (FIG. 55).

Each LED 525 may be a single white LED or multiple white LEDs or each may comprise multiple LEDs either mounted separately or together on a single substrate or package including a phosphor-coated LED either alone or in combination with a color LED, such as a green LED, etc. Details of suitable arrangements of the LEDs and lamp electronics for use in the light fixture are disclosed in U.S. Pat. No. 9,786,639, issued Oct. 10, 2017, which is incorporated by reference herein in its entirety. In other embodiments, all similarly colored LEDs may be used where for example all warm white LEDs or all cool white LEDs may be used where all of the LEDs emit at a similar color point. In such an embodiment all of the LEDs are intended to emit at a similar targeted wavelength; however, in practice there may be some variation in the emitted color of each of the LEDs such that the LEDs may be selected such that light emitted by the LEDs is balanced such that the lighting device 436 emits light at the desired color point. In the embodiments disclosed herein, various combinations of LEDs of similar and different colors may be selected to achieve a desired color point. Each LED element or module may be a single white or other color LED chip or other bare component, or each may comprise multiple LEDs either mounted separately or together on a single substrate or package to form a module including, for example, at least one phosphor-coated LED either alone or in combination with at least one color LED, such as a green LED, a yellow LED, a red LED, etc. In those cases where a soft white illumination is to be produced, each LED 525 typically may include one or more blue shifted yellow LEDs and one or more red LEDs. The LEDs may be disposed in different configurations and/or layouts as desired. Different color temperatures and appearances may be produced using other LED combinations, as is known in the art. In one embodiment, the light source 523 comprises any LED, for example, an MT-G LED module incorporating TrueWhite® LED technology or as disclosed in U.S. Pat. No. 9,818,919, issued to Lowes et al. on Nov. 14, 2017, the disclosure of which is hereby incorporated by reference herein in its entirety. In any of the embodiments disclosed herein the LEDs 525 may have a Lambertian light distribution, although each may have a directional emission distribution (e.g., a side emitting distribution), as necessary or desirable. More generally, any Lambertian, symmetric, wide angle, preferential-sided, or asymmetric beam pattern LED(s) may be used as the light source. Various types of LEDs may be used, including LEDs having primary optics as well as bare LED chips. The LEDs 525 may be disposed in different configurations and/or layouts as desired. Different color temperatures and appearances could be produced using other LED combinations, as is known in the art. For example, a side emitting LED disclosed in U.S. Pat. No. 8,541,795, the disclosure of which is incorporated by reference herein, may be utilized. Still further, any of the LED arrangements and optical elements disclosed in U.S. Pat. No. 9,869,432, filed Dec. 9, 2013, which is hereby incorporated by reference herein, may be used.

Referring to FIGS. 55 through 58, the LEDs 525 are shown mounted on a substrate or LED board 528. The LED board 528 may be any appropriate board, such as a PCB, flexible circuit board, metal core circuit board or the like with the LEDs 525 mounted and electrically interconnected thereon. The LED board 528 can include the electronics and interconnections necessary to deliver power to the LEDs 525. The LED board 528 may provide the physical support for the LEDs 525 and may form part of the electrical path to the LEDs 525 for delivering current to the LEDs 525. If desired, a surface 530 of LED board 528 may be covered or coated by a reflective material, which may be a white material or a material that exhibits specular reflective characteristics. The LED board 528 is secured in fixed relation to the waveguide 500 in any suitable fashion such that the LEDs 525 are disposed opposite to the light coupling portion 524 as will be described.

The LEDs 525 emit light when energized through the electrical path. The term "electrical path" is used to refer to the entire electrical path to the LEDs 525, including an intervening driver circuit and other lamp electronics 522 in the lighting device disposed between the source of electrical power S and the LEDs 525. Electrical conductors (not shown) run between the LEDs 525, the driver circuit and other lamp electronics 522 and the source of electrical power S, such as an electrical grid, to provide critical current to the LEDs 525. The driver circuit and other lamp electronics 522 may be located remotely in driver housing 494, the driver circuit and other lamp electronics 522 may be disposed on the LED board 528 or a portion of the driver circuit and other lamp electronics 522 may be disposed on the LED board 528 and the remainder of the driver circuit and other lamp electronics 522 may be remotely located. The driver circuit and other lamp electronics 522 are electrically coupled to the LED board 528 and are in the electrical path to the LEDs 525. LED lighting systems can work with a variety of different types of power supplies or drivers. For example, a buck converter, boost converter, buck-boost converter, or single ended primary inductor converter (SEPIC) could all be used as driver or a portion of a driver for an LED lighting device or solid-state lamp. The driver circuit may rectify high voltage AC current to low voltage DC current and regulate current flow to the LEDs. The power source S can be a battery or, more typically, an AC source such as the utility mains. The driver circuit is designed to operate the LEDs 525 with AC or DC power in a desired fashion to produce light of a desired intensity and appearance. The driver circuit may comprise a driver circuit as disclosed in U.S. Pat. No. 9,791,110 issued on Oct. 17, 2017, or U.S. Pat. No. 9,303,823, issued Apr. 5, 2016, both of which are hereby incorporated by reference herein. The driver circuit may further be used with light control circuitry that controls color temperature of any of the embodiments disclosed herein in accordance with user input such as disclosed in U.S. patent application Ser. No. 14/292,286, filed May 2014, which is hereby incorporated by reference herein. Preferably, the light source 523 develops light appropriate for general illumination purposes.

The light emitted by the LEDs 525 is delivered to waveguide 500 for further treatment and distribution of the light as will be described in detail. The waveguide 500 may be used to mix the light emitted by the LEDs 525 and to emit the light in a directional or omnidirectional manner to produce a desired luminance pattern.

Further, any of the embodiments disclosed herein may include one or more communication components 460 forming a part of the light control circuitry, such as an RF antenna that senses RF energy or a light sensor. The communication components may be included, for example, to allow the luminaire to communicate with other luminaires and/or with an external controller such as a wireless remote control. More generally, the control circuitry includes at least one of a network component, an RF component, a control component, and a sensor. The sensor may provide an indication of ambient lighting levels thereto and/or occupancy within the illuminated area. The communication components such as a sensor, RF components or the like may be mounted as part of the housing or lens assembly. Such a sensor may be integrated into the light control circuitry. The communication components may be connected to the lighting device via a 7-pin NEMA photocell receptacle or other connection. In various embodiments described herein various smart technologies may be incorporated in the lamps as described in the following disclosures: U.S. Pat. No. 8,736,186, issued May 27, 2014, U.S. Pat. No. 9,572,226, issued Feb. 14, 2017, U.S. Pat. No. 9,155,165, issued Oct. 6, 2015, U.S. Pat. No. 8,975,827, issued Mar. 1, 2013, U.S. Pat. No. 9,155,166, issued Oct. 6, 2015, U.S. Pat. No. 9,433,061, issued Aug. 30, 2016, U.S. Pat. No. 8,829,821, issued Sep. 9, 2014, U.S. Pat. No. 8,912,735, issued Dec. 16, 2014, U.S. patent application Ser. No. 13/838,398, filed Mar. 15, 2013, U.S. Pat. No. 9,622,321, issued Apr. 11, 2017, U.S. patent Application Ser. No. 61/932,058, filed Jan. 27, 2014, the disclosures of which are incorporated by reference herein in their entirety. Additionally, any of the light fixtures described herein can include the smart lighting control technologies disclosed in U.S. Patent Application Ser. No. 2017/02310668, filed on Jun. 24, 2016, which is incorporated by reference herein in its entirety.

The lighting device 436 of FIGS. 52 through 54 is an embodiment of a solid-state lighting device suitable for use in outdoor applications; however, the system of the invention may be used in any solid-state lighting device. Moreover, while an embodiment of a lighting device is shown and described, the waveguides as disclosed herein may be used in any solid-state lighting device including lamps, luminaires, troffer-style lights, outdoor lighting or the like. The LEDs, waveguide, power circuit and other components may be housed in any suitable housing. The lighting devices described herein may be used for any suitable application in any environment such as interior lighting or exterior lighting. The lighting device may be used as a troffer luminaire, suspended luminaire, recessed lighting, street/roadway lighting, parking garage lighting or the like. The housing may be configured for the particular application and the light emitting portion of the waveguide may provide any suitable illumination pattern. Moreover, the number and type of LEDs used, and the total lumen output, color and other characteristics of the lighting device may be adjusted for the particular application.

In different lighting applications, the footprint of the waveguide is limited by the size constraints of the housing containing the waveguide and other lighting device components. For example, some lighting devices are built to fit predetermined standardized sizes. In other applications, such as streetlights, the size of the lighting device is limited by factors such as IP ratings, wind loading, and fixture weight. In other applications the size of the lighting device is limited by custom, aesthetic considerations, architectural considerations, or the like. In a typical LED based lighting device, the light output of the lighting device is dictated by the size and number of the LEDs and the power at which the LEDs are operated; however, the greater the number of LEDs and the higher power at which the LEDs are operated, the greater the heat generated by the LEDs. In traditional waveguides, LEDs run at high power concentrate thermal and photonic energy into a small input coupling region of the waveguide, e.g., the edge of an edge lit waveguide. Because heat has a deleterious effect on LED output and life and can adversely affect other components, such as the waveguide, the lumen power density of the LEDs at the input coupling region is limited, thereby limiting the output of the lighting device. While increasing the coupling area may reduce lumen power density, the constraints on increasing the footprint of the lighting device, and therefore the waveguide, limits the expansion of the footprint of the waveguide to an extent necessary to lower the lumen power density. As a result, existing waveguide designs are limited in lumen output by the lumen power densities. Existing lighting devices also may require extensive heat exchanger mechanisms to prevent overheating of the system components. The waveguides disclosed herein reduce the lumen power density at the LED/waveguide coupling interface to substantially reduce overheating without significantly increasing the footprint of the waveguide.

Referring again to FIGS. 55 through 59, the waveguide 500 comprises a waveguide body 512 that includes a light emitting portion 518, a light coupling portion 524, and a light transmission portion 526. The light emitting portion 518 includes a plurality of light extraction features 516 that extract light out of the waveguide body 512. The light coupling portion 524 is disposed adjacent to, and receives light emitted by, the light source 523 and directs light into the waveguide body 512. The light transmission portion 526 optically couples the light emitting portion 518 to the light coupling portion 524 such that light introduced into the light coupling portion 524 is transmitted to the light emitting portion 518.

Figure 56:
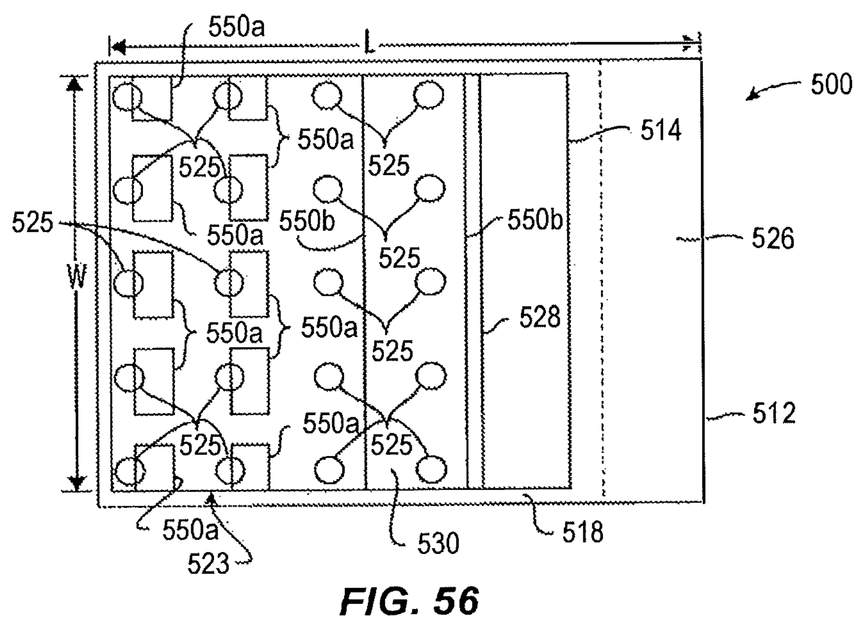
FIG. 56 is a top view of the waveguide of FIG. 55.
Figure 57:
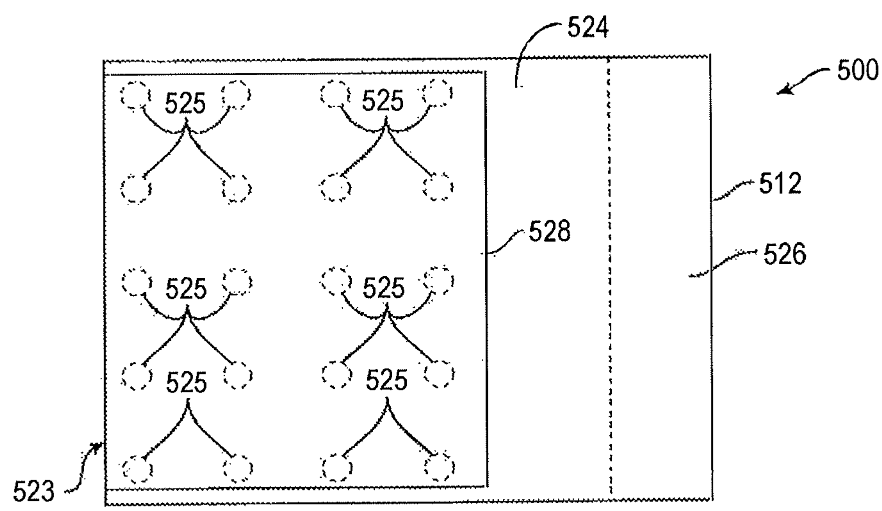
FIG. 57 is a bottom view of the waveguide of FIG. 55.
Figure 58:
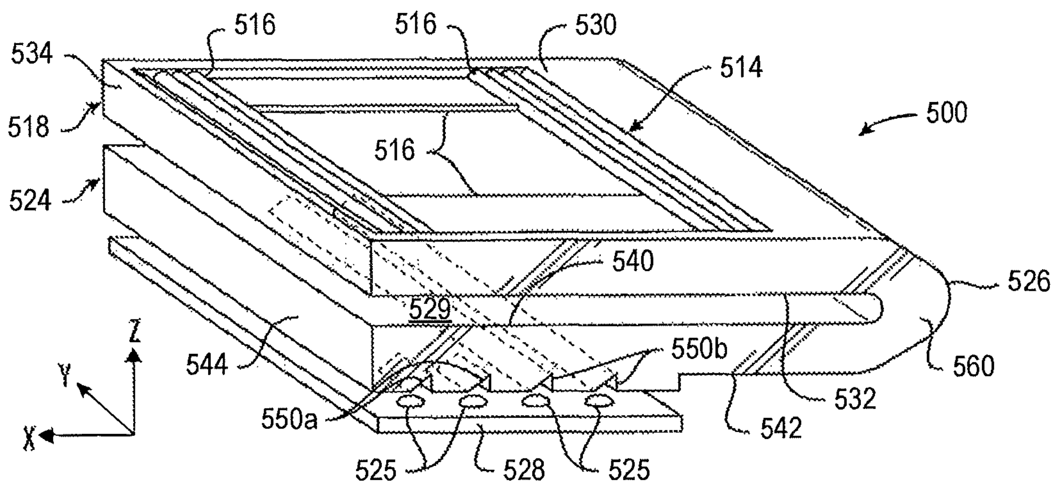
FIG. 58 is a first perspective view of the waveguide of FIG. 55.
Figure 59:
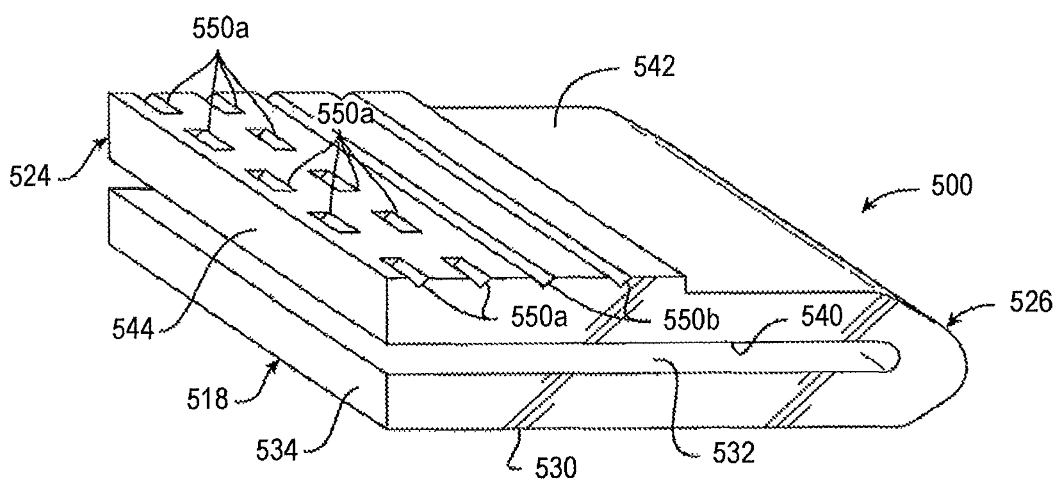
FIG. 59 is a second perspective view of the waveguide of FIG. 55.

The waveguide 500 may be made of any suitable optical grade material that exhibits total internal reflection (TIR) characteristics. The material may comprise but is not limited to acrylic, polycarbonate, glass, molded silicone, or the like. The waveguide 500 has a footprint that may be described, generally, in terms of the area of the waveguide in the plane of the light emitting surface. For example, in the waveguide 500 shown in FIGS. 55 through 59, the light emitting surface 530 is a generally rectangular area of the light emitting portion 518. The waveguide 500 has a generally rectangular footprint (FIG. 56). The footprint of the waveguide 500 may be slightly greater than the area of the light emitting surface 530 where, for example, as shown in FIG. 55, the light transmission portion 526 extends slightly laterally beyond the light emitting portion 518. For a rectangular waveguide the footprint of the waveguide 500 may be described in terms of its length and width. For example, the area of the footprint of waveguide 500 may be described in terms of its length L and width W, transverse to the length L. While the waveguide 500 shown in FIGS. 55 through 59 is rectangular, the waveguide may have any suitable shape including round, square, multi-sided, oval, irregular shaped or the like. In these and in other embodiments, the footprint of the waveguide may be expressed in terms other than length and width.

The light emitting portion 518 may be described generally as having an exterior surface 530, an interior surface 532 and a side surface 534. The exterior surface 530 is the light emitting surface. In the illustrated embodiment, the surfaces comprise generally planar walls; however, where the light emitting portion 518 has other than a rectangular shape, the surfaces may be defined in whole or part by curved walls, planar walls, faceted walls, or combinations of such walls.

One or more of the surfaces of the light emitting portion 518 may be formed with light extraction features 516 to define a light emitting area 514 on light emitting surface 530 (note, the light extraction features 516 are not shown in FIG. 56 in order to more clearly show the light source 523). The light extraction features 516 may be formed on the light emitting exterior surface 530, as shown. Alternatively, the light extraction features may be formed on the interior surface 532 to reflect light to and out of the exterior surface 530. In some embodiments, the light extraction features 516 may be formed on both the exterior surface 530 and the interior surface 532. The light extraction features 516 may also be formed within the waveguide body 512 at positions between the exterior and interior surfaces 530, 532. It is to be understood that in use, the waveguides described herein may assume any spatial orientation and the light emitting surface 530 may be an upper surface of the waveguide, a lower surface of the waveguide and/or a side surface of the waveguide. For example, in FIG. 55 the light emitting surface 530 faces up while in the embodiment of FIGS. 52 through 54, the light emitting surface 530 faces down to produce downlight. The light extraction features 516 may be designed to emit light from the waveguide in any direction and in any illumination pattern.

Figure 72:
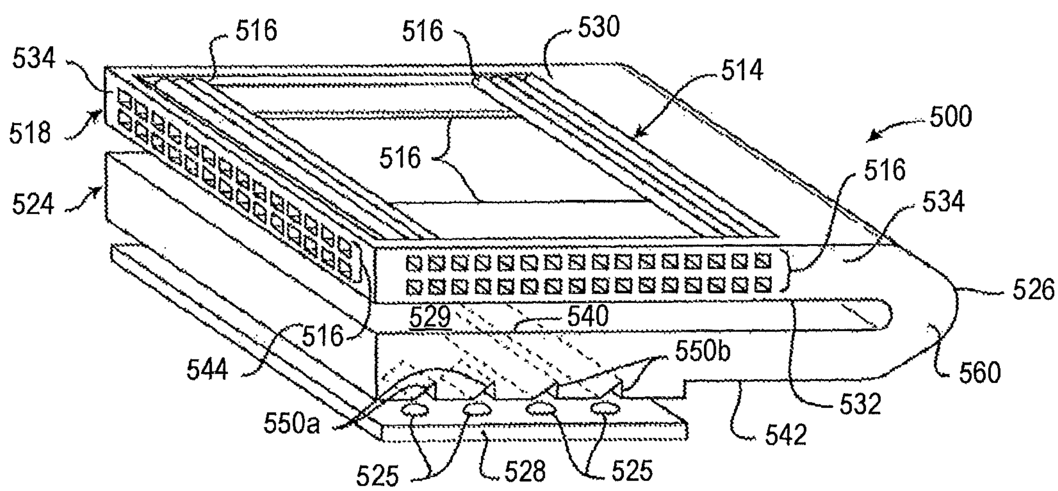
FIG. 72 is a perspective view of another embodiment of the waveguide.

Referring to FIG. 72, the light extraction features 516 may also be formed on the side surfaces 534 of the light emitting portion 518 such that light may emitted laterally from the waveguide in a direction substantially perpendicular to the direction of the light emitted from surface 534. The side surfaces 534 may form light emitting surfaces in addition to light emitting surface 530 or in place of light emitting surface 530.

The light extraction features 516 can comprise a single light extraction element or a plurality of individual light extraction elements. The size, shape and/or density of individual light extraction features 516 can be uniform or vary across one or more surfaces of the waveguide body 512 in a regular or irregular fashion to produce desired light emission pattern. The light extraction features 516 can comprise indents, depressions, facets or holes extending into the waveguide, or bumps, facets or steps rising above the waveguide surface, or a combination of both bumps and depressions. The light extraction features 516 may be part of the waveguide body 512 or may be coupled to surfaces of the waveguide body 512. Individual light extraction features 516 may have a symmetrical or asymmetrical shape or geometry. The light extraction features 516 can be arranged in an array and may exhibit regular or irregular spacing. The light extraction features 516 may be applied to the waveguide as part of the molding process of the waveguide body 512, by etching or other process, by application of a film containing the light extraction features or in other manners. One example of light extraction features is described in U.S. Pat. No. 9,835,317 issued Dec. 5, 2017, which is incorporated by reference herein in its entirety. Additionally, the extraction features may comprise small indents, protrusions, and/or reflective materials and/or surfaces as shown in U.S. Pat. No. 9,690,029, issued Jun. 27, 2017, which is incorporated by reference herein in its entirety. Light extraction features and light coupling features are also shown in U.S. Pat. No. 9,625,636, issued Apr. 18, 2017, which is incorporated by reference herein in its entirety. Another example of light extraction features is described in U.S. patent application Ser. No. 15/587,442, filed May 5, 2017, which is incorporated by reference herein in its entirety.

The light coupling portion 524 may be described generally as having an interior surface 540, an exterior surface 542 and a side surface 544. In the illustrated embodiment the surfaces comprise generally planar walls; however, where the light coupling portion 524 has other than a rectangular shape the surfaces may be defined in whole or part by curved walls, planar walls, faceted walls or combinations of such walls. The light coupling portion 524 is arranged such that it is disposed approximately parallel to the light emitting portion 518 in a layered or stacked configuration. In the orientation of the waveguide shown in FIG. 55 the light emitting portion 518 may be described as being over the light coupling portion 524 while in the orientation of the waveguide shown in FIGS. 52 through 54 the light emitting portion 518 may be described as being under the light coupling portion 524. In any orientation the light emitting portion 518 and the light coupling portion 524 may be described as being in a stacked or layered configuration. The light coupling portion 524 is spaced from the light emitting portion 518 by a narrow air gap 529. In some embodiments, the light coupling portion 524 is closely spaced from the light emitting portion 518 to minimize the height of the waveguide in the z-direction. In this manner, the light coupling portion 524 is arranged back-to-back with the light emitting portion 518. The light coupling portion 524 is disposed adjacent the non-light emitting interior surface 532 of the light emitting portion 518 such that the light coupling portion 524 does not interfere with light emitted from the light emitting portion 518.

As is evident from FIGS. 55 through 59, the light coupling portion 524 has substantially the same area as the light emitting portion 518 and is arranged to be substantially coextensive with the light emitting portion 518 such that the light coupling portion 524 does not increase the footprint of the waveguide relative to the light emitting portion 518. In some embodiments, the light coupling portion 524 may have a smaller footprint than the light emitting portion 518 provided the lumen density at the coupling face does not create overheating conditions for the system components. Moreover, in some embodiments, the light coupling portion 524 may have a larger footprint than the light emitting portion provided that the increase in footprint is not an issue in the lighting device. However, in some preferred embodiments, the footprint of the light coupling portion 524 is equal to or smaller that the footprint of the light emitting portion 518 such that the overall footprint of the waveguide is not increased. Moreover, the light emitting portion 518 and light coupling portion 524 may have different shapes. While the arrangement of the light coupling portion 524 may not increase the footprint of the waveguide, the entire exterior surface 542 of the light coupling portion 524 may be used as the coupling surface for the LEDs 525. As shown in FIGS. 55 through 59, an array of LEDs 525 may be positioned to input light into the light coupling portion 524 over substantially the entire exterior surface 542 thereof. The spacing of the LEDs 525 may be increased over a traditional edge lit waveguide and a greater number of LEDs operated at higher power may be used while still maintaining or decreasing the lumen power density of the device. Whether the footprint of the light coupling portion 524 is smaller than, larger than, or substantially the same as the footprint of the light emitting portion 518, the arrangement of the light guide as described herein can be used to control the routing of the light through the waveguide to produce any mixture of light output patterns. The direction, intensity and lumen density of the light may be managed simultaneously using the waveguide arrangements as described herein.

Each of the LEDs 525 may be optically coupled to the light coupling portion 524 by light coupling features **550*a*, 550*b*. The light coupling features 550*a* are arranged in a one-to-one relationship with the LEDs 525 while the light coupling features 550*b* optically couple more than one LED 525 to the waveguide 500. In some embodiments, all of the light coupling features may be in a one-to-one relationship with the LEDs, and in other embodiments, all of the light coupling features may be coupled to plural LEDs. The number, spacing and pattern of the LEDs 525 and of light coupling features 550*a*, 550*b*** may be different than as shown herein. Light may be coupled into the waveguide through an air gap and a coupling cavity defined by surfaces located at an edge and/or interior portions of the waveguide. Such surfaces comprise an interface between the relatively low index of refraction of air and the relatively high index of refraction of the waveguide material. One way of controlling the spatial and angular spread of injected light is by fitting each source with a dedicated lens. These lenses can be disposed with an air gap between the lens and the coupling optic, or may be manufactured from the same piece of material that defines the waveguide's distribution element(s). The light coupling features may differ from those disclosed herein and may be used provide directional light into the waveguide.

Figure 71:
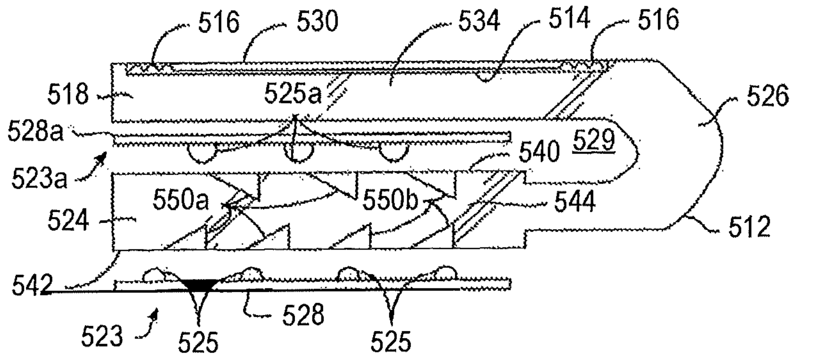
FIG. 71 is a side section view of another embodiment of a waveguide.

As shown in FIGS. 55 through 59, the LEDs 525 are placed adjacent the exterior surface 542 of the light coupling portion 524 to allow access to the LEDs 525 and to simplify manufacturing; however, the LEDs 525 may be arranged in the air gap 529 between the light coupling portion 524 and the light emitting portion 518. In such an arrangement, the LEDs are arranged opposite the interior face 540 of the light coupling portion 524 to direct light into the light coupling portion 524. In other embodiments, the LEDs may be arranged adjacent both the exterior surface 542 of the light coupling portion 524 and in the air gap 529 between the light coupling portion 524 and the light emitting portion 518. As shown in FIG. 71, in such an arrangement, a second light source **523*a* is arranged in space 529 such that the LEDs 525*a* of the second light source 523*a* are arranged opposite the internal face 540 of the light coupling portion 524. The light source 523*a* may be powered as previously described with respect to light source 523. Light coupling features 550*a*, 550*b* may be provided in face 540 to couple LEDs 525*a* to the waveguide. Using a first light source 523 and a second light source 523*a* increases the light directed into the waveguide and increases the over-all lumen output at the light emitting portion 534**.

Regardless of the type of light coupling features used, the entire surface 542 of the light coupling portion 524 is available to couple the LEDs 525 to the waveguide. As shown in the embodiment of FIGS. 55 to 59, the light coupling surface 542 extends substantially parallel to the light emitting surface 530 such that the area of the light coupling surface is approximately the same as the area of the light emitting surface 530. It is to be understood that in some embodiments, the light emitting portion 518 and the light coupling portion 524 may be tapered or curved such that the light coupling portion 524 and the light emitting portion 518 may not be parallel in the strictest sense and may have slightly different areas even where the footprints of the light coupling portion 524 and the light emitting portion 518 are the same.

The waveguide 500 is arranged such that the light coupling surface 542 is a major surface of the waveguide. As explained above, the light coupling portion 524 has major interior and exterior surfaces connected by much smaller side or edge surfaces. The areas of the major interior and exterior surfaces are significantly greater than the area of the side edge surfaces such that using one of the major surfaces of the waveguide as the light coupling surface 542 greatly reduces the density of the LEDs 525.

The light transmission portion 526 optically couples the light coupling portion 524 to the light emitting portion 518. The light transmission portion 526 transmits the light from the light coupling portion 524 to the light emitting portion 518 and may be used to condition the light. For example, the light transmission portion 526 may be used to color mix the light and to eliminate hot spots. In the embodiment of FIGS. 55 through 59, the light transmission portion 526 comprises a curved or angled section of the waveguide body that bends back over itself to transmit the light from an edge of the light coupling portion 524 to an edge of the light emitting portion 518.

The light may be transmitted through the light coupling portion 524, the light transmission portion 526 and the light emitting portion 518 using total internal reflection (TIR) principles. Total internal reflection occurs when a propagating wave strikes a medium boundary at an angle larger than a particular critical angle with respect to the normal to the surface. If the refractive index is lower on the other side of the boundary and the incident angle is greater than the critical angle, the wave cannot pass through and is entirely reflected. In the waveguide 500 TIR principles may be used to transmit the light through the waveguide. However, in some embodiments reflectors may be used. For example, reflectors or a reflective material may be disposed over all a part of the light transmission portion 526 and over parts of the light coupling portion 524 and the light emitting portion 518. The reflective material may comprise a specular layer, a white optic layer or the like and may comprise a film, paint, a physical layer or the like.

In addition to increasing the area of the light coupling surface 542, the waveguides as described herein also increase the functional light path of the light traveling from the light coupling features 550 to the light extraction features 516. As is evident from FIGS. 55 through 59, the light path includes some, or all, of the light coupling portion 524, some, or all, of the light emitting portion 518 as well as the length of the light transmission portion 526. The light path is increased while maintaining a minimum footprint of the waveguide. While the z-dimension of the waveguide is increased, the x, y dimensions (as represented by width W and length L in FIG. 56) are not increased and typically the x, y dimensions are the critical dimensions in lighting device design.

Figure 73:
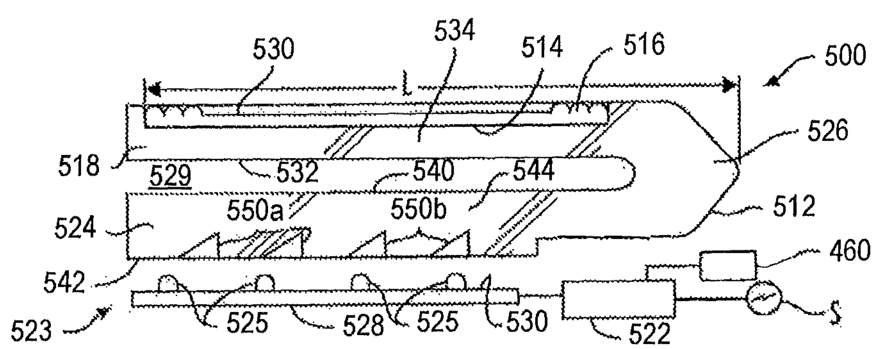
FIG. 73 is a side section view of another embodiment of a waveguide.

In some embodiments, one or more of the light coupling portion 524, the light transmission portion 526 and the light emitting portion 518 may be provided with internal light altering features 533 for diffusing and/or reflecting the light as shown in FIG. 73. These internal light altering features 533 may comprise gas voids (such as air "bubbles"), discrete elements such as diffusive and/or specular reflective particles suspended in or dispersed throughout the waveguide body or other reflective, diffusive or refractive elements such as elongated features. The light altering features 533 may be of any suitable shape and size, and each of the light altering features may be of the same or different shapes and sizes as other ones of the light altering features. The light altering features 533 may be dispersed uniformly or non-uniformly in the wave guide body to alter the path of travel of the light through the waveguide body and to alter the light pattern of the emitted light. In some embodiments, one section of the waveguide body, such as the light emitting portion, may have the light altering features while other sections of the waveguide body, such as the light coupling portion, may not have the light altering features. Moreover, the density of the light altering features may be uniform or non-uniform throughout the waveguide.

Figure 60:
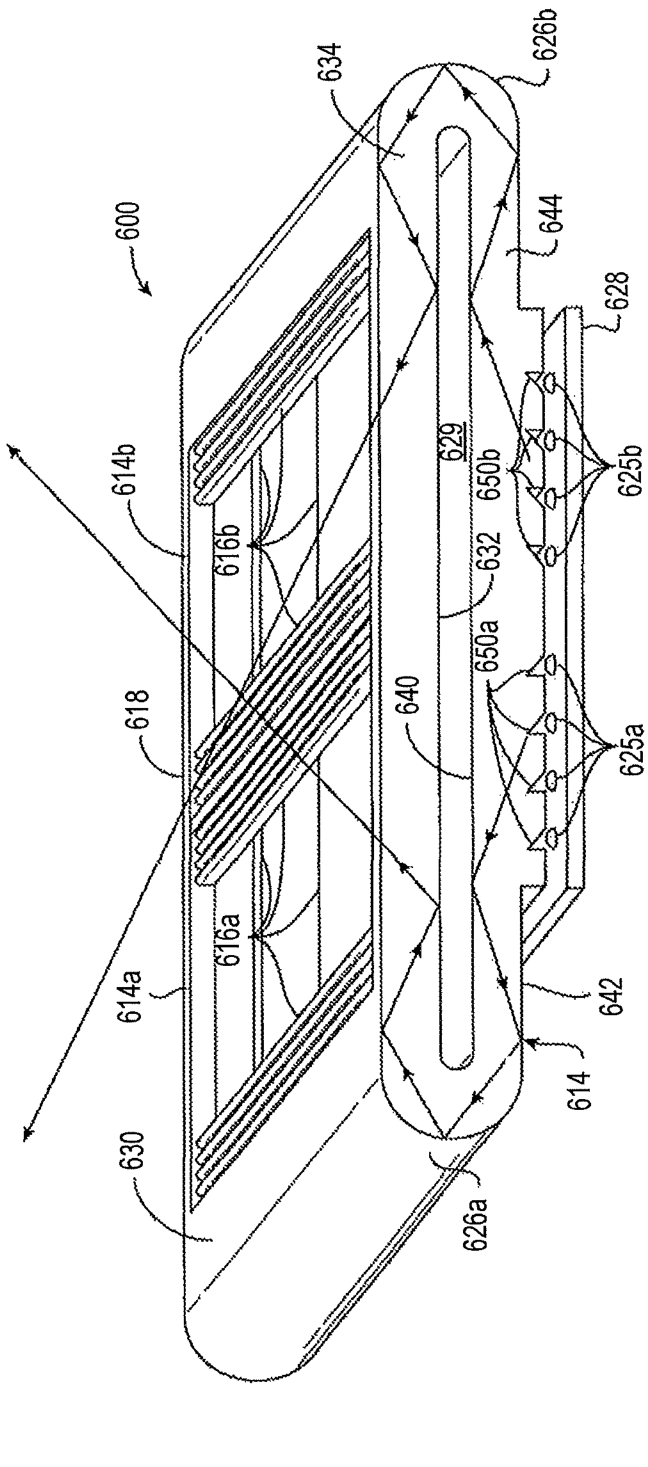
FIG. 60 is a perspective view of another embodiment of the waveguide.

Referring to FIG. 60, another embodiment of a waveguide 600 is illustrated. The embodiment of FIG. 60 is similar to that described above with reference to FIGS. 55 through 59 except that the LEDs 625*a*, 625*b* and light coupling features 650*a*, 650*b* are arranged in multiple groups and the light from each group is transmitted through opposing light transmission sections 626*a*, 626*b* such that the light of the two groups enters the light emitting portion 618 from opposite ends and in opposite directions. The light emitting portion 618 may be described generally as having an exterior surface 630, an interior surface 632 and side or edge surfaces 634. In the illustrated embodiment, the surfaces comprise generally planar surfaces; however, where the light emitting portion 618 has other than a rectangular shape these surfaces may be defined in whole or part by curved walls, planar walls, faceted walls, or combinations of such walls.

One or more of the surfaces of the light emitting portion may be formed with two groups of light extraction features 616*a*, 616*b* to define light extraction areas 614*a*, 614*b*. In the illustrated embodiment, the light extraction features 616*a*, 616*b* are formed on the exterior surface 630 to direct light out of the exterior surface 630. Exterior surface 630 is the light emitting surface. Alternatively, the light extraction features may be formed on the interior surface 632 such that the light extraction features redirect the light to the exterior surface 630. The light extraction features may also be formed between the interior surface 632 and the exterior surface 630. Further, the light extraction features 616*a*, 616*b* may be directional such that the light extraction area 614*a* directs light in a first direction, to the right as viewed in FIG. 60, and the light extraction area 614*b* directs light in a second direction, to the left as viewed in FIG. 60. The light extraction features 616*a*, 616*b* may be configured as previously described.

The light coupling portion 624 may be described generally as having an interior surface 640, an exterior surface 642 and edge or side surfaces 644. In the illustrated embodiment, the surfaces comprise generally planar surfaces; however, where the light coupling portion 624 has other than a rectangular shape these surfaces may be defined in whole or part by curved walls, planar walls, faceted walls, or combinations of such walls. The light coupling portion 624 is arranged such that it is disposed approximately parallel to and spaced closely from the light emitting portion 618 by an air gap 629. In this manner the light coupling portion 624 is arranged back-to-back with the light emitting portion 618. The light coupling portion 624 is disposed adjacent the non-light emitting surface 632 of the light emitting portion 618 such that the light coupling portion 624 does not interfere with light emitted from the light emitting portion 618. As is evident from FIG. 60, the light coupling portion 624 has substantially the same area as the light emitting portion 618 and is arranged to be substantially coextensive with the light emitting portion 618 such that the light coupling portion does not increase the footprint of the waveguide relative to the light emitting portion. While the light coupling portion does not increase the footprint of the waveguide, the entire lower surface 642 of the light coupling portion 614 may be used as the coupling surface for the LEDs 625*a*, 625*b*.

As shown in FIG. 60, a first array of LEDs 625*a* may be positioned to input light into the light coupling portion 624 over a first section of the exterior surface 642 thereof and a second array of LEDs 625*b* may be positioned to input light into the light coupling portion 624 over a second section of the exterior surface 642 thereof. In the illustrated embodiment, the number and spacing of the LEDs 625*a*, 625*b* is approximately equal; however, the two groups of LEDs may differ in size, number of LEDs, spacing of LEDs, types of LEDs, or the like. The spacing of the LEDs may be increased over a traditional edge lit waveguide and a greater number of LEDs operated at higher power may be used while still maintaining or decreasing the lumen power density.

Each of the LEDs 625*a*, 625*b* may be optically coupled to the light coupling portion by light coupling features 650*a*, 650*b*, respectively. The light coupling features 650*a*, 650*b* may be arranged in a one-to-one relationship with the LEDs or a single light coupling feature may be used to optically couple multiple LEDs to the waveguide, as previously described. Regardless of the type of light coupling feature used, the entire surface 642 of the light coupling portion 618 is available to couple the LEDs 625*a*, 625*b* to the waveguide. The light coupling features may be configured such that the light emitted from the first group of LEDs 625*a* is directed in a different direction than the light emitted from the second group of LEDs 625*b*. As shown in FIG. 60, the light from LEDs 625*a* is directed to the left and the light from LEDs 625*b* is directed to the right.

Optically coupling the light coupling portion 614 to the light emitting portion 618 are two light transmission portions 626*a*, 626*b*, one arranged at each end of the light emitting portion and the light coupling portion such that light emitted from LEDs 625*a* is transmitted through light coupling portion 626*a* and light emitted from LEDs 625*b* is transmitted through light coupling portion 626*b*. The light enters the light emitting portion 618 from opposite ends thereof and travels through the light emitting portion in opposite directions as represented by arrows in FIG. 60. The light extraction features 616*a*, 616*b* may be arranged such that light traveling through light emitting portion 618 in the first direction is emitted generally in the first direction and light traveling through light emitting portion 618 in the second direction is emitted generally in the second direction. Because the light is emitted in the same general direction as it is traveling through the light emitting portion 618 optical efficiency of the waveguide is increased as compared to a system where a portion of the light must be reversed against its direction of travel. The arrangement described with respect to FIG. 60 may be used to generate a bi-directional light pattern with greater efficiency than if one of the directional light patterns had to be turned against its input direction. It is noted that the light extraction features may be selected to generate any light pattern including for example, a narrow beam angle spot light, wide beam angle flood light or the like. The illumination pattern may be directionally asymmetrical, or it may be directionally symmetrical.

Figure 61:
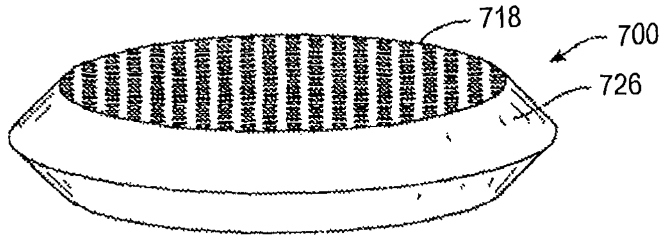
FIG. 61 is a perspective view of another embodiment of the waveguide.
Figure 62:
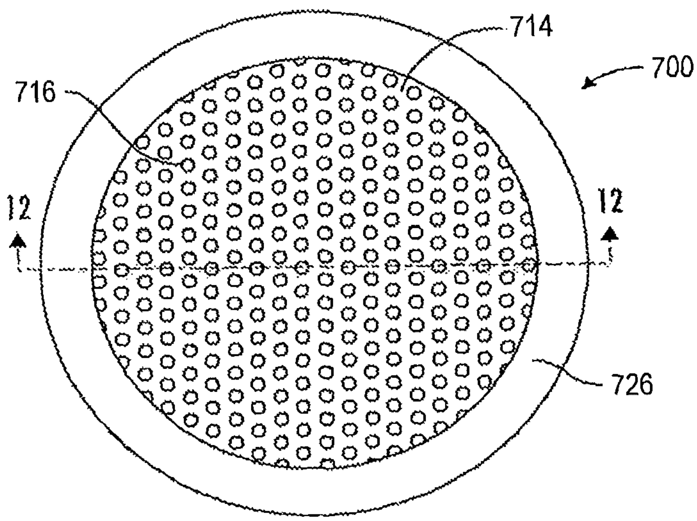
FIG. 62 is a top view of the waveguide of FIG. 61.
Figure 63:
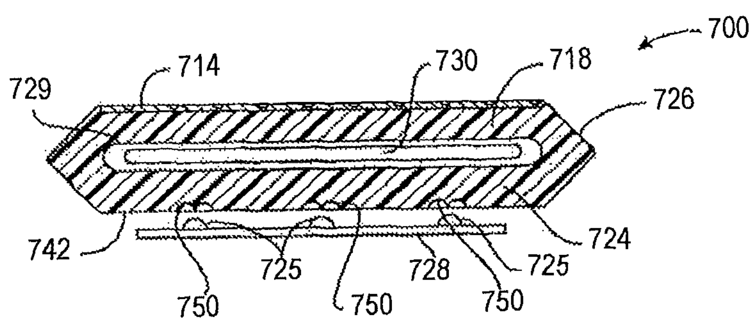
FIG. 63 is a side section view of the waveguide of FIG. 61.

Another embodiment of the waveguide of the invention is shown in FIGS. 61 through 63. In this embodiment, the waveguide 700 has a generally circular footprint where the light coupling portion 724 and the light emitting portion 718 are generally cylindrical in shape. Light is emitted into the generally circular light coupling surface 742 of light coupling portion 724 by LEDs 725 mounted on LED board 728. The light may be directed into light coupling features 750. The light is directed radially outwardly in the light coupling portion 724. The light is transmitted to a generally annular light transmission portion 726. The light transmission portion 726 transmits the light into the outer periphery of the circular light emitting portion 718 and the light is directed radially inwardly by the light transmission portion 726. The light emitting portion 718 has a light emitting surface 714 that includes light emitting features 716. The light may be emitted from the light emitting portion 718 in any suitable pattern. In this and in any of the other embodiments described herein a reflector 730 may be positioned between the light emitting portion 718 and the light coupling portion 724 to optically isolate these portions from one another. As in the other embodiments described above, the light emitting portion 718 is arranged in a layer above the light coupling portion 724 and the two layers are separated by a small air gap 729. While the embodiment shown in FIGS. 61 through 63 is circular, the lighting device may be oval, rectangular, or irregularly shaped where the light is projected radially inwardly into the light emitting portion from the periphery of the light emitting portion 718 by the light transmission portion 724.

Figure 64:
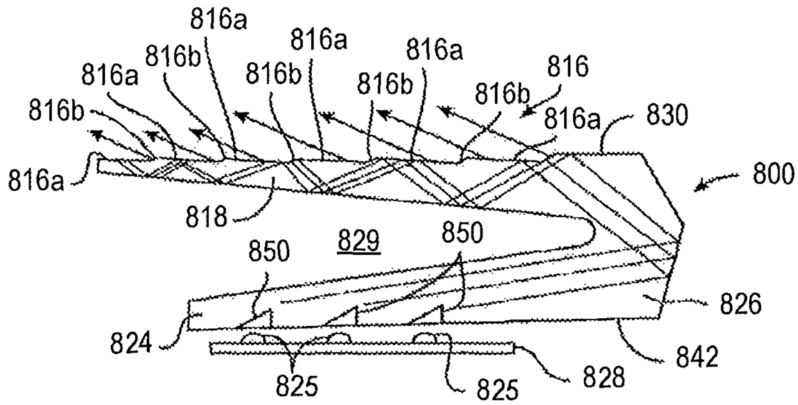
FIG. 64 is a side section view of another embodiment of a waveguide.

Another embodiment of the waveguide of the invention is shown in FIG. 64. In this embodiment, the waveguide 800 has a generally rectangular footprint where the light coupling portion 824 and the light emitting portion 818 are generally rectangular in shape. The light coupling portion 824, light emitting portion 818 and the light transmission portion 826 are generally arranged as explained with respect to the embodiment of FIGS. 55 through 59; however, the light coupling portion 824 is arranged to generate collimated light and the light emitting portion 818 tapers from the light transmission portion 818 to its distal end. Light is emitted into the light coupling surface 842 of light coupling portion 824 by LEDs 825 mounted on LED board 828. The light may be directed into light coupling features 850. As in the other embodiments described above, the light emitting portion 826 is arranged in a layer above the light coupling portion 824 and the two layers are separated by an air gap 829. A light transmission portion 826 optically connects the light emitting portion 818 and the light coupling portion 824 as previously described. In this embodiment, the light emitting portion 818 comprises a light emitting surface 830 formed by light emitting features 816 comprising a plurality of stepped faces 816*a* connected by intermediate surfaces 816*b* that may be planar, curved, concave, scalloped or the like.

Figure 65:
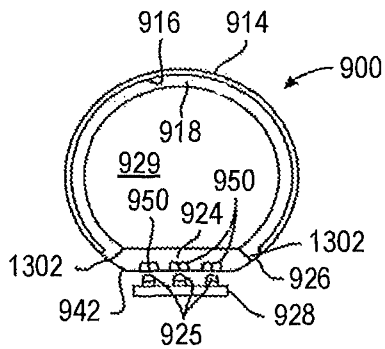
FIG. 65 is a top view of another embodiment of a waveguide.
Figure 66:
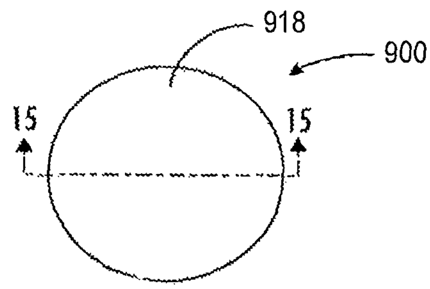
FIG. 66 is a section view taken along line 15-15 of FIG. 65.
Figure 67:
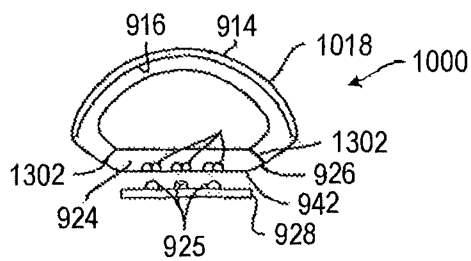
FIG. 67 is a top view of another embodiment of a waveguide.
Figure 68:
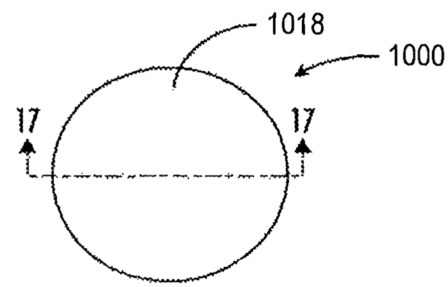
FIG. 68 is a section view taken along line 17-17 of FIG. 67.

Another embodiment of the waveguide of the invention is shown in FIGS. 65 and 66. In this embodiment, the waveguide 900 may have a generally circular footprint, as shown, or it may have a rectangular footprint. Light is emitted into the light coupling surface 942 of light coupling portion 924 such that the light is directed radially outwardly from the light coupling portion 924. Light is emitted into the generally circular light coupling surface 942 of light coupling portion 924 by LEDs 925 mounted on LED board 928. The light may be directed into light coupling features 950. The light is transmitted to a generally annular light transmission portion 926. The light transmission portion 926 transmits the light into the edge of a dome shaped light emitting portion 918. The light emitting portion 918 has a light emitting surface 914 formed by light emitting features 916 as described above. The light may be emitted from the light emitting portion 918 in any suitable pattern; however, with the dome style light emitting portion the light may be emitted nearly omnidirectionally. As in the other embodiments described above, the light emitting portion 918 is arranged in a layer above the light coupling portion 924 and the two layers are separated by an air gap 929. FIGS. 67 and 68, show another embodiment of a waveguide 1000 that is similar to the waveguide of FIGS. 65 and 66 (where like reference numbers are used to identify the same elements) except that the light emitting portion 1018 is formed as a shallower dome and is more closely spaced to the light coupling portion 924.

Figure 69:
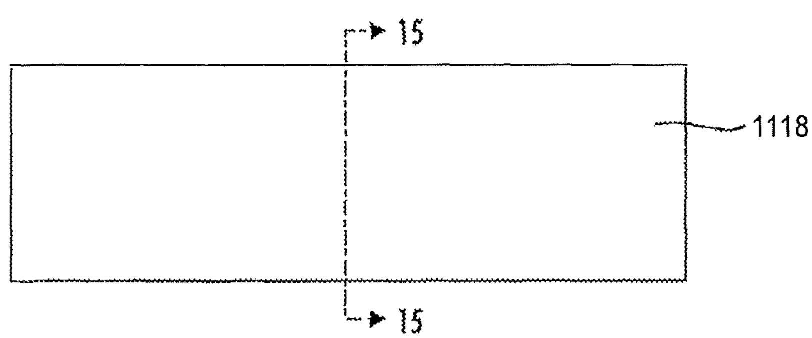
FIG. 69 is a top view of another embodiment of a waveguide.

Another embodiment of the waveguide of the invention is shown in FIG. 69. The waveguide that is similar to the waveguide of FIGS. 65 through 68 (where like reference numbers are used to identify the same elements) except that the light coupling portion, light emitting portion 1018 and the light transmission portion extend linearly to create an elongated, linear waveguide. It should be noted that in this and in the other embodiments described herein the relative dimensions of the waveguide in the x, y, z directions may be different than as shown, such that the waveguides may be relatively longer, wider or narrower than as specifically shown herein. For example, the width dimension W, as shown in FIG. 56, may be increased relative to the length L to create a linear waveguide.

In the embodiments described above, the light coupling portion, light emitting portion and the light transmission portion are formed as part of an integral, one-piece waveguide. In the embodiments described above, the waveguide may be made of a single piece of material, or the waveguide may be made of separate pieces connected together to create the unitary structure. For example, the light emitting portion, the light coupling portion and the light transmission portion may be molded as a single piece. In other embodiments, the light coupling portion and the light transmission portion may be molded as a single piece and the light emitting portion may be molded as a separate piece. The pieces may be designed specifically to be optically coupled to one another to create a finished waveguide.

Figure 70:
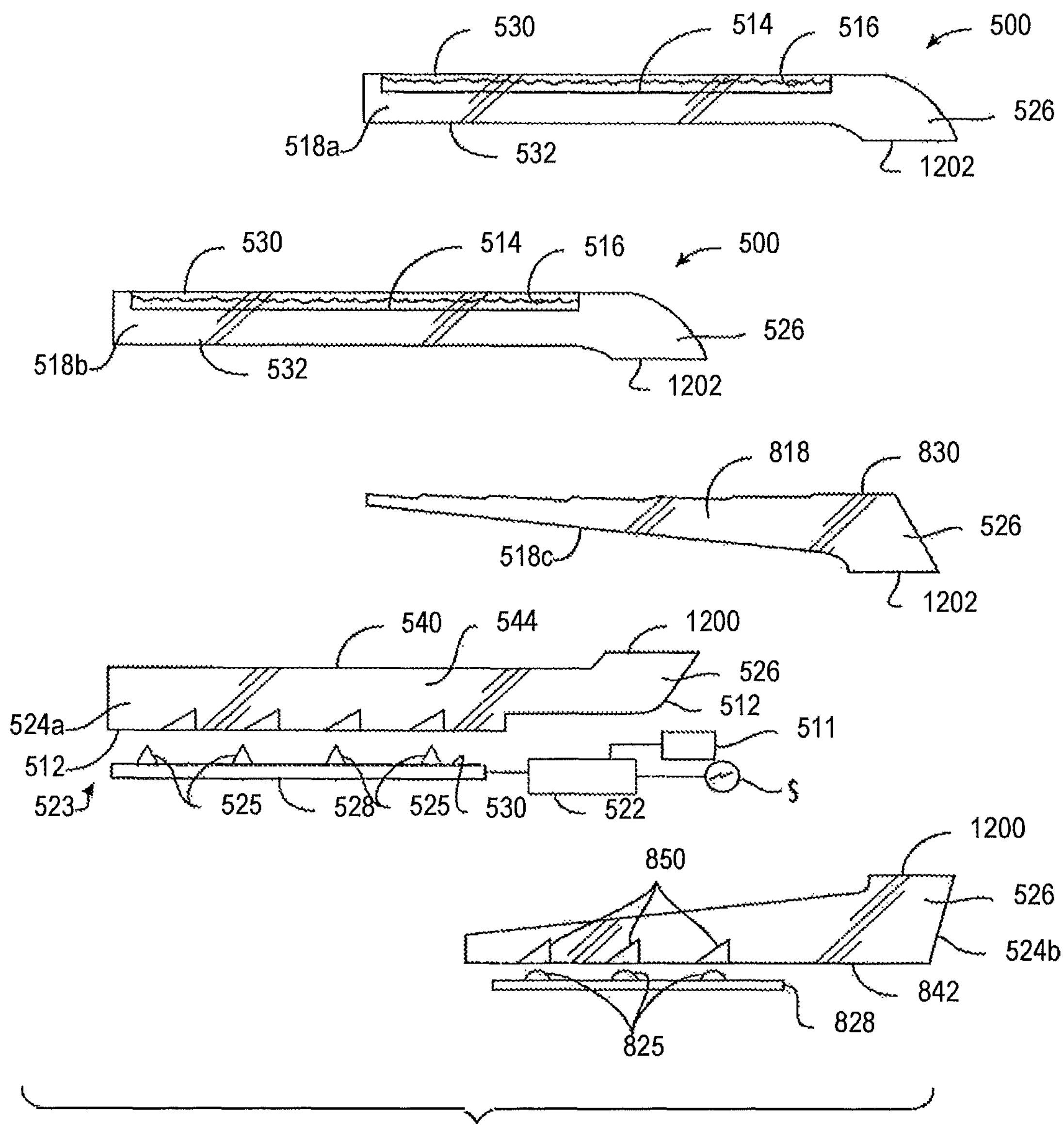
FIG. 70 shows side section views of waveguide components of a modular waveguide system.

However, in other embodiments, a standardized light coupling portion may be designed to be used with multiple different types of light emitting sections as shown in FIG. 70. In such embodiments, the light coupling portion 524*a* may be formed separately from a plurality of the light emitting portions 518*a*, 518*b*, 518*c* such that the light coupling portion 524*a* may be optically connected to any one of a plurality of light emitting portions. In the illustrated embodiment each of the light coupling portion 524*a* and the light emitting portions 518*a*, 518*b*, 518*c* include a portion of the light transmission portion 526. However, the light transmission portion 526 may be entirely contained within one of the light coupling portion or the light emitting portions. Moreover, each of the light transmission portion, the light coupling portion and the light emitting portion may be formed separately. An interface 5200 is created on the light coupling portion 524*a* that optically couples the light coupling portion 524*a* to a mating interface 1202 provided on any one of the plurality of different types of light emitting portions 518*a*, 518*b*, and 518*c*. The interfaces 1201, 1202 may comprise mechanical connectors to secure the portions to one another and an optical gel or other medium may be used between the portions to optically couple the portions to one another. In this manner a single light coupling portion may be used with different types of light emitting portions and/or light transmission portions. For example, as shown in FIG. 70 the light emitting portion 518*a* may be substantially similar to the light emitting portion described with respect to FIGS. 55 through 59; the light emitting portion 518*c* may be substantially similar to the light emitting portion described with respect to FIG. 64; and the light emitting portion 518*b* may be similar to the light emitting portion of FIGS. 55 through 59 except that the light emitting portion 518*b* may be circular rather than rectangular. While examples of different types of light emitting portions are shown, it is to be understood that the light emitting portions may differ from one another in ways different than as specifically described. Moreover, different types of light coupling portions 524*a*, 524*b* may also be provided. For example, light coupling portion 524*a* may be substantially similar to the light coupling portion described with respect to FIGS. 55 through 59; and the light emitting portion 524*b* may be substantially similar to the light emitting portion described with respect to FIG. 64. While examples of different types of light coupling portions are shown it is to be understood that the light coupling portions may differ from one another in ways different than as specifically described. For example, referring to FIGS. 66 and 68, the domed light emitting portions 918, 1018 may be coupled to the same type of light coupling portion 942 at interfaces 1302. The modular approach as described herein allows the number of components to be reduced where, for example, a single light coupling portion may be used with a variety of different types of light emitting portions to create different types of waveguides.

In some embodiments, different portions of the waveguide may be made of different materials to provide different portions of the waveguide with different optical properties. For example, the light emitting portions may be formed of glass while the light coupling portion may be formed of a different material such acrylic or silicone. In other embodiments the light extracting region may be formed of silicone while the remainder of the light emitting portion may be glass. Making different portions of the waveguide of different materials may be most easily performed where the light guide comprises separately made portions; however, even where the waveguide is an integral, one-piece waveguide, different materials may be used to create different portions of the waveguide. The different materials may comprise acrylic, polycarbonate, glass, molded silicone, other optical materials or combinations of such materials. Moreover, the materials may include particles, additives, or the like that alter the optical properties such that, for example, one portion of the waveguide may be made of acrylic and a second portion of the waveguide may be made of acrylic containing reflective or diffusive particles. In such an embodiment, the acrylic and acrylic containing particles are considered different materials. Other materials and in combinations other than as described herein may be used to create different portions of the waveguide having different optical properties.

The waveguide(s) 500 described herein may comprise additional features to assist in developing the target illumination distribution(s). The embodiments discussed herein may incorporate reflecting and/or diffusing surface coverings/coatings. The coverings/coatings may take the form of reflecting/diffusing coatings, paints, and/or sprays as applied to metals, plastics, papers, and/or films. Further, the coverings/coatings contemplated herein may take the form of reflecting/diffusing films and/or sheets including paper films, plastic films, paper sheets, plastics sheets, and/or metal sheets. The reflecting/diffusing films, coatings, paints, sheets, and/or sprays may have the same and/or different reflecting and/or diffusing properties. Further, the films, coatings, paints, sheets, and/or sprays may be applied to provide more or less coverage of the example waveguide(s). Still further, the films, coatings, paints, and/or sprays may be applied to particular parts while not being applied to other parts. The films, coatings, paints, sheets, and/or sprays may be applied during or after manufacture of the waveguide(s) 500, and before, during, and/or after the manufacture and/or assembly of the lighting systems. The films, coatings, paints, sheets, and/or sprays contemplated by this disclosure are referred to as coatings and films, although use of these terms referentially should not limit the materials/substances added to the waveguide.

INDUSTRIAL APPLICABILITY

When one uses a relatively small light source which emits into a broad (e.g., Lambertian) angular distribution (common for LED-based light sources), the conservation of etendue, as generally understood in the art, requires an optical system having a large emission area to achieve an asymmetric angular light distribution. In the case of parabolic reflectors, a large optic is thus generally required to achieve high levels of collimation. In order to achieve a large emission area in a more compact design, the prior art has relied on the use of Fresnel lenses, which utilize refractive optical surfaces to direct and collimate the light. Fresnel lenses, however, are generally planar in nature, and are therefore not well suited to re-directing high-angle light emitted by the source, leading to a loss in optical efficiency. In contrast, in the present invention, light is coupled into the optic, where primarily TIR is used for re-direction and light distribution. This coupling allows the full range of angular emission from the source, including high-angle light, to be re-directed, resulting in higher optical efficiency in a more compact form factor.

The placement of multiple LED element(s) and the optics of the waveguide bodies overlay the illumination from each LED element onto each other, which further helps color mixing while maintaining a desired photometric distribution. While specific coupling feature and extraction feature and/or redirection feature parameters including shapes, sizes, locations, orientations relative to a light source, materials, etc. are disclosed as embodiments herein, the present invention is not limited to the disclosed embodiments, inasmuch as various combinations and all permutations of such parameters are also specifically contemplated herein. Any of the features such as various shaped coupling cavities, LED elements, redirection features, color mixing structures and/or cavities, extraction features, etc. described and/or claimed in U.S. patent application Ser. No. 13/842,521, U.S. patent application Ser. No. 13/839,949, U.S. patent application Ser. No. 13/841,074, filed Mar. 15, 2013, U.S. patent application Ser. No. 13/840,563, U.S. patent application Ser. No. 14/101,086, filed Dec. 9, 2013, U.S. patent application Ser. No. 14/101,132, filed Dec. 9, 2013, U.S. patent application Ser. No. 14/101,147, filed Dec. 9, 2013, U.S. patent application Ser. No. 14/101,129, filed Dec. 9, 2013, and U.S. patent application Ser. No. 14/101,051, filed Dec. 9, 2013, International Patent Application No. PCT/US14/13931, filed Jan. 30, 2014, and International Patent Application No. PCT/US14/030017, filed Mar. 15, 2014, incorporated by reference herein, may be used in a luminaire, either alone or in combination with one or more additional elements, or in varying combination(s) to obtain light mixing and/or a desired light output distribution. Thus, for example, any of the luminaries disclosed herein disclosed herein may include one or more waveguide bodies including coupling features, one or more light redirection features, one or more extraction features or optics, and/or particular waveguide body shapes and/or configurations as disclosed in such applications, as necessary or desirable. Other waveguide body form factors and luminaries incorporating such waveguide bodies are also contemplated.

At least some of the luminaries disclosed herein are particularly adapted for use in installations, such as outdoor products (e.g., streetlights, high-bay lights, canopy lights; area lights) preferably requiring a total luminaire output of at least about 3,000 lumens or greater, and, in some embodiments, a total luminaire output of up to about 8,000 lumens, and, in other embodiments, a total lumen output from about 10,000 lumens to about 23,000 lumens. Further, the luminaries disclosed herein preferably develop a color temperature of between about 2,500 degrees Kelvin and about 6,200 degrees Kelvin, and more preferably between about 3,000 degrees Kelvin and about 6,000 degrees Kelvin, and, in some embodiments, between about 3,500 degrees Kelvin and about 4,500 degrees Kelvin. Also, at least some of the luminaries disclosed herein preferably exhibit an efficacy of at least about 90 lumens per watt, and more preferably at least about 100 lumens per watt, and more preferably, at least about 110 lumens per watt, and more preferably, about 115 lumens per watt. Also, at least some of the luminaries disclosed herein exhibit an efficacy of about 115 lumens per watt or greater. Further, at least some of the waveguide bodies used in the luminaries disclosed herein preferably exhibit an overall efficiency (i.e., light extracted out of the waveguide body divided by light injected into the waveguide body) of at least about 90 percent. A color rendition index (CRI) of at least about 80 is preferably attained by at least some of the luminaries disclosed herein, with a CRI of at least about 85 being more preferable. The luminaries disclosed herein produce a scotopic to photopic (S/P) ratio of at least 1.4, preferably at least 2.0. Any desired form factor and particular output light distribution, including up and down light distributions or up only or down only distributions, etc. may be achieved.

Embodiments disclosed herein are capable of complying with improved operational standards as compared to the prior art as follows:

In certain embodiments, the waveguide bodies used in the luminaries disclosed herein may generally taper from a first edge to a second edge thereof so that substantially all light is extracted during a single pass of each light ray from the LED element(s) to the second edge of the waveguide body. This extraction strategy maximizes the incidence of light rays impinging on an outer side of each extraction feature and being reflected out a surface (or surfaces) of the waveguide body in a controlled manner, as opposed to striking other surfaces at an angle greater than the critical angle and escaping as uncontrolled light. The outer sides of the extraction features are accurately formed so that control is maintained over the direction of extracted light, thereby allowing a high degree of collimation. Still further, the waveguide body is very low profile, leaving more room for heat exchanger structures, driver components, and the like in the luminaire. Also, glare is reduced as compared with other lamps using LED light sources because light is directed outwardly in the waveguide body while being extracted from the waveguide body by the extraction features such that the resulting emitted light is substantially mixed and substantially uniformly distributed throughout the beam angle. The result is a light distribution that is pleasing and particularly useful for general illumination and other purposes using a light source, such as one or more LED element(s).

In some embodiments, one may wish to control the light rays such that at least some of the rays are collimated, but in the same or other embodiments, one may also wish to control other or all of the light rays to increase the angular dispersion thereof so that such light is not collimated. In some embodiments, one might wish to collimate to narrow ranges, while in other cases, one might wish to undertake the opposite. Any of these conditions may be satisfied by the luminaires utilizing waveguide bodies disclosed herein through appropriate modification thereof.

All references, including publications, patent applications, and patents, cited herein are hereby incorporated by reference to the same extent as if each reference were individually and specifically indicated to be incorporated by reference and were set forth in its entirety herein.

Those skilled in the art will recognize improvements and modifications to the preferred embodiments of the present disclosure. All such improvements and modifications are considered within the scope of the concepts disclosed herein and the claims that follow.

Some of the devices described herein utilize a "back-lit" approach in which one or more LED element(s) are located at least partially within one or more coupling cavities each in the form of a hole or depression in a waveguide body. In the embodiment shown in the figures, the coupling cavity extends fully through the waveguide body, although the coupling cavity may extend only partially through the waveguide body. A plug member disposed at least partially in the coupling cavity or formed integrally with the waveguide body to define the coupling cavity diverts light into the waveguide body. Light extraction features may be disposed in or on one or more surfaces of the waveguide body. A diffuser may be disposed adjacent the waveguide body proximate the plug member(s). In such an arrangement, light emitted by the LED element(s) is efficiently coupled into the waveguide body with a minimum number of bounces off of potentially absorbing surfaces, thus yielding high overall system efficiency. This arrangement also offers additional potential benefits in that multiple LED elements may be placed apart at greater distances, thereby reducing the need for costly and bulky heat sinking elements. Further, this approach is scalable in that the distance that light must travel through the waveguide body may be effectively constant as the luminaire size increases.

In the back-lit approach described in the immediately preceding paragraph, it is desirable that the proper amount of light is transmitted through each plug member such that the local region on the diffuser aligned with the plug member shows neither a bright nor a dark spot, nor a spot with a color that differs noticeably from the surrounding regions. Because the volume of the plug member is generally small, it is necessary to provide the plug member with a high degree of opacity, which can be achieved by incorporating highly scattering particles that are typically small in diameter in the material of the plug member. However, small particle diameter typically leads to preferential scattering of short wavelength (blue) light. As a result, the light transmitted through the plug member may have a noticeable yellowish tint, which is typically undesirable.

Further, there exist practical limits on the amount of scattering material that may be incorporated into the plug member. As a result, it may not be possible to achieve sufficient opacity without high absorption using scattering particles that are incorporated into the plug member material. Finally, in regions where the plug member is in contact with the sidewall of the coupling cavity, the index of refraction difference interface at the surface of the cavity may be interrupted, thereby allowing light to transmit from the plug member into the waveguide but not subject to refraction necessary to ensure total TIR within the waveguide.

Still further, a number of LEDs of the same color together comprising an LED element may be disposed in one or more of the coupling cavities. Alternatively, a number of LEDs not all of the same color and together comprising a multi-color LED element may be used in one or more of the coupling cavities of the luminaire in order to achieve a desired lighting effect, such as a particular color temperature. In the former case, a non-uniform intensity of light may be produced. In the latter case, a multi-color LED element may be subject to non-uniform color distribution at high angles, leading to non-uniformity in the color and intensity of output luminance. A non-uniform color distribution also may result from a multi-color LED element having different color LEDs with varying heights. For example, a multi-color LED element may include one or more red LEDs surrounded by a plurality of blue-shifted yellow LEDs. Each red LED has a height that is less than a height of the surrounding blue-shifted yellow LEDs. The light emitted from the red LED, therefore, is obstructed at least in part by the blue-shifted yellow LED, such that the light emanating from the LED element is not uniform. In addition to height differences, differences in the nature of the red and blue-shifted yellow LEDs affect the way the light is emitted from the respective LED.

According to an aspect of the present invention, the coupling cavities may have any of a number of geometries defined by surfaces that promote redirection of the light rays (e.g., through refraction) to better mix the light rays developed by the LEDs. Other design features are disclosed herein according to other aspects that promote light mixing and/or color and/or light intensity uniformity. Thus, for example, some embodiments comprehend the use of a thin reflective layer, such as a metal layer, on a portion of each plug member wherein the layer is of appropriate thickness to allow sufficient light to transmit without substantial shift in color.

Other embodiments relate to the fabrication and surface smoothness of the surface(s) defining the cavity or cavities, change in LED position and/or other modifications to the LED(s) or LED element(s), use of internal TIR features inside the waveguide body, and/or use of one or more masking elements to modify luminance over the surface of the luminaire module.

Figure 1:
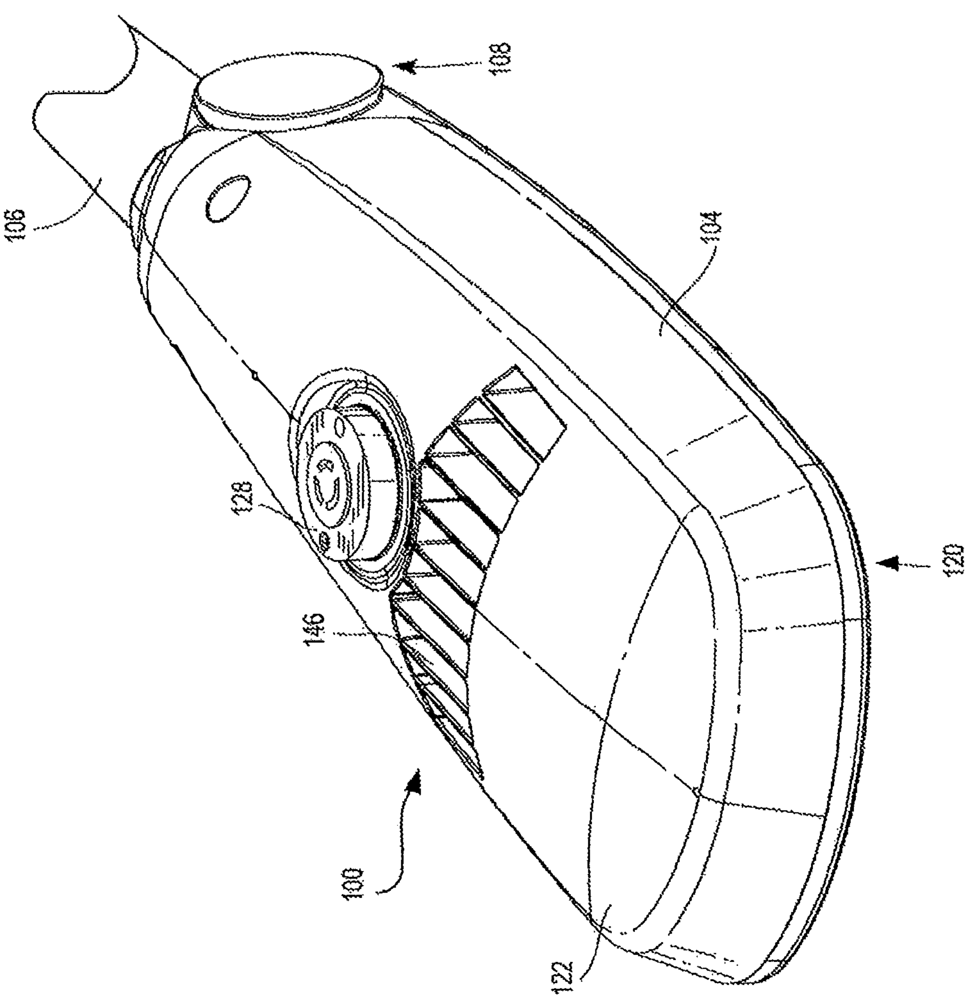
FIG. 1 is an isometric view from above of a luminaire.
Figure 2:
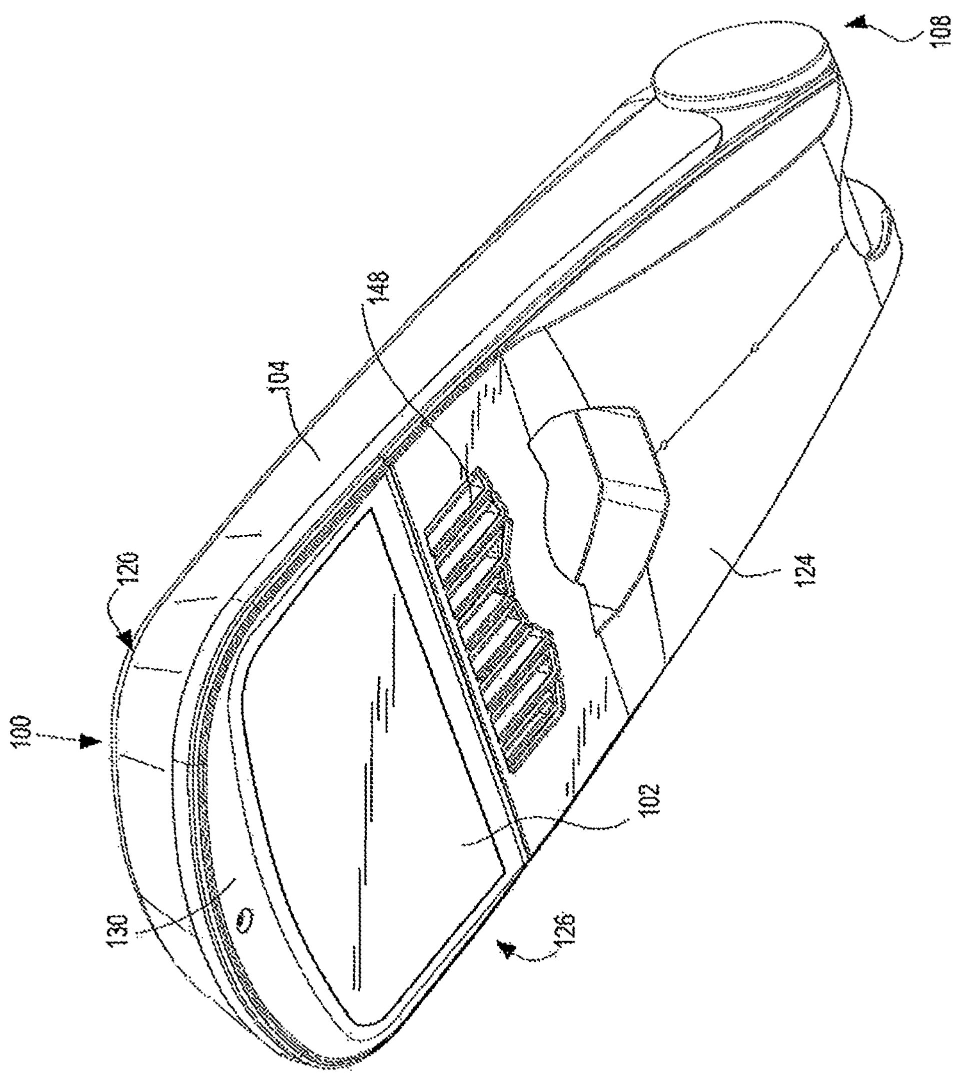
FIG. 2 is an isometric view from below of the luminaire of FIG. 1.
Figure 74A:
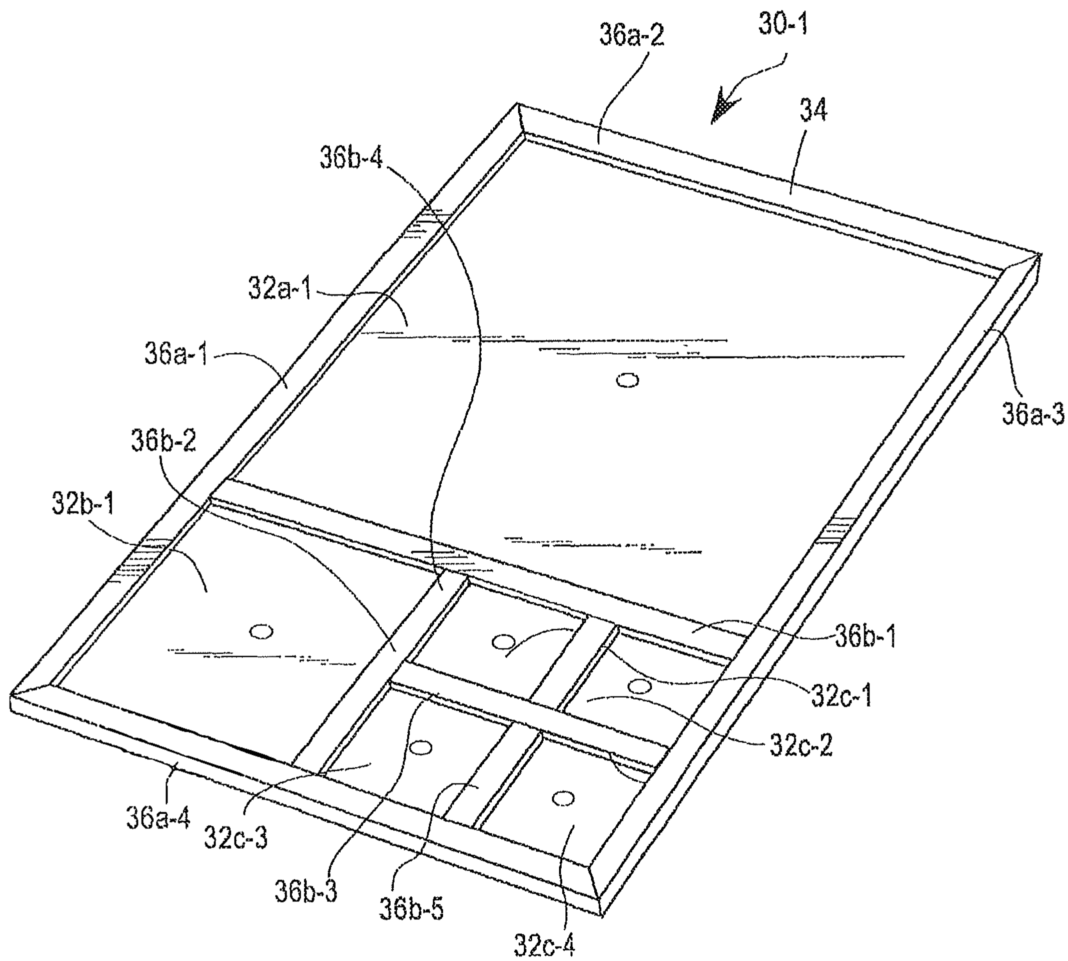
FIG. 74A is an isometric view of a second embodiment of a luminaire incorporating one or more waveguides.

Specifically, FIGS. 74 and 2 illustrate a low profile luminaire 30 utilizing one or more back-lit waveguide luminaire portions 32*a*-32*d* to spread light uniformly. Each waveguide luminaire portion 32*a*-32*d* is joined or secured to other portions 32 by any suitable means, such as a frame 34 including outer frame members 36*a*-36*d* and inner frame members 36*e*-36*g* that are secured to one another in any suitable manner. One or more of the frame members may be coated with a reflective white or specular coating or other material, such as paper or a scattering film, on surfaces thereof that abut the portions 32. Alternatively, the luminaire portions 32 may abut one another directly, or may be separated from one another by an air gap, an optical index matching coupling gel, or the like. In these latter embodiments, the luminaire portions 32 may be secured together by any suitable apparatus that may extend around all of the portions 32 and/or some or all of the individual portions 32. In any event, the luminaire 30 may comprise a troffer sized to fit within a recess in a dropped ceiling, or may have a different size and may be suspended from a ceiling, either alone or in a fixture or other structure. The luminaire 30 is modular in the sense that any number of luminaire portions 32 may be joined to one another and used together. Also, the size of each luminaire portion 32 may be selected so that the luminaire portions may all be of a small size (e.g., about 6 in by 6 in or smaller), a medium size (e.g., about 1 ft by 1 ft), or a large size (e.g., about 2 ft by 2 ft or larger), or may be of different sizes, as desired. For example, as seen in FIG. 74A, an alternative luminaire 30-1 may have one large luminaire portion 32*a*-1 of a size of about 2 ft by 2 ft, a medium luminaire portion 32*b*-1 of a size of about 1 ft by 1 ft, and four small luminaire portions 32*c*-1 through 32*c*-4 each of a size of about 6 in by 6 in, wherein the luminaire portions 32 are maintained in assembled relation by a frame 34 comprising frame members 36*a*-1 through 36*a*-4 and 36*b*-1 through 36*b*-5. (The luminaire portion sizes noted above are approximate in the sense that the frame dimensions are not taken into account.) Any other overall luminaire size and/or shape and/or combinations of luminaire portion size(s), number(s), and relative placement are possible.

Figure 75:
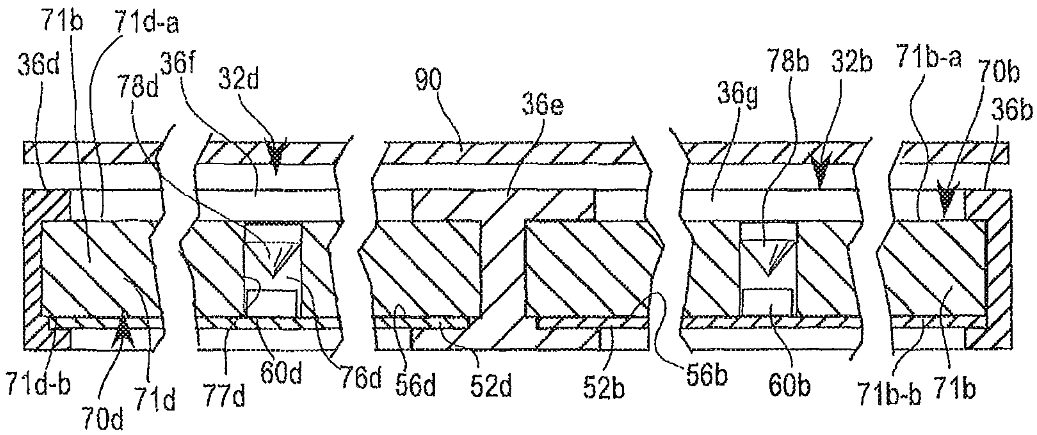
FIG. 75 is a sectional view taken generally along the lines 2-2 of FIG. 74.

As seen in FIG. 75, each luminaire portion 32 includes a base element in the form of a substrate 52 having a base surface 56. If desired, the base surface 56 may be covered or coated by a reflective material, which may be a white material or a material that exhibits specular reflective characteristics. A light source 60 that may include one or more light emitting diodes (LEDs) is mounted on the base surface 56. The light source 60 may be one or more white or other color LEDs or may comprise multiple LEDs either mounted separately or together on a single substrate or package including a phosphor-coated LED either alone or in combination with at least one color LED, such as a green LED, a yellow or amber LED, a red LED, etc. In those cases where a soft white illumination is to be produced, the light source 60 typically includes one or more blue shifted yellow LEDs and one or more red LEDs. Different color temperatures and appearances could be produced using other LED combinations, as is known in the art. In one embodiment, the light source comprises any LED, for example, an MT-G LED element incorporating TrueWhite® LED technology or as disclosed in U.S. patent application Ser. No. 13/649,067, filed Oct. 10, 2012, entitled "LED Package with Multiple Element Light Source and Encapsulant Having Planar Surfaces" by Lowes et al., the disclosure of which is hereby incorporated by reference herein, both as developed by Cree, Inc., the assignee of the present application. In any of the embodiments disclosed herein the LED(s) have a particular emission distribution, as necessary or desirable. For example, a side emitting LED disclosed in U.S. Pat. No. 8,541,795, the disclosure of which is incorporated by reference herein, may be utilized inside the waveguide body. More generally, any lambertian, symmetric, wide angle, preferential-sided, or asymmetric beam pattern LED(s) may be used as the light source.

The light source 60 is operated by control circuitry (not shown) in the form of a driver circuit that receives AC or DC power. The control circuitry may be disposed on the substrate 52 or may be located remotely, or a portion of the control circuitry may be disposed on the substrate and the remainder of the control circuitry may be remotely located. In any event, the control circuitry is designed to operate the light source 60 with AC or DC power in a desired fashion to produce light of a desired intensity and appearance. If necessary or desirable, a heat exchanger (not shown) is arranged to dissipate heat and eliminate thermal crosstalk between the LEDs and the control circuitry. Preferably, the light source develops light appropriate for general illumination purposes including light similar or identical to that provided by an incandescent, halogen, or other lamp that may be incorporated in a down light, a light that produces a wall washing effect, a task light, a troffer, or the like.

A waveguide 70 has a main body of material 71 (FIG. 75), which, in the illustrated embodiment, has a width and length substantially greater than an overall thickness d thereof and, in the illustrated embodiment, is substantially or completely rectangular or any other shape in a dimension transverse to the width and thickness (FIG. 74). Preferably, the thickness d may be at least about 500 microns, and more preferably is between about 500 microns and about 10 mm, and is most preferably between about 3 mm and about 5 mm. The waveguide body 71 may be made of any suitable optical grade material including one or more of acrylic, air, molded silicone, polycarbonate, glass, and/or cyclic olefin copolymers, and combinations thereof, particularly (although not necessarily) in a layered arrangement to achieve a desired effect and/or appearance.

Figure 4:
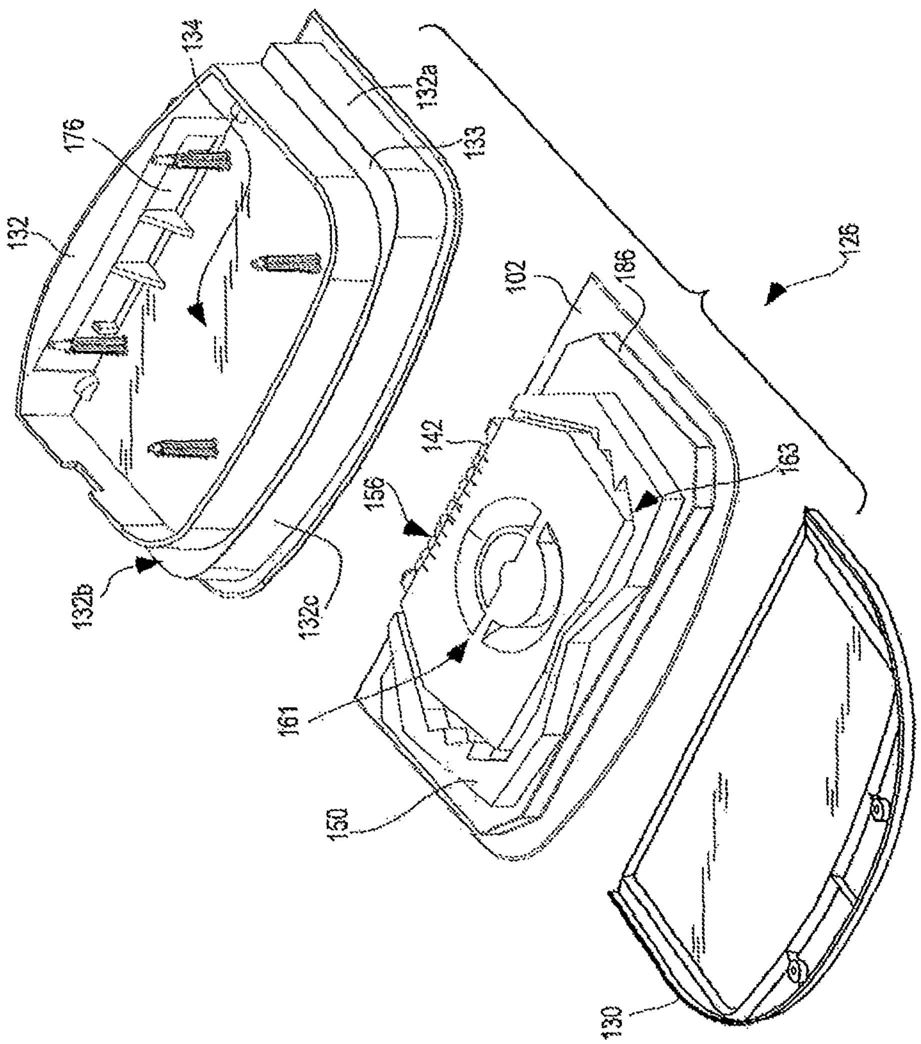
FIG. 4 is a partial exploded fragmentary isometric view from above of an optical assembly portion of FIG. 1.

In the illustrated embodiment, the waveguide body 71 has a constant thickness over the width and length thereof, although the body 71 may be tapered linearly or otherwise over the length and/or width such that the waveguide body 71 is thinner at one or more edges than at a central portion thereof. The waveguide body 71 further includes a first or outer side or surface 71*a*, a second opposite inner side or surface 71*b*, and an interior coupling cavity 76. The interior coupling cavity 76 is defined by a surface 77 that, in the illustrated embodiment, extends partially or fully through the waveguide 70 from the first side toward the second side. Also in some of the illustrated embodiments, the surface 77 defining the cavity 76 is preferably (although not necessarily) normal to the first and second sides 71*a*, 71*b* of the waveguide 70 and the cavity 76 is preferably, although not necessarily, centrally located with an outer surface of the main body of material 71. In some or all of the embodiments disclosed herein, the surface 77 (and, optionally, the surfaces defining alternate cavities described herein) is preferably polished and optically smooth. Also preferably, the light source 60 extends into the cavity 76 from the first side thereof. Still further in the illustrated embodiment, a light diverter of any suitable shape and design, such as a conical plug member 78, extends into the cavity 76 from the second side thereof. Referring to FIGS. 2-4, in a first embodiment, the surface 77 is circular cylindrical in shape and the conical plug member 78 includes a first portion 80 that conforms at least substantially, if not completely, to the surface 77 (i.e., the first portion 80 is also circular cylindrical in shape) and the first portion 80 is secured by any suitable means, such as, an interference or press fit or an adhesive, to the surface 77 such that a second or conical portion 82 of the plug member 78 extends into the cavity 76. Preferably, although not necessarily, the conformance of the outer surface of the first portion 80 to the surface 77 is such that no substantial gaps exist between the two surfaces where the surfaces are coextensive. Still further, if desired, the conical plug member 78 may be integral with the waveguide body 71 rather than being separate therefrom. Further, the light source 60 may be integral with or encased within the waveguide body 71, if desired. In the illustrated embodiment, the first portion 80 preferably has a diameter of at least 500 um, and more preferably between about 1 mm and about 20 mm, and most preferably about 3 mm. Further in the illustrated embodiment, the first portion 80 has a height normal to the diameter of at least about 100 um, and more preferably between about 500 um and about 5 mm, and most preferably about 1 mm. Still further in the illustrated embodiment, the second portion 82 forms an angle relative to the portion 80 of at least about 0 degrees, and more preferably between about 15 degrees and about 60 degrees, and most preferably about 20 degrees. The plug member 78 may be made of white polycarbonate or any other suitable transparent or translucent material, such as acrylic, molded silicone, polytetrafluoroethylene (PTFE), Delrin® acetyl resin, or any other suitable material. The material of the plug member 78 may be the same as or different than the material of the waveguide body 71.

In all of the embodiments disclosed herein, one or more pluralities of light extraction features or elements 88 may be associated with the waveguide body 71. For example one or more light extraction features 88 may be disposed in one or both sides or faces 71*a*, 71*b* of the waveguide body 71. Each light extraction feature 88 comprises a wedge-shaped facet or other planar or non-planar feature (e.g., a curved surface such as a hemisphere) that is formed by any suitable process, such as embossing, cold rolling, or the like, as disclosed in U.S. patent application Ser. No. 13/842,521. Preferably, in all of the embodiments disclosed herein the extraction features are disposed in an array such that the extraction features 88 are disposed at a first density proximate the cavity and gradually increase in density or size with distance from the light source 60, as seen in U.S. patent application Ser. No. 13/842,521. In any of the embodiments disclosed herein, as seen in FIGS. 76A and 76B, the extraction features may be similar or identical to one another in shape, size, and/or pitch (i.e., the spacing may be regular or irregular), or may be different from one another in any one or more of these parameters, as desired. The features may comprise indents, depressions, or holes extending into the waveguide, or bumps or facets or steps that rise above the surface of the waveguide, or a combination of both bumps and depressions. Features of the same size may be used, with the density of features increasing with distance from the source, or the density of features may be constant, with the size of the feature increasing with distance from the source and coupling cavity. For example, where the density of the extraction features is constant with the spacing between features of about 500 microns, and each extraction feature comprises a hemisphere, the diameter of the hemisphere may be no greater than about 1 mm, more preferably no greater than about 750 microns, and most preferably no greater than about 100 microns. Where each extraction feature comprises a shape other than a hemisphere, preferably the greatest dimension (i.e., the overall dimension) of each feature does not exceed about 1 mm, and more preferably does not exceed about 750 microns, and most preferably does not exceed about 100 microns. Also, the waveguide body 71 may have a uniform or non-uniform thickness. Irrespective of whether the thickness of the waveguide body 71 is uniform or non-uniform, a ratio of extraction feature depth to waveguide body thickness is preferably between about 1:10,000 and about 1:2, with ratios between about 1:10,000 and about 1:10 being more preferred, and ratios between about 1:1000 and about 1:5 being most preferred.

It should also be noted that the extraction features may be of differing size, shape, and/or spacing over the surface(s) of the waveguide body so that an asymmetric emitted light distribution is obtained. For example, FIG. 76C illustrates an arrangement wherein a relatively large number of extraction features 88*a* are disposed to the left of the coupling cavity 76 and a relatively small number of extraction features 88*b* are disposed to the right of the coupling cavity 76. As should be evident, more light is extracted from the left side of the waveguide body 71 and relatively less light is extracted from the right side of the waveguide body 71.

In all of the embodiments disclosed herein, the waveguide body may be curved, thereby obviating the need for some or all of the extraction features. Further, a diffuser 90 (FIG. 75) is preferably (although not necessarily) disposed adjacent the side 71*a* of the waveguide body 71 and is retained in position by any suitable means (not shown).

In the first embodiment, and, optionally, in other embodiments disclosed herein, the second portion 82 of the plug member 78 is coated with a reflecting material using any suitable application methodology, such as a vapor deposition process. Preferably, a thin reflective layer, such as a metal layer of particles, of appropriate layer thickness is uniformly disposed on the conical portion 82 to allow sufficient light to transmit through the plug member 78 so that development of a visually observable spot (either too bright or too dark or color shifted with respect to surrounding regions) is minimized at an outer surface of the diffuser 90 adjacent the plug member 78. In the preferred embodiment the metal layer comprises aluminum or silver. In the case of silver, the reflective layer preferably has a thickness of no greater than about 100 nm, and more preferably has a thickness between about 10 nm and about 70 nm, and most preferably has a thickness of about 50 nm. In the case of aluminum, the reflective layer preferably has a thickness of no greater than about 100 nm, and more preferably has a thickness between about 10 nm and about 50 nm, and most preferably has a thickness of about 30 nm.

In any of the embodiments disclosed herein the second portion 82 of the plug member 78 may be non-conical and may have a substantially flat shape, a segmented shape, a tapered shape, an inclined shape to direct light out a particular side of the waveguide body 71, etc.

In alternate embodiments, as seen in FIGS. 79-16, the plug member 78 has a first portion of any other suitable noncircular shape, including a symmetric or asymmetric shape, as desired, and a second portion preferably (although not necessarily) of conical shape as noted above. The coupling cavity may also (although it need not) have a noncircular shape or the shape may be circular where the first portion 80 is disposed and secured (in which case the first portion 80 is circular cylindrical) and the shape of the coupling cavity may be noncircular in other portions (i.e., at locations remote from the first portion 80).

Figure 5:
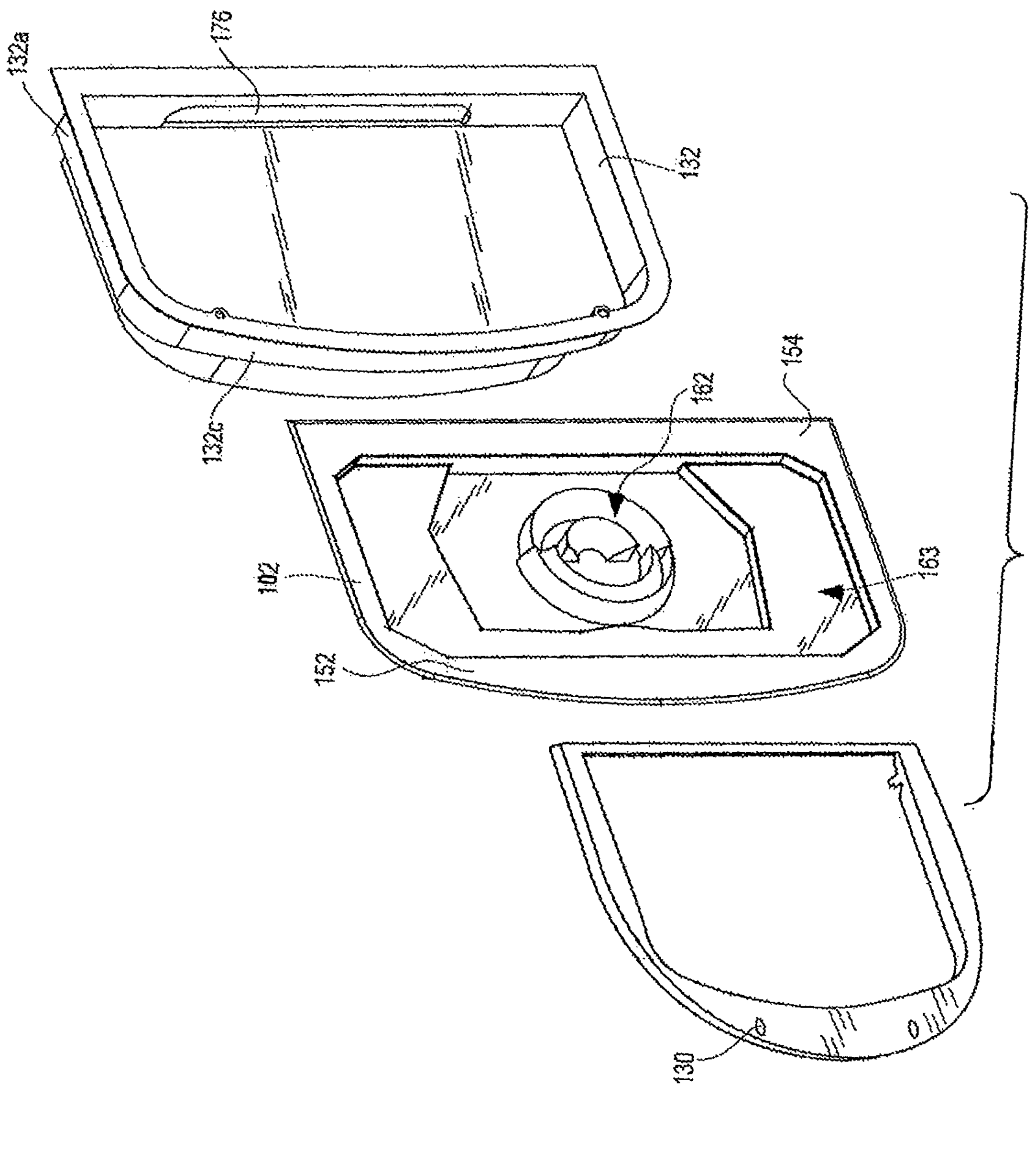
FIG. 5 is a partial exploded fragmentary isometric view from below of the optical assembly portion of FIG. 1.

Specifically referring to FIGS. 79 and 80, a first alternative cavity 100 is illustrated in a waveguide body 71 wherein the cavity 100 is defined by four surfaces 102*a*-102*d*. Preferably, the four surfaces 102 are normal to the upper and lower sides 71*a*, 71*b* and together define a quadrilateral shape, most preferably, a square shape in elevation as seen in FIG. 79. Each of the surfaces 102 preferably has a side-to-side extent (as seen in FIG. 79) of no less than about 500 um, and more preferably between about 1 mm and 20 mm, depending upon the size of the LED element. The LED light source 60 is disposed in the cavity 100, similar or identical to the embodiment of FIG. 3. A plug member 104 includes a first portion 106 that conforms at least substantially, if not fully, as described in connection with the embodiment of FIG. 3, to the preferably square shape defined by the surfaces 102. Each of the surfaces defining the first portion 106 has a height of no less than about 100 um, and more preferably between about 500 um and 5 mm, and most preferably about 1 mm. The plug member 104 further includes a conical second portion 108 similar or identical to the portion 82 of FIG. 3 both in shape and dimensions. The plug member 104 is otherwise identical to the plug member 78 and, in all of the embodiments disclosed in FIGS. 79-18, the second portion 108 may be coated with the metal layer as described in connection with the plug member 78. The first portion 106 is disposed and retained within the cavity 100 in any suitable manner or may be integral therewith such that the second portion 108 is disposed in the cavity 100 facing the light source 60, as in the embodiment of FIG. 3. Preferably, the surfaces 102 are disposed at 45 degree angles with respect to edges or sides 114*a*, 114*b*, 114*c*, and 114*d*, respectively, of an LED element 114 comprising the light source 60. Referring to FIG. 5, the illustrated LED element 114 comprises six blue-shifted yellow LEDs 118*a*-118*f* disposed in two rows of three LEDs located adjacent the edges or sides 114*a*, 114*c*. Three red LEDs 120*a*-120*c* are disposed in a single row between the two rows of blue-shifted LEDs 118. (The embodiments of FIGS. 79-18 are illustrated with the LED 114 element disposed in the same orientation as that illustrated in FIG. 79). The light from the LEDs 118 and 120 is mixed by the interaction of the light rays with the index of refraction interface at the surfaces 102 so that the ability to discern separate light sources is minimized.

FIGS. 81-83 illustrate embodiments wherein a star-shaped cavity 130 is formed in the waveguide body 71 and a star shaped plug member 132 is retained within the star shaped cavity. Thus, for example, FIG. 81 a star-shaped cavity 130-1 having eight equally spaced points 130*a*-130*h* is formed in the waveguide body 71 such that points 130*a*, 130*c*, 130*e*, and 130*g* are aligned with the sides 114*a*, 114*b*, 114*c*, and 114*d*, respectively, of the LED element 114. FIG. 83 illustrates a cavity 130-2 identical to the cavity 130-1 of FIG. 81 except that the cavity 130-2 is rotated 22.5 degrees counter-clockwise relative to the cavity 130-1. In both of the embodiments of FIGS. 81-83 the plug member 132 includes a first portion 134 that substantially or completely conforms to the walls defining the cavity 130. In this embodiment, the cavity 130 and plug member 132 have sharp points.

FIGS. 84-86 illustrate embodiments identical to FIGS. 81-83 with the exception that eight-pointed cavities 150-1 and 150-2 and plug member 152 have rounded or filleted points. Preferably, each fillet has a radius of curvature between about 0.1 mm and about 0.4 mm, and more preferably has a radius of curvature between about 0.2 mm and 0.3 mm, and most preferably has a radius of curvature of about 0.25 mm.

Of course, any of the embodiments disclosed herein may have a different number of points, whether sharp pointed or rounded, or a combination of the two. FIGS. 87-89 illustrate embodiments of cavities 170, 190 (and corresponding first portions of associated plug members) having relatively large numbers of points (16 points in FIG. 87, 32 points in FIGS. 88 and 89) of different shapes and sizes. In these alternative embodiments, the star shaped coupling cavity includes a first plurality of points 172 (FIG. 87) and a second plurality of points 174, and the first plurality of points 172 have a different shape than the second plurality of points 174. Thus, the coupling cavity is defined by a first set of surfaces 176*a*-176*d* (defining the first plurality of points 172) that direct a first distribution of light into the waveguide body and a second set of surfaces 178*a*-178*d* (defining the second plurality of points 174) that direct a second distribution of light different than the first distribution of light into the waveguide body. In these embodiments, the angles of the surfaces with respect to the central axis impact the luminance uniformity and color mixing of the light emitted from the light source. In particular, light uniformity and color mixing improve as the angled surface(s) of the coupling cavity become increasingly parallel with light rays (within Fresnel scattering angular limits, as should be evident to one of ordinary skill in the art), thus maximizing the angle of refraction, and hence light redirection, as the rays traverse the interface between the low index of refraction medium (air) and the higher index of refraction medium (the waveguide). While light uniformity and color mixing may be enhanced using complex shapes, such benefit must be weighed against the difficulty of producing such shapes.

In each of the embodiments of FIGS. 81, 83, 84 and 86-89, each cavity may have radially maximum size (i.e., the distance between a center or centroid (in the case of non-circular coupling cavity shapes) of the cavity and an outermost portion of the surface(s) defining the cavity) of at least about 100 um, and more preferably between about 1 mm and no more than about 50 mm, and most preferably between about 3 mm and about 20 mm. Further, each cavity may have radially minimum size (i.e., the distance between a center or centroid of the cavity and an innermost portion of the surface(s) defining the cavity) of at least about 100 um, and more preferably between about 1 mm and about 50 mm, and most preferably between about 3 mm and about 20 mm. (The term "centroid" as used herein is defined as the center of gravity of an imaginary mass of constant thickness and uniform density fully occupying the coupling cavity.)

The first and second portions of the plug members of FIGS. 82 and 85 (and plug members that may be used with FIGS. 87 and 88) may be identical to the plug members described previously, with the exception of the outside shape of the first portion, as should be evident.

Ray fan and full simulation analyses of the embodiments shown in FIGS. 79-16 were performed to compare color mixing, luminance, and efficiency of waveguides having various shapes of coupling cavities with the design shown in FIGS. 2-4. Ray fan simulations of LED elements within various-shaped coupling cavities demonstrated the color mixing of light rays emitted horizontally from the LED into the waveguide. Full simulations of LED elements within various shaped coupling cavities demonstrated the color mixing, luminance, and efficiency of light rays emitted from the LED into the waveguide having extraction features. LightTools 8.0 by Synopsys was utilized to perform the simulations, although other software known in the art, such as Optis by Optis or Radiant Zemax by Zemax, may be used.

It should be noted that the coupling cavity may have an asymmetric shape, if desired. FIG. 89A illustrates a triangular coupling cavity 179 defined by three coupling features 179*a*-179*c* that extend at least partially between upper and lower surfaces of a waveguide body 180. The cavity 179 has an asymmetric triangular shape with respect to a centroid 181. Although not shown, one or more LEDs and a light diverter extend into the coupling cavity 179 as in the other embodiments disclosed herein.

In embodiments disclosed herein, a coupling cavity is defined by one or more coupling features that extend between the first and second faces wherein at least one of the coupling features extends into the waveguide body to a lateral extent transverse to a depth dimension greater than a lateral extent to which another of the waveguide features extends into the waveguide body. Thus, for example, as seen in FIG. 89A, the coupling feature 179*a* includes at least one portion 179*a*-1 that is disposed to a greater extent farther into the waveguide body 180 than portions 179*c*-1 and 179*c*-2 of the feature 179*c*. The same is true of other embodiments. Further, where the coupling surfaces do not extend fully through the waveguide body, the resulting blind cavity may have one or more shaped cavity base surface(s) or a planar cavity base surface and the cavity base surface(s) may (but need not) be coated with a reflective and/or partially light transmissive material, if desired.

Referring next to FIGS. 90 and 91, the placement of LEDs on the substrate can be modified to enhance color mixing. FIG. 90 illustrates an embodiment in which the red LEDs 120 are reduced in number to two LEDs 120*a*, 120*b*. FIG. 91 illustrates an embodiment wherein the blue shifted yellow LEDs 118 comprise first and second single LEDs 118*a*, 118*c* disposed adjacent the edges or sides 114*a*, 114*c* and first and second pairs of LEDs 118*b*1, 118*b*2 and 118*d*1, 118*d*2, adjacent the sides 114*b*, 114*d*, respectively. Two red LEDs 120*a*, 120*b* are disposed between the LEDs 118 remote from the edges or sides 114. FIG. 91A illustrates an embodiment in which the LEDs 118, 120 are disposed in a checkerboard pattern with the red LEDs 120 being disposed between the blue-shifted LEDs 118.

In addition to the foregoing, the shape or other characteristic of any optics in the path of light may be varied. More particularly, a modified primary or secondary lens 192 (FIG. 105) may be used in conjunction with the LED light source 60 to further improve the luminance and/or color uniformity of the light emitted from the surface of the waveguide. In any embodiment, the primary LED light source lens may be varied and optimized to use refraction or scattering to direct light into preferred directions prior to entering the coupling cavity, thereby improving uniformity. The orientation and/or shape of the LED element relative to the surface(s) defining the coupling cavity may also be varied and optimized to improve light mixing. The lens 192 and/or any of the waveguides disclosed herein may be formed with one or more materials in accordance with the teachings of either U.S. patent application Ser. No. 13/843,928, filed Mar. 15, 2013, entitled "Multi-Layer Polymeric Lens and Unitary Optic Member for LED Light Fixtures and Method of Manufacture" by Craig Raleigh et al., U.S. patent application Ser. No. 13/843,649, filed Mar. 15, 2013, entitled "One-Piece Multi-Lens Optical Member and Method of Manufacture" by Craig Raleigh et al., the disclosures of which are hereby incorporated by reference herein. If desired, a scatterer, which may be effectuated by scattering particles coated on or formed within the lens 192, may be provided to further mix the light developed by the LEDs.

Non-uniform illuminance by the luminaire 30 may be addressed by securing a masking element 210 to the diffuser 90 to obscure bright spots, as seen in FIGS. 92 and 93. The masking element 210 may have any desired shape, may comprise single or multiple sub-elements, and/or may be translucent or opaque. The masking element may be made of any desired material, and should minimize the absorption of light.

In the illustrated embodiment, the light emitted out the waveguide body is mixed such that point sources of light in the source 60 are not visible to a significant extent and the emitted light is controlled to a high degree. The interface between the coupling cavity and the waveguide as described above also results in obscuring discrete point sources.

Further, it may be desirable to redirect light within the waveguide to provide better luminance uniformity from discrete light sources, and/or to provide mixing of colors from multi-color sources. In addition to any or all of the features and embodiments disclosed herein, a waveguide may include internal redirection features that implement scattering, reflection, TIR, and/or refraction to redirect the light within the waveguide body. The spacing, number, size and geometry of redirection features determine the mixing and distribution of light within the waveguide. In some circumstances, the redirection feature may be designed such that some of the light is directed out of, i.e. extracted from, the waveguide body as well.

In one embodiment, the waveguide may include one or more extraction features on the one or more external faces to direct light out of the body, and one or more internal redirection features to redirect light within the body. In general, light reflected off of the extraction features travels relatively directly to the external surface, whereas light reflected off of the redirection features travels some distance within the waveguide before exiting through the external surface. Such redirection within the body of the waveguide is referred to hereinafter as occurring "in-plane." In-plane redirection causes the light ray to be extracted from the waveguide at a modified, laterally-displaced extraction point, in contrast to the original or unaltered extraction point at which the light ray would have otherwise been extracted. The modified extraction point is preferred to the unaltered extraction point as the in-plane redirection enhances color uniformity within the body.

Referring to FIG. 94, a waveguide 250 may comprise a body 252 exhibiting a total internal reflectance characteristic and having a first external face 254 and a second external face 256 opposite the first external face 254. One or more coupling cavities or recesses 258 extends between and is preferably (although not necessarily) fully disposed between the first and second external faces 254, 256, and is adapted to receive a light source 259 (shown in FIG. 100). As in previous embodiments the light source 259 may include one or more LEDs that are configured to direct light into the waveguide body 252. A plug member (as in the previous embodiments, not shown in FIG. 94) may be used to direct light emitted by the LED(s) into the waveguide body 252. The waveguide body 252 also includes one or more redirection features 260*a*, 260*b*, 260*c*, 260*d* configured to redirect light emitted from the LED(s) in-plane.

As shown in FIG. 95, the redirection feature 260 is preferably at least partially or fully internal to the waveguide body 252 and comprises surfaces defining two opposing arcuate voids 261-1, 261-2 extending along the planar direction. The redirection feature 260 preferably, although not necessarily, has a substantially constant thickness (i.e., depth) of about 1 mm and either or both of the voids 261 may be filled with air, acrylic, an acrylic material including scattering particles, polycarbonate, glass, molded silicone, a cyclic olefin copolymer, or another material having an index of refraction different than or the same as the index of refraction of the remainder of the waveguide body 252, or combinations thereof.

Shown most clearly in FIG. 96, the body 252 is comprised of a first plate 262 and a second plate 264 bonded or otherwise secured to one another, wherein the first and second plates 262, 264 include the first and second external faces 254, 256, respectively. The coupling cavity 258 is formed in and extends into at least one of the first and second plates 262, 264 and may comprise any fraction of the thickness of the waveguide body from about 1% or less to 100% of such thickness. The first and second plates 262, 264 are optically transmissive bodies, and may be made of the same or different materials. Both of the first and second plates 262, 264 exhibit a total internal reflection characteristic. The first plate 262 includes a first internal face 266 opposite the first external face 254, and the second plate 264 includes a second internal face 268 opposite the second external face 256. The second internal face 268 of the second plate 264 is maintained in contact with the first internal face 266 of the first plate 262. In the illustrated embodiment the redirection feature 260 is formed by any suitable manufacturing process extending into the first plate 262 from the first internal face 266. Alternatively, in any of the embodiments disclosed herein, the redirection feature 260 may extend into the second plate 264 from the second internal face 268 or portions of the redirection feature 260 may extend into both plates 262, 264 from the faces 266, 268, as should be evident. In this last case, the portions of the redirection feature 260 may be partially or fully aligned with one another, as necessary or desirable.

FIGS. 97 and 98 illustrate an embodiment wherein the waveguide body 252 includes first alternative redirection features 272 each having a triangular cross-sectional shape associated with the first plate 262. Further, the waveguide body 252 may include one or more extraction features 274 on the first and second external faces 254, 256 to direct light out of the body 252. The internal redirection features 272 may also extract light out of the waveguide body 252 as well. A further redirection feature 278 may be embossed or otherwise associated with the second internal face 268 of the second plate 264.

Referring to FIG. 99, the redirection feature 272 is embossed, molded, screen printed, machined, laser-formed, laminated, or otherwise formed and disposed on the first internal face 266 of the first plate 262, and the first internal face 266 of the first plate 262 is thereafter secured to the second internal face 268 of the second plate 264. In any of the embodiments such securement may be accomplished by applying a solvent to one of the internal faces that chemically reacts with the waveguide body material to promote adhesion, and then pressing the internal faces together. Alternatively, the surfaces may be bonded through the application of high pressure and heat, or an adhesive material may be disposed between the surfaces. Other fabrication methods, such as through the use of a three-dimensional printer, are envisioned. Still further, other structures are within the scope of the present invention, including a film or other member having a portion having a first index of refraction and formed by any suitable methodology, such as those noted above (embossing, molding, screen printing, etc.), and sandwiched between two members both having a second index of refraction different than the first index of refraction. A further alternative comprehends a film or other structure disposed between two other members, wherein the film or other structure has a first index of refraction, a first of the two members has a second index of refraction and the other of the two members has a third index of refraction wherein the first, second, and third indices of refraction are different or where the film or other structure comprises an index-matching material.

As shown in FIG. 100, second and third alternative redirection features 282, 284 may extend from the coupling cavity 258 in a radial direction. Second alternative redirection features 282 have a rectangular shape, and third alternative redirection features 284 have a V-shape in plan view. It has been found that radially-extending redirection features are especially useful in promoting mixing of light emitted by an LED element having multiple LEDs distributed in spaced relation on a substrate such that at least some of the LEDs are disposed off-axis, i.e., such LEDs are offset from the center of the cavity in which the LED element is disposed. Specifically, light rays 280 emitted from the LEDs are reflected off of the redirection features 282, 284 due, for example, to total internal reflection, in different directions within the waveguide body 252.

One or more other light redirection feature shapes could be used, such as circular, diamond-shaped (seen in FIG. 101A), kite-shaped (i.e., a diamond shape with different angles at opposing ends of the shape), rectangular, polygonal, curved, flat, tapered, segmented, continuous, discontinuous, symmetric, asymmetric, etc. The light redirection feature preferably has an overall radial length of no less than about 1 um, and more preferably the overall radial length is between about 10 um and about 10 mm, and most preferably between about 1 mm and about 10 mm. Further the light redirection feature preferably has an overall circumferential extent of no less than about 1 um, and more preferably the overall circumferential extent is between about 10 um and about 10 mm, and most preferably between about 1 mm and about 10 mm. Any or all of the surfaces partially or fully defining any or all of the features disclosed herein, including the light redirection features disclosed herein, or any portion thereof, may be coated or otherwise formed with optically reflective materials, such as a specular material, such as a metallized coating, a scattering material, a white material, or the like, if desired.

It should be noted that the number, size, and arrangement of the light redirection features may be such as to gradually collimate light over the extent of the waveguide body and/or could cause redirection of light for another purpose, for example, to cause the light to avoid features that would otherwise absorb or scatter such light.

As seen in FIG. 104, a waveguide body 360 includes a coupling cavity 362 defined by a surface 364 and an LED element 366 extends into the cavity 362. In an illustrated embodiment, the cavity 362 does not extend fully through the waveguide body 360, and instead comprises a blind bore that terminates at a planar base surface 370 that comprises a light diverter. It should be noted that the surface 364 need not be circular cylindrical in shape as seen in FIG. 104; rather, the surface 364 may comprise a plurality of light coupling features in the form of facets or other shaped surfaces. In addition, the planar base surface 370 may also be replaced by other shaped surfaces, such as a conical surface (either convex or concave) or planar, segmented sections that taper to a point coincident with a central axis of the cavity 362. This embodiment is particularly adapted for use with relatively thin waveguide bodies. Also, the planar base surface 370 may be coated with a reflective material, such as a white or specular material as noted above with respect to the plug member.

Still further, the surface 364 (and/or any of the embodiments disclosed herein) may comprise an elongate light coupling cavity or portion, i.e., a cavity or portion that is not fully circular cylindrical, but at least a portion of the cavity or portion is instead another shape, such as elliptical, oval, racetrack-shaped, teardrop-shaped, symmetric or asymmetric, continuous or segmented, etc.

FIGS. 101 and 101A illustrate generally that the LED light source 259 need not be located at one or more interior portions of a waveguide body (such an arrangement can be referred to as an interior lit waveguide), it being understood that, as shown, the LED light source 259 may be adjacent or in an edge 302 of the waveguide body to obtain either an edge lit waveguide or an end lit waveguide, as described below. In edge lit embodiments, the light source 259 may be above, below, and/or to the side of the edge 302 and aligned therewith (as seen in FIG. 101). The waveguide body preferably includes at least one coupling feature 305 (FIG. 101A) defining a coupling cavity 309, and, if desirable, at least one redirection feature 307 (also seen in FIG. 101A) extending away from the coupling cavity 309 and the LED light source 259 as disclosed in the previous embodiments. A reflecting cover or member 303 may be disposed over, under or otherwise adjacent to the light source 259 in any of the embodiments disclosed herein, including the embodiment of FIG. 101, if desired.

A combined interior lit and edge lit waveguide (also referred to as an end lit waveguide) may be obtained by providing coupling features at interior portions and edge(s) of the waveguide. Specifically, FIGS. 102 and 103 illustrate an embodiment in which one or more light sources 259 are disposed adjacent an elongate coupling section or portion 310 of a coupling optic 312. The coupling section 310 includes at least one coupling feature and, if desired, at least one redirection feature as in the embodiments described above.

Referring next to FIG. 106, an alternate noncircular coupling cavity 400 is formed by any suitable methodology in any of the waveguide bodies disclosed herein (the coupling cavity 400 is noncircular in the sense that the surfaces defining the cavity 400, at least where light enters the waveguide body, do not define a smooth circle). The coupling cavity 400, which may comprise a blind cavity or a cavity that extends fully through the waveguide body, includes one or more coupling features in the form of a circumferential array of inwardly directed surfaces, shown as bumps or protrusions 402. The bumps or protrusions 402, each of which may comprise curved, planar, and/or other-shaped surfaces, promote mixing of light by providing surfaces at varying angles with respect to incident light rays developed by an LED light source 114. In the event that the coupling cavity extends fully through the waveguide body, a light diverter (not shown) may be provided opposite the LED light source 114, as in previous embodiments.

FIGS. 107 and 108 illustrate an embodiment identical to that shown in FIG. 106, except that the single circumferential array of inwardly directed curved surfaces are replaced by one or more coupling features comprising first and second circumferential arrays of surfaces comprising bumps or protrusions generally indicated at 410, 412. As seen in FIG. 108, the first array of bumps or protrusions 410 is axially shorter than the second array of bumps or protrusions 412. Further, the first array of bumps or protrusions 410 is disposed radially inside the second array of bumps or protrusions 412 and is coaxial therewith. Light developed by an LED light source 114 is efficiently mixed by the arrays 410, 412.

In any of the embodiments disclosed herein, gaps or interfaces between waveguide elements may be filled with an optical coupling gel or a different optical element or material, such as an air gap.

INDUSTRIAL APPLICABILITY

In summary, it has been found that when using a single color or multicolor LED element in a luminaire, it is desirable to mix the light output developed by the LEDs thoroughly so that the intensity and/or color appearance emitted by the luminaire is uniform. When the LED element is used with a waveguide, opportunities have been found to exist to accomplish such mixing during the light coupling and light guiding or distributing functions. Specifically, bending the light rays by refraction can result in improvement in mixing. In such a case, this refractive bending can be accomplished by providing interfaces in the waveguide between materials having different indices of refraction. These interfaces may define coupling features where light developed by the LED elements enters the waveguide and/or light redirection features at portions intermediate the coupling features and waveguide extraction features or areas where light is otherwise extracted (such as by bends) from the waveguide. It has further been found that directing light into a wide range of refraction angles enhances light mixing. Because the angle $A_r$ of a refracted light ray is a function of the angle $A_i$ between the incident light ray and the interface surface struck by the incident light ray (with refractive angle $A_r$ increasing as $A_i$ approaches zero, i.e., when the incident light ray approaches a parallel condition with respect to the interface surface), a wide range of refracted light ray angles can be obtained by configuring the interface surfaces to include a wide range of angles relative to the incident light rays. This, in turn, means that the interfaces could include a significant extent of interface surfaces that are nearly parallel to the incident light rays, as well as other surfaces disposed at other angles to the incident light rays. Overall waveguide shapes and coupling feature and redirection feature shapes such as curved (including convex, concave, and combinations of convex and concave surfaces), planar, non-planar, tapered, segmented, continuous or discontinuous surfaces, regular or irregular shaped surfaces, symmetric or asymmetric shapes, etc. can be used, it being understood that, in general, light mixing (consistent with the necessary control over light extraction) can be further improved by providing an increased number of interface surfaces and/or more complex interface shapes in the light path. Also, the spacing of coupling features and light redirection features affect the degree of mixing. In some embodiments a single light coupling feature and/or a single light redirection feature may be sufficient to accomplish a desired degree of light mixing. In other embodiments, multiple coupling features and/or multiple light redirection features might be used to realize a desired degree of mixing. In either event, the shapes of multiple coupling features or multiple redirection features may be simple or complex, they may be the same shape or of different shapes, they may be equally or unequally spaced, or distributed randomly or in one or more arrays (which may themselves be equally or unequally spaced, the same or different size and/or shape, etc.) Further, the interfaces may be disposed in a symmetric or asymmetric pattern in the waveguide, the waveguide itself may be symmetric or asymmetric, the waveguide may develop a light distribution that is symmetric, asymmetric, centered or non-centered with respect to the waveguide, the light distribution may be on-axis (i.e., normal to a face of the waveguide) or off-axis (i.e., other than normal with respect to the waveguide face), single or split-beam, etc.

Still further, one or more coupling features or redirection features, or both, may be disposed anywhere inside the waveguide, at any outside surface of the waveguide, such as an edge surface or major face of the waveguide, and/or at locations extending over more than one surface or portion of the waveguide. Where a coupling or light redirection feature is disposed inside the waveguide, the feature may be disposed in or be defined by a cavity extending fully through the waveguide or in or by a cavity that does not extend fully through the waveguide (e.g., in a blind bore or in a cavity fully enclosed by the material of the waveguide). Also, the waveguide of any of the embodiments disclosed herein may be planar, non-planar, irregular-shaped, curved, other shapes, suspended, a lay-in or surface mount waveguide, etc.

While specific coupling feature and light redirection feature parameters including shapes, sizes, locations, orientations relative to a light source, materials, etc. are disclosed as embodiments herein, the present invention is not limited to the disclosed embodiments, inasmuch as various combinations and all permutations of such parameters are also specifically contemplated herein. Thus, any one of the coupling cavities, plug members, LED elements, masking element(s), redirection features, extraction features, etc. as described herein may be used in a luminaire, either alone or in combination with one or more additional elements, or in varying combination(s) to obtain light mixing and/or a desired light output distribution. More specifically, any of the features described and/or claimed in U.S. patent application Ser. No. 13/842,521, U.S. patent application Ser. No. 13/839,949, U.S. patent application Ser. No. 13/841,074, filed Mar. 15, 2013, entitled "Optical Waveguide Body", U.S. patent application Ser. No. 13/840,563, U.S. patent application Ser. No. 14/101,086, filed Dec. 9, 2013, entitled "Optical Waveguides and Luminaires Incorporating Same", U.S. patent application Ser. No. 14/101,099, filed Dec. 9, 2013, entitled "Optical Waveguide Assembly and Light Engine Including Same", U.S. patent application Ser. No. 14/101,132, filed Dec. 9, 2013, entitled "Waveguide Bodies Including Redirection Features and Methods of Producing Same", U.S. patent application Ser. No. 14/101,129, filed Dec. 9, 2013, entitled "Simplified Low Profile Module With Light Guide For Pendant, Surface Mount, Wall Mount and Stand Alone Luminaires", and U.S. patent application Ser. No. 14/101,051, filed Dec. 9, 2013, entitled "Optical Waveguide and Lamp Including Same", , incorporated by reference herein and owned by the assignee of the present application may be used in the devices disclosed herein. Thus, for example, any of the waveguides or luminaires disclosed herein may include one or more coupling features, one or more light redirection features, one or more coupling features or optics, a modified LED arrangement, one or more extraction features, and/or particular waveguide or overall luminaire shapes and/or configurations as disclosed in such applications, as necessary or desirable. Other luminaire and waveguide form factors than those disclosed herein are also contemplated.

The coupling features disclosed herein efficiently couple light into the waveguide, and the redirection features uniformly mix light within the waveguide and the light is thus conditioned for uniform extraction out of the waveguide. At least some of the luminaires disclosed herein are particularly adapted for use in installations, such as, replacement or retrofit lamps (e.g., LED PAR bulbs), outdoor products (e.g., streetlights, high-bay lights, canopy lights), and indoor products (e.g., downlights, troffers, a lay-in or drop-in application, a surface mount application onto a wall or ceiling, etc.) preferably requiring a total luminaire output of at least about 800 lumens or greater, and, more preferably, a total luminaire output of at least about 3000 lumens, and most preferably a total lumen output of about 10,000 lumens. Further, the luminaires disclosed herein preferably have a color temperature of between about 2500 degrees Kelvin and about 6200 degrees Kelvin, and more preferably between about 2500 degrees Kelvin and about 5000 degrees Kelvin, and most preferably about 2700 degrees Kelvin. Also, at least some of the luminaires disclosed herein preferably exhibit an efficacy of at least about 100 lumens per watt, and more preferably at least about 120 lumens per watt, and further exhibit a coupling efficiency of at least about 92 percent. Further, at least some of the luminaires disclosed herein preferably exhibit an overall efficiency (i.e., light extracted out of the waveguide divided by light injected into the waveguide) of at least about 85 percent. A color rendition index (CRI) of at least about 80 is preferably attained by at least some of the luminaires disclosed herein, with a CRI of at least about 88 being more preferable. A gamut area index (GAI) of at least about 65 is achievable as is a thermal loss of less than about 10%. Any desired form factor and particular output light distribution, such as a butterfly light distribution, could be achieved, including up and down light distributions or up only or down only distributions, etc.

When one uses a relatively small light source which emits into a broad (e.g., Lambertian) angular distribution (common for LED-based light sources), the conservation of etendue, as generally understood in the art, requires an optical system having a large emission area to achieve a narrow (collimated) angular light distribution. In the case of parabolic reflectors, a large optic is thus generally required to achieve high levels of collimation. In order to achieve a large emission area in a more compact design, the prior art has relied on the use of Fresnel lenses, which utilize refractive optical surfaces to direct and collimate the light. Fresnel lenses, however, are generally planar in nature, and are therefore not well suited to re-directing high-angle light emitted by the source, leading to a loss in optical efficiency. In contrast, in the present invention, light is coupled into the optic, where primarily TIR is used for re-direction and collimation. This coupling allows the full range of angular emission from the source, including high-angle light, to be re-directed and collimated, resulting in higher optical efficiency in a more compact form factor.

Embodiments disclosed herein are capable of complying with improved operational standards as compared to the prior art as follows:

| | State of the art standards | Improved Standards Achievable by Present Embodiments |
|---|---|---|
| Input coupling efficiency (coupling + waveguide) | 90% | About 95% plus improvements through color mixing, source mixing, and control within the waveguide |
| Output efficiency (extraction) | 90% | About 95%: improved through extraction efficiency plus controlled distribution of light from the waveguide |
| Total system | ~80% | About 90%: great control, many choices of output distribution |

In at least some of the present embodiments the distribution and direction of light within the waveguide is better known, and hence, light is controlled and extracted in a more controlled fashion. In standard optical waveguides, light bounces back and forth through the waveguide. In the present embodiments, light is extracted as much as possible over one pass through the waveguide to minimize losses.

In some embodiments, one may wish to control the light rays such that at least some of the rays are collimated, but in the same or other embodiments, one may also wish to control other or all of the light rays to increase the angular dispersion thereof so that such light is not collimated. In some embodiments, one might wish to collimate to narrow ranges, while in other cases, one might wish to undertake the opposite.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures/FIGS. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Unless otherwise expressly stated, comparative, quantitative terms such as "less" and "greater", are intended to encompass the concept of equality. As an example, "less" can mean not only "less" in the strictest mathematical sense, but also, "less than or equal to."

The expression "correlated color temperature" ("CCT") is used according to its well-known meaning to refer to the temperature of a blackbody that is nearest in color, in a well-defined sense (i.e., can be readily and precisely determined by those skilled in the art). Persons of skill in the art are familiar with correlated color temperatures, and with Chromaticity diagrams that show color points to correspond to specific correlated color temperatures and areas on the diagrams that correspond to specific ranges of correlated color temperatures. Light can be referred to as having a correlated color temperature even if the color point of the light is on the blackbody locus (i.e., its correlated color temperature would be equal to its color temperature); that is, reference herein to light as having a correlated color temperature does not exclude light having a color point on the blackbody locus.

The terms "LED" and "LED device" as used herein may refer to any solid-state light emitter. The terms "solid state light emitter" or "solid state emitter" may include a light emitting diode, laser diode, organic light emitting diode, and/or other semiconductor device which includes one or more semiconductor layers, which may include silicon, silicon carbide, gallium nitride and/or other semiconductor materials, a substrate which may include sapphire, silicon, silicon carbide and/or other microelectronic substrates, and one or more contact layers which may include metal and/or other conductive materials. A solid-state lighting device produces light (ultraviolet, visible, or infrared) by exciting electrons across the band gap between a conduction band and a valence band of a semiconductor active (light-emitting) layer, with the electron transition generating light at a wavelength that depends on the band gap. Thus, the color (wavelength) of the light emitted by a solid-state emitter depends on the materials of the active layers thereof. In various embodiments, solid-state light emitters may have peak wavelengths in the visible range and/or be used in combination with lumiphoric materials having peak wavelengths in the visible range. Multiple solid state light emitters and/or multiple lumiphoric materials (i.e., in combination with at least one solid state light emitter) may be used in a single device, such as to produce light perceived as white or near white in character. In certain embodiments, the aggregated output of multiple solid-state light emitters and/or lumiphoric materials may generate warm white light output.

Solid state light emitters may be used individually or in combination with one or more lumiphoric materials (e.g., phosphors, scintillators, lumiphoric inks) and/or optical elements to generate light at a peak wavelength, or of at least one desired perceived color (including combinations of colors that may be perceived as white). Inclusion of lumiphoric (also called 'luminescent') materials in lighting devices as described herein may be accomplished by direct coating on solid state light emitter, adding such materials to encapsulants, adding such materials to lenses, by embedding or dispersing such materials within lumiphor support elements, and/or coating such materials on lumiphor support elements. Other materials, such as light scattering elements (e.g., particles) and/or index matching materials, may be associated with a lumiphor, a lumiphor binding medium, or a lumiphor support element that may be spatially segregated from a solid state emitter.

I. Exemplary Luminaires/Fixtures with Optical Light Guides

A. Downlight-Style Luminaires

Referring to FIGS. 109-111, a luminaire 10 includes a housing 12, a mounting device 14 secured to the housing 12, a junction box 16, and a heat sink 18. The housing 12 comprises a reflector 20, a shield 22, and an extension ring 24 that are secured together in any suitable fashion, such as by fasteners (not shown), welds, brackets, or the like. The mounting device 14 may include conventional joist hangers 26*a*, 26*b* secured to two brackets 28*a*, 28*b*, respectively. The brackets 28*a*, 28*b* are, in turn, secured in any suitable fashion, such as by fasteners (not shown) to a flange 30 of the extension ring 24. The luminaire 10 may be suspended by fasteners extending through the joist hangers 26 into a structural member, such as one or more joists (not shown). Any other suitable support structure(s) could instead be used, including device(s) that allow the luminaire to be used in new construction or in retrofit applications.

The junction box 16 is mounted on a plate 34 that is, in turn, secured in any suitable fashion (again, e.g., by fasteners, not shown) to the flange 30. The heat sink 18 is mounted atop the shield 22. A light source junction box 40 is disposed on the heat sink 18 and is mounted thereon in any suitable fashion. A conduit 42 houses electrical conductors that interconnect component(s) in the light source junction box 40 with power supplied to the junction box 16.

A light source 50 comprising at least one light emitting diode (LED) element is firmly captured by a retention ring 52 and fasteners 56 (FIG. 110) and/or another fastening element(s), such as adhesive, against an undersurface 54 of the heat sink 18. The light source 50 may be a single white or other color LED chip or other bare component, or each may comprise multiple LEDs either mounted separately or together on a single substrate or package to form a module 51. One or more primary optics, such as one or more lenses, may be disposed over each LED or group of LEDs. Light developed by the light source 50 is directed downwardly as seen in FIGS. 110 and 111 and either travels directly through interior bores 58, 59 (FIGS. 110, 112A, 112B, and 112C) or is directly incident on coupling surfaces 60, 62 of first and second optical waveguide stages or portions 64, 66, respectively, of an optical waveguide 68. The waveguide stages 64, 66 are secured to the heat exchanger 18 in any convenient fashion, such as by fasteners, adhesive, brackets, or the like, or is simply sandwiched together and firmly captured between a shouldered surface 61 and a base surface 63 of the shield 22.

As seen in FIGS. 110-112C, the coupling surface 60 extends entirely through an interior portion of the first stage 64 (i.e., the coupling surface defines a through-bore) and comprises a frustoconical surface. Further in the illustrated embodiment, and as seen in FIGS. 110-112C, the coupling surface 62 comprises a blind bore having a frustoconical shape and defined in part by a planar base portion 69 that also directly receives light from the light source 50. The coupling surfaces 60, 62 are preferably at least partially aligned, and in the illustrated embodiment, are fully aligned in the sense that such surfaces have coincident longitudinal axes 70*a*, 70*b*, respectively, (FIG. 110). Also preferably, the surfaces 62 together form a combined frustoconical shape without substantial discontinuity at the interface therebetween, with the exception of an air gap 65 at an axial plane between the stages 64, 66. Alignment holes 117 may be provided to aid in alignment of the light source 50 with the first stage 64. Alignment holes 117 may contact or be attached to the retention ring 52 that captures the light source 50. An embodiment may provide protrusions on the retention ring 52 that are received by the alignment holes 117. Alternative embodiments may attach the retention ring 52 to the first stage 64 by way of a screw, bolt, fastener, or the like.

If desired, the coupling surface 62 may comprise a through-bore rather than a blind bore (such an arrangement is shown in FIGS. 113 and 114), although the latter has the advantage of providing an enclosed space to house and protect the light source 50.

Referring next to FIG. 112B, the first and second stages 64, 66 are preferably circular in plan view and nested together. The first stage 64 further includes a light transmission portion 70 and a light extraction portion 72. The light transmission portion 70 is disposed laterally between the coupling surface 60 and the light extraction portion 72. As seen in FIG. 112A, the first stage 64 further includes a substantially planar lower surface 74 and a tapered lower surface 76 that meet at an interface surface 78. Referring again to FIGS. 110 and 112B, the light extraction portion 72 includes light extraction or direction features 80, 82 and a light recycling portion or redirection feature 88 intermediate the light extraction features 80, 82.

As seen in FIGS. 110, 112A, and 112C, the second stage 66 includes a light extraction feature or portion 90 and a central cavity 92 defined by a lower planar base surface 94, a lower tapered surface 96, and a cylindrical surface 98. A planar circumferential flange 100 surrounds the light extraction feature 90 and the central cavity 92. The flange 100 facilitates retention of the stages 64, 66 in the luminaire and may enclose and protect the various components thereof. The flange 100 may not serve an optical function, although this need not be the case. In some embodiments, the first and second stages 64, 66 are disposed such that the light extraction portion 72 of the first stage 64 is disposed outside of the light extraction portion 90 of the second stage 66.

In one embodiment, the first stage 64 may include a first major surface with light extraction features 80, 82 and a second major surface opposite the first major surface. The second stage 66 may include a third major surface proximate the second major surface of the first stage 64 and a fourth major surface opposite the third major surface. The second and third major surfaces of the first and second stages 64, 66, respectively, may be disposed such that an air gap is disposed therebetween as described below. The central cavity 92 may extend into the fourth major surface of the second stage 66.

The light source 50 may include, for example, at least one phosphor-coated LED either alone or in combination with at least one color LED, such as a green LED, a yellow LED, a red LED, etc. In those cases where a soft white illumination with improved color rendering is to be produced, each LED module 51 or a plurality of such elements or modules may include one or more blue shifted yellow LEDs and one or more red LEDs. The LEDs may be disposed in different configurations and/or layouts on the module as desired. Different color temperatures and appearances could be produced using other LED combinations, as is known in the art. In one embodiment, the light source 50 comprises any LED, for example, an MT-G LED incorporating TrueWhite® LED technology or as disclosed in U.S. patent application Ser. No. 13/649,067, filed Oct. 10, 2012, entitled "LED Package with Multiple Element Light Source and Encapsulant Having Planar Surfaces" by Lowes et al., the disclosure of which is hereby incorporated by reference herein, as developed and manufactured by Cree, Inc., the assignee of the present application. If desirable, a side emitting LED disclosed in U.S. Pat. No. 8,541,795, the disclosure of which is incorporated by reference herein, may be utilized. In some embodiments, each LED element or module 51 may comprise one or more LEDs disposed within a coupling cavity with an air gap being disposed between the LED element or module 51 and a light input surface. In any of the embodiments disclosed herein each of the LED element(s) or module(s) 51 preferably has a lambertian or near-lambertian light distribution, although each may have a directional emission distribution (e.g., a side emitting distribution), as necessary or desirable. More generally, any lambertian, symmetric, wide angle, preferential-sided, or asymmetric beam pattern LED element(s) or module(s) may be used as the light source.

Still further, the material(s) of the waveguide stages 64, 66 are the same as one another or different, and/or one or both may comprise composite materials. In any event, the material(s) are of optical grade, exhibit TIR characteristics, and comprise, but are not limited to, one or more of acrylic, air, polycarbonate, molded silicone, glass, and/or cyclic olefin copolymers, and combinations thereof, possibly in a layered or other arrangement, to achieve a desired effect and/or appearance. Preferably, although not necessarily, the waveguide stages 64, 66 are both solid and/or one or both have one or more voids or discrete bodies of differing materials therein. The waveguide stages 64, 66 may be fabricated using any suitable manufacturing processes such as hot embossing or molding, including injection/compression molding. Other manufacturing methods may be used as desired.

Each of the extraction features 80, 82 may be generally of the shape disclosed in co-owned U.S. Pat. No. 9,581,751, filed Mar. 15, 2013, entitled "Optical Waveguide and Lamp Including Same", the disclosure of which is incorporated by reference herein.

The first stage 64 is disposed atop the second stage 66 such that the substantially planar lower surface 74 and the tapered lower surface 76 of the first stage 64 are disposed adjacent an upper planar base surface 112 (FIGS. 110, 111, and 112A) and an upper tapered surface 114 comprising a portion of the light extraction feature 90 of the second stage 66. Disposed at a location adjacent an interface 110 between the upper planar base surface 112 and the upper tapered surface 114 (FIG. 111) or at one or more points or areas where the first and second stages 64, 66 are adjacent one another is at least one protrusion that may be continuous or discontinuous and which may have an annular or other shape. In the illustrated embodiment of FIGS. 110, 111, 112A, and 114 four protrusions 115 (seen in FIGS. 110, 111, and 114) extend from the upper planar base surface 112 of the second stage 66 and are received by four cavities 116 (two of which are seen in FIG. 111 and three of which are visible in FIG. 114), formed at least in the planar lower surface 74 of the first stage 64. A first height of each protrusion is slightly greater than a second height of each cavity such that an air gap 120 (FIG. 114) is maintained between the stages 64, 66. The air gap 120 may be of either constant thickness or varying thickness in alternative embodiments.

In general, the luminaire 10 develops a beam spread or beam angle of between about 10 degrees and about 60 degrees, and more preferably between about 10 degrees and about 45 degrees, and most preferably between about 15 degrees and about 40 degrees. The luminaire is further capable of developing a light intensity of at least about 2000 lumens, and more preferably a light intensity of about 4000 to about 15,000 lumens, and more preferably a light output of about 6000 lumens to about 10,000 lumens or higher. In the case of higher output luminaires, thermal issues may require additional features to be employed. The multi-stage nested waveguide optics separated by an air gap are employed to achieve high lumen output with low perceived glare and to allow a narrow luminaire spacing to luminaire height ratio to be realized. The luminaire uses as little as a single light source and multiple optics. The luminaire 10 is particularly suited for use in applications where ceiling heights are relatively great, and where luminaires are to be spread relatively far apart, although the embodiments disclosed herein are not limited to such applications.

In the illustrated embodiments the shape and manufacture of each stage may contribute to the achievement of a desired beam angle. Desirable beam angles may include 15 degrees, 25 degrees, and 40 degrees. The first stage 64 may be machined with light extraction features 80, 82 and/or one or more light redirection features 88 having slightly different sizes and angles as seen in FIGS. 112D and 112E. Further, the first stage 64 and/or second stage 66 may be positioned in a selected relative alignment with respect to the light source in order to obtain a desired beam angle. Varying the relative alignment of the first stage 64 and/or the second stage 66 with respect to the light source 50 allows more or less light to couple directly with the first stage 64 and/or the second stage 66. The variation in relative alignment may be in the transverse direction, the circumferential direction, or both.

Although all of the light transmission surfaces of both waveguide stages 64, 66 are polished in many embodiments, in alternate embodiments selected surfaces of the second stage 66 may be machined with texturing, for example, on the light output surfaces 94, 96, 98, 100. Such texturing may aid in diffusion of output light. One optional texturing is specified by Mold-Tech of Standex Engraving Group, located in Illinois and other locations in the U.S. and around the world, under specification number 11040. In order to apply the texturing to the light output surfaces 94, 96, 98, 100 of the second stage 66, the second stage 66 may be machined, molded, or otherwise formed as two pieces 156, 158. When formed as two pieces as shown in FIG. 112F, the first portion 156 may be polished and the second portion 158 may have the texturing applied to the respective surfaces. After the machine finish is completed for each piece, the second stage 66 may be assembled from the two pieces 156, 158 using acrylic glue or another suitable adhesive.

The waveguide configurations for obtaining 15, 25, and 40-degree beam angles may be created with different combinations of the above-described embodiments for the first and second stages 64, 66. Specifically, a 15 degree beam angle may be achieved by combining a polished second stage 66 with the first stage having the pattern of extraction and redirection features 80, 82, and 88, respectively, shown in FIG. 112D. A 25 degree beam angle may be achieved by combining the textured second stage 66, shown prior to final assembly in FIG. 112F, with the same first stage 64 feature pattern used in the 15 degree beam angle configuration. A 40-degree beam angle may be achieved by combining the textured second stage 66 with the first stage 64 having the extraction feature pattern shown in FIG. 112E.

FIGS. 113 and 114 are ray trace diagrams simulating the passage of light through the first and second stages 64, 66, respectively. Referring first to FIG. 113 the first stage 64 splits the light incident on the coupling surface 60 and/or traveling through the into groups of light rays. A first group 140 of such light rays travels through the interior bores 58, 59 and the planar base portion 69 and out the luminaire 10 with a minimal spread to develop a collimated central illumination distribution portion. A second group of light rays 142 is incident on the coupling surface 60, enters the first stage 64, strikes the first extraction feature 80, exits the first stage 64 in a collimated fashion, and is directed through the air gap 120 into the second stage 66. The second group of light rays 142 is refracted at the tapered surface 96 and exits the luminaire 10 to produce a collimated first intermediate annular illumination portion. A third group of light rays 144 originally incident on the coupling surface 60 totally internally reflects off surfaces of the first stage 64 comprising the substantially planar lower surface 74 at the index interface defining the air gap 120, and travels through the light recycling portion 88 where the light rays are refracted. The refracted light totally internally reflects off the light extraction feature 82 and travels out of the first waveguide stage 64. The lateral dimension of the first waveguide stage 64 is larger than a lateral dimension of the second stage 66 such that at least some of the light reflected off the light extraction feature 82 exits the first stage 64, passes through the planar circumferential flange 100 of the second stage 66 and out of the luminaire 10 to produce a collimated outer annular illumination portion. The first stage 64 thus splits a portion of the light developed by the light source 50 and collimates the light.

In the illustrated embodiment, the second stage 66 receives about 40%-50% of the light developed by the light source 50. Referring next to FIG. 114, a portion of the light developed by the light source 50 that is incident on the coupling surface 62 is refracted upon entering the stage 66 and totally internally reflects off surfaces of the second stage 66 including the planar lower base surface 94, the planar upper base surface 112, and/or the tapered lower surface 76, and is directed out the second stage 66 by the surface 114 of the extraction feature 90 to develop a collimated second intermediate annular illumination distribution portion 150.

The light extraction features 80, 82, and 90 are preferably (although not necessarily) annular in overall shape. Further, the outer surfaces thereof are preferably frustoconical in shape, although this also need not be the case. For example, any or all of the features 80, 82, 90 may have a curved outer surface, or a surface comprising a piecewise linear approximation of a curve, or another shape. Still further, the features 80, 82, 90 may overall be continuous or discontinuous, the features 80, 82, 90 may have a cross-sectional shape that varies or does not vary with length, etc.

The illumination distribution portions 140, 142, 144, and 150 together form an overall illumination distribution that is substantially uniform, both in terms of color and intensity, and has a beam spread as noted above. If desired, light diffusing features such as texturing, lenticular features, or radial bumps can be applied onto one or more corresponding optical features to reduce or eliminate imaging of the light produced by the individual LEDs. Still further, the surfaces of the reflector 20 may be shaped and coated or otherwise formed with a specular or other reflective material so that stray light beams are emitted downwardly together with the light beams forming the illumination distribution portions 140, 142, 144, and 150.

If desired one or both of the stages 64, 66 may be modified or omitted, and/or one or more additional stages may be added to obtain other illumination patterns, if desired.

Still further, referring to FIGS. 115A and 1158, one could stack identical or different waveguide stages 160*a*, 160*b*, . . . , 160N atop one another to obtain a waveguide 162 that receives light from a light source, such as one or more LED elements or modules (not shown) disposed in a base 164 to obtain a light engine that develops an illumination distribution, for example, closely resembling or identical to a compact fluorescent lamp. In the illustrated embodiment, the stages 160 are substantially, if not completely identical to one another, and hence only the waveguide stage 160*a* will be described in detail herein. The stages 160 are maintained in assembled relationship by any suitable means such as acrylic glue, another adhesive, a bracket, one or more rods that are anchored in end plates, fasteners, etc., or a combination thereof.

The stage 160*a* is circular cylindrical in shape and has a central axis of symmetry 166. An internal cavity 168 is V-shaped in cross section and the stage is made of any of the optical materials disclosed herein. The internal cavity 168 may have an alternate cross-sectional shape, such as a parabola, a frustum, a conical shape, an elliptic paraboloid shape, a frustoconical shape, or a combination of shapes. The surface defining the internal cavity 168 may act as a light redirection feature. The internal cavity 168 forms an air gap within the waveguide. The air gap enables the surface defining the internal cavity 168 to redirect light toward the exterior surface 170 of waveguide stage 160*a*. At least some of the redirected light may further be collimated upon said redirection.

The stage 160*a* may be a machined waveguide having all surfaces polished. Alternately, the exterior cylindrical surface 170 may be slightly diffused by roughening or scatter coating or texturing, potentially leading to a more uniform luminance appearance.

The base 164 may consist of a housing cap and a machined heatsink. The housing cap may optionally be made of plastic, such as the plastic varieties used in fused deposition modeling (FDM) or other suitable manufacturing processes. The light engine obtained from combining the base 164 and stacked waveguide stages 160*a*, 160*b*, . . . , 160N may be part of an arrangement within a downlight such as luminaires 172, 174 shown in FIGS. 116A and 116B. A luminaire 172 having a vertical lamping position, as seen in FIG. 116A, provides an intensity distribution resembling that of a similarly situated compact florescent lamp. A luminaire 174 having a horizontal lamping position, as seen in FIG. 116B, provides a relatively wider intensity distribution, again resembling that of a similarly situated compact florescent lamp. However, in both lamping positions, luminaires 172, 174 described herein may provide better efficiency than a luminaire containing a comparable compact florescent lamp.

Any of the embodiments disclosed herein may include a power circuit for operating the LEDs having a buck regulator, a boost regulator, a buck-boost regulator, a SEPIC power supply, or the like, and may comprise a driver circuit as disclosed in U.S. patent application Ser. No. 14/291,829, filed May 30, 2014, entitled "High Efficiency Driver Circuit with Fast Response" by Hu et al. or U.S. patent application Ser. No. 14/292,001, filed May 30, 2014, entitled "SEPIC Driver Circuit with Low Input Current Ripple" by Hu et al.

incorporated by reference herein. The circuit may further be used with light control circuitry that controls color temperature of any of the embodiments disclosed herein in accordance with viewer input such as disclosed in U.S. patent application Ser. No. 14/292,286, filed May 30, 2014, entitled "Lighting Fixture Providing Variable CCT" by Pope et al. incorporated by reference herein.

Further, any of the embodiments disclosed herein may be used in a luminaire having one or more communication components forming a part of the light control circuitry, such as an RF antenna that senses RF energy. The communication components may be included, for example, to allow the luminaire to communicate with other luminaires and/or with an external wireless controller, such as disclosed in U.S. patent application Ser. No. 13/782,040, filed Mar. 1, 2013, entitled "Lighting Fixture for Distributed Control" or U.S. Provisional Application No. 61/932,058, filed Jan. 27, 2014, entitled "Enhanced Network Lighting" both owned by the assignee of the present application and the disclosures of which are incorporated by reference herein. More generally, the light control circuitry includes at least one of a network component, an RF component, a control component, and a sensor. The sensor may provide an indication of ambient lighting levels thereto and/or occupancy within the room or illuminated area. Such sensor may be integrated into the light control circuitry.

B. Troffer-Style Fixtures

1. Troffer-Style with a Light Guide Assembly

FIGS. 117-118B illustrate a troffer light fixture 200 (hereinafter light fixture). The light fixture 200 generally includes a housing 201, a LED assembly 202, and a light guide assembly 203.

The housing 201 extends around the exterior of the light fixture 200 and is configured to mount of otherwise be attached to a support. The light fixture 200 includes a longitudinal axis A that extends along the length. A width is measured perpendicular to the longitudinal axis A. A centerline C/L extends through the light fixture 200. The light fixture may be provided in many sizes, including standard troffer fixture sizes, such as but not limited to 2 feet by 4 feet (2'×4'), 1 foot by 4 feet (1'×4'), or 2 feet by 2 feet (2'×2'). However, it is understood that the elements of the light fixture 200 may have different dimensions and can be customized to fit most any desired fixture dimension. FIG. 117 illustrates the light fixture 200 in an inverted configuration. In some examples, the light fixture 200 is mounted on a ceiling or other elevated position to direct light vertically downward onto the target area. The light fixture 200 may be mounted within a T grid by being placed on the supports of the T grid. In other examples, additional attachments, such as tethers, may be included to stabilize the fixture in case of earthquakes or other disturbances. In other embodiments, the light fixture 200 may be suspended by cables, recessed into a ceiling or mounted on another support structure.

As illustrated in FIG. 119, the housing 201 includes a back pan 210 with end caps 215 secured at each end. The back pan 210 and end caps 215 form a recessed pan style troffer housing. In one example, the back pan 210 includes three separate sections including a center section 211, a first wing 212, and a second wing 213. The back pan 210 includes a generally concave shape that opens outward towards the LED assembly 202. In one example, each of the center section 211, first wing 212, second wing 213, and end caps 215 are made of multiple sheet metal components secured together. In another example, the back pan 210 is made of a single piece of sheet material that is attached to the end caps 215. In another example, the back pan 210 and end caps 215 are made from a single piece of sheet metal formed into the desired shape. In examples with multiple pieces, the pieces are connected together in various manners, including but not limited to mechanical fasteners and welding. As illustrated in FIG. 119, outer support members 219 can extend over and are connected to the outer sides of the end caps 215. In another example, the housing 201 includes the back pan 210, but does not include end caps 215.

The exposed surfaces of the back pan 210 and end caps 215 may be made of or coated with a reflective metal, plastic, or white material. One suitable metal material to be used for the reflective surfaces of the panels is aluminum (Al). The reflective surfaces may also include diffusing components if desired. The reflective surfaces of the panels may comprise many different materials. For many indoor lighting applications, it is desirable to present a uniform, soft light source without unpleasant glare, color striping, or hot spots. Thus, the panels may comprise a diffuse white reflector, such as a microcellular polyethylene terephthalate (MC-PET) material or a DuPont/WhiteOptics material, for example. Other white diffuse reflective materials can also be used. The reflectors may also be aluminum with a diffuse white coating.

The light guide assembly 203 extends over the central longitudinal section of the housing 201. The light guide assembly 203 includes a pair of light guide plates 220, 221. The light guide plates 220, 221 are connected together along the centerline C/L by a connector 222. The connector 222 can also support the LED assembly 202 to position LED elements 233 along the sides of the light guide plates 220, 221.

As illustrated in FIG. 120A, the light guide plates 220, 221 generally include outer edges that form a rectangular shape with opposing ends 223, 224, and opposing sides 225, 226. The light guide plates 220, 221 include a length L measured between the ends 223, 224. The length L can be substantially equal to the back pan 210 such that the ends 223, 224 abut against the end caps 215. In another example, the length L is less than the back pan 210 and one or both ends 223, 224 are spaced inward from the respective end caps 215. The sides 226 can be aligned towards the centerline C/L. As illustrated in FIG. 118B, the sides 226 are attached to the connector 222. In one example, the sides 226 are positioned in slots 229 in the connector 222. In one example, the opposing sides 225 abut against the back pan 210, and specifically against the first and second wings 212, 213 respectively. The sides 223,224 can be attached to the back pan 210, such as with mechanical connectors and/or adhesives. In another example, the sides 225 are spaced away from the back pan 210.

The light guide plates 220, 221 extend outward above the central section of the back pan 210. An enclosed interior space 291 is formed between the light guide plates 220, 221 and the housing 201. The ends of the interior space 291 can be enclosed by the end caps 215.

The light guide plates 220, 221 further include an outer surface 227 that faces away from the back pan 210, and an inner surface 228 that faces towards the back pan 210. The outer surface 227 and the inner surface 228 have different features to direct the light from the light fixture 200. A thickness of the light guide plates 220, 221 is measured between the outer surface 227 and the inner surface 228. The thickness can be consistent throughout, and in one example the thickness is about 3.0 mm. The thickness can also vary depending upon features on one or both of the outer face 227 and the inner face 228.

FIG. 120B illustrates the details of the light guide plates 220, 221. The light guide plates 220, 221 are composed of three layers in the order: a diffuser 281 at the upper face 227, a plate 282, and a diffuse reflector 283 at the inner surface 228. In one example, the diffuser 281 is a diffuser film 281. The diffuser 281 softens and uniformly distributes light that is emitted from the light guide plate 220, 221. The plate collects light from one or more LED elements 233 that are positioned along one or more sides and redistributes the light through the upper surface 227 or outer surface. The diffuse reflector 283 reflects and recycles light that escapes from bottom surface of the plate 282 thus increasing the optical efficiency.

The light guide plates 220, 221 provides for scattered or reflected light to exit through the outer surface 227 or to reflect and propagate within the plate 282. The outgoing light extracts within a range of angles. This enables light to pass directionally through the wave guide plates 220, 221 thus contributing to uniform illumination.

FIGS. 121A and 121B illustrate one light guide plate 220, 221. LED assemblies 202 are positioned along one or both of sides 225, 226. The light guide plates 220, 221 include a series of elongated features 240 that extend the width W between the sides 225, 226. In one example as illustrated in FIG. 121A, the features 240 have a uniform distribution with constant spacing across the outer surface 227. In one example, the features 240 are parallel with the ends 223, 224, and perpendicular to the sides 225, 226. FIG. 121B includes that each of the features 240 has a semi-circular ridge 241 that are separated by intervening valleys 242. The ridges 241 include a uniform shape with a fixed radius. In one example, each of the ridges 241 includes the same radius. In one example, each ridge 241 is a semicircle.

In one example, the features 240 are formed in the plate 282 and the diffuser 281 simply extends over the upper surface of the plate 282 where the plate 282 and the diffuser 281 are stacked. In one example, air gaps are formed at the cylindrical ridges of the features 240. In another example, both the plate 282 and diffuser 281 form the features 240. In another example, the features 240 are formed by the diffuser 281 with the upper surface of the plate 282 being substantially flat.

FIGS. 122A and 122B illustrate a light guide plate 220, 221. Features 243 are formed in the planar lower surface 244 lower surface of the plate 282. The features 243 are configured for light to have total internal reflection (TIR) or be refracted. The light is directed towards the outer surface 227 in varied directions which provides for uniform light distribution. In one example, each of the features 243 includes the same shape and size. In another example, the features 243 include two or more different shapes and/or sizes.

In one example, the features 243 are aligned in a regular pattern with constant spacing. FIG. 122A includes a regular pattern with the features 243 aligned in rows across the width W with gaps positioned between each feature 243. Adjacent rows are offset with the features of one row aligned with the gaps of the adjacent rows. In another example as illustrated in FIG. 123, the features 243 are aligned in uniform rows and also aligned across the width. The features 243 can also be aligned in other regular patterns. In another example, the features 243 are arranged in an irregular pattern. In one example, the features 243 are arranged with a weighted factor for spacing. This includes the spacing gradually increasing or decreasing from a particular point or outer edge while being arranged regularly.

The features 243 include dips that extend into the lower surface 244 of the plate 282. The dips include an ellipsoidal shape in a first plane as illustrated in FIGS. 124A and 124B and a freeform shape in the crossed plane as illustrated in FIG. 124C. In one example as specifically included in FIG. 124C, the crossed plane includes a scooped shape. The dips include a major axis with the ellipsoidal shape and a minor axis with the freeform shape. The dips are arranged with the major axis of the ellipsoidal shape being perpendicular to the plane of the LED assembly 202. Using the example of FIG. 122A, the major axis is perpendicular to one or both sides 225, 226 and the LED assembly 202 would be positioned along one or both of the sides 225, 226.

In another example, the features 243 include other shapes that are trapezoidal shape or other freeform shape in an axis either parallel or perpendicular to an LED assembly 202.

FIG. 125A illustrates light rays fan moving through a light guide plate 220, 221. Light rays from the light elements 233 of the LED assembly 202 enter into the plate 282. Some of the light rays hit the features 243 and then partially reflect to be emitted outward from the outer surface 227 or perimeter edges. Some of the light rays are refracted and guided inside the plate 282 until hitting another feature 243 and/or other spot on the light guide plate 220, 221. Some of the light rays hit directly against the top surface of the plate 282 and/or the diffuser 281 and are reflected and guided inside the plate 282 until hitting a feature 243 or surface. Some of the light rays propagate various distances through the plate 282 until hitting a feature 243 or perimeter edge. Some of the light rays hit the diffuse reflector 283 and are reflected into the plate 282.

FIG. 125B illustrates a light ray fan on the planar surface 244 that reflects by TIR in a normal manner. FIG. 125C illustrates light rays hitting the features 243. The light rays hitting the features 243 are TIR-reflected and go in varied directions. The varied surface curvatures of the features 243 scatter the light in different directions. In one example, the features 243 include ellipsoidal dips with the shape being elongated along the main LED light direction. This enables the light to propagate through the light guide plate 220, 221 smoothly to the opposing side 225, 226 while going in varied directions upon contact with a feature 243. The freeform surface of the ellipsoidal shape in the opposing plane assists to extract the light uniformly onto the outer surface 227 and also to pass through the light guide plate 220, 221.

An LED assembly 202 is mounted to each of the first and second light guide plates 220, 221. In one example as illustrated in FIGS. 118A and 118B, the LED assemblies 202 are mounted to the side 226 of each of the light guide plates 220, 221. The LED assemblies 202 include LED elements 233 aligned in an elongated manner that extends along the light guide plates 225, 226.

FIG. 126A illustrates an LED assembly 202 that includes the LED elements 233 and a substrate 231. The LED elements 233 can be arranged in a variety of different arrangements. In one example as illustrated in FIG. 126A, the LED elements 233 are aligned in a single row. In another example as illustrated in FIG. 126B, the LED elements 233 are aligned in two or more rows. The LED elements 233 can be arranged at various spacings. In one example, the LED elements 233 are equally spaced along the length of the light guide plates 220, 221. In another example, the LED elements 233 are arranged in clusters at different spacings along the light guide plates 220, 221. In one example, each LED element 233 has a size of about 1.0 mm in length and about 1.0 mm in width.

The LED assemblies 202 can include various LED elements 233. In the various examples, the LED assembly 202 can include the same or different LED elements 233. In one example, the multiple LED elements 233 are similarly colored (e.g., all warm white LED elements 233). In such an example all of the LED elements are intended to emit at a similar targeted wavelength; however, in practice there may be some variation in the emitted color of each of the LED elements 233 such that the LED elements 233 may be selected such that light emitted by the LED elements 233 is balanced such that the light fixture 200 emits light at the desired color point.

In one example, each LED element 233 is a single white or other color LED chip or other bare component. In another example, each LED element 233 includes multiple LEDs either mounted separately or together. In the various embodiments, the LED elements 233 can include, for example, at least one phosphor-coated LED either alone or in combination with at least one color LED, such as a green LED, a yellow LED, a red LED, etc.

In various examples, the LED elements 233 of similar and/or different colors may be selected to achieve a desired color point.

In one example, the LED assembly 202 includes different LED elements 233. Examples include blue-shifted-yellow LED elements ("BSY") and a single red LED elements ("R"). Once properly mixed the resultant output light will have a "warm white" appearance. Another example uses a series of clusters having three BSY LED elements 233 and a single red LED element 233. This scheme will also yield a warm white output when sufficiently mixed. Another example uses a series of clusters having two BSY LED elements 233 and two red LED elements 233. This scheme will also yield a warm white output when sufficiently mixed. In other examples, separate blue-shifted-yellow LED elements 233 and a green LED element 233 and/or blue-shifted-red LED element 233 and a green LED element 233 are used. Details of suitable arrangements of the LED elements 233 and electronics for use in the light fixture 200 are disclosed in U.S. Pat. No. 9,786,639, which is incorporated by reference herein in its entirety.

The substrate 231 supports and positions the LED elements 233. The substrate 231 can include various configurations, including but not limited to a printed circuit board and a flexible circuit board. The substrate 231 can include various shapes and sizes depending upon the number and arrangement of the LED elements 233.

In one example, an LED assembly 202 is attached to light guide plates 220, 221 along one of the sides 225, 226, or ends 223, 224. In one example, the LED assembly 202 is connected to one of the sides 225, 226, such as side 226 as illustrated in FIG. 127. The LED assembly 202 extends the length of the light guide plate 220, 221.

A reflector 239 is attached to the opposing side 225, 226 (e.g., side 225 in FIG. 127). Various types of reflectors 229 can be used, such as but not limited to a WHITEOPTIC reflector from WhiteOptics, LLC, or a high reflecting film or material. In one example, the reflector 229 is configured to transmit about 50% of the light and to reflect about 50% of the light. In another example, the reflector 229 reflects 100% of the light. In another example, the opposing side 225, 226 does not include a reflector 229.

In one example, the LED assembly 202 and reflector 229 guide the light and the ends 223, 224 do not include optics. In one example, one or both ends 223, 224 can be flat and polished.

In one example as illustrated in FIG. 127, a single LED assembly 202 is attached to each light guide plate 220, 221. In another example, two or more LED assemblies 202 are attached to each light guide plate 220, 221. For example, LED assemblies 202 are attached to both of the sides 225, 226, to one of the sides 225, 226 and one of the ends 223, 224, or to both of the ends 223, 224.

In one example, the light guide plates 220, 221 are the same and each includes the same arrangement of one or more LED assemblies 202. This provides for uniform light distribution throughout the light fixture 200. In another example, the light guide plates 220, 221 are different and/or include different arrangements of the one or more LED assemblies 202.

Each LED element 233 receives power from an LED driver circuit or power supply of suitable type, such as a SEPIC-type power converter and/or other power conversion circuits. At the most basic level a driver circuit 250 may comprise an AC to DC converter, a DC to DC converter, or both. In one example, the driver circuit 250 comprises an AC to DC converter and a DC to DC converter. In another example, the AC to DC conversion is done remotely (i.e., outside the fixture), and the DC to DC conversion is done at the driver circuit 250 locally at the light fixture 200. In yet another example, only AC to DC conversion is done at the driver circuit 250 at the light fixture 200. Some of the electronic circuitry for powering the LED elements 233 such as the driver and power supply and other control circuitry may be contained as part of the LED assembly 202 or the lamp electronics may be supported separately from the LED assembly 202.

In one example, a single driver circuit 250 is operatively connected to each of the LED elements 233. In another example as illustrated in FIG. 126B, two or more driver circuits 250 are connected to the LED elements 233.

In one example, the LED assemblies 202 are each mounted on a heat sink that transfers away heat generated by the one or more LED elements 233. The heat sink provides a surface that contacts against and supports the substrate 231. The heat sink further includes one or more fins for dissipating the heat. The heat sink 232 cools the one or more LED elements 233 allowing for operation at desired temperature levels.

As illustrated in FIG. 119, a control box 290 is attached to the housing 201. In one example as illustrated in FIG. 119, the control box 290 is attached to the underside of the second wing 213. The control box 290 can also be positioned at other locations. The control box 290 extends around and forms an enclosed interior space configured to shield and isolate various electrical components. In one example, one or more driver circuits 250 are housed within the control box 290. Electronic components within the control box 290 may be shielded and isolated.

Examples of troffer light fixtures with a housing and LED assembly are disclosed in U.S. Pat. Nos. 10,508,794, 10,247,372, and 10,203,088, each of which is hereby incorporated by reference in its entirety.

Illumination testing was performed on three separate lighting fixtures 200. Each light fixture 200 included the same housing 201 and with the same LED assembly 202 attached to the side 226 of each light guide plate 220, 221 as illustrated in FIGS. 118A and 1188. A first light fixture 200 included no reflector 229 on the opposing side 225. A second light fixture 200 included a reflector 229 attached to the side 225 with the reflector 229 configured to reflect 50% of the light and to transmit 50% of the light. A third light fixture 200 included a reflector 229 attached to the side 225 with the reflector 229 configured to reflect 100% of the light. FIGS. 128A, 128B, 128C, and 128D illustrate the first light fixture 200. FIGS. 129A, 129B, 129C, and 129D illustrate the second light fixture 200. FIGS. 130A, 130B, 130C, and 130D illustrate the third light fixture 200.

Each of FIGS. 128A, 129A, and 130A illustrate two separate plots. The first plot 1 illustrates the intensity curve over vertical angles on the plane perpendicular to the longitudinal axis A (see FIG. 117). The second plot 2 is the intensity curve on the vertical angles on the plane (parallel plane) along the longitudinal axis A.

A spacing criterion (SC) was also calculated for each light fixture 200. The SC shows how much light can be distributed widely to make uniform at a given mounting height (i.e., it is the ratio of luminaires spacing to mounting height). The SC was measured along each of the longitudinal axis, perpendicular axis, and in a diagonal direction. For the first light fixture 200 (with no reflecting optic), the SC in along the longitudinal axis was 1.12, the SC in the perpendicular axis was 1.20, and the SC in the diagonal direction was 1.26. For the second light fixture 200 (with the reflector 229 being 50% transmissive and 50% reflective), the SC along the longitudinal axis was 1.12, the SC in the perpendicular axis was 1.20, and the SC in the diagonal direction was 1.28. For the third light fixture 200 (with the reflector 229 being 100% reflective), the SC in along the longitudinal axis was 1.12, the SC in the perpendicular axis was 1.81, and the SC in the diagonal direction was 1.26.

FIGS. 128B, 129B, and 130B illustrate the Luminaire Classification System (LCS). The LCS illustrates lumens distribution over angles as % of total fixture lumens. Each of the light fixtures 200 was measured for FL is front low (angle), FM is front medium angle, FH is front high angle, FVH is front very high angle, BL is back low angle, BM is back medium angle, BH is back high angle, UL is uplight low angle, and UH is uplight high angle. For these measurement, low is between 0-30°, medium is between 30-60°, high is between 60-80°, and very high is between 80-90°, uplight low is between 90-100°, and uplight high is between 100-180°.

The first light fixture 200 without reflecting optics (FIG. 128B) includes the following: FL=15.8%; FM=25.8%; FH=7.9%; FVH=0.5%; BL=15.8%; BM=25.8%; BH=7.9%; BVH=0.5%; UL=0.0%; and UH=0.0%.

The second light fixture 200 with the reflector 229 that is 50% transmissive and 50% reflective includes the following: FL=15.7%; FM=25.8%; FH=7.9%; FVH=0.5%; BL=15.7%; BM=25.8%; BH=7.9%; BVH=0.5%; UL=0.0%; and UH=0.0%.

The third light fixture 200 with the reflector 229 that is 100% reflective includes the following: FL=15.9%; FM=25.8%; FH=7.8%; FVH=0.6%; BL=15.9%; BM=25.7%; BH=7.8%; BVH=0.6%; UL=0.0%; and UH=0.0%.

The optical efficiency of three light fixtures 200 can range from between about 75%-80%.

FIGS. 128C, 129C, and 130C demonstrate the luminance appearance from a front view.

FIGS. 128D, 129D, and 130D demonstrate the luminance appearance from an angle of 65 degrees relative to the centerline.

FIGS. 131A and 131B disclose another light fixture 200 with a troffer design. The light fixture 200 includes a housing 201 as described above for light fixture 200. The light fixture 260 includes a longitudinal axis A that extends along the length. The light fixture 260 can have various shapes and sizes, including standard troffer fixture sizes, such as but not limited to 2 feet by 4 feet (2'×4'), 1 foot by 4 feet (1'×4'), or 2 feet by 2 feet (2'×2'). However, it is understood that the elements of the light fixture 200 may have different dimensions and can be customized to fit most any desired fixture dimension.

A light panel assembly 204 extends over the central section of housing 201. The light panel assembly 204 includes first and second light panels 260, 261. As illustrated in FIG. 132A, the light panels 260, 261 have a substantially rectangular shape with opposing ends 262, 263, and opposing lateral sides 264, 265. In one example, the light panels 260, 261 extend the length of the back pan 210 with the ends 262, 263 contacting against each of the opposing end caps 215. In another example, one or both ends 262, 263 are spaced away from the end caps 215. The inner lateral sides 264 are connected to the connector 222 that is aligned along the centerline C/L. In one example, the connector 222 includes slots 229 that receive the lateral sides 264.

The outer lateral sides 265 are positioned towards the back pan 210. In one example, the lateral sides 265 contact against the back pan 210, with the lateral sides 265 contacting against the first wing 212 and the second wing 213, respectively. In one example, the lateral sides 265 are attached to the back pan 200, such as with one or more adhesives and mechanical fasteners.

The light panel assembly 204 extends across the central section of the housing 201. An enclosed interior space 291 is formed between the light panel assembly 204 and the housing 200. The ends of the interior space 291 can be enclosed by the end caps 215.

As illustrated in FIG. 132B, the light panels 260, 261 include a light assembly 270 and a protective film 280. The light assembly 270 is positioned at an inner side 267 of the light panels 260, 261, and the film 280 is positioned at an outer side 266. The light panels 260, 261 comprise a relatively thin, flat shape.

As illustrated in FIG. 132A, the light assembly 270 includes an array of pixels 271 that face outward away from the housing 201. The array can include various sizes and shapes. As illustrated in FIG. 132C, each pixel 271 includes multiple sub-pixels 272. In one design, each pixel 271 includes three sub-pixels 272: a red sub-pixel 272; a green sub-pixel 272; and a blue sub-pixel 272 (i.e., an RGB pixel). The sub-pixels 272 can be adjusted to different luminance values to cause the pixels 271 to have various colors.

In another example, each pixel 271 is a single pixel that provide a single uniform light. In one example, the single pixel gives uniform lighting with a single white color.

In one example, the sub-pixels 272 are microscopic LEDs that have a size of between about 1-10 μm. The pixels 271 and sub-pixels 272 can also include other lighting technologies, including liquid crystal display (LCD), organic LED (OLED), and quantum dots (QD).

The film 280 is positioned over the light assembly 270 (i.e., on the side of the light assembly 270 away from the assembly 201). The film 280 protects the light assembly 270 from environmental conditions such as humidity and from mechanical deformation.

In another example as illustrated in FIG. 133, the light panels 260, 261 include just a light assembly 270 without a film 280. In one example, a protecting member is integral formed within the light assembly 270. The light panels 260, 261 do not require extra diffusers because the array of pixels 271 is a diffused light source having uniform luminance.

In one example, the light assemblies 270 include a heat sink mounted on the inner side towards the housing 201.

FIG. 134 illustrates plots 1, 2 of the intensity curve of the light fixture 200. The first plot 1 illustrates the intensity curve over vertical angles on the plane perpendicular to the longitudinal axis A. The second plot 2 is the intensity curve on the v-angles on the plane perpendicular to the longitudinal axis A. The light fixture 200 further includes a Spacing Criterion along the longitudinal axis and perpendicular axis of 1.3, and along the diagonal of 1.42, along with good Lambertian distribution.

In the various examples, the light fixtures 200 can include one or more communication components forming a part of the light control circuitry, such as an RF antenna that senses RF energy. The communication components may be included, for example, to allow the light fixture 200 to communicate with other light fixtures 200 and/or with an external wireless controller. More generally, the control circuitry includes at least one of a network component, an RF component, a control component, and a sensor. The sensor, such as a knob-shaped sensor, may provide an indication of ambient lighting levels thereto and/or occupancy within the room or illuminated area. Such a sensor may be integrated into the light control circuitry. In various embodiments described herein various smart technologies may be incorporated in the lamps as described in the following United States patent applications "Solid State Lighting Switches and Fixtures Providing Selectively Linked Dimming and Color Control and Methods of Operating," application Ser. No. 13/295,609, filed Nov. 14, 2011, which is incorporated by reference herein in its entirety; "Master/Slave Arrangement for Lighting Fixture Modules," application Ser. No. 13/782,096, filed Mar. 1, 2013, which is incorporated by reference herein in its entirety; "Lighting Fixture for Automated Grouping," application Ser. No. 13/782,022, filed Mar. 1, 2013, which is incorporated by reference herein in its entirety; "Lighting Fixture for Distributed Control," application Ser. No. 13/782,040, filed Mar. 1, 2013, which is incorporated by reference herein in its entirety; "Efficient Routing Tables for Lighting Networks," application Ser. No. 13/782,053, filed Mar. 1, 2013, which is incorporated by reference herein in its entirety; "Handheld Device for Communicating with Lighting Fixtures," application Ser. No. 13/782,068, filed Mar. 1, 2013, which is incorporated by reference herein in its entirety; "Auto Commissioning Lighting Fixture," application Ser. No. 13/782,078, filed Mar. 1, 2013, which is incorporated by reference herein in its entirety; "Commissioning fora Lighting Network," application Ser. No. 13/782,131, filed Mar. 1, 2013, which is incorporated by reference herein in its entirety; "Ambient Light Monitoring in a Lighting Fixture," application Ser. No. 13/838,398, filed Mar. 15, 2013, which is incorporated by reference herein in its entirety; "System, Devices and Methods for Controlling One or More Lights," application Ser. No. 14/052,336, filed Oct. 11, 2013, which is incorporated by reference herein in its entirety; and "Enhanced Network Lighting," Application No. 61/932,058, filed Jan. 27, 2014, which is incorporated by reference herein in its entirety. Additionally, any of the light fixtures described herein can include the smart lighting control technologies disclosed in U.S. Provisional Application Ser. No. 62/292,528, titled "Distributed Lighting Network", filed on Feb. 8, 2016 and assigned to the same assignee as the present application, the entirety of this application being incorporated by reference herein.

In various examples described herein various Circadian-rhythm related technologies may be incorporated in the light fixtures as described in the following: U.S. Pat. Nos. 8,310,143, 10,278,250, 10,412,809, 10,465,869, 10,451,229, 9,900,957, and 10,502,374, each of which is incorporated by reference herein in its entirety.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein. Although steps of various processes or methods described herein may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention.

2. Troffer-Style with an Inner Lens

FIGS. 135A and 135B illustrate a troffer light fixture 300 (hereinafter light fixture). The light fixture 300 generally includes a housing 301, an LED assembly 302, a lens assembly 303, and an inner lens 340.

The housing 301 extends around the exterior of the light fixture 300 and is configured to mount or otherwise be attached to a support. The light fixture 300 includes a longitudinal axis A that extends along the length. A width is measured perpendicular to the longitudinal axis A. As illustrated in FIG. 135B, when viewed from the end, a centerline C/L extends through the light fixture 300 and divides the light fixture 300 into first and second lateral sections. The light fixture 300 can have a variety of different sizes, including standard troffer fixture sizes, such as but not limited to 2 feet by 4 feet (2'×4'), 1 foot by 4 feet (1'×4'), or 2 feet by 2 feet (2'×2'). However, it is understood that the elements of the light fixture 300 may have different dimensions and can be customized to fit most any desired fixture dimension.

FIG. 135A illustrates the light fixture 300 in an inverted configuration. In some examples, the light fixture 300 is mounted on a ceiling or other elevated position to direct light vertically downward onto the target area. The light fixture 300 may be mounted within a T grid by being placed on the supports of the T grid. In other examples, additional attachments, such as tethers, may be included to stabilize the fixture in case of earthquakes or other disturbances. In other embodiments, the light fixture 300 may be suspended by cables, recessed into a ceiling or mounted on another support structure.

The housing 301 includes a back pan 310 with end caps 315 secured at each end. The back pan 310 and end caps 315 form a recessed pan style troffer housing defining an interior space for receiving the LED assembly 302. In one example, the back pan 310 includes three separate sections including a center section 311, a first wing 312, and a second wing 313. In one example, each of the center section 311, first wing 312, second wing 313, and end caps 315 are made of multiple sheet metal components secured together. In another example, the back pan 310 is made of a single piece of sheet material that is attached to the end caps 315. In another example, the back pan 310 and end caps 315 are made from a single piece of sheet metal formed into the desired shape. In examples with multiple pieces, the pieces are connected together in various manners, including but not limited to mechanical fasteners and welding.

As illustrated in FIG. 136, outer support members 319 can extend over and are connected to the outer sides of the end caps 315. In another example, the housing 301 includes the back pan 310, but does not include end caps 315.

The exposed surfaces of the back pan 310 and end caps 315 may be made of or coated with a reflective metal, plastic, or white material. One suitable metal material to be used for the reflective surfaces of the panels is aluminum (Al). The reflective surfaces may also include diffusing components if desired. For many lighting applications, it is desirable to present a uniform, soft light source without unpleasant glare, color striping, or hot spots. Thus, one or more sections of the housing 301 can be coated with a reflective material, such as a microcellular polyethylene terephthalate (MCPET) material or a DuPont/WhiteOptics material, for example. Other white diffuse reflective materials can also be used. One or more sections of the housing 301 may also include a diffuse white coating.

A lens assembly 303 is attached to the housing 301. The lens assembly 303 includes a pair of flat fixture lenses 320, 321. As illustrated in FIGS. 137A and 137B, an outer end 323 of lens 320 is positioned at the first wing 312 of the back pan 310 and an outer end 324 of lens 321 is positioned at the second wing 313. In one example, the outer ends 323, 324 abut against the respective wings 312, 313, and can be connected by one or more of mechanical fasteners and adhesives. In another example, the outer ends 323, 324 are spaced away from the respective wings 312, 313.

A connector 322 is positioned between and connects together the lenses 320, 321. The connector 322 includes slots 325 that receive the inner ends 326, 327 respectively of the lenses 320, 321. The connector 322 is positioned along the centerline C/L. In one example, the connector 322 is centered on the centerline C/L.

In one example, each lens 320, 321 is a single piece. In other examples, one or both lenses 320, 321 are constructed from two or more pieces. The lenses 320, 321 can be constructed from various materials, including but not limited to plastic, such as extruded plastic, and glass. In one example, the entire lenses 320, 321 are light transmissive and diffusive. In one example, one or more sections of the lenses 320, 321 are clear. The outer surfaces 328, 329 of the lenses 320, 321 may be uniform or may have different features and diffusion levels. In another example, one or more sections of one or more of the lenses 320, 321 is more diffuse than the remainder of the lens 320, 321.

In one example, each of the lenses 320, 321 are flat with a constant thickness across the length and width. In other examples, one or both the lenses 320, 321 include variable thicknesses. In one example, each of the lenses 320, 321 is identical thus allowing a single part to function as either section and reduce the number of separate components in the design of the light fixture 300.

The housing 301 and lens assembly 302 form an interior space 391 that houses the LED assembly 302 and inner lens 340. The interior space 391 may be sealed to protect the LED assembly 302 and inner lens 340 and prevent the ingress of water and/or debris.

The LED assembly 302 includes LED elements 333 aligned in an elongated manner that extends along the back pan 310. In one example, the LED assembly 302 extends the entire length of the back pan 310 between the end caps 315. In another example, the LED assembly 302 extends a lesser distance and is spaced away from one or both of the end caps 315. In one example, the LED assembly 302 is aligned with the longitudinal axis A (FIG. 135A) of the light fixture 300 and is mounted to the center section 311 of the back pan 310.

The LED assembly 302 includes the LED elements 333 and a substrate 331. The LED elements 333 can be arranged in a variety of different arrangements. In one example as illustrated in FIG. 136, the LED elements 333 are aligned in a single row. In another example as illustrated in FIG. 138A, the LED elements 333 are aligned in two or more rows. The LED elements 333 can be arranged at various spacings. In one example, the LED elements 333 are equally spaced along the length of the back pan 310. In another example, the LED elements 333 are arranged in clusters at different spacings along the back pan 310.

The LED assembly 302 can include various LED elements 333. In the various examples, the LED assembly 302 can include the same or different LED elements 333. In one example, the multiple LED elements 333 are similarly colored (e.g., all warm white LED elements 333). In such an example all of the LED elements are intended to emit at a similar targeted wavelength; however, in practice there may be some variation in the emitted color of each of the LED elements 333 such that the LED elements 333 may be selected such that light emitted by the LED elements 333 is balanced such that the light fixture 300 emits light at the desired color point.

In one example, each LED element 333 is a single white or other color LED chip or other bare component. In another example, each LED element 333 includes multiple LEDs either mounted separately or together. In the various embodiments, the LED elements 333 can include, for example, at least one phosphor-coated LED either alone or in combination with at least one color LED, such as a green LED, a yellow LED, a red LED, etc.

In various examples, the LED elements 333 of similar and/or different colors may be selected to achieve a desired color point.

In one example, the LED assembly 302 includes different LED elements 333. Examples include blue-shifted-yellow LED elements ("BSY") and a single red LED elements ("R"). Once properly mixed the resultant output light will have a "warm white" appearance. Another example uses a series of clusters having three BSY LED elements 333 and a single red LED element 333. This scheme will also yield a warm white output when sufficiently mixed. Another example uses a series of clusters having two BSY LED elements 333 and two red LED elements 333. This scheme will also yield a warm white output when sufficiently mixed. In other examples, separate blue-shifted-yellow LED elements 333 and a green LED element 333 and/or blue-shifted-red LED element 333 and a green LED element 333 are used. Details of suitable arrangements of the LED elements 333 and electronics for use in the light fixture 300 are disclosed in U.S. Pat. No. 9,786,639, which is incorporated by reference herein in its entirety.

The LED assembly 302 includes a substrate 331 that supports and positions the LED elements 333. The substrate 331 can include various configurations, including but not limited to a printed circuit board and a flexible circuit board. The substrate 331 can include various shapes and sizes depending upon the number and arrangement FIG. 137B, the LED assembly 302 is centered along the centerline C/L of the light fixture 300. The connector 322 positioned between the lenses 320, 321 is also positioned along the centerline C/L. The centerline C/L also extends through the center of the back pan 310 which can include the center of the center section 311.

Each LED element 333 receives power from an LED driver circuit or power supply of suitable type, such as a SEPIC-type power converter and/or other power conversion circuits. At the most basic level a driver circuit 350 may comprise an AC to DC converter, a DC to DC converter, or both. In one example, the driver circuit 350 comprises an AC to DC converter and a DC to DC converter. In another example, the AC to DC conversion is done remotely (i.e., outside the fixture), and the DC to DC conversion is done at the driver circuit 350 locally at the light fixture 300. In yet another example, only AC to DC conversion is done at the driver circuit 350 at the light fixture 300. Some of the electronic circuitry for powering the LED elements 333 such as the driver and power supply and other control circuitry may be contained as part of the LED assembly 302 or the electronics may be supported separately from the LED assembly 330.

In one example, a single driver circuit 350 is operatively connected to the LED elements 333. In another example as illustrated in FIG. 138A, two or more driver circuits 350 are connected to the LED elements 333.

In one example as illustrated in FIG. 138B, the LED assembly 302 is mounted on a heat sink 332 that transfers away heat generated by the one or more LED elements 333. The heat sink 332 provides a surface that contacts against and supports the substrate 331. The heat sink 332 further includes one or more fins for dissipating the heat. The heat sink 332 cools the one or more LED elements 333 allowing for operation at desired temperature levels. It should be understood that FIG. 138B provides an example only of the heatsink 332 as many different heatsink structures could be used with an embodiment of the present invention.

In one example, the substrate 331 is attached directly to the housing 301. In one specific example, the substrate 331 is attached to the back pan 310. The substrate 331 can be attached to the center section 311, or to one of the first and second wings 312, 313. The attachment provides for the LED assembly 302 to be thermally coupled to the housing 301. The thermal coupling provides for heat produced by the LED elements 333 to be transferred to and dissipated through the housing 301.

As illustrated in FIG. 136, a control box 390 is attached to the housing 301. In one example, the control box 390 is attached to the underside of the second wing 313. The control box 390 can also be positioned at other locations. The control box 390 extends around and forms an enclosed interior space configured to shield and isolate various electrical components. In one example, one or more driver circuits 350 are housed within the control box 390. Electronic components within the control box 390 may be shielded and isolated.

Examples of troffer light fixtures with a housing 301 and LED assembly 302 are disclosed in: U.S. Pat. Nos. 10,508,794, 10,247,372, and 10,203,088 each of which is hereby incorporated by reference in their entirety.

An inner lens 340 is positioned in the interior space 391 and over the LED elements 333. In one example, the inner lens 340 extends the entirety of the back pan 310. In another example, the inner lens 340 is positioned inward from one or both ends of the back pan 310.

As illustrated in FIG. 139, the inner lens 340 directs the light from the LED elements 333 away from a center zone 392 along the centerline C/L and into lateral light zones 393, 394. The centerline C/L lies in a plane that bisects the light fixture 300 along the width and divides the light fixture 300 into first and second lateral sections. The centerline C/L extends through the connector 322 that connects together the inner ends 326, 327 of the fixture lenses 320, 321. The center zone 392 is centered on the centerline C/L. In one example, the center zone 392 extends 10° on each side of the centerline C/L (i.e., +/−10°). In another example, the center zone 392 is smaller (e.g., extends about 5° on each side of the centerline C/L). In another example, the center zone 392 is larger (e.g., extends about 15° on each side of the centerline C/L). In the various examples, the center zone 392 is centered on the centerline C/L and extends outward an equal amount on each lateral side.

The light zones 393, 394 are positioned on opposing lateral sides of the center zone 392. Light zone 393 extends between the center zone 392 and the first wing 312 of the back pan 310. Light zone 394 extends between the center zone 392 and the second wing 313 of the back pan 310. The light zones 393, 394 have equal sizes and are defined by the angle α formed between the respective edge of the center zone 392 and respective first and second wings 312, 313. In one example, the angle α is about 72°. Light zones 393, 394 can be larger or smaller depending upon the size of the center zone 392 and/or angular orientation of the first and second wings 312, 313.

A baseline BL lies in a plane that is perpendicular to the plane of the centerline C/L. In one example, the baseline BL extends along the surface of the substrate 331. In another example, the baseline BL is aligned along a bottom edge of the inner lens 40. In one example, the top surfaces of the first and second wings 312, 313 are each aligned at an angle of between about 5°-15° with the baseline BL. In one specific embodiment, the first and second wings 312, 313 are aligned at an angle of about 8° with the baseline BL.

The inner lens 340 provides for light rays to illuminate both light zones 393, 394 and provide for uniform luminance. The inner lens 340 provides for symmetrical lighting within both light zones 393, 394. In one example, the inners lens 340 provides for no light to be distributed into the center zone 392. In another example, a limited amount of light may be transmitted into the center zone 392.

FIG. 140 illustrates an inner lens 340 that includes a cavity 341 that extends the length of the inner lens 340 and is positioned over the LED elements 333. The inner lens 340 also includes an outer surface 342 spaced on the opposing surface away from the cavity 341. A bottom edge 343 extends along the bottom of the inner lens 340. The bottom edge 343 can include various shapes that can be flat or uneven (as illustrated in FIG. 140).

The inner lens 340 includes an elongated shape along a first axis to extend along the back pan 310. The inner lens 340 is a diverging cylindrical lens. That is, the inner lens 340 is cylindrical lens along a first axis (e.g., along the length or y-axis) and a diverging lens (or negative lens) in a second axis (e.g., an x-axis) as illustrated in FIG. 140.

The inner lens 340 is a negative lens that diverges light along the axis that is perpendicular to the centerline C/L as the inner lens 340 is assembled. The light rays are refracted on the steep inner surface of the cavity 341 and then pass through the lens 340 and are further refracted for wide distribution. The inner lens 340 transfers the light rays outward in wide angles without overlap. This enables the light to have a smooth distribution without shadows or hotspots. The inner lens 340 is shaped with the lens thickness gradually and symmetrically increasing from the center (at a peak 351 of the cavity 341) to each lateral end 345, 346. The surfaces of the cavity 341 and outer surface 342 have slowly varying curvatures so that light can be uniformly distributed on the whole target surface. The slowly varying curvature may diminish shadows or hot spots which may be generated on the fixture lenses 320, 321.

In one example, the inner lens 340 has no total internal reflection portions on the whole outer surface 342. Instead, light rays are refracted smoothly and sequentially without shadows or hot spots.

The cavity 341 has a steep but smooth surface for light coupling so that light rays are refracted towards the inside of the inner lens 340 in wide angles to help in shaping the wide light distribution. The slowly varying surface enables smooth and sequential light refraction and wide distribution without interactions among light rays to form uniform luminance in the target area.

As illustrated in FIG. 140, the cavity 341 includes a peak 351. The peak 351 is located at the center of the cavity 341. The outer surface 342 can include a dimple 348. In one example, the peak 351 and the dimple 348 are both aligned with the centerline C/L. A straight line that extends through the peak 351 and the dimple 348 divides the inner lens 340 into two sections that have equal shapes and sizes. The inner lens 340 is symmetrical about the line. A thickness of the inner lens 340 is measured between the cavity 341 and the outer surface 342. The minimum thickness is located along the line.

FIG. 141A illustrates a ray fan of light rays propagating through and from the inner lens 340. The inner lens 340 smoothly distributes the light rays without interaction into the light zones 393, 394. The light rays distributed within the light zones 393, 394 are greater at wide angles towards the outer edges than at more narrow angles towards the edges at the center zone 392. In one example, the light rays are divided into increasing outgoing angular spacing sequentially from the lower to the upper side. The same light distribution is obtained in both light zones 393, 394 as the inner lens 340 provides for symmetrical light distribution within each of the light zones 393, 394. The ray fan illustrates that the light rays have equal incident angular spacing with the light rays divided symmetrically and sequentially. The center zone 392 includes no light rays as the inner lens 340 blocks light rays from entering this zone.

FIG. 141B illustrates a distribution of light rays from the light fixture 300. A majority of the light is distributed outward from the inner lens 340 into the light zones 393, 394 without reflecting from the housing 301. Some portion of the light is reflected from the housing 301. The light from the inner lens 340 forms a wide luminance pattern that substantially fills each of the fixture lenses 320, 321. These fixture lenses 320, 321 are substantially illuminated across their widths. In one example, some light may enter the center zone 392 because individual LED elements 333 are extended sources and each has the strongest intensity in the center zone 392.

The light fixture 300 includes a single inner lens 340. The inner lens 340 can include various design features. In the various examples, the inner lens 340 is designed to diverge light (i.e., a negative lens) along one axis and to symmetrically distribute the light into two sides. The inner lens 340 can be constructed from a variety of materials, including but not limited to acrylic, transparent plastics, and glass. FIGS. 142A-145B illustrate different examples of an inner lens 340 that can be used in the light fixture 300. Each includes different aspects that affect the light distribution.

a. Inner Lens 1

FIGS. 142A and 142B illustrate a first inner lens 340. The inner cavity 341 includes a steep shape with a peak aligned along the centerline C/L. The outer surface 342 includes a continuous shape that extends between the lateral ends 345, 346. In one example, the radius of the outer surface 342 is about 11.85 mm. The bottom edge 343 includes a pair of projections 344 on opposing sides of the inner cavity 341. The sections 347 that extend between the projections 344 and lateral sections beyond the projections 344 to the ends 345, 346 are co-planar. In one example, the sections 347 are parallel with the baseline BL (and perpendicular to the centerline C/L). The inner lens 340 includes a width measured between the lateral ends 345, 346 of about 22.1 mm and a height at the cavity 341 measured along the centerline C/L of about 8.1 mm. The inner lens 340 is symmetrical about a straight line that extends between the peak 351 and the dimple 348.

b. Inner Lens 2

FIGS. 143A and 143B illustrate a second inner lens 340. The inner lens 340 is symmetrical about a straight line that extends between the peak 351 and the dimple 348. The inner cavity 341 includes a steep shape with a peak 351 aligned along the centerline C/L. The outer surface 342 includes the dimple 348 at the centerline C/L. The dimple 348 divides the outer surface 342 into first and second lateral sections 342*a*, 342*b*. The first lateral section 342*a* extends between the lateral end 345 and the dimple 348. The second lateral section 342*b* extends between the lateral end 346 and the dimple 348. In one example, the radius of each of the lateral sections 342*a*, 342*b* is about 11.85 mm from the respective lateral edge 345, 346 to a point prior to the start of the dimple 348. The bottom edge 343 includes a pair of projections 344 on opposing sides of the inner cavity 341. The sections 347 that extend between the projections 344 and lateral ends 345, 346 are co-planar. In one example, the sections 347 are parallel with the baseline BL (and perpendicular to the centerline C/L). The inner lens 340 includes a width measured between the lateral ends 345, 346 of about 22.1 mm and a height at the cavity 341 measured along the centerline C/L of about 8.0 mm.

c. Inner Lens 3

FIGS. 144A and 144B illustrate a third inner lens 340. The inner lens 340 is symmetrical about a straight line that extends between the peak 351 and the dimple 348. The inner cavity 341 includes a wider shape than the first and second inner lenses (i.e., FIGS. 142A, 142B, 143A, 143B). The peak 351 is positioned on the centerline C/L and is flatter than those of the first and second inner lenses. The outer surface 342 includes first and second sections 342*a*, 342*b* that meet at the dimple 348 that is positioned on the centerline C/L. The depth of the dimple 348 measured from the upper extent of the first and second sections 342*a*, 342*b* is deeper than the second inner lens. The bottom edge 343 includes a pair of projections 344 and sections 347 that extend outward to the lateral ends 345, 346. The sections 347 are positioned at an acute angle 11 relative to the baseline BL (that is perpendicular to the centerline C/L). The inner lens 340 includes a width measured between the lateral ends 345, 346 of about 22.7 mm and a height at the cavity 341 measured along the centerline C/L of about 8.8 mm.

d. Inner Lens 4

FIGS. 145A and 145B illustrate a fourth inner lens 340. The fourth inner lens 340 includes a cavity 341 with a steeper shape than the third inner lens. The inner lens 340 is symmetrical about a straight line that extends between the peak 351 and the dimple 348. In one example, the cavity 341 includes the same shape and size as the cavities 341 of the first and second inner lenses (i.e., FIGS. 142A, 142B, 143A, 143B). The outer surface 342 includes first and second sections 342*a*, 342*b* that meet at the dimple 348. The first and second sections 342*a*, 342*b* are wider than the corresponding first and second sections 342*a*, 342*b* of the third inner lens. The width of the inner lens 340 is about 23.7 mm measured between the lateral ends 345, 346. The height of the inner lens 340 measured at the centerline C/L is about 8.7 mm. The bottom edge 343 includes projections 344 and bottom sections 347. The bottom sections 347 are aligned in a plane that is parallel to the baseline BL (that is perpendicular to the centerline C/L).

The inner lenses 340 include three features. A first feature is the dimple 348 that is symmetrical about the centerline C/L. The dimple 348 divides the light into outer directions for distribution in the light zones 393, 394 and blocks light in the center zone 392. A second feature is the symmetrical surface of the cavity 341 about the centerline C/L. A third feature is the symmetrical surface of the outer surface 342 about the centerline C/L. The second and third features enable light rays to be refracted in further wide angles. The surfaces of the inner lens 340 provide for normal refraction without total internal reflection in which the incident angle is less than the critical angle (e.g., about 42° for acrylic).

Intensity and luminous flux distribution patterns are illustrated in FIGS. 146A-149B for the four different options for the inner lens 340. FIGS. 146A and 146B include the light distribution for a light fixture 300 with the first inner lens 340 (see FIGS. 142A and 142B). FIGS. 147A and 147B include the light distribution for a light fixture 300 with the second inner lens 340 (see FIGS. 143A and 143B). FIGS. 148A and 148B include the light distribution for a light fixture 300 with the third inner lens 340 (see FIGS. 144A and 144B). FIGS. 149A and 149B include the light distribution for a light fixture 300 with the fourth inner lens 340 (see FIGS. 145A and 145B).

Each of FIGS. 146A, 147A, 148A, and 149A illustrate two separate plots. The first plot 1 illustrates the intensity curve over vertical angles on the plane perpendicular to the longitudinal axis A. The second plot 2 is the intensity curve on the v-angles on the plane (parallel plane) along the longitudinal axis A. The longitudinal axis A is the axis along lined LED elements 333, the perpendicular plane is crossed to the longitudinal axis A. The parallel plane is along the longitudinal axis A. In other words, the perpendicular plane is the vertical plane crossing the longitudinal axis, or 90°-270° and parallel plane is the one along the longitudinal axis, or 0°-180°.

FIG. 146A further includes a Spacing Criterion (SC) and an optical efficiency (OE). The SC shows how much light can be distributed widely to make uniform at a given mounting height (i.e., it is the ratio of luminaires spacing to mounting height). The SC along the y-axis is 1.12 and the SC along the x-axis if 1.60. The OE is 84%.

FIG. 147A includes an SC along the y-axis of 1.12 and along the x-axis of 1.64, and an OE of 86%.

FIG. 148A includes an SC along the y-axis of 1.14 and along the x-axis of 1.74. The OE is 85%.

FIG. 149A includes an SC along the y-axis of 1.16 and along the x-axis of 1.68. The OE is 85%.

FIGS. 146B, 147B, 148B, and 149B illustrate the Luminaire Classification System (LCS). The LCS illustrates lumens distribution over angles as % of total fixture lumens. Each of the inner lenses 340 were measured for FL is front low (angle), FM is front medium angle, FH is front high angle, FVH is front very high angle, BL is back low angle, BM is back medium angle, BH is back high angle, UL is uplight low angle, and UH is uplight high angle. For these measurement, low is between 0-30°, medium is between 30-60°, high is between and very high is between 80-90°, uplight low is between 90-100°, and uplight high is between 100-180°.

The first inner lens 340 (FIG. 146B) includes the following: FL=12.7%; FM=25.8%; FH=10.6%; FVH=1.0%; BL=12.7%; BM=25.8%; BH=10.6%; BVH=1.0%; UL=0.0%; and UH=0.0%.

The second inner lens 340 (FIG. 147B) includes the following: FL=12.5%; FM=25.9%; FH=10.6%; FVH=1.0%; BL=12.5%; BM=25.9%; BH=BVH=1.0%; UL=0.0%; and UH=0.0%.

The third inner lens 340 (FIG. 148B) includes the following: FL=12.1%; FM=25.9%; FH=11.0%; FVH=1.0%; BL=12.2%; BM=25.9%; BH=11.0%; BVH=1.0%; UL=0.0%; and UH=0.0%.

The fourth inner lens 340 (FIG. 149B) includes the following: FL=12.2%; FM=25.8%; FH=11.1%; FVH=1.0%; BL=12.2%; BM=25.7%; BH=11.1%; BVH=1.0%; UL=0.0%; and UH=0.0%.

A linear array of LED elements 333 such as arranged in a troffer-style LED fixture emit a Gaussian type of light distribution with a sharp peak luminance in the center along the longitudinal axis A of the linear array. As a result, a linearly arranged LED array will typically create a bright spot along the longitudinal axis A of the light fixture 300 with dimmer lateral sides. The use of an inner lens 340 distributes the light laterally into the light zones 393, 394 and away from the center zone 392. The inner lens 340 further provides for symmetrical light distribution on opposing sides of the longitudinal axis A.

FIG. 150B illustrates the luminance uniformity from a front view of light fixtures 300 using the different inner lenses 340. As illustrated in FIG. 150A, the front view is taken along the centerline C/L of the light fixture 300. As evident, the large central peak is eliminated and light is distributed across the width.

FIG. 151B illustrates the luminance uniformity from a 45° angle relative to the centerline C/L (see FIG. 151A).

As illustrated in FIG. 150B in the front view, each of the first, second, third, and fourth inner lenses provide a lens uniformity Max/Min between 1.6 and 2.6.

In one example, the light fixture 400 includes a lens uniformity of between about 1.5 and 2.0 in the front view. In another example, the light fixture 400 includes a lens uniformity of between about 2.0 and 4.0 in the front view.

In one example, the ratio of the maximum luminance uniformity to the minimum luminance uniformity is analyzed according to one or more IES standards, such as but not limited to RP-20 standards for outdoor use and RP-1-12 for office lighting. In one example, a maximum/minimum ratio of less than 3:1 is considered excellent. In one example, a maximum/minimum ratio of less than is considered good.

FIG. 152A illustrates a fifth inner lens 340. The fifth inner lens 340 includes the same outer surface as the second inner lens 340 (see FIGS. 143A and 143B) with a different inner cavity 341). The inner lens 340 is symmetrical about a straight line that extends between the peak 351 and the dimple 348. The inner cavity 341 includes a steep shape with a peak 351 aligned along the centerline C/L. The outer surface 342 includes the dimple 348 at the centerline C/L. The dimple 348 divides the outer surface 342 into first and second lateral sections 342*a*, 342*b*. The first lateral section 342*a* extends between the lateral end 345 and the dimple 348. The second lateral section 342*b* extends between the lateral end 346 and the dimple 348. The bottom edge 343 includes a pair of projections 344 on opposing sides of the inner cavity 341. The sections 347 that extend between the projections 344 and lateral ends 345, 346 are co-planar.

FIG. 153A illustrates a sixth inner lens 340. The sixth inner lens 340 is symmetrical about a straight line that extends between the peak 351 and the dimple 348. The inner cavity 341 includes a steep shape with a peak 351 aligned along the centerline C/L. A straight line that extends through the peak 351 and dimple 348 is collinear with the centerline C/L. The outer surface 342 includes the dimple 348 at the centerline C/L. The dimple 348 divides the outer surface 342 into first and second lateral sections 342*a*, 342*b*. The first lateral section 342*a* extends between a first point at a flange 290 and the dimple 348. The second lateral section 342*b* extends between the flange 290 and the dimple 348. The flange 290 extends along the bottom and extends laterally outward beyond each of the sections 342*a*, 342*b* respectively. Indents 291, 292 are formed in the bottom edge 293 of the flange along the sections 342*a*, 342*b*. In one example, the bottom edge 343 is perpendicular to the centerline C/L.

FIG. 152B illustrates a light distribution for a light fixture with the fifth inner lens 340. FIG. 153B illustrates the light distribution for a light fixture with the sixth inner lens 340. A first plot 1 of the intensity curve over vertical angles on the plane perpendicular to the longitudinal axis A. The second plot 2 is the intensity curve on the v-angles on the plane along the longitudinal axis A. The fifth inner lens 340 includes an SC of 1.72 and an OE is 81%. The sixth inner lens 340 includes an SC of 1.70 and an OE of 80%.

FIG. 152C illustrates the LCS for the fifth inner lens 340 that includes the following: FL=12.3%; FM=25.9%; FH=10.8%; FVH=1.0%; BL=12.3%; BM=25.9%; BH=10.8%; BVH=1.0%; UL=0.0%; and UH=0.0%.

FIG. 153C illustrates the LCS for the sixth inner lens 340 that includes the following: FL=12.4%; FM=25.9%; FH=10.6%; FVH=1.0%; BL=12.4%; BM=25.9%; BH=10.6%; BVH=1.0%; UL=0.0%; and UH=0.0%.

FIGS. 154A and 154B illustrate the luminance uniformity from a front view of a light fixture 300 using the fifth inner lens 340 at a dimmed level. The front view is taken along the centerline C/L of the light fixture 300. In one example, the asymmetric lighting is a result of the environment in which the light fixture 300 is positioned and/or the housing 301 (e.g., polishing process of the housing 301). FIGS. 154C and 154D illustrate the luminance uniformity of a light fixture 300 with the fifth lens 340 at a dimmed level from a 45° angle relative to the centerline C/L.

FIGS. 155A and 155B illustrate the luminance uniformity from a front view of a light fixture 300 using the sixth inner lens 340 at a dimmed level. The front view is taken along the centerline C/L of the light fixture 300. In one example, the asymmetric lighting is a result of the environment in which the light fixture 300 is positioned and/or the housing 301 (e.g., polishing process of the housing 301). FIGS. 155C and 155D illustrate the luminance uniformity of a light fixture 300 with the sixth lens 340 at a dimmed level from a 45° angle relative to the centerline C/L.

FIGS. 156A and 156B illustrate the luminance uniformity from a front view of a light fixture 300 using the sixth inner lens 340 at a full level. The front view is taken along the centerline C/L of the light fixture 300. In one example, the asymmetric lighting is a result of the environment in which the light fixture 300 is positioned and/or the housing 301 (e.g., polishing process of the housing 301). FIGS. 156C and 156D illustrate the luminance uniformity of a light fixture 300 with the sixth lens 340 at a full level from a 45° angle relative to the centerline C/L.

The light fixture 300 can be utilized for a circadian system that may be affected by lighting characteristics. Spectra and output lumens can be tuned or dynamically controllable according to a metric for proper circadian requirements (referred to as Circadian Stimulus). Factors for the circadian lighting are lumen level, spectrum (color), exposure timing, exposure duration, and distribution.

The light fixture 300 generates a wider distribution than a typical troffer-style light due to the inner lens 340. The wider distribution is desirable for the circadian system over time and duration.

The lighting fixture 300 can adjust the lumen levels using program instructions stored in control circuitry, such as remote circuitry or circuitry located within the control box 390. Color temperature of the light can vary between about 2700K to 6500K. The color temperature can be continuously tunable and dynamically controllable for proper CCTs. In one example, the LED elements 333 are tunable in CCT, such as those currently available from Nichia Corporation. In another example, the different LED elements 333 are assembled in a manner to make color variations.

FIG. 157 illustrates examples of spectra of tunable LED elements 333 at two extreme CCTs, namely 2700K and 6500K. In one example, the spectrum is tuned continuously from 2700K to 6500K and operated dynamically depending on the condition of the circadian system. In another example, the spectrum is tuned between the two CCTs.

FIGS. 158A, 158B and 159A, 159B illustrate color rendering and distribution of a light fixture 300 at two extreme CCTs. In these examples, the light fixture 300 includes the fourth inner lens 340 (see FIGS. 145A and 145B).

FIGS. 158A and 158B illustrate the light fixture 300 with a CCT at 2700K and 3000 Lm. The circadian distribution is wide. FIG. 158A illustrates the first plot 1 at 90° and the second plot 2 at 0°. FIG. 158B illustrates the luminous flux distribution with the following characteristics: FL=12.3%; FM=25.7%; FH=11.0%; FVH=0.9%; BL=12.3%; BM=25.7%; BH=11.0%; BVH=0.9%; UL=0.0%; and UH=0.0%.

FIGS. 159A and 159B illustrate the light fixture 300 with a CCT at 6500K and 3000 Lm. The circadian distribution is wide. FIG. 159A illustrates the first plot 1 at 90° and the second plot 2 at 0°. FIG. 159B illustrates the luminous flux distribution with the following characteristics: FL=12.3%; FM=25.7%; FH=11.0%; FVH=0.9%; BL=12.3%; BM=25.7%; BH=11.0%; BVH=0.9%; UL=0.0%; and UH=0.0%.

As shown in FIG. 160A and listed in the table of FIG. 160B, the color space is defined by the following x, y coordinates on the 1931 CIE Chromaticity Diagram: (0.29, 0.32), (0.35, 0.38), (0.40, 0.42), (0.48, 0.44), (0.48, 0.39), (0.40, (0.32, 0.30), (0.29, 0.32). The light fixture 300 can be operated at one or more color points within the color space depending on the requirement of the circadian system over time. In one example, lumen levels and duration may be dynamically operated to get circadian conditions in lighting.

The color of visible light emitted by a light source, and/or the color of a mixture visible light emitted by a plurality of light sources can be represented on either the 1931 CIE (Commission International de l'Eclairage) Chromaticity Diagram or the 1976 CIE Chromaticity Diagram. Persons of skill in the art are familiar with these diagrams, and these diagrams are readily available.

The CIE Chromaticity Diagrams map out the human color perception in terms of two CIE parameters, namely, x (or ccx) and y (or ccy) (in the case of the 1931 diagram) or u' and v' (in the case of the 1976 diagram). Each color point on the respective diagrams corresponds to a particular hue. For a technical description of CIE chromaticity diagrams, see, for example, "Encyclopedia of Physical Science and Technology", vol. 7, 230-231 (Robert A Meyers ed., 1987). The spectral colors are distributed around the boundary of the outlined space, which includes all of the hues perceived by the human eye. The boundary represents maximum saturation for the spectral colors.

The 1931 CIE Chromaticity Diagram can be used to define colors as weighted sums of different hues. The 1976 CIE Chromaticity Diagram is similar to the 1931 Diagram, except that similar distances on the 1976 Diagram represent similar perceived differences in color.

The expression "hue", as used herein, means light that has a color shade and saturation that correspond to a specific point on a CIE Chromaticity Diagram, i.e., a color point that can be characterized with x, y coordinates on the 1931 CIE Chromaticity Diagram or with u', v' coordinates on the 1976 CIE Chromaticity Diagram.

In the 1931 CIE Chromaticity Diagram, deviation from a color point on the diagram can be expressed either in terms of the x, y coordinates or, alternatively, in order to give an indication as to the extent of the perceived difference in color, in terms of MacAdam ellipses (or plural-step MacAdam ellipses). For example, a locus of color points defined as being ten MacAdam ellipses (also known as "a ten-step MacAdam ellipse) from a specified hue defined by a particular set of coordinates on the 1931 CIE Chromaticity Diagram consists of hues that would each be perceived as differing from the specified hue to a common extent (and likewise for loci of points defined as being spaced from a particular hue by other quantities of MacAdam ellipses).

A typical human eye is able to differentiate between hues that are spaced from each other by more than seven MacAdam ellipses (and is not able to differentiate between hues that are spaced from each other by seven or fewer MacAdam ellipses).

Since similar distances on the 1976 Diagram represent similar perceived differences in color, deviation from a point on the 1976 Diagram can be expressed in terms of the coordinates, u' and v', e.g., distance from the point=(Δu'2+Δv'2)½. This formula gives a value, in the scale of the u' v' coordinates, corresponding to the distance between points. The hues defined by a locus of points that are each a common distance from a specified color point consist of hues that would each be perceived as differing from the specified hue to a common extent.

A series of points that is commonly represented on the CIE Diagrams is referred to as the blackbody locus. The chromaticity coordinates (i.e., color points) that lie along the blackbody locus correspond to spectral power distributions that obey Planck's equation: E(λ)=a/λ^(5)·(1/e^(B/(λ·T))−1), where E is the emission intensity, λ is the emission wavelength, T is the temperature of the blackbody and A and B are constants. The 1976 CIE Diagram includes temperature listings along the blackbody locus. These temperature listings show the color path of a blackbody radiator that is caused to increase to such temperatures. As a heated object becomes incandescent, it first glows reddish, then yellowish, then white, and finally bluish. This occurs because the wavelength associated with the peak radiation of the blackbody radiator becomes progressively shorter with increased temperature, consistent with the Wien Displacement Law. Illuminants that produce light that is on or near the blackbody locus can thus be described in terms of their color temperature.

In one example, the light fixture 300 is designed to be a direct view troffer style with a large luminous source, a shallow depth, and color changing capability. In one example, the light fixture 300 can also include optical control. The direct view troffer style with the LED elements 333 on the back of housing 301 and aimed directly at the inner lens 340 provides for a more economical design that uses the housing 301 as a heat sink and overall includes fewer parts. The large luminous source provides for an increase in optic source size which for constant Lumen output and optical distribution yields a reduction in luminous intensity or glare reduction. Color changing provides for CCT and circadian control.

In light fixture design, it has been determined that the shorter the optical path length and the larger the source size, the harder it is to color mix the LEDs as well as limiting lens luminance uniformity. The more diffusion provides for color mixing and improved uniformity, but with lower optical efficiency. As disclosed in the tested data above in the luminance images, polar candela plots, and zonal distribution, the light fixtures 300 provide for good uniformity, optical control, and glare control while working with the constraints of troffer style designs listed above.

FIG. 161A includes a light fixture 400 with an indirect troffer configuration. The light fixture 400 comprises a housing 301, LED assembly 302, and lens assembly 303 as disclosed above. The light fixture 400 further includes a reflector 410 positioned over the LED elements 333 to reflect the light. The light fixture 400 does not include an inner lens 340.

The light fixture 400 includes a longitudinal axis A and a centerline C/L. The light fixture 400 may be provided in many sizes, including standard troffer fixture sizes. However, it is understood that the elements of the light fixture 400 may have different dimensions and can be customized to fit most any desired fixture dimension.

The housing 301 and lens assembly 303 form an interior space 391 that houses the LED assembly 302 and the reflector 410. The LED assembly 302 includes various examples of LED elements 333 in an elongated manner that extends along the back pan 310. The LED assembly 302 is mounted to the connector 322 with the connector 322 also acting as a heatsink. The LED elements 333 face towards and illuminate the reflector 410. The light from the LED elements 333 is reflected from the reflector 410 to the fixture lens 320, 321 through which it is emitted into the environment. This arrangement is referred to as an "indirect troffer" design. The reflector 410 is configured with a hybrid configuration that provides for specular reflection in a central portion of the reflector 410 and diffuse reflection in the lateral portions of the reflector 410. This configuration provides for improved uniformity luminance. In one example, the LED assembly 302 is aligned with the longitudinal axis A of the light fixture 300.

The reflector 410 is positioned in the interior space 391 and faces towards the LED assembly 302 that is mounted on the connector 322. As illustrated in FIG. 161B, the reflector 410 includes opposing ends 411, 412 that define a length L and opposing sides 413, 414 that define the width W. The length L is sized to extend along the length of the back pan 310. In one example, the ends 411, 412 abut against the end caps 315 of the housing 301. In another example, one or both ends 411, 412 are spaced away from the respective end caps 315. The width W is sized for the sides 413, 414 to contact against the back pan 310. As illustrated in FIG. 161A, side 413 contacts against the first wing 312 and side 414 contacts against the second wing 313. The sides 413, 414 can be attached to the respective wings 312, 313, such as by one or more mechanical fasteners and adhesives.

The reflector 410 includes a peak 415 that extends the length L. The reflector 410 is aligned within the interior space 391 with the peak 415 positioned along the centerline C/L. The first lateral section 416 extends along the first side of the centerline C/L and the second lateral section 417 extends along the second side of the centerline C/L.

The reflector 410 includes a specular reflection section 420 along a central section and that extend the length L. The specular reflection section 420 includes sections 420*a*, 420*b* on opposing sides of the peak 415. The specular reflection sections 420*a*, 420*b* are positioned along the mid-portion of the reflector 410. The reflector 410 also includes a diffuse reflection section 421. The diffuse reflection section 421 includes diffuse sections 421*a*, 421*b* located along the outer lateral sections. Diffuse reflection section 421*a* extends between the specular reflection section 420*a* and the side 413, and diffuse reflection section 421*b* extends between the specular reflection section 420*b* and the side 414.

In one example, in the boundary zones between the specular reflection section 420 and the diffuse reflection sections 421 can provide for a transition. For example, the boundary zones can include partially specular reflection section, e.g., 50/50 or 30/70 (specular/diffuse) so the lighting can be smoothly varying and give improved uniformity in luminance.

The reflector 410 illuminates both light zones 393, 394 symmetrically and provides for uniform luminance in both zones 393, 394. The mid-portion of the reflector 410 defined by the specular section 420 divides the light into two directions. The outer sections of the reflector 410 defined by the diffuse reflection sections 421*a*, 421*b* provides for diffuse reflection. Light from the specular reflection section 420 and directly from the LED assembly 302 is reflected diffusely to provide for uniform luminance.

The reflector 410 includes a symmetrical shape about the peak 415 with each of the lateral sections 416, 417 having the same shape and size. Further, the specular reflection sections 420*a*, 420*b* include the same shape and size, and the diffuse reflection sections 421*a*, 421*b* include the same shape and size.

In one example, the reflector 410 has a folded configuration. The fold line is formed at the peak 415. Each of the sections that extend between the peak 415 and the respective lateral side 413, 414 includes the same shape and size.

FIGS. 162A, 162B, 162C, and 162D discloses an example of the light fixture 400 with a reflector 410 in which the entirety provides for diffuse reflection (i.e., the entire reflector 410 is a single diffuse reflection section 421). FIG. 162A illustrates the light fixture 400 view from the front along the centerline C/L (i.e., a 0° viewing angle). FIG. 162B illustrates the light fixture 400 at a 65° viewing angle). A light fixture with just a diffuse reflector 410 gives a hot luminance around the mid zone at the centerline C/L as the LED elements 333 give a strong intensity around the center zone 392.

FIG. 162C illustrates intensity distribution with a Spacing Criterion (SC) of how much light can be distributed widely to make uniform at a given mounting height (i.e., it is the ratio of luminaires spacing to mounting height). The SC along the y-axis is 1.10, along the x-axis if 1.22, and along the diagonal is 1.28. FIG. 162D includes the following luminous flux distribution: FL=15.4%; FM=25.7%; FH=8.2%; FVH=0.6%; BL=15.4%; BM=25.8%; BH=8.3%; BVH=0.6%; UL=0.0%; and UH=0.0%.

FIGS. 163A, 163B, 163C, and 163D disclose an example of the light fixture 400 with a reflector 410 in which the entirety provides for specular reflection (i.e., the entire reflector 410 is a single specular reflection section 420). FIG. 163A illustrates the light fixture 400 view from the front along the centerline C/L (i.e., a 0° viewing angle). FIG. 163B illustrates the light fixture 400 at a 65° viewing angle). This light fixture 400 with just a specular reflector 410 gives a dim luminance around the mid zone at the centerline C/L as light is reflected towards both lateral sides strongly by the steep angle of the reflector 410 in proximity to the peak 415.

FIG. 163C illustrates intensity distribution with a SC along the y-axis is 1.16, along the x-axis if 1.54, and along the diagonal is 1.46. FIG. 163D includes the following luminous flux distribution: FL=12.5%; FM=26.0%; FH=10.6%; FVH=0.7%; BL=12.6%; BM=26.1%; BH=10.8%; BVH=0.7%; UL=0.0%; and UH=0.0%.

FIGS. 164A, 164B, 164C, 164D disclose a light fixture 410 with a hybrid reflector 410 as illustrated in FIG. 161B with both specular and diffuse reflection sections 420, 421. The combination of specular and diffuse reflection sections 420, 421 gives balanced luminance and good uniformity. Near the boundary where the specular and diffuse reflection sections 420, 421 meet, both reflection sections 420, 421 include some hot spots with higher luminance values than adjacent areas. In one example to reduce and/or eliminate the hot spots, the two reflection sections 420, 421 are mixed, such as by lightly diffusing the specular reflection section 421.

FIG. 164A illustrates the light fixture 400 view from the front along the centerline C/L (i.e., a 0° viewing angle). FIG. 164B illustrates the light fixture 400 at a 65° viewing angle). FIG. 164C illustrates intensity distribution with a SC along the y-axis is 1.12, along the x-axis if 1.28, and along the diagonal is 1.32. FIG. 164D includes the following luminous flux distribution: FL=14.4%; FM=25.6%; FH=9.3%; FVH=0.6%; BL=14.4%; BM=25.7%; BH=9.4%; BVH=0.6%; UL=0.0%; and UH=0.0%.

In the various examples, the light fixtures 300, 400 can include one or more communication components forming a part of the light control circuitry, such as an RF antenna that senses RF energy. The communication components may be included, for example, to allow the light fixture 300 to communicate with other light fixtures 300 and/or with an external wireless controller. More generally, the control circuitry includes at least one of a network component, an RF component, a control component, and a sensor. The sensor, such as a knob-shaped sensor, may provide an indication of ambient lighting levels thereto and/or occupancy within the room or illuminated area. Such a sensor may be integrated into the light control circuitry. In various embodiments described herein various smart technologies may be incorporated in the lamps as described in the following United States patent applications "Solid State Lighting Switches and Fixtures Providing Selectively Linked Dimming and Color Control and Methods of Operating," application Ser. No. 13/295,609, filed Nov. 14, 2011, which is incorporated by reference herein in its entirety; "Master/Slave Arrangement for Lighting Fixture Modules," application Ser. No. 13/782,096, filed Mar. 1, 2013, which is incorporated by reference herein in its entirety; "Lighting Fixture for Automated Grouping," application Ser. No. 13/782,022, filed Mar. 1, 2013, which is incorporated by reference herein in its entirety; "Lighting Fixture for Distributed Control," application Ser. No. 13/782,040, filed Mar. 1, 2013, which is incorporated by reference herein in its entirety; "Efficient Routing Tables for Lighting Networks," application Ser. No. 13/782,053, filed Mar. 1, 2013, which is incorporated by reference herein in its entirety; "Handheld Device for Communicating with Lighting Fixtures," application Ser. No. 13/782,068, filed Mar. 1, 2013, which is incorporated by reference herein in its entirety; "Auto Commissioning Lighting Fixture," application Ser. No. 13/782,078, filed Mar. 1, 2013, which is incorporated by reference herein in its entirety; "Commissioning fora Lighting Network," application Ser. No. 13/782,131, filed Mar. 1, 2013, which is incorporated by reference herein in its entirety; "Ambient Light Monitoring in a Lighting Fixture," application Ser. No. 13/838,398, filed Mar. 15, 2013, which is incorporated by reference herein in its entirety; "System, Devices and Methods for Controlling One or More Lights," application Ser. No. 14/052,336, filed Oct. 11, 2013, which is incorporated by reference herein in its entirety; and "Enhanced Network Lighting," Application No. 61/932,058, filed Jan. 27, 2014, which is incorporated by reference herein in its entirety. Additionally, any of the light fixtures described herein can include the smart lighting control technologies disclosed in U.S. Provisional Application Ser. No. 62/292,528, titled "Distributed Lighting Network", filed on Feb. 8, 2016 and assigned to the same assignee as the present application, the entirety of this application being incorporated by reference herein.

In various examples described herein various Circadian-rhythm related technologies may be incorporated in the light fixtures as described in the following: U.S. Pat. Nos. 8,310,143, 10,278,250, 10,412,809, 10,465,869, 10,451,229, 9,900,957, and 10,502,374, each of which is incorporated by reference herein in its entirety.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein. Although steps of various processes or methods described herein may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention.

II. Additional Optical Light Guides for Lighting Fixtures/Luminaires

Each disclosed luminaire provides an aesthetically pleasing, sturdy, cost effective luminaire for use in general lighting. The lighting is accomplished with reduced glare as compared to conventional lighting systems.

The extraction features disclosed herein efficiently extract light out of the waveguide. At least some of the luminaires disclosed herein (perhaps with modifications as necessary or desirable) are particularly adapted for use in installations, such as, replacement or retrofit lamps, indoor products, (e.g., downlights, troffers, a lay-in or drop-in application, a surface mount application onto a wall or ceiling, etc.), and outdoor products. Further, the luminaires disclosed herein preferably develop light at a color temperature of between about 2500 degrees Kelvin and about 6200 degrees Kelvin, and more preferably between about 2500 degrees Kelvin and about 5000 degrees Kelvin, and most preferably between about 3000 degrees Kelvin and about 5000 degrees Kelvin. Also, at least some of the luminaires disclosed herein preferably exhibit an efficacy of at least about 60 lumens per watt, and more preferably at least about lumens per watt. Further, at least some of the optical coupling members and waveguides disclosed herein preferably exhibit an overall efficiency (i.e., light extracted out of the waveguide divided by light injected into the waveguide) of at least about 90 percent. A color rendition index (CRI) of at least about 70 is preferably attained by at least some of the luminaires disclosed herein, with a CRI of at least about 580 being more preferable. Any desired particular output light distribution could be developed.

When one uses a relatively small light source which emits into a broad (e.g., Lambertian) angular distribution (common for LED-based light sources), the conservation of etendue, as generally understood in the art, requires an optical system having a large emission area to achieve a narrow (collimated) angular light distribution. In the case of parabolic reflectors, a large optic is thus generally required to achieve high levels of collimation. In order to achieve a large emission area in a more compact design, the prior art has relied on the use of Fresnel lenses, which utilize refractive optical surfaces to direct and collimate the light. Fresnel lenses, however, are generally planar in nature, and are therefore not well suited to re-directing high-angle light emitted by the source, leading to a loss in optical efficiency. In contrast, in the present embodiments, light is coupled into the optical stages, where primarily TIR is used for re-direction and collimation. This coupling allows the full range of angular emission from the source, including high-angle light, to be re-directed and collimated, resulting in higher optical efficiency in a more compact form factor.

Embodiments disclosed herein are capable of complying with improved operational standards as compared to the prior art as follows:

| | State of the art standards | Improved Standards Achievable by Present Embodiments |
|---|---|---|
| Input coupling efficiency (coupling + waveguide) | 90% | About 95% plus improvements through color mixing, source mixing, and control within the waveguide |
| Output efficiency (extraction) | 90% | About 95%: improved through extraction efficiency plus controlled distribution of light from the waveguide |
| Total system | ~70% | About 80%: great control, many choices of output distribution |

In at least some of the present embodiments the distribution and direction of light within the waveguide is better known, and hence, light is controlled and extracted in a more controlled fashion. In standard optical waveguides, light bounces back and forth through the waveguide. In the present embodiments, light is extracted as much as possible over one pass through each of the waveguide stages to minimize losses.

In some embodiments, one may wish to control the light rays such that at least some of the rays are collimated, but in the same or other embodiments, one may also wish to control other or all of the light rays to increase the angular dispersion thereof so that such light is not collimated. In some embodiments, one might wish to collimate to narrow ranges, while in other cases, one might wish to undertake the opposite.

As in the present embodiments, a waveguide may include various combinations of optical features, such as coupling and/or extraction features, to produce a desired light distribution. A lighting system may be designed without constraint due to color mixing requirements, the need for uniformity of color and brightness, and other limits that might otherwise result from the use of a specific light source. Further, the light transport aspect of a waveguide allows for the use of various form factors, sizes, materials, and other design choices. The design options for a lighting system utilizing a waveguide as described herein are not limited to any specific application and/or a specific light source.

The embodiments disclosed herein break light up into different portions that are controlled by separate stages that are axially stacked or offset, with or without an air gap therebetween, to develop a desired illumination distribution. While the embodiments disclosed herein do not utilize a light diverter in a coupling cavity to spread such light into the waveguide, and hence, the illumination distribution is limited by the size of the light source, one could use a light diverter to obtain a different illumination distribution, if desired.

In general, the curvature and/or other shape of a waveguide body and/or the shape, size, and/or spacing of extraction features determine the particular light extraction distribution. All of these options affect the visual uniformity from one end of the waveguide to another. For example, a waveguide body having smooth surfaces may emit light at curved portions thereof. The sharper the curve is, the more light is extracted. The extraction of light along a curve also depends on the thickness of the waveguide body. Light can travel through tight curves of a thin waveguide body without reaching the critical angle, whereas light that travels through a thick waveguide body is more likely to strike the surface at an angle greater than the critical angle and escape.

Tapering a waveguide body causes light to reflect internally along the length of the waveguide body while increasing the angle of incidence. Eventually, this light strikes one side at an angle that is acute enough to escape. The opposite example, i.e., a gradually thickening waveguide body over the length thereof, causes light to collimate along the length with fewer and fewer interactions with the waveguide body walls. These reactions can be used to extract and control light within the waveguide. When combined with dedicated extraction features, tapering allows one to change the incident angular distribution across an array of features. This, in turn, controls how much, and in what direction light is extracted. Thus, a select combination of curves, tapered surfaces, and extraction features can achieve a desired illumination and appearance.

Still further, the waveguide bodies contemplated herein are made of any suitable optically transmissive material, such as an acrylic material, a silicone, a polycarbonate, a glass material, or other suitable material(s) to achieve a desired effect and/or appearance.

As shown in FIGS. 165A-166B, a first embodiment of a waveguide 550 comprises a coupling optic 552 attached to a main waveguide body 554. At least one light source 556, such as one or more LEDs, is disposed adjacent to the coupling optic 552. The light source 556 may be a white LED or may comprise multiple LEDs including a phosphor-coated LED either alone or in combination with a color LED, such as a green LED, etc. In those cases where a soft white illumination is to be produced, the light source 556 typically includes a blue shifted yellow LED and a red LED. Different color temperatures and appearances could be produced using other LED combinations, as is known in the art. In one embodiment, the light source 556 comprises any LED, for example, an MT-G LED incorporating TrueWhite® LED technology as developed and manufactured by Cree, Inc., the assignee of the present application.

The waveguide body 554 has a curved, tapered shape formed by a first surface 558 and a second surface 560. Light emitted from the light source 556 exits an output surface 562 of the coupling optic 552 and enters an input surface 564 at a first end 566 of the waveguide body 554. Light is emitted through the first surface 558 and reflected internally along the second surface 560 throughout the length of the waveguide body 554. The waveguide body 554 is designed to emit all or substantially all of the light from the first surface 558 as the light travels through the waveguide body 554. Any remaining light may exit the waveguide 554 at an end surface 570 located at a second end 568 opposite the first end 566. Alternatively, the end surface 570 may be coated with a reflective material, such as a white or silvered material to reflect any remaining light back into the waveguide body 554, if desired.

The curvature of the first surface 558 of the waveguide body 554 allows light to escape, whereas the curvature of the second surface 560 of the waveguide body 554 prevents the escape of light through total internal reflection. Specifically, total internal reflection refers to the internal reflection of light within the waveguide body that occurs when the angle of incidence of the light ray at the surface is less than a threshold referred to as the critical angle. The critical angle depends on the indices of refraction (N) of the material of which the waveguide body is composed and of the material adjacent to the waveguide body. For example, if the waveguide body is an acrylic material having an index of refraction of approximately 1.5 and is surrounded by air, the critical angle, ⊖c, is as follows:

$$\ominus c=\arcsin(Nacrylic/Nair)=\arcsin(1.5/1)=41.8°$$

In the first embodiment, light is emitted through the first surface 558 of the waveguide body 554 in part due to the curvature thereof.

As shown in FIGS. 165A and 1658, the taper of the waveguide body 554 is linear between the input surface 564 and the end surface 570. According to one embodiment, a first thickness at the input surface 564 is 6 mm and a second thickness of the end surface is 2 mm. The radius of curvature of the first surface 558 is approximately 200 mm and the radius of the curvature of the second surface 560 is approximately 200 mm.

Further, the number, geometry, and spatial array of optional extraction features across a waveguide body affects the uniformity and distribution of emitted light. As shown in the first embodiment of the waveguide body 554 in FIGS. 166A, 166B and 167A-167C, an array of discrete extraction features 572 having a variable extraction feature size is utilized to obtain a uniform or nearly uniform distribution of light. Specifically, the extraction features 572 are arranged in rows and columns wherein the features in each row extend left to right and the features in each column extend top to bottom as seen in FIGS. 166A and 166B. The extraction features 572 closest to the light source may be generally smaller and/or more widely spaced apart so that in the length dimension of the waveguide body 554 the majority of light travels past such features to be extracted at subsequent parts of the waveguide body 554. This results in a gradual extraction of light over the length of the waveguide body 554. The center to center spacing of extraction features 572 in each row are preferably constant, although such spacing may be variable, if desired. The extraction features 572 contemplated herein may be formed by injection molding, embossing, laser cutting, calendar rolling, or the extraction features may added to the waveguide body 554 by a film.

Referring to FIGS. 166A and 166B, extraction features 572 on the first surface 558 of the waveguide body 554 permit the light rays to exit the waveguide body 554 because the angles of incidence of light rays at the surface of the extraction features 572 are greater than the critical angle. The change in size (and, optionally, spacing) of the extraction features 572 over the length of the waveguide body 554 results in a uniform or nearly uniform distribution of light emitted from the waveguide body 554 over the length and width thereof. Preferably, as seen in FIGS. 167A and 167B, the extraction features 572 nearest the light source 556 are approximately 0.5 mm in width by 0.5 mm in length and mm in depth. Also preferably, the extraction features at such location have a center to center spacing of about 2 mm. Still further, as seen in FIGS. 167A and 167C, the extraction features 572 farthest from the light source 556 are preferably approximately 1.4 mm (width) by 1.4 mm (length) by 1.4 mm (depth). In addition, the extraction features 572 at such location are also spaced apart about 2 mm (measured center-to-center). While the extraction features 572 are illustrated as having a constant spacing along the waveguide body 554, the features may instead have variable spacing as noted above. Thus, for example, the spacing between the features may decrease with distance from the light source 556. The increased size (and, possibly, density) of extraction features 572 as seen in FIG. 167C allows for the same amount of light to be emitted as the smaller extraction features 572 seen in FIG. 167B. While a uniform distribution of light is desired in the first embodiment, other distributions of light may be contemplated and obtained using different arrays of extraction features.

Referring next to FIGS. 168A-169C, a further embodiment of a waveguide body 574 is illustrated. The waveguide body 574 is identical to the waveguide body 554, with the exception that the sizes and densities of extraction features 576 are constant along an outer surface 577. The waveguide body 574 further includes an input surface 578, an end surface 579 opposite the input surface 578, and an inner surface 580 and is adapted to be used in conjunction with any coupling optic and one or more light sources, such as the coupling optics disclosed herein and the LED 556 of the previous embodiment. The dimensions and shape of the waveguide body 574 are identical to those of the previous embodiment.

Figure 174A:
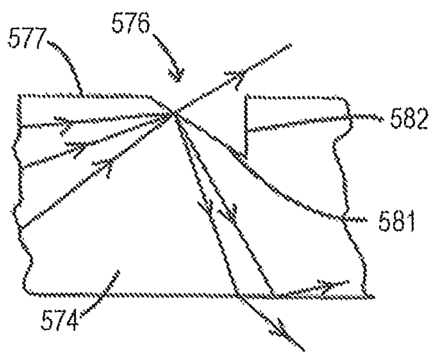

As seen in FIGS. 169A-169C, each extraction feature 576 comprises a V-shaped notch formed by flat surfaces 581, 582. End surfaces 583, 584 are disposed at opposing ends of the surfaces 581, 582. The end surfaces 583, 584 are preferably, although not necessarily, substantially normal to the surface 577. In one embodiment, as seen in FIG. 169A, the surface 581 is disposed at an angle a1 with respect to the surface 577 whereas the surface 582 is disposed at an angle a2 with respect to the surface 577. While the angles a1 and a2 are shown as being equal or substantially equal to one another in FIGS. 169A-169C, the objective in a preferred embodiment is to extract all or substantially all light during a single pass through the waveguide body from the input surface 578 to the end surface 579. Therefore, light strikes only the surfaces 581, and little to no light strikes the surfaces 582. In such an embodiment the surfaces 581, 582 are be disposed at different angles with respect to the surface 577, such that a1 is about equal to 140 degrees and a2 is about equal to 95 degrees, as seen in FIG. 174A.

The extraction features 576 shown in FIGS. 169A-169C may be used as the extraction features 572 of the first embodiment, it being understood that the size and spacing of the extraction features may vary over the surface 558, as noted previously. The same or different extraction features could be used in any of the embodiments disclosed herein as noted in greater detail hereinafter, either alone or in combination.

Referring to FIGS. 170A-171B, a third embodiment of a waveguide body 590 utilizes extraction features 592 in the form of a plurality of discrete steps 594 on a surface 598 of the waveguide body 590. The waveguide body 590 has an input surface 591 and an end surface 593. The steps 594 extend from side to side of the waveguide body 590 whereby the input surface 591 has a thickness greater than the thickness of the end surface 593. Any coupling optic, such as any of the coupling optics disclosed herein, may be used with the waveguide body 590. Light either refracts or internally reflects via total internal reflection at each of the steps 594. The waveguide body 590 may be flat (i.e., substantially planar) or curved in any shape, smooth or textured, and/or have a secondary optically refractive or reflective coating applied thereon. Each step 594 may also be angled, for example, as shown by the tapered surfaces 596 in FIG. 171A, although the surfaces 596 can be normal to adjacent surfaces 598, if desired.

FIG. 171B illustrates an embodiment wherein extraction features 592 include surfaces 596 that form an acute angle with respect to adjacent surfaces 598, contrary to the embodiment of FIG. 171A. In this embodiment, the light rays traveling from left to right as seen in FIG. 171B are extracted out of the surface including the surfaces 596, 598 as seen in FIG. 171A, as opposed to the lower surface 599 (seen in FIGS. 170C and 171B).

Yet another modification of the embodiment of FIGS. 170A-171B is seen in FIGS. 172A-172C wherein the tapered waveguide body 590 includes extraction features 592 having surfaces 596 separated from one another by intermediate step surfaces 595. The waveguide body 590 tapers from a first thickness at the input surface 591 to a second, lesser thickness at the end surface 593. Light is directed out of the lower surface 599.

Further, the steps 594 may be used in conjunction with extraction features 576 that are disposed in the surfaces 598 or even in each step 594. This combination allows for an array of equally spaced extraction features 572 to effect a uniform distribution of light. The changes in thickness allows for a distribution of emitted light without affecting the surface appearance of the waveguide.

Extraction features may also be used to internally reflect and prevent the uncontrolled escape of light. For example, as seen in FIG. 174A, a portion of light that contacts a surface 581 of a typical extraction feature 576 escapes uncontrolled. FIG. 173A illustrates a waveguide body 608 having a slotted extraction feature 610 that redirects at least a portion of light that would normally escape back into the waveguide body 608. The slotted extraction feature 610 comprises a parallel-sided slot having a first side surface 611 and a second side surface 612. A portion of the light strikes the slotted extraction feature 610 at a sufficiently high angle of incidence that the light escapes through the first side surface 611. However, most of the escaped light reenters the waveguide body 608 through the second side surface 612. The light thereafter reflects off the outer surface of the waveguide body 608 and remains inside the body 608. The surface finish and geometry of the slotted extraction feature 610 affect the amount of light that is redirected back into the waveguide body 608. If desired, a slotted extraction feature 610 may be provided in upper and lower surfaces of the waveguide body 608. Also, while a flat slot is illustrated in FIG. 173A, curved or segmented slots are also possible. For example, FIG. 173 illustrates a curved and segmented slot comprising slot portions 614*a*, 614*b*. Parallel slotted extraction features may be formed within the waveguide as well as at the surface thereof, for example, as seen at 613 in FIG. 173A. Any of the extraction features disclosed herein may be used in or on any of the waveguide bodies disclosed herein. The extraction features may be equally or unequally sized, shaped, and/or spaced in and/or on the waveguide body.

Figure 174B:
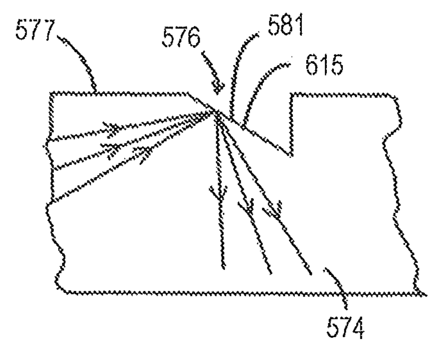
Figure 174C:
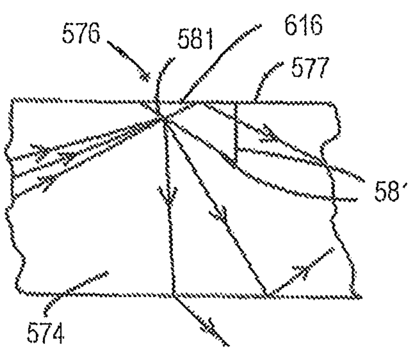

In addition to the extraction features 572, 576, 594, 610, 613, and/or 614, light may be controlled through the use of discrete specular reflection. An extraction feature intended to reflect light via total internal reflection is limited in that any light that strikes the surface at an angle greater than the critical angle will escape uncontrolled rather than be reflected internally. Specular reflection is not so limited, although specular reflection can lead to losses due to absorption. The interaction of light rays and extraction features 602 with and without a specular reflective surface is shown in FIGS. 174A-174C. FIG. 174A shows the typical extraction feature 576 with no reflective surface. FIG. 1748 shows a typical extraction feature 576 with a discrete reflective surface 615 formed directly thereon. The discrete reflective surface 615 formed on each extraction feature 576 directs any light that would normally escape through the extraction feature 576 back into the waveguide body 574. FIG. 174C shows an extraction feature 576 with a discrete reflective surface 616 having an air gap 617 therebetween. In this embodiment, light either reflects off the surface 581 back into the waveguide body 574 or refracts out of the surface 581. The light that does refract is redirected back into the waveguide body 574 by the reflective surface 616 after traveling through the air gap 617. The use of non-continuous reflective surfaces localized at points of extraction reduces the cost of the reflective material, and therefore, the overall cost of the waveguide. Specular reflective surfaces can be manufactured by deposition, bonding, co-extrusion with extraction features, insert molding, vacuum metallization, or the like.

Referring to FIGS. 175A-175C, a further embodiment of a waveguide body 620 includes a curved, tapered shape formed by a first surface 622 and a second surface 624. Similar to the first embodiment of the waveguide 554, light enters an input surface 626 at a first end 628 of the waveguide 620. Light is emitted through the first surface 622 and reflected internally along the second surface 624 throughout the length of the waveguide body 620. The waveguide body 620 is designed to emit all or substantially all of the light from the first surface 622 as the light travels through the waveguide body 620. Thus, little or no light is emitted out an end face 632 opposite the first end 628.

FIG. 175C shows a side elevational view of the waveguide 620 body. The distance 634 between the first and second surfaces 622, 624 is constant along the width. The first and second surfaces 622, 624 have a varied contour that comprises linear portions 636 and curved portions 638. The waveguide body 620 has a plurality of extraction features 640 that are equally or unequally spaced on the surface 622 and/or which are of the same or different size(s) and/or shape(s), as desired. As noted in greater detail hereinafter, the embodiment of FIGS. 175A-175C has multiple inflection regions that extend transverse to the general path of light through the input surface 626. Further, as in all the embodiments disclosed herein, that waveguide body is made of an acrylic material, a silicone, a polycarbonate, a glass material, or the like.

FIGS. 176A and 176B illustrate yet another embodiment wherein a series of parallel, equally-sized linear extraction features 698 are disposed in a surface 699 at varying distances between an input surface 700 of a waveguide body 702. Each of the extraction features 698 may be V-shaped and elongate such that extraction features 698 extend from side to side of the waveguide body 702. The spacing between the extraction features 698 decreases with distance from the input surface 700 such that the extraction features are closest together adjacent an end surface 704. The light is extracted out of a surface 706 opposite the surface 699.

FIG. 177 illustrates an embodiment identical to FIGS. 176A and 176B, with the exception that the waveguide features 698 are equally spaced and become larger with distance from the input face 700. If desired, the extraction features 698 may be unequally spaced between the input and end surfaces 700, 704, if desired. As in the embodiment of FIGS. 176A and 176B, light is extracted out of the surface 706.

FIGS. 178A-178D illustrate yet another embodiment of a waveguide body 740 having an input surface 742, an end surface 744, and a J-shaped body 746 disposed between the surfaces 742, 744. The waveguide body 740 may be of constant thickness as seen in FIGS. 178A-178D, or may have a tapering thickness such that the input surface 742 is thicker than the end surface 744. Further, the embodiment of FIGS. 178A-178D is preferably of constant thickness across the width of the body 740, although the thickness could vary along the width, if desired. One or more extraction features may be provided on an outer surface 748 and or an inner surface 750, if desired, although it should be noted that light injected into the waveguide body 740 escapes the body 740 through the surface 748 due to the curvature thereof.

FIGS. 179A-179C illustrate a still further embodiment of a waveguide 760 including an input surface 762. The waveguide body 760 further includes first and second parallel surfaces 764, 766 and beveled surfaces 768, 770 that meet at a line 772. Light entering the input surface 762 escapes through the surfaces 768, 770.

Figure 180:
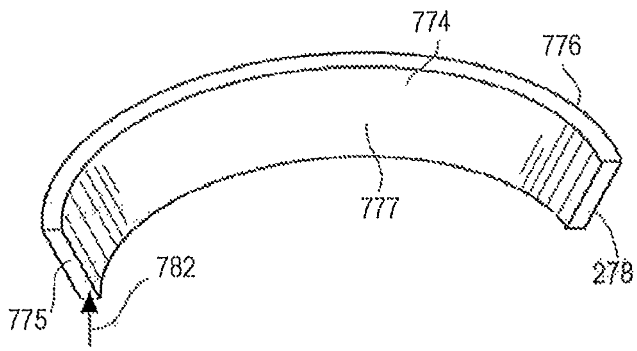
Figure 181:
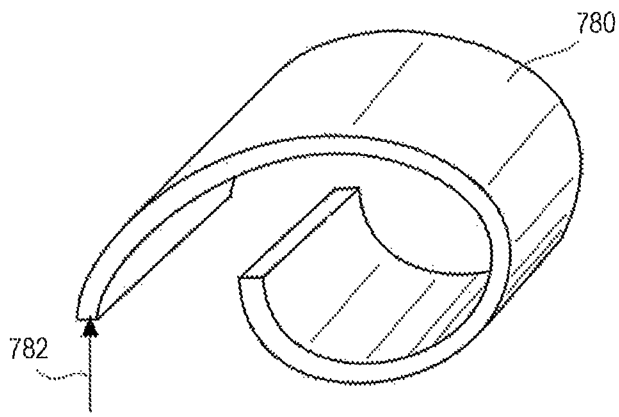

A further embodiment comprises the curved waveguide body 774 of FIG. 180. Light entering an input surface 775 travels through the waveguide body 774 and is directed out an outer surface 776 that is opposite an inner surface 777. As in any of the embodiments disclosed herein, the surfaces 776, 777 may be completely smooth, and/or may include one or more extraction features as disclosed herein. Further, the waveguide body may have a constant thickness (i.e., the dimension between the faces 776, 777) throughout, or may have a tapered thickness between the input surface 775 and an end surface 778, as desired. As should be evident from an inspection of FIG. 180, the waveguide body 774 is not only curved in one plane, but also is tapered inwardly from top to bottom (i.e., transverse to the plane of the curve of the body 774) as seen in the Figure.

Figure 182:
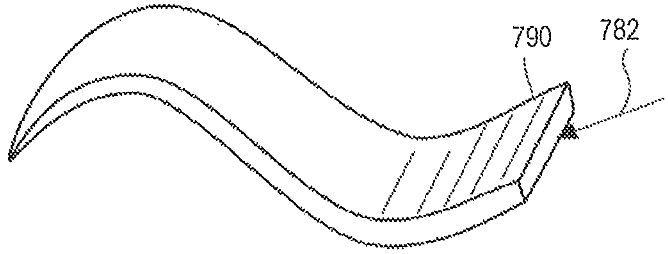
Figure 183:
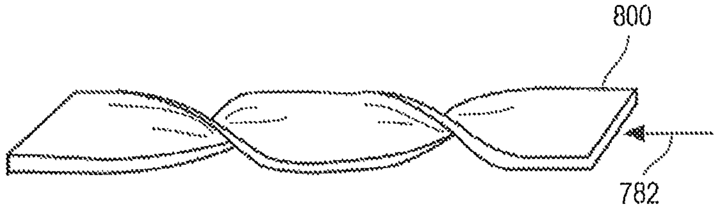
Figure 184:
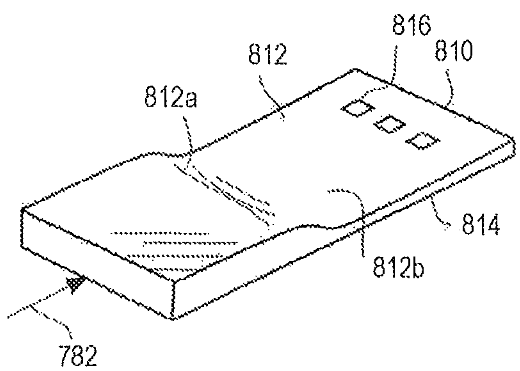

In the case of an arc of constant radius, a large portion of light is extracted at the beginning of the arc, while the remaining light skips along the outside surface. If the bend becomes sharper with distance along the waveguide body, a portion of light is extracted as light skips along the outside surface. By constantly spiraling the arc inwards, light can be extracted out of the outer face of the arc evenly along the curve. Such an embodiment is shown by the spiral-shaped waveguide body 780 of FIG. 181 (an arrow 782 illustrates the general direction of light entering the waveguide body 780 and the embodiments shown in the other Figures). These same principles apply to S-bends and arcs that curve in two directions, like a corkscrew. For example, an S-shaped waveguide body 790 is shown in FIG. 182 and a corkscrew-shaped waveguide body 800 is shown in FIG. 183. Either or both of the waveguide bodies is of constant cross sectional thickness from an input surface to an end surface or is tapered between such surfaces. The surfaces may be smooth and/or may include extraction features as disclosed herein. The benefit of these shapes is that they produce new geometry to work with, new ways to create a light distribution, and new ways to affect the interaction between the waveguide shape and any extraction features.

Figure 185:
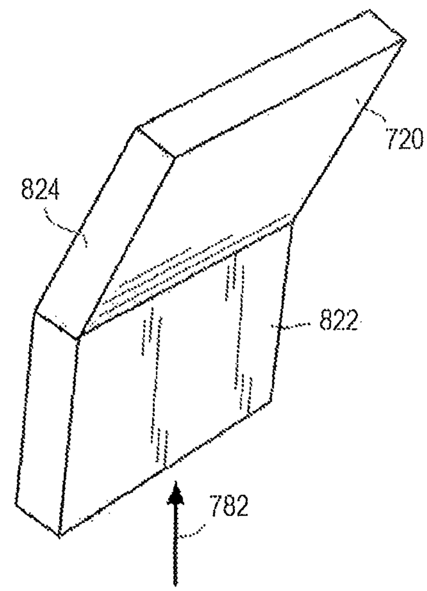
Figure 186:
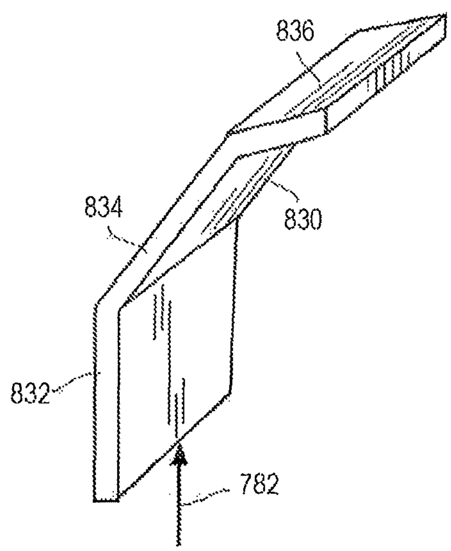
Figure 187:
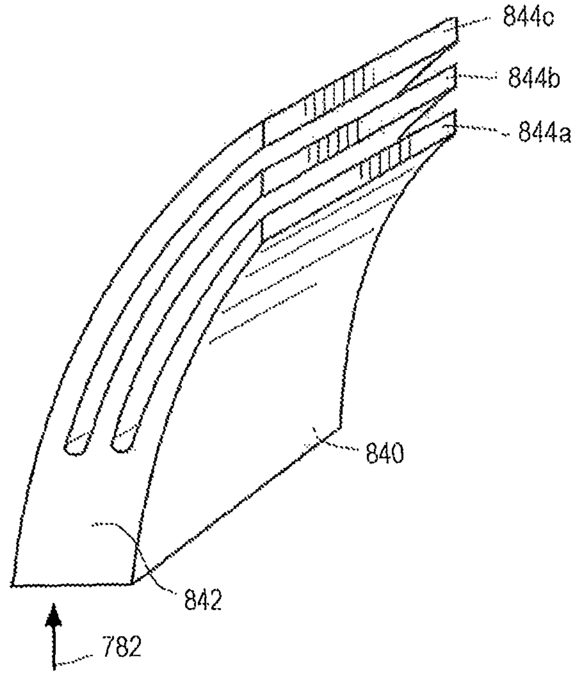

FIGS. 184-194B illustrate further embodiments of waveguide bodies 810, 820, 830, 840, 850, 860, 870, 880, 890, 900, and 910, respectively, wherein curvature, changes in profile and/or cross sectional shape and thickness are altered to create a number of effects. The waveguide body 810 is preferably, although not necessarily, rectangular in cross sectional shape and has a curved surface 812 opposite a flat surface 814. The curved surface 812 has multiple inflection regions defining a convex surface 812*a* and a convex surface 812*b*. Both of the surfaces 812, 814 may be smooth and/or may have extraction features 816 disposed therein (as may all of the surfaces of the embodiments disclosed herein.) Referring to FIGS. 185 and 186, the waveguide bodies 820, 830 preferably, although not necessarily, have a rectangular cross sectional shape, and may include two sections 822, 824 (FIG. 185) or three or more sections 832, 834, 836 (FIG. 186) that are disposed at angles with respect to one another. FIG. 187 illustrates the waveguide body 840 having a base portion 842 and three curved sections 844*a*-844*c* extending away from the base portion 842. The cross sections of the base portion 842 and the curved portions 844 are preferably, although not necessarily, rectangular in shape.

Figure 189:
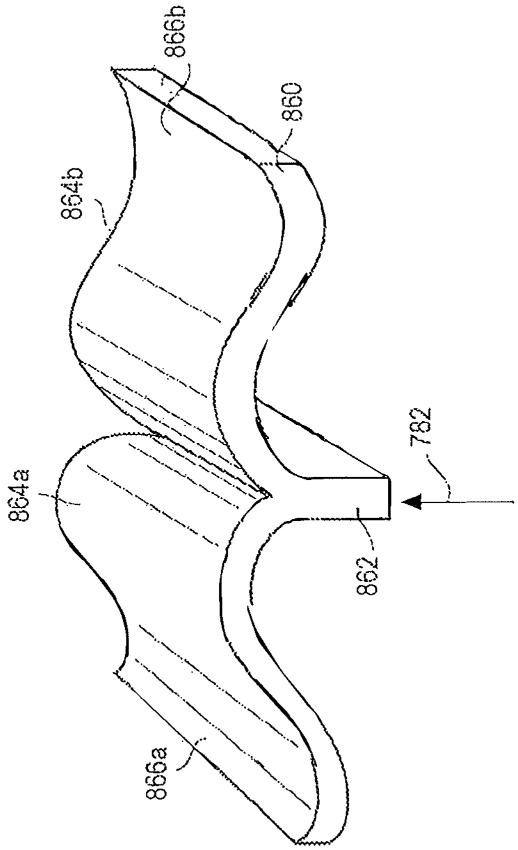
Figure 188:
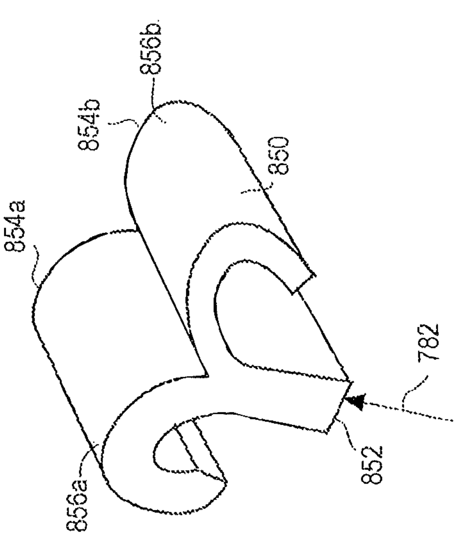

FIGS. 188 and 189 illustrate waveguide bodies 850 and 860 that include base portions 852, 862, respectively. The waveguide body 850 of FIG. 188 includes diverging sections 854*a*, 854*b* having outer surfaces 856*a*, 856*b* extending away from the base portion 852 that curve outwardly in convex fashion. The waveguide body 860 of FIG. 189 includes diverging sections 864*a*, 864*b* having outer surfaces 866*a*, 866*b* that curve outwardly in convex and concave fashion.

Figure 192:
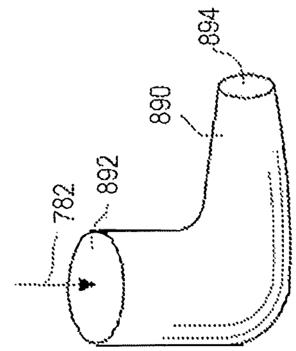
Figure 191:
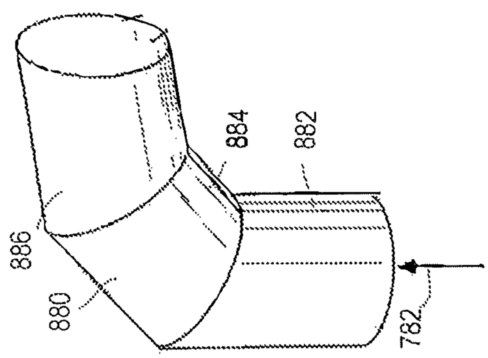
Figure 190:
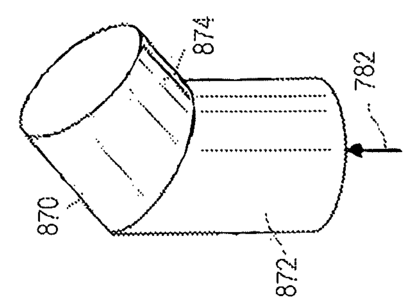

The waveguide bodies 870, 880, and 890 of FIGS. 190-192 all have circular or elliptical cross sectional shapes. The waveguide bodies 870, 880 have two sections 872, 874 (FIG. 190) or three or more sections 882, 884, 886 (FIG. 191). The waveguide body 890 of FIG. 192 preferably, although not necessarily, has a circular or elliptical cross sectional shape and, like any of the waveguide bodies disclosed herein (or any section or portion of any of the waveguide bodies disclosed herein) tapers from an input surface 892 to an output surface 894.

The waveguide body 900 of FIGS. 193A and 193B is substantially mushroom-shaped in cross section comprising a base section 902 that may be circular in cross section and a circular cap section 904. Extraction features 906 may be provided in the cap section 904. Light may be emitted from a cap surface 908.

Figure 195:
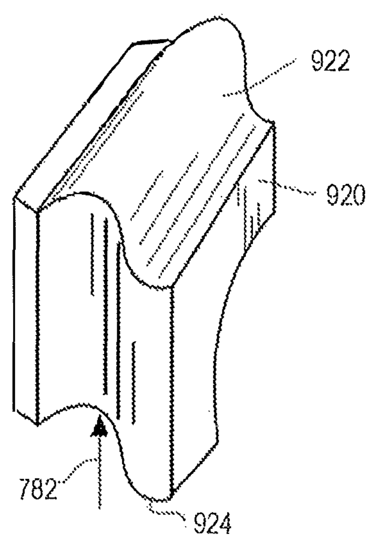

FIGS. 194A and 195 illustrate that the cross sectional shape may be further varied, as desired. Thus, for example, the cross sectional shape may be triangular as illustrated by the waveguide body 910 or any other shape. If desired, any of the waveguide bodies may be hollow, as illustrated by the waveguide body 912 seen in FIG. 194B, which is identical to the waveguide body 910 of FIG. 194A except that a triangular recess 914 extends fully therethrough. FIG. 195 illustrates substantially sinusoidal outer surfaces 922, 924 defining a complex cross sectional shape.

FIG. 196A illustrates a waveguide body 940 that is preferably, although not necessarily, planar and of constant thickness throughout. Light is directed into opposing input surfaces 942*a*, 942*b* and transversely through the body 940 by first and second light sources 556*a*, 556*b*, each comprising, for example, one or more LEDs, and coupling optics 552*a*, 552*b*, respectively, which together form a waveguide. Extraction features 944, which may be similar or identical to the extraction features 576 or any of the other extraction features disclosed herein, are disposed in a surface 946. As seen in FIG. 1968 light developed by the light sources 556*a*, 556*b* is directed out a surface 948 opposite the surface 946. As seen in FIG. 196A, the density and/or sizes of the extraction features 944 are relatively low at areas near the input surfaces 942*a*, 942*b* and the density and/or sizes are relatively great at an intermediate area 950. Alternatively, or in addition, the shapes of the extraction features may vary over the surface 946. A desired light distribution, such as a uniform light distribution, is thus obtained.

As in other embodiments, extraction features may be disposed at other locations, such as in the surface 948, as desired.

FIG. 197 illustrates a waveguide body 960 that is curved in two dimensions. Specifically, the body 960 is curved not only along the length between an input surface 962 and an end surface 964, but also along the width between side surfaces 966, 968. Preferably, although not necessarily, the waveguide body is also tapered between the input surface 962 and the end surface 964, and is illustrated as having smooth surfaces, although one or more extraction features may be provided on either or both of opposed surfaces 970, 972.

FIGS. 198A-198C illustrate a waveguide body 990 that is also curved in multiple dimensions. An input surface 992 is disposed at a first end and light is transmitted into first and second (or more) sections 993, 994. Each section 993, 994 is tapered and is curved along the length and width thereof. Light is directed out of the waveguide body 990 downwardly as seen in FIG. 198A.

FIG. 199A illustrates various alternative extraction feature shapes. Specifically, extraction features 1050, 1052 comprise convex and concave rounded features, respectively. Extraction features 1054, 1056 comprise outwardly extending and inwardly extending triangular shapes, respectively (the extraction feature 1056 is similar or identical to the extraction feature 576 described above). Extraction features 1058, 1060 comprise outwardly extending and inwardly extending inverted triangular shapes, respectively. FIG. 199B shows a waveguide body 1070 including any or all of the extraction features 1050-1060. The sizes and/or density of the features may be constant or variable, as desired.

Alternatively or in addition, the extraction features may have any of the shapes of co-owned U.S. Pat. No. 10,436,969, entitled "Optical Waveguide and Luminaire Incorporating Same", the disclosure of which is expressly incorporated by reference herein.

Figure 174D:
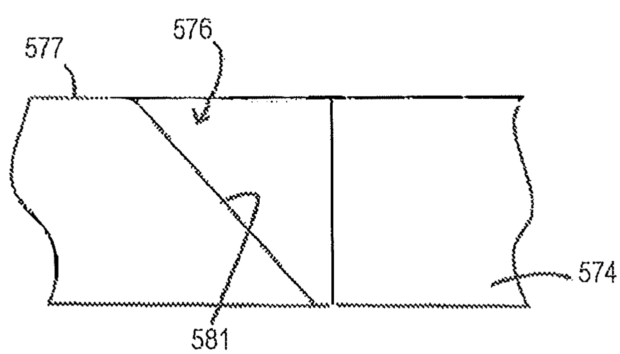

If desired, one or more extraction features may extend fully through any of the waveguide bodies described herein, for example, as seen in FIG. 174D. Specifically, the extraction feature 576 may have a limited lateral extent (so that the physical integrity of the waveguide body is not impaired) and further may extend fully through the waveguide body 574. Such an extraction feature may be particularly useful at or near an end surface of any of the waveguide bodies disclosed herein.

Referring next to FIGS. 200A and 200B, a further embodiment comprises a waveguide body 1080 and a plurality of light sources that may comprise LEDs 1082*a*-1082*d*. While four LEDs are shown, any number of LEDs may be used instead. The LEDs 1082 direct light radially into the waveguide body 1080. In the illustrated embodiment, the waveguide body 1080 is circular, but the body 1080 could be any other shape, for example as described herein, such as square, rectangular, curved, etc. As seen in FIG. 200B, and as in previous embodiments, the waveguide body 1080 includes one or more extraction features 1083 arranged in concentric and coaxial sections 1083*a*-1083*d* about the LEDs to assist in light extraction. The extraction features are similar or identical to the extraction features of co-owned U.S. Pat. No. 10,436,969, entitled "Optical Waveguide and Luminaire Incorporating Same", incorporated by reference herein. Light extraction can occur out of one or both of opposed surfaces 1084, 1086. Still further, the surface 1086 could be tapered and the surface 1084 could be flat, or both surfaces 1084, 1086 may be tapered or have another shape, as desired.

FIGS. 201A and 201B illustrate yet another waveguide body 1090 and a plurality of light sources that may comprise LEDs 1092*a*-1092*d*. While four LEDs 1092 are shown, any number of LEDs may be used instead. In the illustrated embodiment, the waveguide body 1090 is circular in shape, but may be any other shape, including the shapes disclosed herein. The light developed by the LEDs is directed axially downward as seen in FIG. 201B. The downwardly directed light is diverted by a beveled surface 1094 of the waveguide body 1090 radially inwardly by total internal reflection. The waveguide body 1090 includes one or more extraction features 1095 similar or identical to the extraction features of FIGS. 200A and 200B arranged in concentric and coaxial sections 1095*a*-1095*d* relative to the LEDs 1092*a*-1092*d*, also as in the embodiment of FIGS. 201A and 201B. Light is directed by the extraction features 1095 out one or both opposed surfaces 1096, 1098. If desired, the surface 1098 may be tapered along with the surface 1096 and/or the surface 1096 may be flat, as desired.

A still further embodiment of a waveguide body 1100 is shown in FIGS. 202A and 202B. The body 1100 has a base portion 1102 and an outwardly flared main light emitting portion 1104. The base portion may have an optional interior coupling cavity 1106 comprising a blind bore within which is disposed one or more light sources in the form of one or more LEDs 1110 (FIG. 202B). If desired, the interior coupling cavity 1106 may be omitted and light developed by the LEDs 1110 may be directed through an air gap into a planar or otherwise shaped input surface 1114. The waveguide body 1100 is made of any suitable optically transmissive material, as in the preceding embodiments. Light developed by the LED's travels through the main light emitting portion 1104 and out an inner curved surface 1116.

FIG. 202C illustrates an embodiment identical to FIGS. 202A and 202B except that the interior coupling cavity comprises a bore 1117 that extends fully through the base portion 1102 and the one or more light sources comprising one or more LEDs 1110 extend into the bore 1117 from an inner end as opposed to the outside end shown in FIGS. 202A and 202B. In addition, a light diverter comprising a highly reflective conical plug member 1118 is disposed in the outside end of the bore 1117. The plug member 1118 may include a base flange 1119 that is secured by any suitable means, such as an adhesive, to an outer surface of the waveguide body 1100 such that a conical portion 1120 extends into the bore 1117. If desired, the base flange 1119 may be omitted and the outer diameter of the plug member 1118 may be slightly greater than the diameter of the bore 1117 whereupon the plug member 1118 may be press fitted or friction fitted into the bore 1117 and/or secured by adhesive or other means. Still further, if desired, the conical plug member 1118 may be integral with the waveguide body 1100 rather than being separate therefrom. Further, the one or more LEDs 1110 may be integral with the waveguide body 1100, if desired. In the illustrated embodiment, the plug member 1118 may be made of white polycarbonate or any other suitable material, such as acrylic, molded silicone, polytetrafluoroethylene (PTFE), or Delrin® acetyl resin. The material may be coated with reflective silver or other metal or material using any suitable application methodology, such as a vapor deposition process.

Light developed by the one or more LEDs is incident on the conical portion 1120 and is diverted transversely through the base portion 1102. The light then travels through the main light emitting portion 1104 and out the inner curved surface 1116. Additional detail regarding light transmission and extraction is provided in co-owned U.S. Pat. No. 10,436,969, entitled "Optical Waveguide and Luminaire incorporating Same", incorporated by reference herein.

In either of the embodiments shown in FIGS. 202A-202C additional extraction features as disclosed herein may be disposed on any or all of the surfaces of the waveguide body 1100.

Other shapes of waveguide bodies and extraction features are possible. Combining these shapes stacks their effects and changes the waveguide body light distribution further. In general, the waveguide body shapes disclosed herein may include one or multiple inflection points or regions where a radius of curvature of a surface changes either abruptly or gradually. In the case of a waveguide body having multiple inflection regions, the inflection regions may be transverse to the path of light through the waveguide body (e.g., as seen in FIGS. 175A-175C), along the path of light through the waveguide body (e.g., shown in FIG. 182), or both (e.g., as shown by the waveguide body 1140 of FIGS. 203A-203C or by combining waveguide bodies having both inflection regions). Also, successive inflection regions may reverse between positive and negative directions (e.g., there may be a transition between convex and concave surfaces). Single inflection regions and various combinations of multiple inflection regions, where the inflection regions are along or transverse to the path of light through the waveguide body or multiple waveguide bodies are contemplated by the present invention.

Referring again to FIGS. 165A and 165C, light developed by the one or more LEDs 556 is transmitted through the coupling optic 552. If desired, an air gap is disposed between the LED(s) 556 and the coupling optic 552. Any suitable apparatus may be provided to mount the light source 556 in desired relationship to the coupling optic 552. The coupling optic 552 mixes the light as close to the light source 556 as possible to increase efficiency, and controls the light distribution from the light source 556 into the waveguide body. When using a curved waveguide body as described above, the coupling optic 552 can control the angle at which the light rays strike the curved surface(s), which results in controlled internal reflection or extraction at the curved surface(s).

If desired, light may be alternatively or additionally transmitted into the coupling optic 552 by a specular reflector at least partially or completely surrounding each or all of the LEDs.

As seen in FIGS. 204A and 204B, a further embodiment of a coupling optic 1100 having a coupling optic body 1101 is shown. The coupling optic is adapted for use with at least one, and preferably a plurality of LEDs of any suitable type. The coupling optic body 1101 includes a plurality of input cavities 1102*a*, 1102*b*, . . . , 1102N each associated with and receiving light from a plurality of LEDs (not shown in FIGS. 204A and 204B, but which are identical or similar to the LED 556 of FIG. 165A). The input cavities 1102 are identical to one another and are disposed in a line adjacent one another across a width of the coupling optic 1100. As seen in FIG. 204B, each input cavity 1102, for example, the input cavity 1102*b*, includes an approximately racetrack-shaped wall 1106 surrounded by arcuate upper and lower marginal surfaces 1108*a*, 1108*b*, respectively. A curved surface 1110 tapers between the upper marginal surface 1108*a* and a planar upper surface 1112 of the coupling optic 1100. A further curved surface identical to the curved surface 1110 tapers between the lower marginal surface 1108*b* and a planar lower surface of the coupling optic 1100.

A central projection 1114 is disposed in a recess 1116 defined by the wall 1106. The central projection 1114 is, in turn, defined by curved wall sections 1117*a*-1117*d*. A further approximately racetrack-shaped wall 1118 is disposed in a central portion of the projection 1114 and terminates at a base surface 1120 to form a further recess 1122. The LED associated with the input cavity 1102*b* in mounted by any suitable means relative to the input cavity 1102*b* so that the LED extends into the further recess 1122 with an air gap between the LED and the base surface 1120. The LED is arranged such that light emitted by the LED is directed into the coupling optic 1100. If desired, a reflector (not shown) may be disposed behind and/or around the LED to increase coupling efficiency. Further, any of the surfaces may be coated or otherwise formed with a reflective surface, as desired.

In embodiments such as that shown in FIGS. 204A and 204B where more than one LED is connected to a waveguide body, the coupling optic 1100 may reduce the dead zones between the light cones of the LEDs. The coupling optic 1100 may also control how the light cones overlap, which is particularly important when using different colored LEDs. Light mixing is advantageously accomplished so that the appearance of point sources is minimized.

As shown in FIGS. 165A and 170A, the coupling optic guide 552 introduces light emitted from the light source 556 to the waveguide 554. The light source 556 is disposed adjacent to a coupling optic 582 that has a cone shape to direct the light through the coupling optic guide 552. The coupling optic 582 is positioned within the coupling optic guide 552 against a curved indentation 584 formed on a front face 586 opposite the output face 562 of the coupling optic guide 552. The light source 556 is positioned outside of the coupling optic guide 552 within the curved indentation 584. An air gap 585 between the light source 556 and the indentation 584 allows for mixing of the light before the light enters the coupling optic 582. Two angled side surfaces 588, the front face 586, and the output face 562 may be made of a plastic material and are coated with a reflective material. The coupling optic guide 552 is hollow and filled with air.

Other embodiments of the disclosure including all of the possible different and various combinations of the individual features of each of the foregoing embodiments and examples are specifically included herein.

The waveguide components described herein may be used singly or in combination. Specifically, a flat, curved, or otherwise-shaped waveguide body with or without discrete extraction features could be combined with any of the coupling optics and light sources described herein. In any case, one may obtain a desired light output distribution.

Numerous modifications to the present disclosure will be apparent to those skilled in the art in view of the foregoing description. Accordingly, this description is to be construed as illustrative only and is presented for the purposes of enabling those skilled in the art to make and use the present disclosure and to teach the best mode of carrying out the same.

All references, including publications, patent applications, and patents, cited herein are hereby incorporated by reference to the same extent as if each reference were individually and specifically indicated to be incorporated by reference and were set forth in its entirety herein.

The invention claimed is:

1. A waveguide comprising:

a waveguide body including:

a top surface, bottom surface, and a light input surface defining coupling features for receiving light from a light emitter;

a light transmission portion disposed between the light input surface and a light extraction portion, where the light propagates through the light transmission portion toward the light extraction portion;

the light extraction portion comprising at least one light redirection feature and at least one light extraction feature that cooperate to generate a controlled light pattern exiting the waveguide body, wherein the at least one light redirection feature is disposed proximate the top surface of the waveguide body, and the at least one light extraction feature is disposed proximate the bottom surface of the waveguide body.

2. The waveguide of claim 1, wherein the at least one light extraction feature extracts a first portion of the light from the waveguide via total internal reflection.

3. The waveguide of claim 2, wherein the at least one light extraction feature extracts a second portion of the light from the waveguide via refraction.

4. The waveguide of claim 1, wherein the coupling features split the light into portions with different directional components.

5. The waveguide of claim 1, wherein the at least one light redirection feature and the at least one light extraction feature comprise curved surfaces.

6. The waveguide of claim 1, wherein the at least one light redirection feature and the at least one light extraction feature are curved facets.

7. The waveguide of claim 1, wherein the at least one light redirection feature comprises a plurality of concentric light redirection features.

8. The waveguide of claim 1, wherein the controlled light pattern comprises a uniform illumination pattern on a target surface.

9. The waveguide of claim 1, wherein the controlled light pattern comprises a circular illumination pattern on a target surface.

10. The waveguide of claim 1, wherein the controlled light pattern comprises a rectangular illumination pattern on a target surface.

11. A post top luminaire comprising:

a housing including a cover, a base, and struts extending between the cover and base; and at least one waveguide positioned in the housing, the waveguide comprising:

a top surface, bottom surface, and a light input surface defining coupling features for receiving light from a light emitter;

a light transmission portion disposed between the light input surface and a light extraction portion, where the light propagates through the light transmission portion toward the light extraction portion;

the light extraction portion comprising at least one light redirection feature and at least one light extraction feature that cooperate to generate a controlled light pattern exiting the waveguide body, wherein the at least one light redirection feature is disposed proximate the top surface of the waveguide body, and the at least one light extraction feature is disposed proximate the bottom surface of the waveguide body.

12. The post top luminaire of claim 11, wherein the at least one waveguide is coupled to the cover.

13. The post top luminaire of claim 11, wherein the at least one light extraction feature extracts a first portion of the light from the waveguide via total internal reflection.

14. The post top luminaire of claim 13, wherein the at least one light extraction feature extracts a second portion of the light from the waveguide via refraction.

15. The post top luminaire of claim 11, wherein the coupling features split the light into portions with different directional components.

16. The post top luminaire of claim 11, wherein the at least one light redirection feature and the at least one light extraction feature are curved facets.

17. A post top luminaire comprising:

a housing including a cover, a base, and struts extending between the cover and base; and at least one waveguide positioned in the housing, the waveguide comprising:

a light input surface defining coupling features, wherein a light emitter is disposed adjacent the light input surface and emits light into the coupling features;

a light transmission portion disposed between the light input surface and a light extraction portion, wherein light from the light emitter received at the light input surface propagates through the light transmission portion toward the light extraction portion; and the light extraction portion comprising at least one light redirection feature and at least one light extraction feature that cooperate to generate a controlled light pattern exiting the lighting device.

18. The post top luminaire of claim 17, wherein the at least one waveguide comprises a plurality of waveguides coupled to a support post within the housing.

19. The post top luminaire of claim 18, wherein the waveguides are arranged vertically along the support post.

20. The post top luminaire of claim 18, wherein the waveguides are arranged on adjacent faces of the support post.

* * * * *